United States Patent
Spokoyny et al.

(10) Patent No.: US 11,479,470 B2
(45) Date of Patent: Oct. 25, 2022

(54) THREE-DIMENSIONAL BORON-RICH CLUSTERS

(71) Applicant: The Regents of the University of California, Oakland, CA (US)

(72) Inventors: Alexander Spokoyny, Oakland, CA (US); Heather D. Maynard, Oakland, CA (US); Elaine A. Qian, Oakland, CA (US); Marco S. Messina, Oakland, CA (US); Alex Wixtrom, Oakland, CA (US); Jonathan Axtell, Oakland, CA (US); Kent Kirlikovali, Oakland, CA (US); Alejandra Gonzalez, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 1016 days.

(21) Appl. No.: 16/077,415

(22) PCT Filed: Feb. 21, 2017

(86) PCT No.: PCT/US2017/018755
§ 371 (c)(1),
(2) Date: Aug. 10, 2018

(87) PCT Pub. No.: WO2017/143348
PCT Pub. Date: Aug. 24, 2017

(65) Prior Publication Data
US 2019/0047871 A1    Feb. 14, 2019

Related U.S. Application Data

(60) Provisional application No. 62/296,961, filed on Feb. 18, 2016, provisional application No. 62/316,367, filed on Mar. 31, 2016.

(51) Int. Cl.
*C01B 35/12* (2006.01)
*C08F 2/50* (2006.01)
*C08F 112/08* (2006.01)

(52) U.S. Cl.
CPC .............. *C01B 35/12* (2013.01); *C08F 2/50* (2013.01); *C08F 112/08* (2013.01); *C01P 2002/84* (2013.01); *C01P 2002/85* (2013.01); *C01P 2004/30* (2013.01); *C01P 2004/64* (2013.01); *C01P 2006/40* (2013.01)

(58) Field of Classification Search
CPC ........... C01B 35/12; C08F 112/08; C08F 2/50
See application file for complete search history.

(56) References Cited

FOREIGN PATENT DOCUMENTS

| WO | 2017143348 A2 | 8/2017 |
| WO | 2017143348 A3 | 8/2017 |

OTHER PUBLICATIONS

Lee et al., Angew. Chem. Int. Ed., (2007), 46(17), p. 3018-3022.*
Rodriguez et al., "Synthetic Inhibitors of Extended Helix-Protein Interactions Based on a Biphenyl 4,4'-Dicarboxamide Scaffold", ChemBioChem, Mar. 4, 2009, vol. 10, pp. 829-833, DOI: 10.1002/cbic.200800715.
Roy et al., "Reductive Elimination of Aryl Halides upon Addition of Hindered Alkylphosphines to Dimeric Arylpalladium(II) Halide Complexes", Organometallics, Feb. 25, 2004, vol. 23, No. 7, pp. 1533-1541, doi: 10.1021/om034277u.
Sailor et al., "Surface chemistry of Luminescent Silicon Nanocrystallites", Advanced Materials, 1997, vol. 9, pp. 783-793.
Sajoto et al., "Blue and Near-UV Phosphorescence from Iridium Complexes with Cyclometalated Pyrazolyl or N-Heterocyclic Carbene Ligands", Inorganic Chemistry, vol. 44, No. 22, Sep. 27, 2005, pp. 7992-8003, DOI: 10.1021/ic081296i.
Salentine, "High-field boron-11 NMR of alkali borates. Aqueous polyborate equilibria", Inorganic Chemistry, Dec. 1983, vol. 22, pp. 3920-3924, doi 10.1021/ic00168a019.
Salvi et al., "A New Biarylphosphine Ligand for the Pd-Catalyzed Synthesis of Diaryl Ethers under Mild Conditions", Organic Letters, 2012, vol. 14, No. 1, pp. 170-173, First Published Dec. 19, 2011, doi: 10.1021/ol202955h.
Saris et al., "Gram Scale Synthesis of Benzophenanthroline and Its Blue Phosphorescent Platinum Complex", Organic Letters, Aug. 4, 2016, vol. 18, No. 16, pp. 3960-3963, DOI: 10.1021/acs.orglett.6b01693.
Satapathy et al., "Glycoconjugates of Polyhedral Boron Clusters", Journal of Organometallic Chemistry, vol. 798, Part 1, Dec. 1, 2015, pp. 13-23, https://doi.org/10.1016/j.jorganchem.2015.06.027.
Schaeck et al., "Rapid Cage Degradation of 1-Formyl- and 1-Alkyloxycarbonyl-Substituted 1,2-Dicarba-closo-dodecaboranes by Water or Methanol in Polar Organic Solvents", Inorganic Chemistry, 1999, vol. 38, No. 1, pp. 204-206, published on web Dec. 12, 1998, doi: 10.1021/ic980995a.
Schareina et al., "Improving palladium-catalyzed cyanation of aryl halides: development of a state-of-the-art methodology using potassium hexacyanoferrate(II) as cyanating agent", Journal of Organometallic Chemistry, Nov. 29, 2004, vol. 689, No. 24, pp. 4576-4583, available online Sep. 15, 2004, doi: 10.1016/j.jorganchem.2004.08.020.

(Continued)

*Primary Examiner* — Yong L Chu
(74) *Attorney, Agent, or Firm* — KPPB LLP

(57) ABSTRACT

Novel three-dimensional molecular clusters and methods of their synthesis are provided. The three-dimensional molecular clusters may be perfunctionalized polyhedral boranes and carboranes. The three-dimensional clusters may be configured to manipulate the photophysical properties of other materials, including, for example, for use as photooxidants or as components in organic light-emitting diode materials. Methods are also provided for synthesizing and perfunctionalizing such three-dimensional clusters. The three-dimensional clusters may also be configured for use as organomimetic materials.

13 Claims, 62 Drawing Sheets

(56) References Cited

OTHER PUBLICATIONS

Schnockel, "Structures and Properties of Metalloid Al and Ga Clusters Open Our Eyes to the Diversity and Complexity of Fundamental Chemical and Physical Processes during Formation and Dissolution of Metals", Chemical Reviews, 2010, vol. 110, No. 7, pp. 4125-4163, published on web Jun. 11, 2010, doi:10.1021/cr900375g.

Scholz et al., "Carbaboranes as Pharmacophores: Properties, Synthesis, and Application Strategies", Chemical Reviews, Jul. 25, 2011, vol. 111, pp. 7035-7062, dx.doi.org/10.1021/cr200038x.

Scholz et al., "Chemical degradation mechanisms of organic semiconductor devices", Proc. SPIE 6999, Apr. 16, 2008, vol. 69991B, pp. 69991B-1-69991B-10, doi: 10.1117/12.778875.

Seifert et al., "Chemical degradation mechanisms of highly efficient blue phosphorescent emitters used for organic light emitting diodes", Organic Electronics, Jan. 2013, vol. 14, pp. 115-123, available online Nov. 7, 2012, http://dx.doi.org/10.1016/j.orgel.2012.10.003.

Semioshkin et al., "Reactions of closo-[B12H12]2- anion with aromatic acylchlorides: synthesis of novel 1,2-disubstituted dodecaborates [1-HO-2-ArCOB12H10]2-", Polyhedron, 2004, vol. 23, No. 13, pp. 2135-2139, available online Jul. 29, 2004, doi: 10.1016/j.poly.2004.06.005.

Sevryugina et al., "Novel Approach to Aminocarboranes by Mild Amidation of Selected lodo-carboranes", Inorganic Chemistry, Oct. 21, 2010, vol. 49, No. 22, pp. 10627-10634, doi: 0.1021/ic101620h.

Sgarbossa et al., "Steric Effects in the Baeyer-Villiger Oxidation of Ketones Catalyzed by Platinum(II) Lewis Acid Complexes with Coordinated Electron-Donor Alkyl Diphosphines", Organometallics, Apr. 10, 2007, vol. 26, No. 10, pp. 2714-2719, doi.10.1021/om070077x.

Shapiro et al., "The Nature of Boron Hydride Solids", Journal of the American Chemical Society, Sep. 20, 1959, vol. 81, pp. 4787-4790, doi: 10.1021/ja01527a009.

Shelly et al., ".eta. 1-Benzene coordination: the synthesis and x-ray crystal structure of a novel silver salt of the weakly coordinating carborane anion B11CH12-", Journal of the American Chemical Society, vol. 107, No. 21, Oct. 1985, pp. 5955-5959.

Shelly et al., "The Least Coordinating Anion", Journal of the American Chemical Society, vol. 108, No. 11, May 1986, pp. 3117-3118.

Sheppard, "Metal-catalysed halogen exchange reactions of aryl halides", Organic & Biomolecular Chemistry, 2009, vol. 7, pp. 1043-1052, first published as an Advance Article on the web Jan. 30, 2009, doi: 10.1039/B818155A.

Shi et al., "Carborane tuning of photophysical properties of phosphorescent iridium(III) complexes", Chemical Communications, Mar. 4, 2013, vol. 49, pp. 4746-4748, doi: 10.1039/c3cc40996a.

Shi et al., "Carboranes Tuning the Phosphorescence of Iridium Tetrazolate Complexes", Chemistry: A European Journal, Dec. 8, 2014, vol. 20, No. 50, pp. 16550-16557, http://dx.doi.org/10.1022/chem.201404743.

Shi et al., "Variable Photophysical Properties of Phosphorescent Iridium(III) Complexes Triggered by closo—and nido -Carborane Substitution", Angewandte Chemie, Dec. 9, 2013, vol. 125, Issue 50, pp. 13676-1368, first published Oct. 16, 2013, https://doi.org/10.1002/ange.201307333l.

Shi et al., "Variable Photophysical Properties of Phosphorescent Iridium(III) Complexes Triggered by closo—and nido-Carborane Substitution", Angewandte Chemie International Edition, Oct. 16, 2013, vol. 52, pp. 13434-13438, DOI: 10.1002/anie.201307333.

Sit et al., "Facile Synthesis of ansa-Zirconocenes Incorporating a Linked Dicarbollyl Ligand via Direct Deboration of Zirconocene Carboranyl Complexes", Organometallics, Jun. 9, 2011, vol. 30, No. 13, pp. 3449-3452, dx.doi.org/10.1021/om200245g.

Sivaev et al., "Derivatives of the closo-dodecaborate anion and their application in medicine", Russian Chemical Bulletin, International Edition, Aug. 2002, vol. 51, No. 8, pp. 1362-1374.

Sivasubramaniam et al., "Fluorine cleavage of the light blue heteroleptic triplet emitter Flrpic", Journal of Fluorine Chemistry, Jul. 2009, vol. 130, pp. 640-649, available online May 5, 2009, doi: 10.1016/j.fluchem.2009.04.009.

Smith et al., "Mechanistic Studies of Two-Dimensional Covalent Organic Frameworks Rapidly Polymerized from Initially Homogenous Conditions", Journal of the American Chemical Society, May 22, 2014, vol. 136, No. 24, pp. 8783-8789, dx.doi.org/10.1021/ja5037868.

Speiser et al., "Two-Electron-Transfer Redox Systems, Part 7: Two-Step Electrochemical Oxidation of the Boron Subhalide Cluster Dianions B6X62- (X = Cl, Br, I)", Inorganic Chemistry, 2003, vol. 42, No. 13, pp. 4018-4028, published on web May 28, 2003, doi: 10.1021/ic034101l.

Spokoyny, "New ligand platforms featuring boron-rich clusters as organomimetic substituents", Pure and Applied Chemistry, Apr. 29, 2013, vol. 85, No. 5, pp. 903-919, http://dx.doi.org/10.1351/PAC-CON-13-01-13.

Spokoyny et al., "A coordination chemistry dichotomy for icosahedral carborane-based ligands", Nature Chemistry, Aug. 2011, vol. 3, pp. 590-596, published online Jul. 22, 2011, doi: 10.1038/nchem.1088.

Spokoyny et al., "A Perfluoroaryl-Cysteine SNAr Chemistry Approach to Unprotected Peptide Stapling", Journal of the American Chemical Society, Apr. 5, 2013, vol. 135, No. 16, pp. 5946-5949, dx.doi.org/10.1021/ja400119t.

Spokoyny et al., "Carborane-Based Pincers: Synthesis and Structure of SeBSe and SBS Pd(II) Complexes", Journal of the American Chemical Society, Jun. 17, 2009, vol. 131, pp. 9482-9483, doi:10.1021/ja902526k.

Spokoyny et al., "Extremely Electron-Rich, Boron-Functionalized, Icosahedral Carborane-Based Phosphinoboranes", Organometallics, Dec. 24, 2012, vol. 31, pp. 8478-8481, dx.doi.org/10.1021/om301116x.

Stevens et al., "[Ir(PCy3)2(H)2(H2B-NMe2)]+ as a Latent Source of Aminoborane: Probing the Role of Metal in the Dehydrocoupling of H3B-NMe2H and Retrodimerisation of [H2BNMe2]2", Chemistry: A European Journal, Mar. 1, 2011, vol. 17, No. 10, pp. 3011-3020, doi: 10.1002/chem.201002517.

Su et al., "Nucleosome-like Structure from Dendrimer-Induced DNA Compaction", Macromolecules, Jun. 4, 2012, vol. 45, No. 12, pp. 5208-5217, dx.doi.org/10.1021/ma300308y.

Sundermeier et al., "Progress in the Palladium-Catalyzed Cyanation of Aryl Chlorides", Chemistry- A European Journal, Apr. 8, 2003, vol. 9, No. 8, pp. 1828-1836, doi: 10.1002/chem.200390210.

Surry et al., "Biaryl Phosphane Ligands in Palladium-Catalyzed Amination", NIH Public Access, published in final edited form as Angewandte Chemie International Edition, Aug. 4, 2008, vol. 47, No. 34, pp. 6338-6361, author manuscript available in PMC Dec. 7, 2012, doi: 10.1002/anie.200800497.

Suzuki et al., "Template synthesis of precisely monodisperse silica nanoparticles within self-assembled organometallic spheres", Nature Chemistry, vol. 2, No. 1, Jan. 2010, Electronic Publication: Nov. 22, 2009, pp. 25-29, DOI: 10.1038/NCHEM.446.

Swensen et al., "Improved Efficiency in Blue Phosphorescent Organic Light-Emitting Devices Using Host Materials of Lower Triplet Energy than the Phosphorescent Blue Emitter", Advanced Functional Materials, Sep. 9, 2011, vol. 21, No. 17, pp. 3250-3258, DOI: 10.1002/adfm.201100586.

Taft Jr., "The General Nature of the Proportionality of Polar Effects of Substituent Groups in Organic Chemistry", Journal of the American Chemical Society, Sep. 1953, vol. 75, No. 17, pp. 4231-4238, doi: 10.1021/ja01113a027.

Tamayo et al., "Synthesis and Characterization of Facial and Meridional Tris-cyclometalated Iridium(III) Complexes", Journal of the American Chemical Society, May 22, 2003, vol. 125, No. 24, pp. 7377-7387, doi: 10.1021/ja034537z.

Tang et al., "Dehydrogenation of Saturated CC and BN Bonds at Cationic N-Heterocyclic Carbene Stabilized M(III) Centers (M = Rh, Ir)", Journal of the American Chemical Society, vol. 132, No. 30, Jul. 12, 2010, pp. 10578-10591, doi: 10.1021/ja1043787.

Tang et al., "Nickel-Catalyzed Cross-Coupling Reactions of o-Carboranyl with Aryl Iodides: Facile Synthesis of 1-Aryl-o-

(56) References Cited

OTHER PUBLICATIONS

Carboranes and 1,2-Diaryl-o-Carboranes", Angewandte Chemie International Edition, May 8, 2015, vol. 54, pp. 7662-7665, DOI: 10.1002/anie.201502502.

Teixidor et al., "exo-nido-Cyclooctadienerhodacarboranes: Synthesis, Reactivity, and Catalytic Properties in Alkene Hydrogenation", Journal of the American Chemical Society, Feb. 23, 2000, vol. 122, No. 9, pp. 1963-1973, doi: 10.1021/ja992970w.

Teixidor et al., "Forced exo-nido rhoda and ruthenacarboranes as catalyst precursors: a review", Journal of Organometallic Chemistry, Dec. 8, 2000, vol. 614-615, pp. 48-56.

Teixidor et al., "Synthesis of Globular Precursors", Chemistry: A European Journal, Sep. 1, 2015, vol. 21, No. 36, pp. 12778-12786, DOI: 10.1002/chem.201501223.

Temesghen et al., "Analytical utility of valence band X-ray photoelectron spectroscopy of iron and its oxides, with spectral interpretation by cluster and band structure calculations", Analytical and Bioanalytical Chemistry, Aug. 2002, vol. 373, pp. 601-608, DOI: 10.1007/s00216-002-1362-3.

Chen et al., "Light-Controlled Radical Polymerization: Mechanisms, Methods, and Applications", Chemical Review, vol. 116, No. 17, Mar. 15, 2016, pp. 10167-10211, DOI: 10.1021/acs.chemrev.5b00671.

Chen et al., "Visible-Light-Controlled Living Radical Polymerization from a Trithiocarbonate Iniferter Mediated by an Organic Photoredox Catalyst", ACS Macro Letters, Apr. 30, 2015, vol. 4, No. 5, pp. 566-569, doi 10.1021/acsmacrolett.5b00241.

Cheng et al., "Facile Synthesis of N-Carboranyl Amines through an ortho-Carboryne Intermediate", Communications, Angewandte Chemie, 2016, vol. 128, pp. 1783-1786, doi:10.1002/anie.201507952.

Cherng, "Synthesis of substituted pyridines by the reactions of halopyridines with sulfur, oxygen and carbon nucleophiles under focused microwave irradiation", Tetrahedron, vol. 58, No. 24, Jun. 10, 2002, pp. 4931-4935.

Chi et al., "Transition-metal phosphors with cyclometalating ligands fundamentals and applications", Chemical Society Reviews, Feb. 2010, vol. 39, No. 2, pp. 638-655, first published as an Advance Article on the web Dec. 7, 2009, DOI: 10.1039/b916237b.

Chou et al., "Phosphorescent Dyes for Organic Light-Emitting Diodes", Chemistry—A European Journal, 2007, vol. 13, pp. 380-395, DOI: 10.1002/chem.200601272.

Connelly et al., "Chemical Redox Agents for Organometallic Chemistry", Chemical Reviews, Mar. 26, 1996, vol. 96, pp. 877-910.

Cornioley-Deuschel et al., "Complexes of platinum(II) and palladium(II) with the 2,2'-biphenyldiyl dianion as a .sigma.-bonded chelate ligand", Inorganic Chemistry, Oct. 1987, vol. 26, pp. 3354-3358.

Coult et al., "C-arylation and C-heteroarylation of icosahedral carboranes via their copper(I) derivatives", Journal of Organometallic Chemistry, Dec. 14, 1993, vol. 462, No. 1-2, pp. 19-29.

Crespo et al., "Luminescent nido-Carborane-Diphosphine Anions [(PR2)2C2B9H10]- (R = Ph, iPr). Modification of Their Luminescence Properties upon Formation of Three-Coordinate Gold(I) Complexes", Inorganic Chemistry, Feb. 19, 2003, vol. 42, No. 6, pp. 2061-2068.

Crespo et al., "Structural and Photophysical Study on Heterobimetallic Complexes with d8-d10 Interactions Supported by Carborane Ligands: Theoretical Analysis of the Emissive Behaviour", Chemistry: A European Journal, Mar. 10, 2014, vol. 20, No. 11, pp. 3120-3127, DOI: 10.1002/chem201303735.

Crowther et al., "Coordination of CB11H12- to cationic zirconium(IV) complexes. Synthesis and structures of (C5H5)2Zr(.eta.2-CH2Ph)(CB11H12), (C5H4Me)2Zr(CH3)(CB11H12), and (C5Me5)Zr(CH3)2(CB11H12)", Organometallics, vol. 12, No. 8, Aug. 1993, pp. 2897-2903.

Cummings et al., "Tuning the Excited-State Properties of Platinum(II) Diimine Dithiolate Complexes", Journal of the American Chemical Society, Feb. 28, 1996, vol. 118, pp. 1949-1960.

Czerwieniec et al., "The Lowest Excited State of Brightly Emitting Gold(I) Triphosphine Complexes", Inorganic Chemistry, vol. 49, No. 8, Mar. 16, 2010, pp. 3764-3767, DOI: 10.1021/ic902325n.

Dam et al., Binding of Multivalent Carbohydrates to Concanavalin A and Dioclea grandiflora Lectin: Thermodynamic Analysis of the "Multivalency Effect", Journal of Biological Chemistry, vol. 275, No. 19, May 12, 2000, pp. 14223-14230, doi: 10.1074/jbc.275.19.14223.

Daniel et al., "Gold Nanoparticles: Assembly, Supramolecular Chemistry, Quantum-Size-Related Properties, and Applications Toward Biology, Catalysis, and Nanotechnology", Chem. Rev., 2004, vol. 104, pp. 293-346, doi: 10.1021/cr030698.

Darmawan et al., "Highly efficient blue and deep-blue emitting zwitterionic iridium(III) complexes: synthesis, photophysics and electroluminescence", Journal of Materials Chemistry C, vol. 2, No. 14, Mar. 2014, pp. 2569-2582, DOI: 10.1039/c3tc32181a.

De Moraes et al., "Analysis of chemical degradation mechanism within sky blue phosphorescent organic light emitting diodes by laser-desorption/ionization time-of-flight mass spectrometry", Organic Electronics, Feb. 2011, vol. 12, pp. 341-347, available online Dec. 1, 2010, doi: 10.1016/j.orgel.2010.11.004.

Deblase et al., "Rapid and Efficient Redox Processes within 2D Covalent Organic Framework Thin Films", ACS Nano, vol. 9, No. 3, Feb. 11, 2015, pp. 3178-3183.

Dedeian et al., "Photophysical and Electrochemical Properties of Heteroleptic Tris-Cyclometalated Iridium(III) Complexes", Inorganic Chemistry Communication, vol. 44, No. 13, May 21, 2005, pp. 4445-4447.

Dohmeier et al., "The Tetrameric Aluminum(I) Compound [}AI(n5-C5Me5)}4]", Angewandte Chemie International Edition, vol. 30, No. 5, May 1991, pp. 564-565.

Doi et al., "Reaction of [Ir(cyclo-octa-1,5-diene){P(p. tolyl)3}2][nido-7,8-C2B9H12] with hydrogen; synthesis and X-ray structure of 3,9-[(H)2{P(p-tolyl)3}2Ir]-3,9-μ-(H)2-7,8-C2B9H10", Journal of the Chemical Society, Chemical Communications, No. 3, 1980, pp. 80-82.

Douvris et al., "Hydrodefluorination of Perfluoroalkyl Groups Using Silylium-Carborane Catalysts", Science, Aug. 29, 2008, vol. 321, pp. 1188-1190, doi: 10.1126/science.1159979.

Douvris et al., "Update 1 of: Chemistry of the Carba-closo-dodecaborate(-) Anion, CB11H12-", Chemical Reviews, vol. 113, No. 10, Oct. 9, 2013, pp. PR179-PR233, dx.doi.org/10.1021/cr050548u.

Dreaden et al., "The Golden Age: Gold Nanoparticles for Biomedicine", Chemical Society Reviews, vol. 41, No. 7, Apr. 7, 2012, Electronic Publication: Nov. 22, 2011, pp. 2740-2779, DOI: 10.1039/c1cs15237h.

Düfert et al., "Suzuki-Miyaura Cross-Coupling of Unprotected, Nitrogen-Rich Heterocycles: Substrate Scope and Mechanistic Investigation", Journal of the American Chemical Society, Aug. 2, 2013, vol. 135, No. 34, pp. 12877-12885, dx.doi.org/10.1021/ja4064469.

Duhovic et al., "Synthesis and Electrical Properties of Covalent Organic Frameworks with Heavy Chalcogens", Chemistry of Materials, vol. 27, No. 16, Jul. 30, 2015, pp. 5487-5490, DOI: 10.1021/acs.chemmater.5b02358.

Dungey et al., "Photobehavior of (α-Diimine)dimesitylplatinum(II) Complexes", Inorganic Chemistry, Oct. 7, 2000, vol. 39, pp. 5192-5196.

Eberhardt et al., "The Valence Structure of the Boron Hydrides", Journal of Chemical Physics, Jun. 1954, vol. 22, No. 6, pp. 989-1001, published online Dec. 29, 2004, doi: 10.1063/1.1740320.

Edelbach et al., "Catalytic Hydrogenolysis of Biphenylene with Platinum, Palladium, and Nickel Phosphine Complexes", Organometallics, Sep. 26, 1998, vol. 17, pp. 4784-4794, doi: 10.1021/om9805281.

Eleazer et al., "Metal- and Ligand-Centered Reactivity of meta-Carboranyl-Backbone Pincer Complexes of Rhodium", Organometallics, Jan. 13, 2016, vol. 35, pp. 106-112, DOI: 10.1021/acs.organomet.5b00807.

El-Hellani et al., "Structure and Bonding of a Zwitterionic Iridium Complex Supported by a Phosphine with the Parent Carba-closo-

(56) References Cited

OTHER PUBLICATIONS dodecaborate CB11H11—Ligand Substituent", Organometallics, vol. 32, No. 23, Nov. 22, 2013, pp. 6887-6890, dx.doi.org/10.1021/om401001p.

El-Kaderi et al., "Designed Synthesis of 3D Covalent Organic Frameworks", Science, vol. 316, No. 5822, Apr. 13, 2007, pp. 268-272, DOI: 10.1126/science.1139915.

Ellis et al., "A Convenient Preparation of B12H12 2- Salts", Journal of the American Chemical Society, Dec. 1963, vol. 85, vol. 23, p. 3885, doi: 10.1021/ja00906a032.

Elsabahy et al., "Design of polymeric nanoparticles for biomedical delivery applications", Chemical Society Reviews, vol. 41, No. 7, Feb. 14, 2012, pp. 2545-2561, DOI: 10.1039/c2cs15327k.

El-Zaria et al., "High yielding synthesis of carboranes under mild reaction conditions using a homogeneous silver(I) catalyst: Direct evidence of a bimetallic intermediate", Angewandte Chemie—International Edition, vol. 53, No. 20, May 12, 2014, pp. 5156-5160, DOI: 10.1002/anie.201311012.

El-Zaria et al., "m-Carborane-Based Chiral NBN Pincer-Metal Complexes: Synthesis, Structure, and Application in Asymmetric Catalysis", Inorganic Chemistry, Mar. 25, 2011, vol. 50, pp. 4149-4161, dx.doi.org/10.1021/ic2002095.

Endo et al., "Potent estrogen agonists based on carborane as a hydrophobic skeletal structure, A new medicinal application of boron clusters", Chemistry & Biology, Apr. 1, 2001, vol. 8, pp. 341-355.

Erhardt et al., "Mechanisms of Catalyst Poisoning in Palladium-Catalyzed Cyanation of Haloarenes. Remarkably Facile C-N Bond Activation in the [(Ph3P)4Pd]/[Bu4N]+ CN- System", Journal of the American Chemical Society, Mar. 13, 2008, vol. 130, No. 14, pp. 4828-4845, doi: 10.1021/ja078298h.

Fagnoni et al., "Photocatalysis for the Formation of the C-C Bond", Chemical Reviews, May 27, 2007, vol. 107, No. 6, pp. 2725-2756, doi: 10.1021/cr068352x.

Farha et al., "Synthesis and Hydrogen Sorption Properties of Carborane Based Metal-Organic Framework Materials", Journal of the American Chemical Society, Sep. 27, 2007, vol. 129, No. 42, pp. 12680-12681, doi: 10.1021/ja076167a.

Farha et al., "Synthesis of Stable Dodecaalkoxy Derivatives of hypercloso-B12H12", Journal of the American Chemical Society, Dec. 3, 2005, vol. 127, No. 51, pp. 18243-18251, doi: 10.1021/ja0556373.

Farha et al., "Synthesis, Properties, and Gas Separation Studies of a Robust Diimide-Based Microporous Organic Polymer", Chemistry of Materials, Communication, vol. 21, No. 14, Jul. 1, 2009, pp. 3033-3035, DOI:10.1021/cm901280w.

Farokhzad et al., "Impact of Nanotechnology on Drug Delivery", ACS Nano, vol. 3, No. 1, Jan. 27, 2009, pp. 16-20.

Fernandez-Megia et al., "A Click Approach to Unprotected Glycodendrimers", Macromolecules, vol. 39, No. 6, Feb. 10, 2006, pp. 2113-2120, doi: 10.1021/ma052448w.

Feuillastre et al., "Design and Synthesis of New Circularly Polarized Thermally Activated Delayed Fluorescence Emitters", Journal of the American Chemical Society, vol. 138, No. 12, Mar. 11, 2016, pp. 3990-3993, DOI: 10.1021/jacs.6b00850.

Fey et al., "Regioselective B-Cyclometalation of a Bulky o-Carboranyl Phosphine and the Unexpected Formation of a Dirhodium(II) Complex", Organometallics, Feb. 9, 2012, vol. 31, pp. 2907-2913, dx.doi.org/10.1021/om201198s.

Fleetham et al., "Efficient "Pure" Blue OLEDs Employing Tetradentate Pt Complexes with a Narrow Spectral Bandwidth", Advanced Materials, vol. 26, No. 41, Sep. 10, 2014, pp. 7116-7121, DOI: 10.1002/adma.201401759.

Fleetham et al., "Efficient deep blue electrophosphorescent devices based on platinum(II) bis(n-methyl-imidazolyl)benzene chloride", Organic Electronics: Physics, Materials, Applications, vol. 13, No. 8, Aug. 2012, pp. 1430-1435, available online Apr. 17, 2012, dx.doi.org/10.1016/j.orgel.2012.03.041.

Fleetham et al., "Tetradentate Pt(II) Complexes with 6-Membered Chelate Rings: A New Route for Stable and Efficient Blue Organic Light Emitting Diodes", Chemistry of Materials, vol. 28, No. 10, Mar. 16, 2016, pp. 3276-3282, DOI: 10.1021/acs.chemmater.5b04957.

Forster et al., "Electron Density and Bonding in Borates: An Experimental Study of Tetrabutylammonium Heptahydridohexaborate, [(C4H9)4N][B6H7]", European Journal of Inorganic Chemistry, vol. 2007, No. 20, Jul. 2007, pp. 3169-3172, DPO 10.1002/ejic.200700444.

Fort, "2-Fluoropyridine", Encyclopedia of Reagents for Organic Synthesis, Article—RN00559 Sep. 17, 2007, 5 pgs.

Fox et al., "Deboronation ofC-Substituted ortho- and Meta-Closo-Carboranes Using "Wet" Fluoride ion Solutions", Polyhedron, vol. 15, No. 4, pp. 565-571.

Fréchet, "Dendrimers and supramolecular chemistry", Proceedings of the National Academy of Sciences of USA, Apr. 16, 2002, vol. 99, No. 8. pp. 4782-4787, doi: 10.1073/pnas.082013899.

Friis et al., "Mild Pd-Catalyzed Aminocarbonylation of (Hetero)Aryl Bromides with a Palladacycle Precatalyst", Organic Letters, Aug. 4, 2014, vol. 16, No. 16, pp. 4296-4299, doi: 10.1021/ol502014b.

Fritze et al., "closo-Halogenohydrohexaborate, II 11B-NMR—Spectra of the closo-Halogenohydrohexaborate XnB6H6-n2-, n = 0-6; X = Cl, Br, I", Zeitschrift für Naturforschung, 42b, 1987, pp. 287-292.

Fritze et al., "closo-Halogenohydrohexaborate, III Vibrational Spectra of the closo-Halogenohydrohexaborate XnB6H6-n2-, n = 1-5; X = Cl, Br, I", Zeitschrift für Naturforschung, 42b, 1987, pp. 293-300.

Gabel, "Boron clusters in medicinal chemistry: perspectives and problems", Pure and Applied Chemistry, vol. 87, No. 2, Jan. 6, 2015, pp. 173-179, DOI 10.1515/pac-2014-1007.

Garrou, ".DELTA.R-ring contributions to phosphorus-31 NMR parameters of transition-metal-phosphorus chelate complexes", Chemical Reviews, Jun. 1981, vol. 81, pp. 229-266.

Gaumet et al., "Nanoparticles for drug delivery: The need for precision in reporting particle size parameters", European Journal of Pharmaceutics and Biopharmaceutics, May 2008, vol. 69, pp. 1-9, available online Aug. 7, 2007, doi:10.1016/j.ejpb.2004.08.001.

Geim et al., "The rise of graphene", Nature Materials, Mar. 2007, vol. 6, pp. 183-191.

Geis et al., "Synthesis and characterization of synthetically useful salts of the weakly-coordinating dianion [B12Cl12]2-", Dalton Transactions, Apr. 21, 2009, pp. 2687-2694, first published as an Advance Article of the web Feb. 24, 2009, doi: 10.1039/b821030f.

Ghedini et al., "Oxidative Addition to Cyclometalated Azobenzene Platinum(II) Complexes: A Route to Octahedral Liquid Crystalline Materials", Organometallics, May 4, 1999, vol. 18, pp. 2116-2124.

Giebink et al., "Intrinsic luminance loss in phosphorescent small-molecule organic light emitting devices due to bimolecular annihilation reactions", Journal of Applied Physics, vol. 103, No. 4, Feb. 28, 2008, pp. 044509-1-044509-9, https://doi.org/10.1063/1.2884530.

Giljohann et al., "Oligonucleotide Loading Determines Cellular Uptake of DNA-Modified Gold Nanoparticles", Nano Letters, Nov. 13, 2007, vol. 7, No. 12, pp. 3818-3821.

Goswami et al., "cRGD Peptide-Conjugated Icosahedral closo-B122- Core Carrying Multiple Gd3+-DOTA Chelates for αvβ3 Integrin-Targeted Tumor Imaging (MRI)", Inorganic Chemistry, Feb. 7, 2013, vol. 52, No. 4, pp. 1701-1709, doi: 10.1021/ic302340c.

Goswami et al., "Synthesis of Vertex-Differentiated Icosahedral closo-Boranes: Polyfunctional Scaffolds for Targeted Drug Delivery", Journal of Organic Chemistry, Nov. 20, 2012, vol. 77, pp. 11333-11338, doi: 10.1021/jo3021314.

Gouzerh et al., "Main-Group Element, Organic, and Organometallic Derivatives of Polyoxometalates", Chemical Reviews, vol. 98, No. 1, Feb. 5, 1998, pp. 77-112.

Grimes, "Carboranes in the chemist's toolbox", Dalton Transactions, Feb. 13, 2015, vol. 44, No. 13, pp. 5939-5956, doi:10.1039/c5dt00231a.

Grimes et al., "Boron Clusters Come of Age", Journal of Chemical Education, May 1, 2004, vol. 81, No. 5, pp. 657-672, doi: 10.1021/ed081p657.

(56) References Cited

OTHER PUBLICATIONS

Gruner et al., "Synthesis of 12-Substituted 1-Carba-closo-dodecaborate Anions and First Hyperpolarizability of the 12-C7H6+-CB11H11—Ylide", Journal of the American Chemical Society, vol. 121, No. 13, Mar. 19, 1999, pp. 3122-3126.
Grushin, "Carboranylhalonium ions: from striking reactivity to a unified mechanistic analysis of polar reactions of diarylhalonium compounds", Accounts of Chemical Research, Nov. 1992, vol. 25, No. 11, pp. 529-536, doi: 10.1021/ar00023a007.
Gu et al., "Exhaustive Chlorination of [B12H12]2—without Chlorine Gas and the Use of [B12Cl12]2—as a Supporting Anion in Catalytic Hydrodefluorination of Aliphatic C-F Bonds", Inorganic Chemistry, Mar. 1, 2011, vol. 50, pp. 2726-2728, doi: 10.1021/ic200024u.
Guarise et al., "A multivalent HIV-1 fusion inhibitor based on small helical foldamers", Tetrahedron, vol. 68, No. 23, Jun. 10, 2012, pp. 4346-4352, doi:10.1016/j.tet.2012.03.078.
Hakkinen, "The gold-sulfur interface at the nanoscale", Nature Chemistry, Jun. 2012, vol. 4, No. 6, pp. 443-455, published online May 22, 2012, DOI:10.1038/NCHEM.1352.
Hang et al., "Highly Efficient Blue-Emitting Cyclometalated Platinum(II) Complexes by Judicious Molecular Design", Angewandte Chemie International Edition, May 9, 2013, vol. 52, pp. 6753-6756, DOI:10.1002/anie.201302541.
Hansch et al., "A survey of Hammett substituent constants and resonance and field parameters", Chemical Reviews, Mar. 1991, vol. 91, pp. 165-195, doi: 10.1021/cr00002a004.
Harwell et al., "Auracarboranes with and without Au-Au Interactions: An Unusually Strong Aurophilic Interaction", Journal of the American Chemical Society, Mar. 20, 1996, vol. 118, No. 11, pp. 2679-2685.
Harwell et al., "Structural Characterization of Representative d7, d8, and d9 Transition Metal Complexes of Bis(o-carborane)", Inorganic Chemistry, Dec. 3, 1997, vol. 36, pp. 5951-5955.
Hawker et al., "Preparation of Polymers with Controlled Molecular Architecture. A New Convergent Approach to Dendritic Macromolecules", Journal of the American Chemical Society, vol. 112, No. 21, Oct. 1990, pp. 7638-7647.
Hawthorne, "Boron, My Favorite Element", Journal of Chemical Education, Oct. 1, 2009, vol. 86, pp. 1131, doi: 10.1021/ed086p1131.
Hawthorne, "New discoveries at the interface of boron and carbon chemistries", Pure and Applied Chemistry, 2003, vol. 75, No. 9, pp. 1157-1164.
Hawthorne, "The Role of Chemistry in the Development of Boron Neutron Capture Therapy of Cancer", Angewandte Chemie International Edition, Jul. 1993, vol. 32, No. 7, pp. 950-984.
Hawthorne et al., "Preparation and characterization of the (3)-1,2- and (3)-1,7-dicarbadodecahydroundecaborate(-1) ions", Journal of the American Chemical Society, vol. 90, No. 4, Feb. 1968, pp. 862-868.
Heindl et al., "Giant Rugby Ball [{CpBnFe(n5-P5)}24Cu96Br96] Derived from Pentaphosphaferrocene and CuBr2", Journal of the American Chemical Society, Aug. 17, 2015, vol. 137, No. 34, pp. 10938-10941, DOI: 10.1021/jacs.5b06835.
Hertler, "Chemistry of Boranes. XIII. Chloromethyldimethylamino Derivatives of B10H10-2 and B12H12-2", Inorganic Chemistry, Aug. 1964, vol. 3, pp. 1195-1196, doi: 10.1021/ic50018a030.
Herzog et al., "A Camouflaged nido-Carborane Anion: Facile Synthesis of Octa-B-methyl-1,2-dicarba-closo-dodecaborane(12) and Its Deboration Reaction", Chemistry—A European Journal, Mar. 25, 1999, vol. 5, pp. 1212-1217.
Himmelspach et al., "Microwave-Assisted Kumada-Type Cross-Coupling Reactions of Iodinated Carba-closo-dodecaborate Anions", Inorganic Chemistry, Jan. 26, 2012, vol. 51, No. 4, pp. 2679-2688, dx.doi.org/10.1021/ic202638k.
Hirai et al., "One-Step Borylation of 1,3-Diaryloxybenzenes Towards Efficient Materials for Organic Light-Emitting Diodes", Angewandte Chemie International Edition, Nov. 9, 2015, vol. 54, No. 46, p. 13581-13585, DOI: 10.1002/anie.201506335.
Hissler et al., "Platinum diimine complexes: towards a molecular photochemical device", Coordination Chemistry Reviews, Oct. 2000, vol. 208, pp. 115-137.
Hoffman et al., "The origins and evolution of "controlled" drug delivery systems", Journal of Controlled Release, Dec. 18, 2008, vol. 132, No. 3, pp. 153-163, available online Aug. 28, 2008.
Hoffmann et al., "A new 4c-2e bond in B6H7-", Chem. Communication, 2007, pp. 3097-3099.
Hoffmann et al., "Boron Hydrides: LCAO-MO and Resonance Studies", Journal of Chemical Physics, 1962, Published Online Jul. 20, 2004, vol. 37, pp. 2872-2883, doi: 10.1063/1.1733113.
Holmes et al., "Blue organic electrophosphorescence using exothermic host-guest energy transfer", Applied Physics Letters, Apr. 14, 2003, vol. 82, No. 15, pp. 2422-2424, https://doi.org/10.1063/1.1568146.
Hostetler et al., "Dynamics of Place-Exchange Reactions on Monolayer-Protected Gold Cluster Molecules", Langmuir, vol. 15, No. 11, Apr. 30, 1999, pp. 3782-3789.
Hostetler et al., "Monolayers in Three Dimensions: Synthesis and Electrochemistry of ω-Functionalized Alkanethiolate-Stabilized Gold Cluster Compounds", Journal of the American Chemical Society, vol. 118, No. 17, 1996, pp. 4212-4213.
Housecroft et al., "Cluster bonding and energetics of the borane anions, BnHn2- (n = 5-12): A comparative study using bond length—bond enthal", Polyhedron, vol. 4, No. 11, 1985, pp. 1875-1881.
Hudson et al., "Enhancing Phosphorescence and Electrophosphorescence of Cyclometalated Pt(II) Compounds with Triarylboron", Advanced Functional Materials, Oct. 22, 2010, vol. 20, pp. 3426-3439, DOI: 10.1002/adfm.201000904.
Ivanov et al., "Fluorination of deltahedral closo-borane and -carborane anions with N-fluoro reagents", Journal of Fluorine Chemistry, vol. 89, No. 1, Apr. 30, 1998, pp. 65-72.
Ivanov et al., "Synthesis and Characterization of Ammonioundecafluoro-closo-dodecaborates(1-). New Superweak Anions", Inorganic Chemistry, Jun. 25, 2003, vol. 42, No. 15, pp. 4489-4491.
Ivanov et al., "Synthesis and Stability of Reactive Salts of Dodecafluoro-closo-dodecaborate(2-)", Journal of the American Chemical Society, Mar. 27, 2003, vol. 125, pp. 4694-4695, doi: 10.1021/ja0296374.
Jacobsen, "Hypovalency—a kinetic-energy density description of a 4c-2e bond", Dalton Transactions, Apr. 22, 2009, No. 21, pp. 4252-4258.
Munoz et al., "Real-Time Evaluation of Binding Mechanisms in Multivalent Interactions: A Surface Plasmon Resonance Kinetic Approach", Journal of the American Chemical Society, Apr. 8, 2013, vol. 135, No. 16, pp. 5966-5969, dx.doi.org/10.1021/ja400951g.
Nakamura et al., "Design and synthesis of fluorescence-labeled closo-dodecaborate lipid: its liposome formation and in vivo imaging targeting of tumors for boron neutron capture therapy", Organic & Biomolecular Chemistry, Nov. 3, 2011, vol. 10, No. 7, pp. 1374-1380, DOI: 10.1039/c1ob06500a.
Narayanam et al., "Visible light photoredox catalysis: applications in organic synthesis", Chemical Society Reviews, 2011, vol. 40, pp. 102-113, First Published Jun. 10, 2010, doi: 10.1039/b913880n.
Nieuwenhuyzen et al., "Ionic Liquids Containing Boron Cluster Anions", Inorganic Chemistry, Jan. 7, 2009, vol. 48, No. 3, pp. 889-901, DOI: 10.1021/ic/801448w.
Nunez et al., "Coordination of the nido-carboranyldiphosphine ligand to ruthenium(II): the first example of the tricoordinating capacity of the 7,8-(PPh2)2-7,8-C2B9H10 moiety", Applied Organometallic Chemistry, May 7, 2003, vol. 17, No. 6-7, pp. 509-517, DOI:10.1002/aoc464.
Nunez et al., "Electrochemistry and Photoluminescence of Icosahedral Carboranes, Boranes, Metallacarboranes, and Their Derivatives", Chemical Reviews, Nov. 14, 2016, vol. 116, No. 23, pp. 14307-14378, DOI: 10.1021/acs.chemrev.6b00198.
Olid et al., "Methods to produce B-C, B-P, B-N and B-S bonds in boron clusters", Chemical Society Reviews, 2013, vol. 42, pp. 3318-3336, doi: 10.1039/c2cs35441a.
Oliva et al., "On the electronic structure and stability of icosahedral r-X2Z10H12 and Z12H122- clusters; r = {ortho, meta, para}, X =

(56) References Cited

OTHER PUBLICATIONS

{C, Si}, Z = {B, Al}", Physical Chemistry Chemical Physics, 2010, vol. 12, first published as an Advance Article on the web Mar. 26, 2010, pp. 5101-5108, DOI: 10.1039/b924322d.

Owen et al., "Chelated biscarborane transition metal derivatives formed through carbon-metal .sigma, bonds", Journal of the American Chemical Society, Feb. 24, 1971, vol. 93, No. 4, pp. 873-880.

Owen et al., "Novel chelated biscarborane transition metal complexes formed through carbon-metal .sigma, bonds", Journal of the American Chemical Society, May 20, 1970, vol. 92, No. 10, pp. 3194-3196.

Park et al., "Modulation of protein-protein interactions by synthetic receptors: Design of molecules that disrupt serine protease-proteinaceous inhibitor interaction", Proceedings of the National Academy of Sciences of USA, Apr. 16, 2002, vol. 99, No. 8, pp. 5105-5109, www.pnas.org/dgi/doi/10.1073/pnas.0/2675899.

Park et al., "The substituent effect of 2-R-o-carborane on the photophysical properties of iridium(III) cyclometalates", Dalton Transactions, Feb. 17, 2016, vol. 45, No. 13, pp. 5667-5675, DOI: 10.1039/9dt00065g.

Paw et al., "Luminescent platinum complexes: tuning and using the excited state", Coordination Chemistry Reviews, Apr. 1998, vol. 171, pp. 125-150.

Peczuh et al., "Peptide and Protein Recognition by Designed Molecules", Chemical Reviews, Jun. 20, 2000, vol. 100, No. 7, pp. 2479-2494, DOI 10.1021/cr9900026.

Peer et al., "Nanocarriers as an emerging platform for cancer therapy", Nature Nanotechnology, vol. 2, Dec. 2007, pp. 751-760.

Perkowski et al., "Visible Light Photoinitiated Metal-Free Living Cationic Polymerization of 4-Methoxystyrene", Journal of the American Chemical Society, Jun. 8, 2015, vol. 137, No. 24, pp. 7580-7583, doi: 10.1021/jacs.5b03733.

Peryshkov et al., "Direct Perfluorination of K2B12H12 in Acetonitrile Occurs at the Gas Bubble-Solution Interface and Is Inhibited by HF. Experimental and DFT Study of Inhibition by Protic Acids and Soft, Polarizable Anions", Journal of the American Chemical Society, Dec. 2, 2009, vol. 131, No. 51, pp. 18393-18403, doi: 10.1021/ja9069437.

Peryshkov et al., "Latent Porosity in Potassium Dodecafluoro-closo-dodecaborate(2-). Structures and Rapid Room Temperature Interconversions of Crystalline K2B12F12, K2(H2O)2B12F12, and K2(H2O)4B12F12 in the Presence of Water Vapor", Journal of the American Chemical Society, Sep. 10, 2010, vol. 132, No. 39, pp. 13902-13913, DOI: 10.1021/ja105522d.

Peymann et al., "A Study of the Sequential Acid-Catalyzed Hydroxylation of Dodecahydro-closo-dodecaborate(2-)", Inorganic Chemistry, Feb. 24, 2000, vol. 39, No. 6, pp. 1163-1170, doi: 10.1021/ic991105.

Peymann et al., "An Icosahedral Array of Methyl Groups Supported by an Aromatic Borane Scaffold: The [closo-B12(CH3)12]2- Ion", Journal of the American Chemical Society, vol. 121, No. 23, May 29, 1999, pp. 5601-5602, doi: 10.1021/ja990884q.

Peymann et al., "An unpaired electron incarcerated within an icosahedral borane cage: Synthesis and crystal structure of the blue, air-stable {[closo-B12(CH3)12]}-radical", Chemical Communications, 1999, vol. 20, pp. 2039-2040.

Peymann et al., "Aromatic polyhedral hydroxyborates: bridging boron oxides and boron hydrides", Angewandte Chemie International Edition, 1999, vol. 38, No. 6, pp. 1061-1064.

Peymann et al., "Dodeca (benzyloxy) dodecaborane, B12 (OCH2Ph) 12: A Stable Derivative of hypercloso-B12H12", Angewandte Chemie International Edition, 2001, vol. 40, No. 9, pp. 1664-1667.

Peymann et al., "Dodecahydroxy-closo-dodecaborate(2-)", Journal of the American Chemical Society, Feb. 14, 2001, vol. 123, No. 10, pp. 2182-2185, doi: 10.1021/ja0014887.

Peymann et al., "Dodecamethyl-closo-dodecaborate(2-)", Inorganic Chemistry, vol. 40, No. 6, Feb. 10, 2001, pp. 1291-1294, DOI: 10.1021/ic0010398.

Pitochelli et al., "The Isolation of the Icosahedral B12h12-2 Ion", Journal of the American Chemical Society, Jun. 1960, vol. 82, pp. 3228-3229, doi: 10.1021/ja01497a069.

Popescu et al., "Metal promoted charge and hapticities of phosphines: The uniqueness of carboranylphosphines", Coordination Chemistry Reviews, Jun. 15, 2014, vol. 269, pp. 54-84, available online Feb. 28, 2014.

Power, "Persistent and Stable Radicals of the Heavier Main Group Elements and Related Species", Chemical Reviews, Feb. 22, 2003, vol. 103, No. 3, pp. 789-809, doi: 10.1021/cr020406p, doi: 10.1021/cr020406p.

Preetz et al., "Preparation and 11B-NMR-Spectra of the Perhalogenated closo-Hexaborate B6XnY6-n2-, n = 0-6; X + Y = Cl, Br, I", Zeitschrift für Naturforschung, 45b, 1990, pp. 1113-1117.

Preetz et al., "Preparation, 11 B-NMR- and Vibrational Spectra of the Octahedral closo-Borate Anions B6X62-; X= H, Cl, Br, I", Zeitschrift für Naturforschung, 39b, 1984, pp. 1472-1477.

Preetz et al., "Preparation, 11B-NMR and Vibrational Spectra of the closo-Hexaborates [B6(SCN)6]2- and [B6(SeCN)6]2-", Zeitschrift für Naturforschung, 47b, 1992, pp. 1119-1121.

Preetz et al., "Preparation, Vibrational Spectra and Normal Coordinate Analysis of the 10B and 11B Isotopomers of [B2(NCS)6]2- and Crystal Structure of (Ph3P=N=PPh3)2[B2(NCS)6]", Zeitschrift für Naturforschung, 51b, 1996, pp. 551-556.

Preetz et al., "The Hexahydro-closo-hexaborate Dianion [B6H6]2- and Its Derivatives", European Journal of Inorganic Chemistry, Nov. 1999, vol. 1999, No. 11, pp. 1831-1846.

Press et al., "Triflyloxy-substituted carboranes as useful weakly coordinating anions", Chemical Communications, Jul. 30, 2015, vol. 51, No. 74, p. 14034-14037, DOI: 10.1039/c5cc05047b.

Prier et al., "Visible Light Photoredox Catalysis with Transition Metal Complexes: Applications in Organic Synthesis", Chemical Reviews, Mar. 19, 2013, vol. 113, No. 7, pp. 5322-5363, doi: 10.1021/cr300503r.

Prokhorov et al., "Brightly Luminescent Pt(II) Pincer Complexes with a Sterically Demanding Carboranyl-Phenylpyridine Ligand: A New Material Class for Diverse Optoelectronic Applications", Journal of American Chemical Society, Jun. 17, 2014, vol. 136, pp. 9637-9642, dx.doi.org/10.1021/ja503220w.

Puga et al., "Synthesis of quadruped-shaped polyfunctionalized o-carborane synthons", Chemical Communications, Jan. 24, 2011, vol. 47, pp. 2252-2254, doi: 10.1039/C0CC05151A.

Pyykko et al., "Molecular Single-Bond Covalent Radii for Elements 1-118", Chemistry: A European Journal, Dec. 22, 2008, vol. 15, No. 1, pp. 186-197, DOI: 10.1002/chem.200800987.

Qian et al., "Atomically precise organomimetic cluster nanomolecules assembled via perfluoroaryl-thiol SNAr chemistry", Nature Chemistry, vol. 19 Dec. 2016, vol. 9, No. 4, pp. 333-340, DOI: https://doi.org/10.1038/nchem.2686.

Quan et al., "Palladium-Catalyzed Regioselective Diarylation of o-Carboranes By Direct Cage B-H Activation", Angewandte Chemie, 2016, vol. 128, pp. 1317-1320, DOI: 10.1002/anie.201507697.

Qui, "Recent advances in transition metal-mediated functionalization of o-carboranes", Tetrahedron Letters, Feb. 2015, vol. 56, No. 8, pp. 963-971, doi: 10.1016/j.tetlet.2015.01.038.

Ramachandran et al., "A Bond-Fluctuation Mechanism for Stochastic Switching in Wired Molecules", Science, May 30, 2003, vol. 300, pp. 1413-1416, doi: 10.1126/science.1083825.

Ramírez-Contreras et al., "Convenient C-alkylation of the [HCB11CI11]—carborane anion", Dalton Transactions, vol. 41, No. 26, Mar. 9, 2012, pp. 7842-7844, DOI: 10.1039/c2dt12431a.

Ramírez-Contreras et al., "Synthesis of a Silylium Zwitterion", Angewandte Chemie: International Edition, Sep. 23, 2013, vol. 52, No. 39, pp. 10313-10315 DOI: 10.1002/anie.201302082.

Rao et al., "Polymer nanoparticles: Preparation techniques and size-control parameters", Progress in Polymer Science, Jul. 2011, vol. 36, No. 7, pp. 887-913, available online Jan. 22, 2011.

Ren et al., "A Facile and Practical Synthetic Route to 1,1'-Bis(o-carborane)", Organometallics, Sep. 4, 2008, vol. 27, pp. 5167-5168, doi: 10.1021/am8005323.

Rifat et al., "Rhodium Phosphines Partnered with the Carborane Monoanions [CB11H6Y6]- (Y = H, Br). Synthesis and Evaluation

(56) References Cited

OTHER PUBLICATIONS as Alkene Hydrogenation Catalysts", Organometallics, Jun. 4, 2002, vol. 21, No. 14, pp. 2856-2865, doi: 10.1021/om020077r.
Riley et al., "Unprecedented flexibility of the 1,1'-bis(o-carborane) ligand: catalytically-active species stabilised by B-agostic B-H-Ru interactions", Dalton Transactions, 2016, vol. 45, pp. 1127-1137, DOI:10.1039/c5dt03417e.
Rillema et al., "Electronic and Photophysical Properties of Platinum(II) Biphenyl Complexes Containing 2,2'-Bipyridine and 1,10-Phenanthroline Ligands", Inorganic Chemistry, 2013, vol. 52, pp. 596-607, published Dec. 27, 2012, dx.doi.org/10.1021/ic301393e.
Rillema et al., "HOMO-LUMO energy gap control in platinum(II) biphenyl complexes containing 2,2'-bipyridine ligands", Dalton Transactions, Aug. 27, 2015, vol. 44, pp. 17075-17090, DOI: 10.1039/c5dt01891a.
Jacobsen, "Steve Buchwald @60", Advanced Synthesis & Catalysis, Jul. 17, 2015, vol. 357, No. 10, pp. 2173-2174, doi: 10.1002/adsc.201500536.
Jain et al., "Protein Surface Recognition by Synthetic Receptors Based on a Tetraphenylporphyrin Scaffold", Organic Letters, May 23, 2000, vol. 2, No. 12, pp. 1721-1723, doi: 10.1021/ol005871s.
Jalisatgi et al., "A Convenient Route to Diversely Substituted Icosahedral Closomer Nanoscaffolds", Journal of the American Chemical Society, Jul. 18, 2011, vol. 133, No. 32, pp. 12382-12385, dx.doi.org/10.1021ja204488p.
Jenne et al., "Alkoxy substituted halogenated closo-dodecaborates as anions for ionic liquids", Dalton Transactions, Jun. 24, 2015, vol. 44, pp. 13119-13124, doi: 10.1039/c5dt01633a.
Jiang et al., "Zwitterionic Iridium Complexes: Synthesis, Luminescent Properties, and Their Application in Cell Imaging", Inorganic Chemistry, Mar. 8, 2010, vol. 49, No. 7, pp. 3252-3260.
Jones, "Recent advances in the molecular design of synthetic vaccines", Nature Chemistry, Dec. 2018, vol. 7, pp. 952-960, published online Nov. 20, 2015, doi:10.1038/NCHEM.2396.
Jones et al., "Analysis of protein-protein interaction sites using surface patches", Journal of Molecular Biology, Sep. 12, 1997, vol. 272, pp. 121-132.
Jones et al., "Nanomaterials: Programmable materials and the nature of the DNA bond", Science, vol. 347, No. 6224, Feb. 20, 2015, pp. 1260901-1-1260901-11, DOI: 10.1126/science.1260901.
Jude et al., "Coordination-Driven Self-Assemblies with a Carborane Backbone", Journal of the American Chemical Society, Aug. 9, 2005, vol. 127, pp. 12131-12139, doi: 10.1021/ja053050i.
Julius et al., "Synthesis and evaluation of transthyretin amyloidosis inhibitors containing carborane pharmacophores", Proceedings of the National Academy of Sciences of USA, Mar. 20, 2007, vol. 104, No. 12, pp. 4808-4813.
Juris et al., "Ru(II) polypyridine complexes: photophysics, photochemistry, eletrochemistry, and chemiluminescence", Coordination Chemistry Reviews, Mar. 1988, vol. 84, pp. 85-277, doi: 10.1016/0010-8545(88)80032-8.
Kabytaev et al., "B-Mercaptocarboranes: A New Synthetic Route", European Journal of Inorganic Chemistry, Feb. 4, 2013, vol. 2013, No. 14, pp. 2488-2491, doi: 10.1002/ejic.201201518.
Kabytaev et al., "Boron-Oxygen Bond Formation by Palladium-Catalyzed Etheration of 2-Iodo-para-carborane", Organometallics, Jul. 24, 2009, vol. 28, No. 16, pp. 4758-4763, doi: 10.1021/om9001044.
Kahlert et al., "Syntheses and reductions of C-dimesitylboryl-1,2-dicarba-closo-dodecaboranes", Dalton Transactions, Apr. 24, 2015, vol. 44, pp. 9766-9781, doi:10.1039/c5dt00758e.
Kaim et al., "Boron Atoms as Spin Carriers in Two- and Three-Dimensional Systems", Angewandte Chemie International Edition, Jun. 25, 2009, vol. 48, pp. 5082-5091, doi: 10.1002/anie.200803493.
Kalyanasundaram, "Photophysics, photochemistry and solar energy conversion with tris(bipyridyl)ruthenium(II) and its analogues", Coordination Chemistry Reviews, Oct. 1982, vol. 46, pp. 159-244, doi: 10.1016/0010-8545(82)85003-0.

Kamiya et al., "Saccharide-Coated M12L24 Molecular Spheres That Form Aggregates by Multi-interaction with Proteins", Journal of the American Chemical Society, Mar. 8, 2007, vol. 129, No. 13, pp. 3816-3817.
Kavitha et al., "In Search of High-Performance Platinum(II) Phosphorescent Materials for the Fabrication of Red Electroluminescent Devices", Advanced Functional Materials, Feb. 14, 2005, vol. 15, pp. 223-229, DOI: 10.1002/adfm.200400131.
Kawasumi et al., "Thermally Activated Delayed Fluorescence Materials Based on Homoconjugation Effect of Donor-Acceptor Triptycenes", Journal of the American Chemical Society, Sep. 14, 2015, vol. 137, No. 37, pp. 11908-11911, DOI:10.1021/jacs.5b07932.
Kennedy et al., "Carborane-Based Metal-Organic Framework with High Methane and Hydrogen Storage Capacities", Chemistry of Materials, Aug. 3, 2013, vol. 25, No. 17, pp. 3539-3543, dx.doi.org/10.1021/cm4020942.
Keskin et al., "Principles of protein-protein interactions: what are the preferred ways for proteins to interact?", Chemical Reviews, Mar. 21, 2008, vol. 108, No. 4, pp. 1225-1244.
Kielian et al., "Virus membrane-fusion proteins: more than one way to make a hairpin", Nature Reviews Microbiology, Jan. 1, 2006, vol. 4, pp. 67-76, doi: 10.1038/nrmicro1326.
Kiessling et al., "Synthetic Multivalent Ligands as Probes of Signal Transduction", Angewandte Chemie International Edition, Mar. 24, 2006, vol. 45, No. 15, pp. 2348-2368.
Kikuchi et al., "Stepwise DNA condensation by a histone-mimic peptide-coated M12L24 spherical complex", Chemical Science, vol. 5, No. 8, Apr. 29, 2014, pp. 3257-3260, doi: 10.1039/c4sc00656a.
Kim et al., "Homoleptic Tris-Cyclometalated Iridium Complexes with Substituted o-Carboranes: Green Phosphorescent Emitters for Highly Efficient Solution-Processed Organic Light-Emitting Diodes", Inorganic Chemistry, Jan. 7, 2016, vol. 55, No. 2, pp. 909-917, doi: 10.1021/acs.inorgchem.5b02444.
Kim et al., "o-Carboranyl-Phosphine as a New Class of Strong-Field Ancillary Ligand in Cyclometalated Iridium(III) Complexes: Toward Blue Phosphorescence", Organometallics, Jul. 7, 2015, vol. 34, pp. 3455-3458, doi: 10.1021/acs.organomet.5b00438.
Kim et al., "Phosphorescence Color Tuning of Cyclometalated Iridium Complexes by o-Carborane Substitution", Inorganic Chemistry, 2013, vol. 52, pp. 160-168, published Dec. 20, 2012, dx.doi.org/10.1021/ic3015699.
King, "Three-Dimensional Aromaticity in Polyhedral Boranes and Related Molecules", Chemical Reviews, Mar. 3, 2001, vol. 101, pp. 1119-1152, doi: 10.1021/cr000442t.
King et al., "Chemical applications of group theory and topology. 7. A graph-theoretical interpretation of the bonding topology in polyhedral boranes, carboranes, and metal clusters", Journal of the American Chemical Society, Nov. 1977, vol. 99, No. 24, pp. 7834-7840.
King et al., "Dodecamethylcarba-closo-dodecaboranyl (CB11Me12•), a Stable Free Radical", Journal of the American Chemical Society, Nov. 6, 1996, vol. 118, vol. 44, pp. 10902-10903, doi: 10.1021/ja9622160.
King et al., "The Sixteen CB11HnMe12-n- Anions with Fivefold Substitution Symmetry: Anodic Oxidation and Electronic Structure", Journal of the American Chemical Society, Oct. 5, 2007, vol. 129, No. 43, pp. 12960-12980.
Knoth et al., "Chemistry of Boranes. IX. Halogenation of B10H10-2 and B12H12-2", Inorganic Chemistry, Feb. 1964, vol. 3, pp. 159-167, doi: 10.1021/ic50012a002.
Knoth et al., "Derivative Chemistry of B10H10- and B12H12-", Journal of the American Chemical Society, Mar. 1962, vol. 84, pp. 1056-1057, doi: 10.1021/ja00865a040.
Ko et al., "Blue phosphorescent N-heterocyclic carbene chelated Pt(II) complexes with an alpha-duryl-beta-diketonato ancillary ligand", Dalton Transactions, 2015, vol. 44, pp. 8433-8443, doi: 10.1039/c4dt03085k.
Kogot et al., "Single Peptide Assembly onto a 1.5 nm Au Surface via a Histidine Tag", Journal of the American Chemical Society, Nov. 5, 2008, vol. 130, No. 48, pp. 16156-16157, doi:10.1021/ja8064717.

(56) References Cited

OTHER PUBLICATIONS

Konieczka et al., "Synthesis, Characterization, and Selected Properties of 7- and 12-Ammoniocarba-closo-dodecaboranes", European Journal of Inorganic Chemistry, 2013, First Published Nov. 9, 2012, vol. 2013, No. 1, pp. 134-146, doi: 10.1002/ejic.201200969.
Kracke et al., "Carborane-Derived Local Anesthetics are Isomer Dependent", ChemMedChem, 2015, First Published Nov. 24, 2014, vol. 10, No. 1, pp. 62-67, doi: 10.1002/cmdc.201402369.
Kuhn et al., "Porous, Covalent Triazine-Based Frameworks Prepared by Ionothermal Synthesis", Angewandte Chemie International Edition, Apr. 14, 2008, vol. 47, No. 18, pp. 3450-3453, DOI: 10.1002/ANIE.200705710.
Kui et al., "Robust phosphorescent platinum(II) complexes with tetradentate O^N^C^N ligands: high efficiency OLEDs with excellent efficiency stability", Chemical Communications, Jan. 16, 2013, vol. 49, No. 15, pp. 1497-1499, DOI: 10.1039/c2cc37862k.
Kultyshev et al., "S-Alkylation and S-Amination of Methyl Thioethers -Derivatives of closo-[B12H12]2-. Synthesis of a Boronated Phosphonate, gem-Bisphosphonates, and Dodecaborane-ortho-carborane Oligomers", Journal of the American Chemical Society, Feb. 2002, vol. 124, No. 11, pp. 2614-2624, published on Web Feb. 19, 2002, DOI: 10.1021/ja0123857.
Kultyshev et al., "Synthesis of Mono- and Dihalogenated Derivatives of (Me2S)2B12H10 and Palladium-Catalyzed Boron-Carbon Cross-Coupling Reactions of the Iodides with Grignard Reagents", Inorganic Chemistry, Apr. 12, 2003, vol. 42, No. 10, pp. 3199-3207.
Kvam et al., "Spectroscopic and Electrochemical Properties of Some Mixed-Ligand Cyclometalated Platinum(II) Complexes Derived from 2-Phenylpyridine", Acta Chemica Scandinavica, 1995, vol. 49, pp. 335-343.
Ladouceur et al., "A Comprehensive Survey of Cationic Iridium(III) Complexes Bearing Nontraditional Ligand Chelation Motifs", European Journal of Inorganic Chemistry, vol. 2013, No. 17, Jun. 2013, pp. 2985-3007, doi: 10.1002/ejic.201300171.
Lamansky et al., "Synthesis and Characterization of Phosphorescent Cyclometalated Iridium Complexes", Inorganic Chemistry, vol. 40, No. 7, Mar. 1, 2001, pp. 1704-1711.
Lavallo et al., "Perhalogenated Carba-closo-dodecaborate Anions as Ligand Substituents: Applications in Gold Catalysis", Angewandte Chemie: International Edition, Mar. 11, 2013, vol. 52, No. 11, pp. 3172-3176, DOI: 10.1002/anie201209107.
Lee et al., "Alkoxy derivatives of dodecaborate: Discrete nanomolecular ions with tunable pseudometallic properties", Angew.Chem. Int. Ed., 2007, vol. 46, No. 17, pp. 3018-3022, DOI: 10.1002/anie.200605126.
Lee et al., "Deep blue phosphorescent organic light-emitting diodes with very high brightness and efficiency", Nature Materials, Jan. 2016, vol. 15, pp. 92-98, published online Oct. 19, 2015, DOI:10.10388/NMAT4446.
Lee et al., "Iridium Cyclo metalates with Tethered o-Carboranes: Impact of Restricted Rotation of o-Carborane on Phosphorescence Efficiency", Journal of the American Chemical Society, Jun. 15, 2015, vol. 137, No. 35, pp. 8018-8021, doi: 10.1021/jacs.5b04576.
Lee et al., "Luminous Butterflies: Efficient Exciton Harvesting by Benzophenone Derivatives for Full-Color Delayed Fluorescence OLEDs", Angewandte Chemie International Edition, Jun. 2014, vol. 126, No. 25, pp. 6520-6524, DOI: 10.1002/ange.201402992.
Lee et al., "Manipulation of Phosphorescence Efficiency of Cyclometalated Iridium Complexes by Substituted o-Carboranes", Chemistry: A European Journal, Jan. 26, 2015, vol. 21, No. 5, pp. 2052-2061, DOI: 10.1002/chem.201405433.
International Preliminary Report on Patentability for International Application PCT/US2018/018755, Report issued Aug. 21, 2018, dated Aug. 30, 2018, 12 Pgs.
International Search Report and Written Opinion for International Application No. PCT/US2017/018755, Search completed Aug. 29, 2017, dated Aug. 29, 2017, 17 Pgs.
Aihara, "Three-dimensional aromaticity of polyhedral boranes", Journal of the American Chemical Society, May 24, 1978, vol. 100, No. 11, pp. 3339-3342, doi: 10.1021/ja00479a015.

Alconcel et al., "FDA-approved poly(ethylene glycol)-protein conjugate drugs", Polymer Chemistry, vol. 2, No. 7, Apr. 27, 2011, pp. 1442-1448.
Allen et al., "Honeycomb Carbon: A Review of Graphene", Chemical Reviews, 2010, vol. 110, No. 1, pp. 132-145, first published Jul. 17, 2009.
Alov, "Determination of the States of Oxidation of Metals in Thin Oxide Films by X-Ray Photoelectron Spectroscopy", Journal of Analytical Chemistry, May 2005, vol. 60, pp. 431-435.
Ambrogio et al., "Mechanized Silica Nanoparticles: A New Frontier in Theranostic Nanomedicine", Accounts of Chemical Research, vol. 44, No. 10, Oct. 18, 2011, Online Publication: Jun. 15, 2011, pp. 903-913.
Ames et al., "A Convenient Synthesis of Ethynyl-N-heteroarenes", Synthesis, May 1981, pp. 364-365.
Arkin et al., "Small-molecule inhibitors of protein-protein interactions: progressing towards the dream", Nature Reviews, Drug Discovery, 2004, vol. 3, pp. 301-317, doi: 10.1038/nrd1343.
Azzarito et al., "Inhibition of a-helix-mediated protein-protein interactions using designed molecules", Nature Chemistry, Mar. 2013, vol. 5, pp. 161-173, published online Feb. 20, 2013, doi:10.1038/NCHEN.1568.
Bader, "A Quantum Theory of Molecular Structure and Its Applications", Chemical Reviews, vol. 91, No. 5, Jul. 1991, pp. 893-928.
Bader, "Atoms in Molecules: A Quantum Theory", Angew. Chem. 1992, vol. 104, No. 10, p. 1423.
Bader et al., "Properties of atoms in molecules: structures and reactivities of boranes and carboranes", Canadian Journal of Chemistry, vol. 70, No. 2, Feb. 1992, pp. 657-676.
Bae et al., "Deep Red Phosphorescence of Cyclometalated Iridium Complexes by o-Carborane Substitution", Inorganic Chemistry, 2014, vol. 53, pp. 128-138, first published Dec. 13, 2013, dx.doi.org.10/1021/ic401775m.
Bae et al., "Heteroleptic tris-cyclometalated iridium(III) complexes supported by an o-carboranyl-pyridine ligand", Dalton Transactions, Apr. 25, 2013, vol. 42, pp. 8549-8552.
Bandyopadhyay et al., "Isomeric bis[(phenylazo)acetaldoximato]platinum(II) compounds", Inorganic Chemistry, Apr. 1983, vol. 22, pp. 1315-1321.
Baranoff et al., "Flrpic: archetypal blue phosphorescent emitter for electroluminescence", Dalton Transactions, 2015, vol. 44, pp. 8318-8329, doi:10.1039/c4dt02991g.
Baurmeister et al., "Darstellung, Schwingungsspektren und Normalkoordinationsanalyse der D- und 13C-lsotopomeren des Methylpentahydro-closo-hexaborats [B6H5(CH3)]2- sowie Kristallstruktur von [P(C6H5)4] [B6H6(CH3)]", Zeitschrift fur Naturforschung, 50b, 1995, pp. 623-629.
Becer et al., "Click Chemistry beyond Metal-Catalyzed Cycloaddition", Angewandte Chemie International Edition, vol. 48, No. 27, Jun. 17, 2009, pp. 4900-4908, doi: 10.1002/anie.200900755.
Becer et al., "Clicking Pentafluorostyrene Copolymers: Synthesis, Nanoprecipitation, and Glycosylation", Macromolecules, vol. 42, No. 7, Mar. 12, 2009, pp. 2387-2394.
Beletskaya et al., "New B-substituted derivatives of m-carborane, p-carborane, and cobalt bis(1,2-dicarbollide) anion", Journal of Organometallic Chemistry, vol. 689, No. 18, Sep. 15, 2004, pp. 2920-2929, available online Jul. 24, 2004, doi:10.1016.j.jorganchem.2004.05.047.
Beletskaya et al., "Palladium-Catalyzed Amination of 2-Iodo-para-carborane", Organometallics, Mar. 27, 2007, vol. 26, No. 9, pp. 2340-2347, doi: 10.1021/om0611756.
Bernardi et al., "Multivalent glycoconjugates as anti-pathogenic agents", Chemical Society Reviews, vol. 42, No. 11, Dec. 19, 2012, pp. 4709-4727, DOI: 10.1039/c2cs35408j.
Bevilacqua et al., "Synthesis and Characterization of Luminescent Square-Planar Platinum(II) Complexes Containing Dithiolate or Dithiocarbamate Ligands", Inorganic Chemistry, Jun. 1994, vol. 33, pp. 2913-2923.
Birchall et al., "The Mechanism of the Nucleophilic Substitution Reactions of Polyfluoroarenes", Chemical Communications (London), No. 7, 1967, pp. 338-339.
Biscoe et al., "A New Class of Easily Activated Palladium Precatalysts for Facile C-N Cross-Coupling Reactions and the Low Temperature

(56) References Cited

OTHER PUBLICATIONS

Oxidative Addition of Aryl Chlorides", Journal of the American Chemical Society, May 1, 2008, vol. 130, No. 21, pp. 6686-6687, doi: 10.1021/ja801137k.
Blanton et al., "Excited-state properties of platinum(II) complexes containing biphenyl as a ligand: complexes of the type [(bph)PtL2], where L = monodentate or saturated bidentate ligands", Inorganic Chemistry, Jul. 1992, vol. 31, pp. 3230-3235.
Boere et al., "On the Oxidation of the Three-Dimensional Aromatics [B12X12]2- (X=F, Cl, Br, I)", Chemistry—A European Journal, vol. 20, No. 15, Mar. 5, 2014, pp. 4447-4459, doi: 10.1002/chem.201304405.
Bohling et al., "Substituent Effects on the Fluorescence Properties of ortho-Carboranes: Unusual Emission Behaviour in C-(2'-Pyridyl)-orthocarboranes", European Journal of Inorganic Chemistry, Jan. 4, 2016, pp. 403-412, doi: 10.1002/ejic.201501284.
Bolli et al., "Synthesis and Properties of the Weakly Coordinating Anion [Me3NB12Cl11]-", Chemistry: A European Journal, vol. 20, No. 42, Oct. 13, 2014, pp. 13783-13792, doi:10.10028chem.201403625.
Bondarev et al., "Synthesis of [closo-B12(OH)11NH3]-: A New Heterobifunctional Dodecaborane Scaffold for Drug Delivery Applications", Journal of the American Chemical Society, Aug. 7, 2013, vol. 135, No. 35, pp. 13204-13211, doi: 10.1021/ja4069613.
Boone, "Isolation of the Hexahydroclovohexaborate(2-) Anion, B6H62-", Journal of the American Chemical Society, vol. 86, No. 22, Nov. 1964, p. 5036.
Bridgeman et al., "Detecting delocalization", New Journal of Chemistry, vol. 32, No. 8, Apr. 15, 2008, pp. 1359-1367, doi:10.1039/b801180j.
Brint et al., "Bonding in clusters. Part 3. Protonation of nido-pentaborane(9), nido-hexaborane(10), and closo-hexaborate(6) (2-)", Journal of the Chemical Society, Dalton Transactions, No. 12, 1981, pp. 2515-2522.
Brooks et al., "Synthesis and Characterization of Phosphorescent Cyclometalated Platinum Complexes", Inorganic Chemistry, May 10, 2002, vol. 41, No. 12, pp. 3055-3066, doi:10.1021/ic0255508.
Bruno et al., "Design and Preparation of New Palladium Precatalysts for C-C and C-N Cross-Coupling Reactions", Chemical Science, 2013, vol. 4, pp. 916-920, doi:10.1039/C2SC20903A.
Brust et al., "Synthesis of Thiol-derivatised Gold Nanoparticles in a Two-phase Liquid-Liquid System", Journal of the Chemical Society, Chemical Communications, 1994, pp. 801-802.
Bublitz et al., "Preparation, 11B NMR Spectra, Vibrational Spectra and Normal Coordinate Analysis of conjuncto-Bis-hexahydro-closo-hexaborate, [B6H6-B6H6]2-, and the Crystal Structure of [P(C6H5)4]2-conjuncto-[B6H6-B6H6]", Zeitschrift für Naturforschung, 51b, 1996, pp. 609-618.
Burkhardt et al., "Die Elektronen-Lokalisierungs-Funktion in closo-Bor-Clustern", Zeitschrift für anorganische und allgemeine Chemie, vol. 619, 1993, pp. 437-441.
Byun et al., "Highly efficient red electrophosphorescence from a solution-processed zwitterionic cyclometalated iridium(III) complex", Applied Physics Letters, vol. 91, No. 21, Nov. 21, 2007, pp. 211106-1-211106-3.
Calitree et al., "Tellurium Analogues of Rosamine and Rhodamine Dyes: Synthesis, Structure, 125Te NMR, and Heteroatom Contributions to Excitation Energies", Organometallics, Oct. 27, 2007, vol. 26, No. 25, pp. 6248-6257, doi: 10.1021/om700846m.
Carrera et al., "Efficient halogen photoelimination from dibromo, dichloro and difluoro tellurophenes", Dalton Transactions, vol. 44, No. 5, Feb. 7, 2015, pp. 2092-2096, doi:10.1039c4dt01751j.
Cavanaugh et al., "Protonation of cluster molecules: Bridging hydrogen sites in tetrahedral, octahedral and capped square pyramidal clusters: Be4H8, Be4H8", Polyhedron, vol. 4, No. 4, 1985, pp. 687-695.
Cerdán et al., "A borane laser", Nature Communications, Jan. 13, 2015, vol. 6, No. 5958, pp. 1-7, doi:10.1038/ncomms6958.
Chang et al., "Emissive Pt(II) complexes bearing both cyclometalated ligand and 2-pyridyl hexafluoropropoxide ancillary chelate", Dalton Transactions, Nov. 3, 2008, pp. 6901-6911, doi:10.1039/b808602h.
Chang et al., "Highly Efficient Blue-Emitting Iridium(III) Carbene Complexes and Phosphorescent OLEDs", Angewandte Chemie International Edition, vol. 47, No. 24, Jun. 2, 2008, pp. 4542-4545, doi:10.1002/anie200800748.
Chang et al., "Platinum(II) Complexes with Pyridyl Azolate-Based Chelates: Synthesis, Structural Characterization, and Tuning of Photo- and Electrophosphorescence", Inorganic Chemistry, Dec. 9, 2005, vol. 45, No. 1, pp. 137-146, doi 10.1021/ic051393b.
Chassot et al., "cis-Bis(2-phenylpyridine)platinum(ll) (CBPPP): a simple molecular platinum compound", Inorganic Chemistry, Dec. 1984, vol. 23, pp. 4249-4253.
Lee et al., "Selective Precipitation of Prions by Polyoxometalate Complexes", Journal of the American Chemical Society, Sep. 17, 2005, vol. 127, No. 40, pp. 13802-13803, DOI: 10.1021/ja055219y.
Lee Jr., "Catalyst-Free Polyhydroboration of Dodecaborate Yields Highly Photoluminescent Ionic Polyarylated Clusters", Angewandte Chemie International Edition, Dec. 2, 2016, vol. 56, No. 1, pp. 138-142, DOI: 10.1002/anie.201608249.
Leitao et al., "Catalysis in service of main group chemistry offers a versatile approach to p-block molecules and materials", Nature Chemistry, Oct. 2013, vol. 5, No. 10, pp. 817-829, published online Sep. 23, 2013, DOI: 10.1038/NCHEN.1749.
Leites, "Vibrational spectroscopy of carboranes and parent boranes and its capabilities in carborane chemistry", Chemical Reviews, Mar. 1992, vol. 92, pp. 279-323, doi: 10.1021/cr00010a006.
Leung et al., "Selective disruption of protein aggregation by cyclodextrin dimers", Proceedings of the National Academy of Sciences of USA, May 9, 2000, vol. 97, No. 10, pp. 5050-5053.
Li et al., "Blue electrophosphorescent organoplatinum(II) complexes with dianionic tetradentate bis(carbene) ligands", Chemical Communications, Jul. 15, 2011, vol. 47, No. 32, pp. 9075-9077, DOI 10.1039/c1cc12943k.
Li et al., "Carboranes as a Tool to Tune Phosphorescence", Chemistry: A European Journal, Nov. 25, 2015, vol. 22, pp. 1888-1898, doi: 10.1002/chem.201503456.
Li et al., "Organic Syntheses on an Icosahedral Borane Surface: Closomer Structures with Twelvefold Functionality", Journal of the American Chemical Society, Nov. 29, 2005, vol. 127, pp. 17832-17841, doi: 10.1021/ja055226m.
Li et al., "Polyhedral Oligomeric Silsesquioxane (POSS) Polymers and Copolymers: A Review", Journal of Inorganic and Organometallic Polymers, Sep. 2001, vol. 11, No. 3, pp. 123-154.
Li et al., "Simple syntheses and alkylation reactions of 3-iodo-o-carborane and 9,12-diiodo-o-carborane", Inorganic Chemistry, Dec. 1991, vol. 30, pp. 4866-4868.
Li et al., "Synthesis and characterization of cyclometalated Ir(III) complexes with pyrazolyl ancillary ligands", Polyhedron, vol. 23, Jan. 22, 2004, No. 2-3, pp. 419-428, DOI: 10.1016/j.poly.2003.11.028.
Li et al., "Synthetic Control of Excited-State Properties in Cyclometalated Ir(III) Complexes Using Ancillary Ligands", Inorganic Chemistry, Feb. 12, 2005, vol. 44, No. 6, pp. 1713-1727, doi: 10.1021/ic048599h.
Lin et al., "Two-Electron Redox Chemistry at the Dinuclear Core of a TePt Platform: Chlorine Photoreductive Elimination and Isolation of a TeVPtI Complex", Journal of the American Chemical Society, Jun. 18, 2012, vol. 134, No. 29, pp. 12230-12238, dx.doi.org/10.1021/ja3046074.
Liu et al., "Mechanistic Study of Precursor Evolution in Colloidal Group II-VI Semiconductor Nanocrystal Synthesis", Journal of the American Chemical Society, 2007, vol. 129, No. 2, pp. 305-312, published Dec. 21, 2006, doi: 10.1021/ja0656696.
Lo Conte et al., "The atomic structure of protein-protein recognition sites", Journal of Molecular Biology, Feb. 5, 1999, vol. 85, pp. 2177-2198.
Longuet-Higgins et al., "The electronic structure of an icosahedron of boron atoms", Proceedings of the Royal Society A, Jun. 12, 1955, vol. 230, pp. 110-119, doi: 10.1098/rspa.1955.0115.

(56) References Cited

OTHER PUBLICATIONS

Longuet-Higgins et al., "The electronic structure of the borides AfB6", Proceedings of the Royal Society of London. Series A. Mathematical and Physical Sciences, vol. 224, No. 1158, Jul. 7, 1954, pp. 336-347.

Lorenzen et al., "Paramagnetic Cluster Ions [B6HalnHal'6-n]•- (Hal, Hal' = Cl, Br, I). Epr Evidence for Radical Stabilization through Electronic Effects of the Halogen Substituents", Inorganic Chemistry, Jul. 18, 1998, vol. 37, No. 16, pp. 4011-4014, doi: 10.1021/ic9802698.

Loudet et al., "BODIPY Dyes and Their Derivatives: Syntheses and Spectroscopic Properties", Chemical Reviews, vol. 107, No. 11, Oct. 9, 2007, pp. 4891-4932, doi: 10.1021/cr078381n.

Love et al., "Self-Assembled Monolayers of Thiolates on Metals as a Form of Nanotechnology", Chem. Rev. 2005, 105, pp. 1103-1169.

Lugo et al., "Synthesis of a Hybrid m-Terphenyl/o-Carborane Building Block: Applications in Phosphine Ligand Design", Inorganic Chemistry, Feb. 10, 2015, vol. 54, pp. 2094-2096, doi: 10.1021/ic5030636.

Lumpkin et al., "Metal-to-ligand charge-transfer (MLCT) photochemistry: experimental evidence for the participation of a higher lying MLCT state in polypyridyl complexes of ruthenium(II) and osmium(II)", Journal of Physical Chemistry, Jan. 1990, vol. 94, No. 1, pp. 239-243, doi: 10.1021/j100364a039.

Lundquist et al., "The Cluster Glycoside Effect", Chemical Reviews, Jan. 29, 2002, vol. 102, No. 2, pp. 555-578, doi: 10.1021/cr000418f.

Lyu et al., "Palladium-Catalyzed Direct Dialkenylation of Cage B-H Bonds in o-Carboranes through Cross-Coupling Reactions", Angewandte Chemie International Edition, Jul. 21, 2015, vol. 54, pp. 10623-10626, DOI: 10.1002/anie.201504481.

Ma et al., "Closomers of High Boron Content: Synthesis, Characterization, and Potential Application as Unimolecular Nanoparticle Delivery Vehicles for Boron Neutron Capture Therapy", Inorganic Chemistry, Dec. 3, 2005, vol. 45, No. 1, pp. 278-285, DOI: 10.1021/ic512141q.

Macleod et al., "PEGylated N-Heterocyclic Carbene Anchors Designed To Stabilize Gold Nanoparticles in Biologically Relevant Media", Journal of the American Chemical Society, Jun. 17, 2015, vol. 137, No. 25, pp. 7974-7977, DOI: 10.1021/jacs5b02452.

Maderna et al., "Twelvefold Functionalization of an Icosahedral Surface by Total Esterification of [B12(OH)12]2-: 12(12)-Closomers", Angewandte Chemie International Edition, May 3, 2001, vol. 40, No. 9, pp. 1661-1664.

Maestri et al., "Absorption Spectra and Luminescence Properties of Isomeric Platinum (II) and Palladium (II) Complexes containing 1,1'-biphenyldiyl, 2-phenylpyridine, and 2,2'-bijpyridine as ligands", Helvetica Chimica Acta, Aug. 10, 1988, vol. 71, pp. 1053-1059.

Maity et al., "Steric and Electronic Influence of Aryl Isocyanides on the Properties of Iridium(III) Cyclometalates", Inorganic Chemistry, Feb. 24, 2016, vol. 55, No. 5, pp. 2299-2308, DOI: 10.1021/acs.inorgchem.5b02691.

Malashkevich et al., "Core structure of the envelope glycoprotein GP2 from Ebola virus at 1.9-Å resolution", Proceedings of the National Academy of Sciences of the United States of America, Mar. 16, 1999, vol. 96, No. 6, pp. 2662-2667.

Mammen et al., "Polyvalent Interactions in Biological Systems: Implications for Design and", Angewandte Chemie International Edition, Dec. 17, 1998, vol. 37, pp. 2754-2794.

Marin et al., "Organic Photocatalysts for the Oxidation of Pollutants and Model Compounds", Chemical Reviews, 2012, vol. 112, No. 3, pp. 1710-1750, First Published Oct. 31, 2011, doi: 10.1021/cr2000543.

Martin et al., "1,1'-Bis(ortho-carborane) as a K2 co-ligand", Journal of Organometallic Chemistry, Dec. 1, 2015, vol. 798, pp. 36-40, available online May 7, 2015, http://dx.doi.org/10.1016/j.jorganchem.2015.04.011.

Matthews et al., "Enfuvirtide: the first therapy to inhibit the entry of HIV-1 into host CD4 lymphocytes", Nature Reviews | Drug Discovery, Mar. 1, 2004, vol. 3, pp. 215-225.

McArthur et al., "Cation reduction and comproportionation as novel strategies to produce high voltage, halide free, carborane based electrolytes for rechargeable Mg batteries", Inorganic Chemistry Frontiers, Dec. 2015, vol. 2, No. 2, pp. 1101-1104, doi: 10.1039/c5qi00171d.

McKee, "Density Functional Theory Study of Anionic and Neutral Per-Substituted 12-Vertex Boron Cage Systems, B12X12n- (n = 2, 1, 0)", Inorganic Chemistry, Feb. 7, 2002, vol. 41, No. 5, pp. 1299-1305, doi: 10.1021. ic011021c.

McKee et al., "Ab Initio Study of the Hypercloso Boron Hydrides BnHn and BnHn-. Exceptional Stability of Neutral B13H13", Journal of the American Chemical Society, Apr. 29, 2000, vol. 122, No. 19, pp. 4781-4793, doi: 10.1021/ja994490a.

Méhes et al., "Enhanced electroluminescence efficiency in a spiro-acridine derivative through thermally activated delayed fluorescence", Angewandte Chemie International Edition, Nov. 5, 2012, vol. 51, No. 45, pp. 11311-11315, DOI: 10.1002/anie.201206289.

Messina et al., "Visible-light-induced olefin activation using 3D aromatic boron-rich cluster photooxidants", Journal of the American Chemical Society, May 17, 2016, vol. 138, No. 22, pp. 6952-6955, DOI: 10.1021/jacs.6b03568.

Mhinzi et al., "closo-Monocarbaboranes as ligands fortransition metals: synthesis and reactivity of exo-diphosphineplatinum-closo-monocarbaborane complexes; structure of [Pt{But2P(CH2)2PBut2}(closo-CB11H12)][CB11H12]", Journal of the Chemical Society, Dalton Transactions, No. 10, 1991, pp. 2769-2776.

Miller et al., "Chemistry of Boranes. XX. Syntheses of Polyhedral Boranes", Inorganic Chemistry, Oct. 1964, vol. 3, pp. 1456-1463, doi: 10.1021/ic50020a026.

Miller et al., "Synthesis of Polyhedral Boranes", Journal of the American Chemical Society, Dec. 1963, vol. 85, pp. 3885-3886, doi: 10.1021/ja00906a033.

Moore, "Shape-Persistent Molecular Architectures of Nanoscale Dimension", Accounts of Chemical Research, Oct. 14, 1997, vol. 30, pp. 402-413, doi: 10.1021/ar950232g.

Moore et al., "Synthesis of rigid dendritic macromolecules: enlarging the repeat unit size as a function of generation, permitting growth to continue", Macromolecules, Oct. 1991, vol. 24, No. 21, pp. 5893-5894.

Moore Jr. et al., "Molecular Orbitals in Some Boron Compounds", Journal of the Chemical Physics, 1961, vol. 35, No. 4, pp. 1329-1334, published online Aug. 4, 2004, doi: 10.1063/1.1732046.

Mucic et al., "DNA-Directed Synthesis of Binary Nanoparticle Network Materials", Journal of the American Chemical Society, Nov. 20, 1998, vol. 120, pp. 12674-12675, doi: 10.1021/ja982721s.

Muetterties et al., "Chemistry of Boranes. VIII. Salts and Acids of B10H10-2 and B1212-2", Inorganic Chemistry, Mar. 1964, vol. 3, pp. 444-451, doi: 10.1021/ic50013a030.

Mukherjee et al., "Boron clusters in luminescent materials", Chemical Communications, Oct. 26, 2015, vol. 52, No. 6, pp. 1070-1093, DOI: 10.1039/c5cc08213g.

Mukhin et al., "Catalytic Amidation of 9-Iodo-m-carborane and 2-Iodo-p-carborane at a Boron Atom", Organometallics, Oct. 23, 2008, vol. 27, No. 22, pp. 5937-5942, doi: 10.1021/om800635d.

Muller et al., "From linking of metal-oxide building blocks in a dynamic library to giant clusters with unique properties and towards adaptive chemistry", Chemical Society Reviews, Sep. 5, 2012, vol. 41, No. 22, pp. 7431-7463, DOI: 10.1039/c2cs35169b.

Thesing et al., "Vibrational Spectra and Normal Coordinate Analysis of the Heteroleptic Halogenohexaborates B6XnY6-n2-, n = 1-5; X # Y = Cl, Br, I", Zeitschrift für Naturforschung, 46b, 1991, pp. 602-608.

Thiripuranathar et al., "Icosahedral metallacarborane/carborane species derived from 1,1'-bis(o-carborane)", Dalton Transactions, Feb. 5, 2015, vol. 44, pp. 5628-5637, DOI:10.1039/c5dt00081e.

Thomas et al., "Self-Assembled p. Carborane Analogue of p-Mercaptobenzoic Acid on Au{111}", Chemistry of Materials, Jun. 24, 2015, vol. 27, No. 15, pp. 5425-5435, doi: 10.1021/acs.chemmater.5b02263.

Tomalia et al., "A New Class of Polymers: Starburst-Dendritic Macromolecules", Polymer Journal, vol. 17, No. 1, Jan. 15, 1985, pp. 117-132.

(56) References Cited

OTHER PUBLICATIONS

Tremblay, "The rise of OLED displays", Chemical & Engineering News, vol. 94, No. 28, Jul. 11, 2016, pp. 30-34.

Tsang et al., "Host engineering for improving the performance of blue phosphorescent organic light-emitting devices", Organic Electronics, Jul. 2011, vol. 12, No. 7, pp. 1114-1119 available online Apr. 11, 2011, doi: 10.1016/j.orgel.2011.03.046.

Tsang et al., "Synthesis, Structure, and Catalytic Applications for ortho-and meta-Carboranyl Based NBN Pincer-Pd Complexes", Inorganic Chemistry, Aug. 11, 2014, vol. 53, No. 17, pp. 9284-9295, dx.doi.org/10.1021/ic5013999.

Tsuboyama et al., "Homoleptic Cyclometalated Iridium Complexes with Highly Efficient Red Phosphorescence and Application to Organic Light-Emitting Diode", Journal of the American Chemical Society, Sep. 27, 2003, vol. 125, No. 42, p. 12971-12979, doi: 10.1021/ja034732d.

Turner et al., "Cyclometalated Platinum Complexes with Luminescent Quantum Yields Approaching 100%", Inorganic Chemistry, Jun. 10, 2013, vol. 52, No. 13, pp. 7344-7351, dx.doi.org/10.1021/ic302490c.

Uoyama et al., "Highly efficient organic light-emitting diodes from delayed fluorescence", Nature, Dec. 13, 2012, vol. 492, No. 7428, pp. 234-238, doi:10.1038/nature11687.

Van et al., "Oxidative Perhydroxylation of [closo-B12H12]2- to the Stable Inorganic Cluster Redox System [B12(OH)12]2-/.-: Experiment and Theory", Chemistry-A European Journal, Aug. 19, 2010, vol. 16, p. 11242-11245, DOI: 10.1002/chem.201001374.

Veinot et al., "Toward the Ideal Organic Light-Emitting Diode. The Versatility and Utility of Interfacial Tailoring by Cross-Linked Siloxane Interlayers", Accounts of Chemical Research, Jun. 10, 2005, vol. 38, No. 8, pp. 632-643, doi:10.1021/ar030210r.

Veronese et al., "PEGylation, successful approach to drug delivery", Drug Discovery Today, Nov. 1, 2005, vol. 10, No. 21, pp. 1451-1458.

Viñas et al., "Are Halocarboranes Suitable for Substitution Reactions? The Case for 3-1-1,2-closo-C2B10H11: Molecular Orbital Calculations, Aryldehalogenation Reactions, 11B NMR Interpretation of closo-Carboranes, and Molecular Structures of 1-Ph-3-Br-1,2-closo-C2B10H10", Inorganic Chemistry, Nov. 20, 2001, vol. 40, pp. 6555-6562, doi: 10.1021/ic010493o.

Visbal et al., "N-Heterocyclic Carbene Ligands as Modulators of Luminescence in Three-Coordinate Gold(I) Complexes with Spectacular Quantum Yields", Journal of the American Chemical Society, Mar. 13, 2013, vol. 135, No. 12, pp. 4712-4715, dx.doi.org/10.1021/ja401523x.

Visbal et al., "Three-coordinate gold(I) N-heterocyclic carbene complexes: a new class of strongly luminescent derivatives", Dalton Transactions, 2014, vol. 43, No. 1, pp. 328-334, DOI: 10.1039/c3t52146j.

Wanner et al., "Hexaborate Cluster Radical Anions [B6HalnHal'6-n]*- and [B6Hal5R]*- (Hal, Hal' = Cl, Br, I; R = H, alkyl). Chemical or Electrochemical Generation, Vibrational, UV-Vis and EPR Spectroscopy", Zeitschrift für Naturforschung, 54b, 1999, pp. 1103-1108.

Generation, Vibrational, UV-Vis and EPR Spectroscopy', Zeitschrift fur Naturforschung, 54b, 1999, pp. 1103-1108.

Weissenhorn et al., "Virus membrane fusion", FEBS Letters, vol. 581, No. 11, May 22, 2007, pp. 2150-2155, doi:10.1016/j.febslet.2007.01.093.

Wiersema et al., "Electrochemical preparation and halogenation of 1,1'-,mu.-hydro-bis(undecahydro-closo-dodecaborate)(3-), B24H233-", Inorganic Chemistry, Oct. 1969, vol. 8, No. 10, pp. 2074-2079, doi: 10.1021/ic50080a009.

Wiesboeck et al., "Dicarbaundecaborane(13) and Derivatives", Journal of the American Chemical Society, Apr. 20, 1964, vol. 86, pp. 1642-1643.

Wilger et al., "The direct anti-Markovnikov addition of mineral acids to styrenes", Nature Chemistry, Jul. 13, 2014, vol. 6, pp. 720-726, doi: 10.1038/nchem.2000.

Wixtrom et al., "Rapid Synthesis of Redox-Active Dodecaborane B12(OR)12 Clusters Under Ambient Conditions", Inorganic Chemistry Frontiers, May 1, 2016, vol. 3, No. 5, pp. 711-717, DOI: 10.1039/c5qi00263j.

Wong et al., "Synthesis of the First Example of the 12-Vertex-closo/12-Vertex-nido Biscarborane Cluster by a Metal-Free B-H Activation at a Phosphorus(lll) Center", Chemistry: A European Journal, vol. 22, No. 20, May 10, 2016, pp. 6764-6767, DOI: 10.1002/chem.201601194.

Wright et al., "Click-Like Reactions with the Inert HCB11Cl11- Anion Lead to Carborane-Fused Heterocycles with Unusual Aromatic Character", Inorganic Chemistry, May 7, 2013, vol. 52, No. 10, pp. 6223-6229, doi: 10.1021/ic400786a.

Wunderlich et al., "Structure of B12H12-2 Ion", Journal of the American Chemical Society, Aug. 1960, vol. 82, No. 16, pp. 4427-4428, doi: 10.1021/ja01501a076.

Xing et al., 'Formation of New Structures and Their Synergistic Effects in Boron and Nitrogen Codoped Ti02 for Enhancement of Photocatalytic.

Xu et al., "A Robust and Versatile Photoinduced Living Polymerization of Conjugated and Unconjugated Monomers and Its Oxygen Tolerance", Journal of the American Chemical Society, Apr. 1, 2014, vol. 136, No. 14, pp. 5508-5519, doi: 10.1021/ja501745g.

Xu et al., "Metal-induced B-H bond activation: reactions between halfsandwich Ir and Rh complexes with carboranylthioamide", Dalton Transactions, 2015, vol. 44, pp. 1530-1533, DOI: 10.1039/c4dt03624g.

Yang et al., "Rigid-rod molecules: carborods. Synthesis of tetrameric p-carboranes and the crystal structure of bis(tri-n-butylsilyl)tetra-p-carborane", Journal of the American Chemistry Society, Nov. 1992, vol. 114, pp. 9719-9721.

Yao et al., "Iridium-Mediated Regioselective B-H/C-H Activation of Carborane Cage: A Facile Synthetic Route to Metallacycles with a Carborane Backbone", Journal of the American Chemical Society, Jan. 28, 2014, vol. 136, pp. 2825-2832, dx.doi.org/10.1021/ja4115665.

Yao et al., "Pseudo-aromatic bis-o-carborane iridium and rhodium complexes", Journal of Organometallic Chemistry, Dec. 1, 2015, vol. 798, pp. 274-277, available online Apr. 14, 2015, http://dx.doi.org/10.1016/j.jorganchem.2015.03.328.

Yoon et al., "Visible light photocatalysis as a greener approach to photochemical synthesis", Nature Chemistry, Jun. 23, 2010, vol. 2, pp. 527-532, doi: 10.1038/nchem.687, DOI: 10.1038/NCHEM.687.

Yu et al., "Monte-Carlo simulations of PAMAM dendrimer-DNA interactions", Soft Matter, May 30, 2014, vol. 10, No. 29, pp. 5325-5336, DOI: 10.1039/c4sm00452c.

Yvon et al., "Polyoxometalate Clusters Integrated into Peptide Chains and as Inorganic Amino Acids: Solution- and Solid-Phase Approaches", Angewandte Chemie International Edition, Mar. 12, 2014, vol. 53, No. 13, pp. 3336-3341, DOI: 10.1002/anie.201311135.

Zakharkin et al., "Cleavage of o-carboranes to (3)-1,2-dicarbaundecarborates by amines", Bulletin of the Academy of Sciences of the USSR, Division of Chemical Science, vol. 24, No. 11, Nov. 1975, pp. 2484-2486.

Zakharkin et al., "Synthesis of B-organo-substituted 1,2-, 1,7-, and 1,12-dicarbaclosododecarboranes(12)", Journal of Organometallic Chemistry, Mar. 2, 1982, vol. 226, No. 3, pp. 217-222, doi: 10.1016/S0022-328X(00)83405-1.

Zhang et al., "Efficient blue organic light-emitting diodes employing thermally activated delayed fluorescence", Nature Photonics, Apr. 2014, vol. 8, No. 4, pp. 326-332, published online Mar. 2, 2014, DOI: 10.1038/nphoton.2014.12.

Zhang et al., "Synthesis and Structural Characterization of Ammonio/Hydroxo Undecachloro-closo-Dodecaborates [B12Cl11NH3]-V[B12Cl11OH]2- and Their Derivatives", European Journal of Inorganic Chemistry, Oct. 16, 2015, vol. 2015, No. 31, 5158-5162, doi: 10.1002/ejic.201501009.

Zhang et al., "Tenfold increase in the lifetime of blue phosphorescent organic light-emitting diodes", Nature Communications, Sep. 25, 2014, vol. 5, No. 5008, pp. 1-7, DOI:10.1038/ncomms6008.

(56) References Cited

OTHER PUBLICATIONS

Zhang et al., "π-Clamp-mediated cysteine conjugation", Nature Chemistry, Dec. 21, 2015, vol. 8, pp. 120-128, HHS Public Access, Author manuscript available May 9, 2016, doi:10.1038/nchem. 2413.
Zhao et al., "1,3-Dehydro-o-Carborane: Generation and Reaction with Arenes", Angewandte Chemie International Edition, Jul. 1, 2014, vol. 53, No. 32, pp. 8488-8491, doi: 10.1002/anie.201405023.
Zhao et al., "3-Dimensional Hueckel theory for cluster compounds", Inorganic Chemistry, Oct. 1993, vol. 32, No. 22, pp. 4700-4707.
Zheng et al., "Facile Electrophilic Iodination of Icosahedral Carboranes. Synthesis of Carborane Derivatives with Boron-Carbon Bonds via the Palladium-Catalyzed Reaction of Diiodocarboranes with Grignard Reagents", Inorganic Chemistry, Apr. 1995, vol. 34, pp. 2095-2100.
Zhu et al., "Atomically Precise Au25(SR)18 Nanoparticles as Catalysts for the Selective Hydrogenation of α,β-Unsaturated Ketones and Aldehydes", Angewandte Chemie International Edition, Feb. 1, 2010, vol. 49, pp. 1295-1298, DOI: 10.1002/anie.200906249.
Zhu et al., "Kinetically Controlled, High-Yield Synthesis of Au25 Clusters", Journal of the American Chemical Society, Jan. 10, 2008, vol. 130, 1138-1139, doi: 10.1021/ja0782448.
Zhu et al., "Late-Stage Peptide Diversification by Bioorthogonal Catalytic C-H Arylation at 23 °C in H20", Chemistry: A European Journal, Jul. 6, 2015, vol. 21, No. 28, pp. 9980-9983, DOI: 10.1002/chem.201501831.
Zhu et al., "X-ray photoelectron spectroscopy characterization of oxidated Si particles formed by pulsed ion-beam ablation", Applied Surface Science, Jun. 15, 2006, vol. 252, pp. 5776-5782, doi: 10.1016/j.apsusc.2005.07.040.
Zuleta et al., "Square-planar complexes of platinum(II) that luminesce in fluid solution", Journal of the American Chemical Society, Nov. 1989, vol. 111, pp. 8916-8917.
Echols, "Multiple DNA-protein interactions governing high-precision DNA transactions", Science, Sep. 5, 1986, vol. 233, No. 4768, pp. 1050-1056, doi: 10.1126/science.2943018.
Fox et al., "Deboronation of 9-substituted-ortho- and -meta-carboranes", Journal of Organometallic Chemistry, Jan. 1999, vol. 573, Nos. 1-2, pp. 279-291, doi: 10.1016/S0022-328X(98)00881-X.
Fox et al., "Gaussian free-energy dependence of electron-transfer rates in iridium complexes", Science, Mar. 2, 1990, vol. 247, pp. 1069-1071, doi: 10.1126/science.247.4946.1069.
Hofmann et al., "A new 4c-2e bond in B6H7-", Chemical Communications, No. 29, May 18, 2007, pp. 3097-3099, DOI: 10.1039/b704944g.
Issa et al., "Boron in Drug Discovery: Carboranes as Unique Pharmacophores in Biologically Active Compounds", Chemical Reviews, Jun. 30, 2011, vol. 111, pp. 5701-5722, doi: 10.1021/cr2000866.
Jiang et al., "Iodination Reactions of Icosahedral para-Carborane and the Synthesis of Carborane Derivatives with Boron-Carbon Bonds", Inorganic Chemistry, Jun. 1, 1995, vol. 34, No. 13, pp. 3491-3498, doi: 10.1021/ic00117a018.
Joost et al., "Facile Oxidative Addition of Aryl Iodides to Gold(I) by Ligand Design: Bending Turns on Reactivity", Journal of the American Chemical Society, Sep. 30, 2014, vol. 136, No. 42, pp. 14654-14657, doi: 10.1021/ja506978c.
Kohonen et al., "Polyamidoamine dendrimers induce epigenetic changes in cultured normal and malignant human lung epithelial cells", Cancer Research, vol. 73, No. 8, Apr. 2013, Abstract 5657, 1 pg.
Lamansky et al., "Highly Phosphorescent Bis-Cyclometalated Iridium Complexes: Synthesis, Photophysical Characterization, and Use in Organic Light Emitting Diodes", Journal of the American Chemical Society, vol. 123, No. 18, Apr. 13, 2001, pp. 4304-4312, doi:10.1021/ja003693s.
Prokhorov et al., "2,2'-Bipyridinyl carboranes as B,N,N-ligands in cyclometallated complexes of platinum(II)", Chemical Communications, Jun. 8, 2011, vol. 47, pp. 7713-7715, DOI: 10.1039/c1cc12230d.
Rupich et al., "Characterization of Chlorocloboborane Acids as Electrolytes for Acid Fuel Cells", Journal of The Electrochemical Society, Jan. 1985, vol. 132, pp. 119-122.
Senegal et al., "A General, Practical Palladium-Catalyzed Cyanation of (Hetero)Aryl Chlorides and Bromides", Angewandte Chemie International Edition, Aug. 9, 2013, vol. 52, No. 37, pp. 10035-10039, doi: 10.1002/anie.201304188.
Sivaev et al., "Chemistry of closo-Dodecaborate Anion [B12H12]2-: A Review", Collection of Czechoslovak Chemical Communications, 2002, vol. 67, pp. 679-727, doi: 10.1135/cccc20020679.
Wilson, "Inhibition of protein-protein interactions using designed molecules", Journal of Chemical Society Reviews, Jul. 27, 2009, vol. 38, pp. 3289-3300, doi: 10.1039/b807197g.
Yağci et al., "Externally Stimulated Initiator Systems for Cationic Polymerization", Progress in Polymer Science, Dec. 1998, vol. 23, No. 8, pp. 1485-1538, doi: 10.1016/S0079-6700(98)00010-0.
Plesek et al., "Potassium dodecahydro-7, 8-dicarba-nido-undecaborate(1-), k[7, 8-c2b9h12], intermediates, stock solution, and anhydrous salt", Inorganic Syntheses, Jan. 1, 1984, vol. 22, p. 231.
Pushechnikov et al., "Dendritic closomers: novel spherical hybrid dendrimers", Chem. Commun., 2013, vol. 49, pp. 3579-3581, DOI: 10.1039/c3cc40597d.
Sisaev, "Chemistry of closo-Dodecaborate Anion [B12H12]2 a Review", Collection of Czechoslovak Chemical Communications, Jun. 2002, vol. 67, pp. 679-727.

* cited by examiner

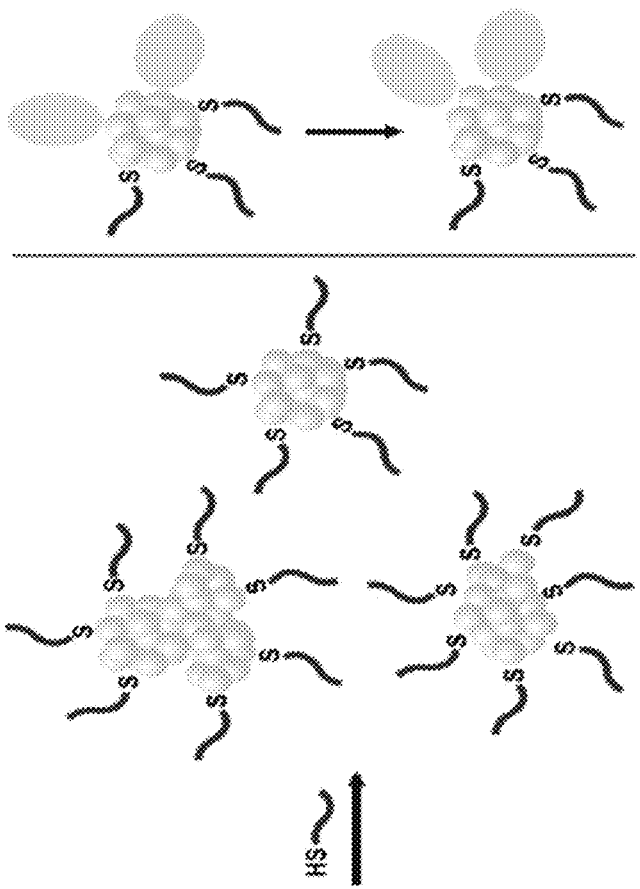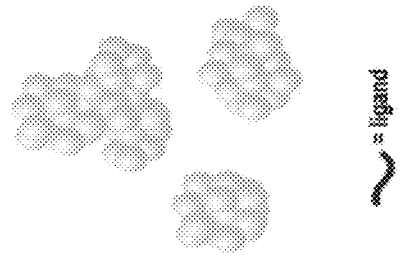

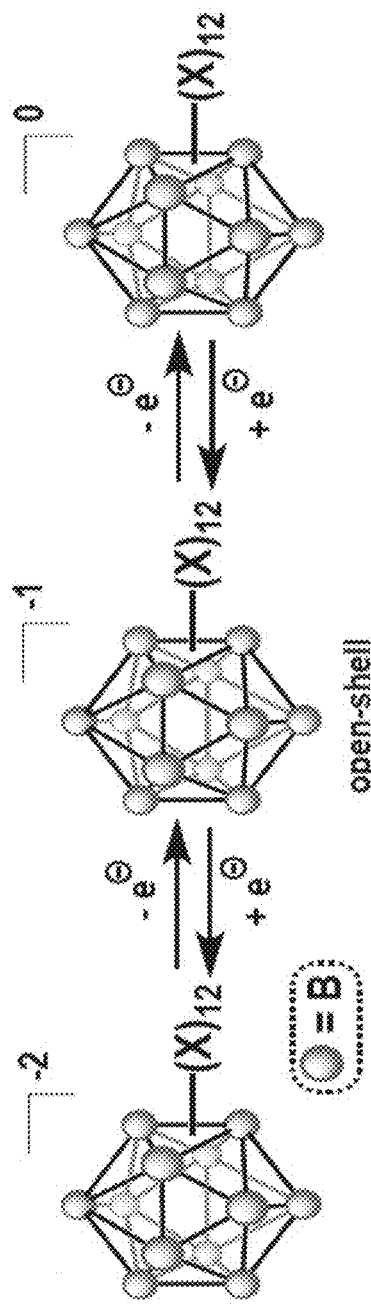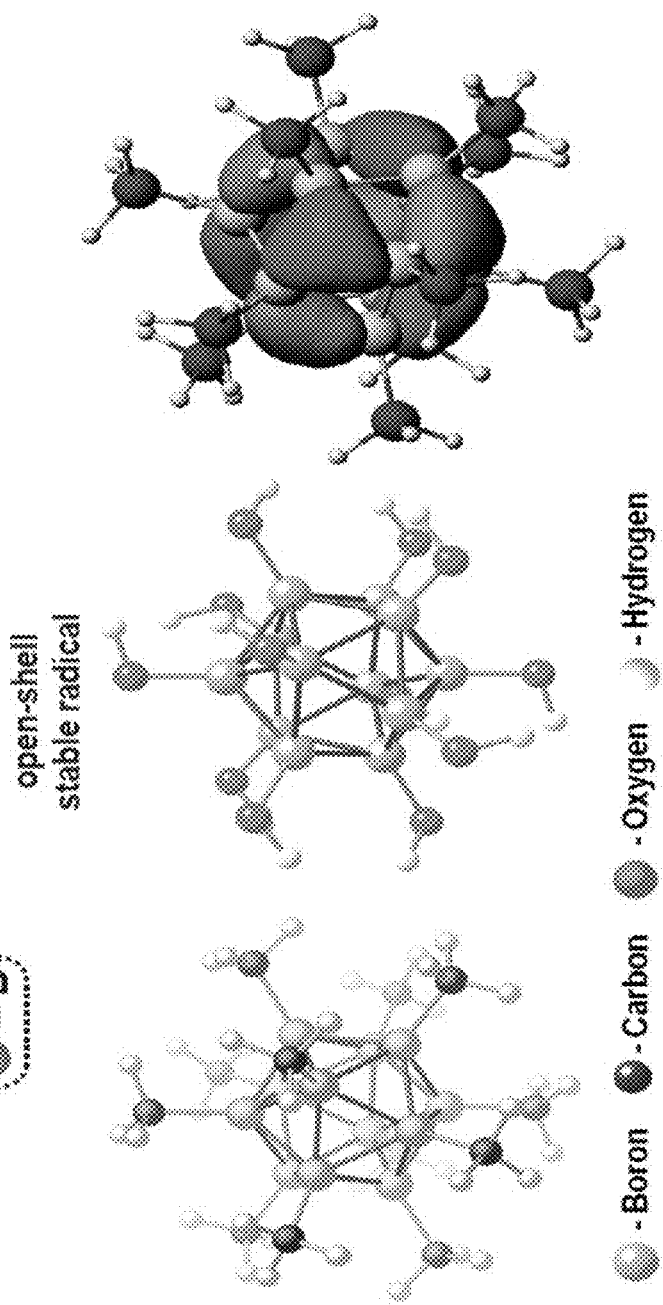
FIG. 5A
FIG. 5B

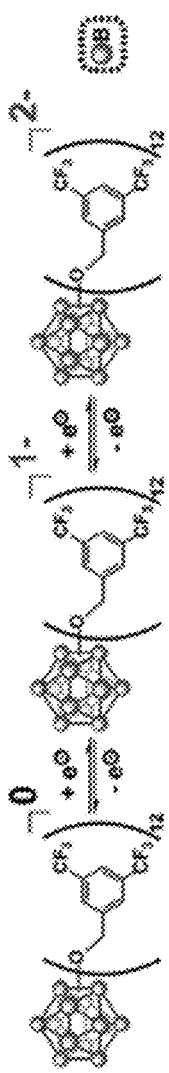
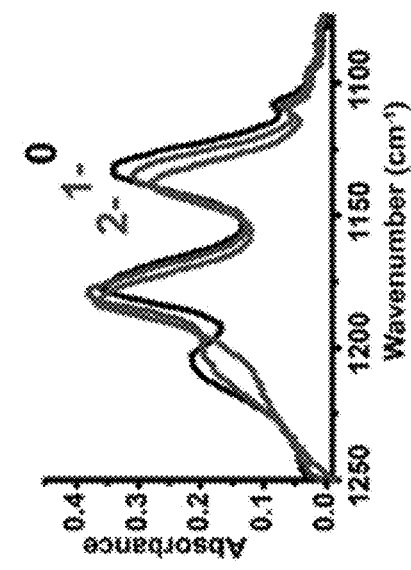
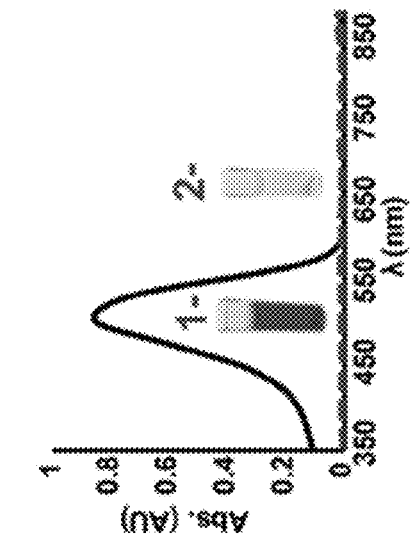
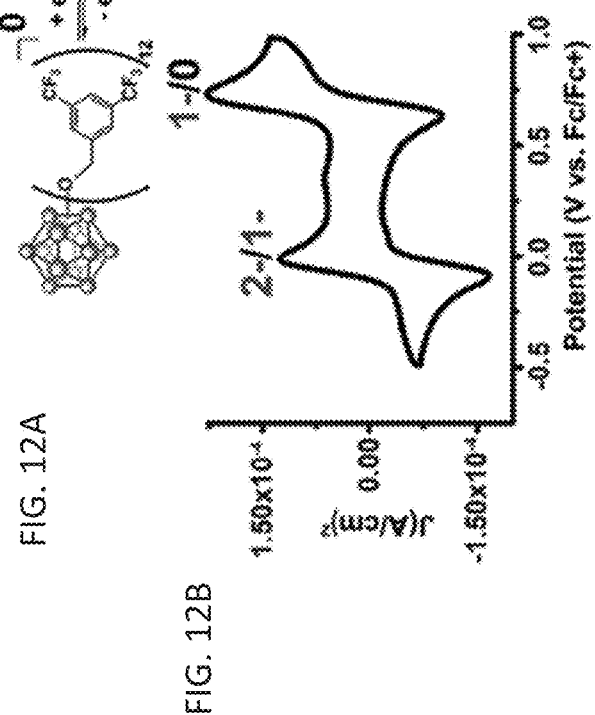
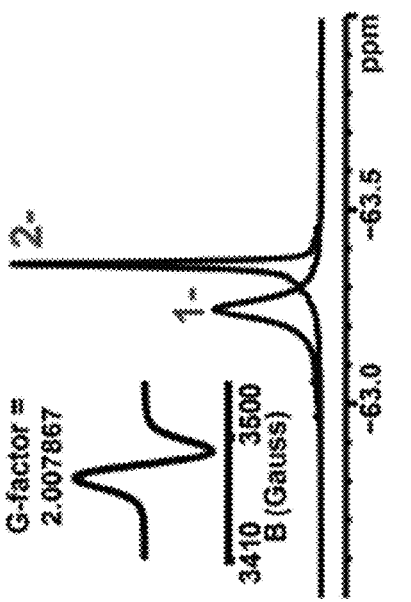
FIG. 12A
FIG. 12B
FIG. 12C
FIG. 12D
FIG. 12E

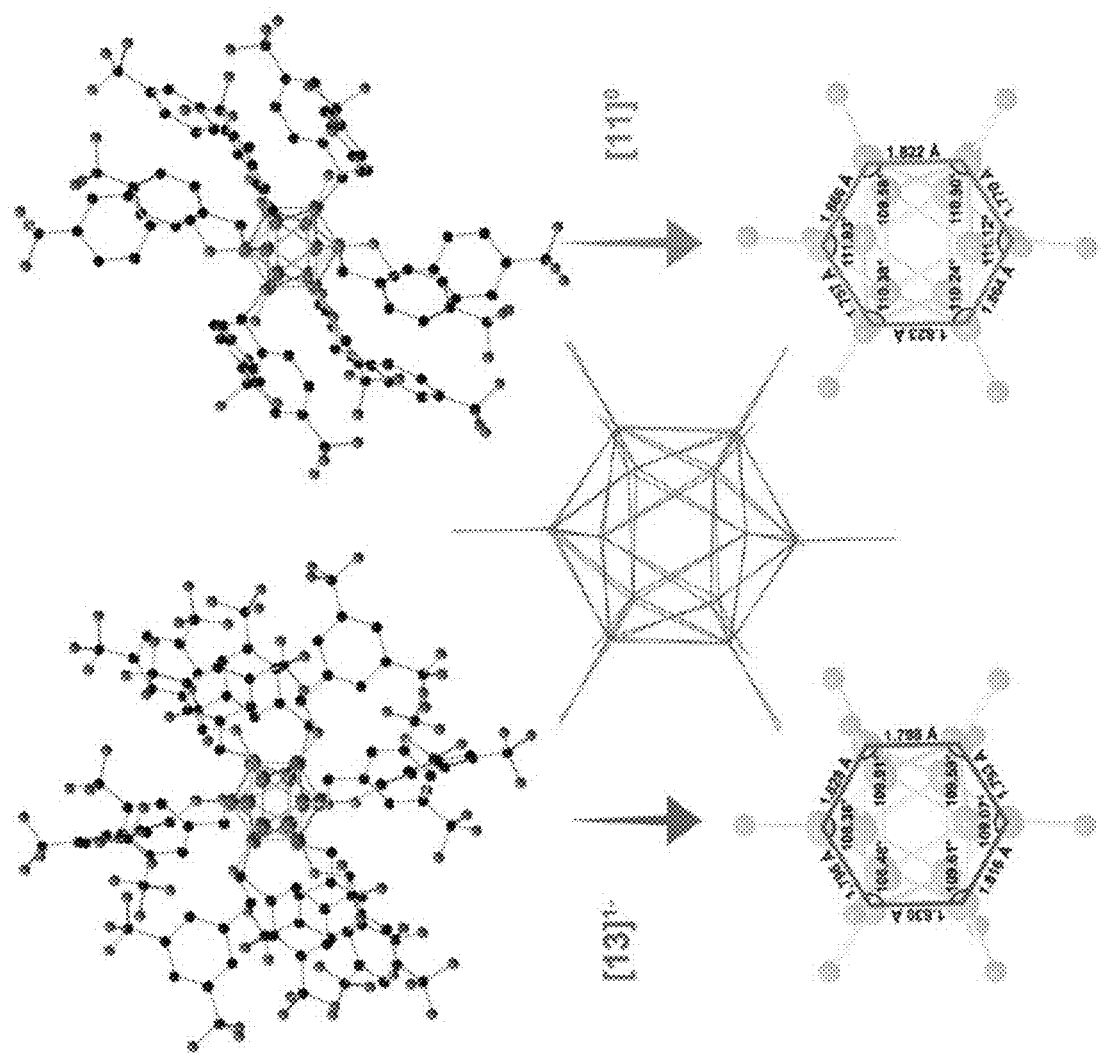

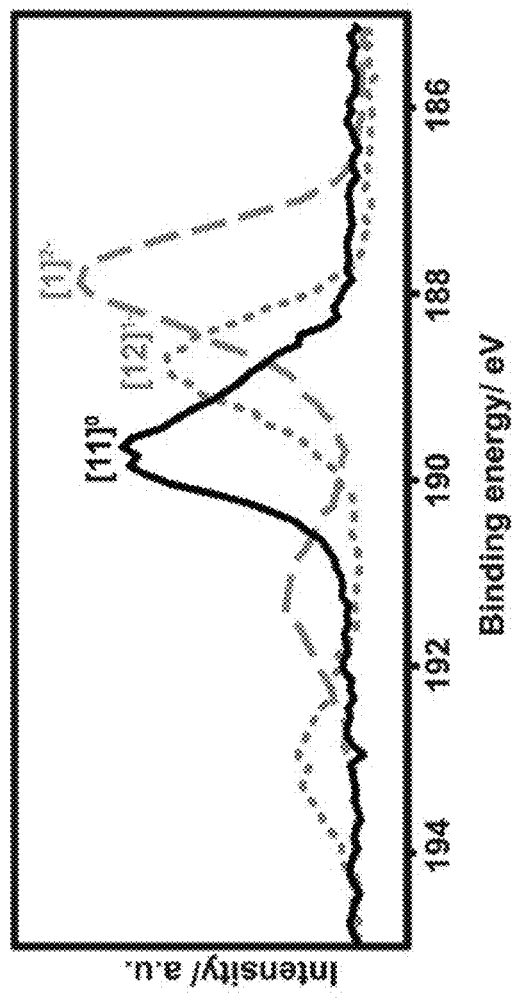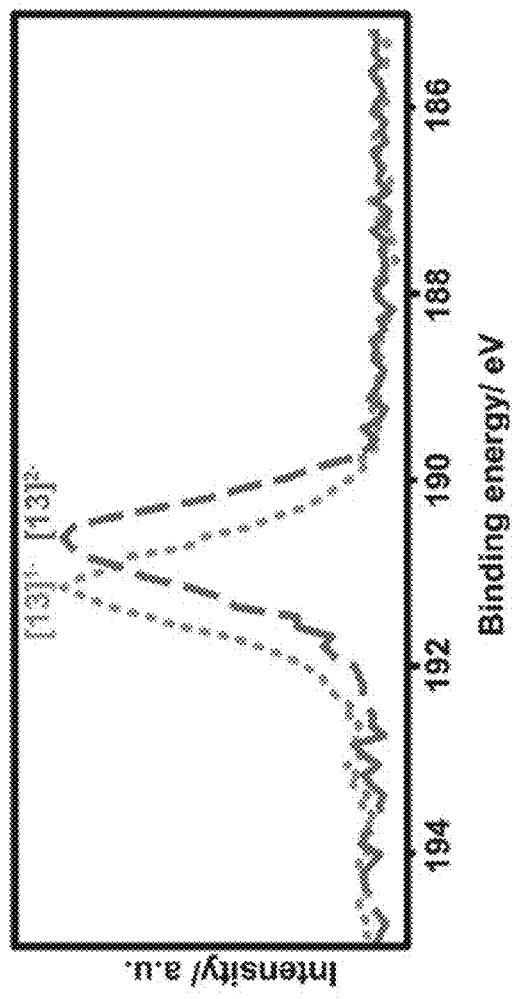
FIG. 14A
FIG. 14B

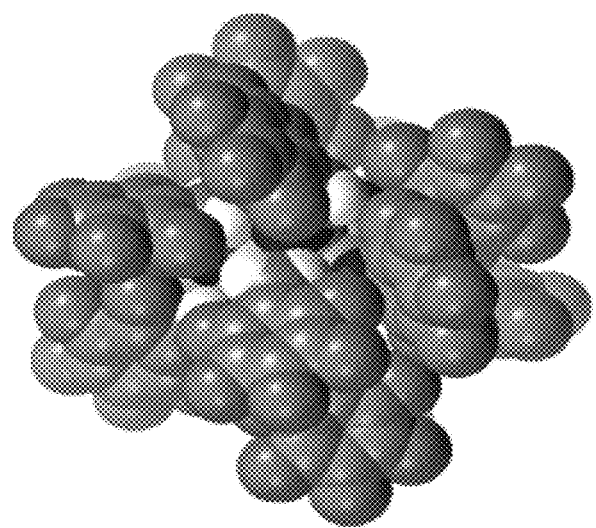
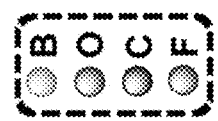
FIG. 22E
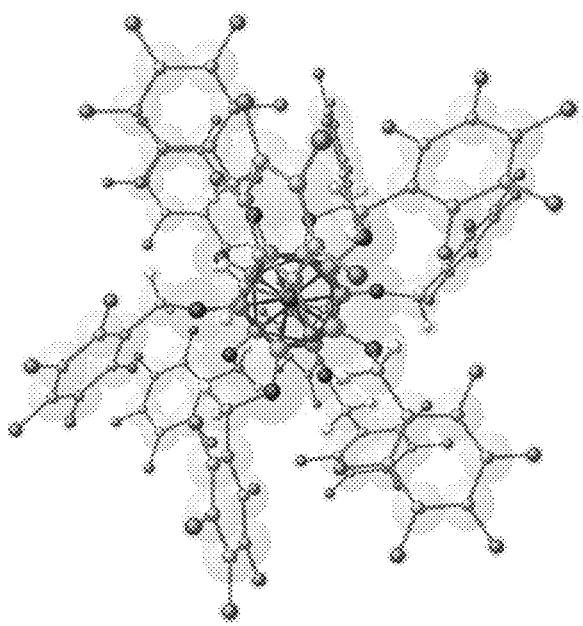
FIG. 22D

FIG. 23

| Oxidant (mol%) | Conc. | Ð | $M_n$ (kDa) | Time | Yield |
|---|---|---|---|---|---|
| 1a (0.5) | 2 M | 1.3 | 13.8 | 4 h | <10% |
| 1b (0.1) | 2 M | 15.2 | 255 | <1m | 81% |
| 1b (0.005) | 2 M | 1.7 | 198 | <1m | 90% |
| 1b (0.05) | 0.2 M | 1.7 | 198 | 6 h | 97% |

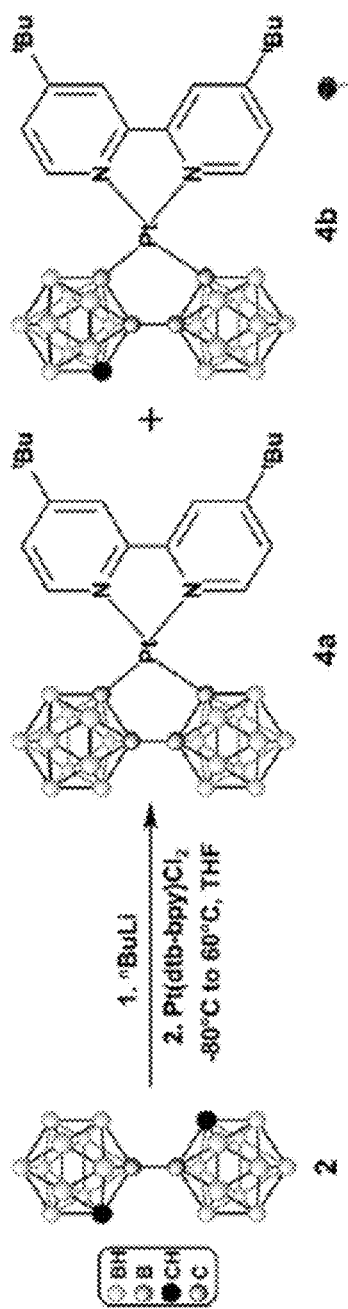
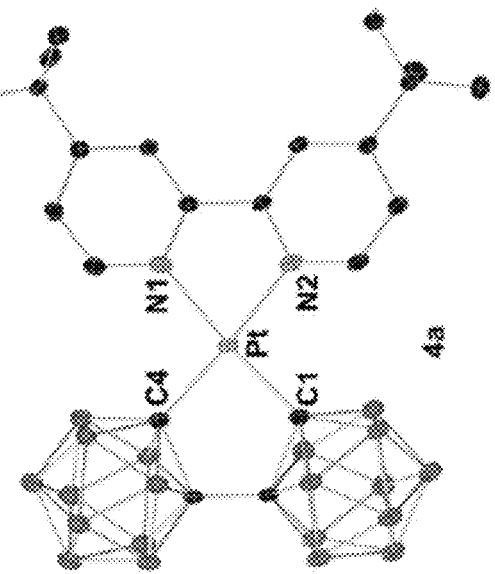
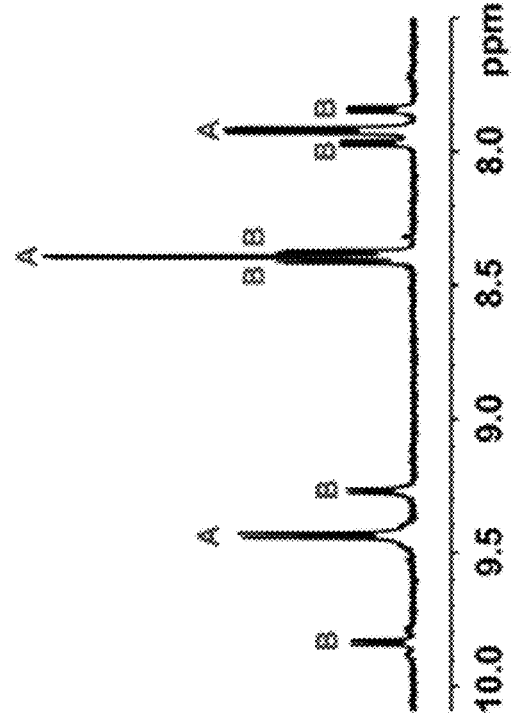
FIG. 29A
FIG. 29B
FIG. 29C

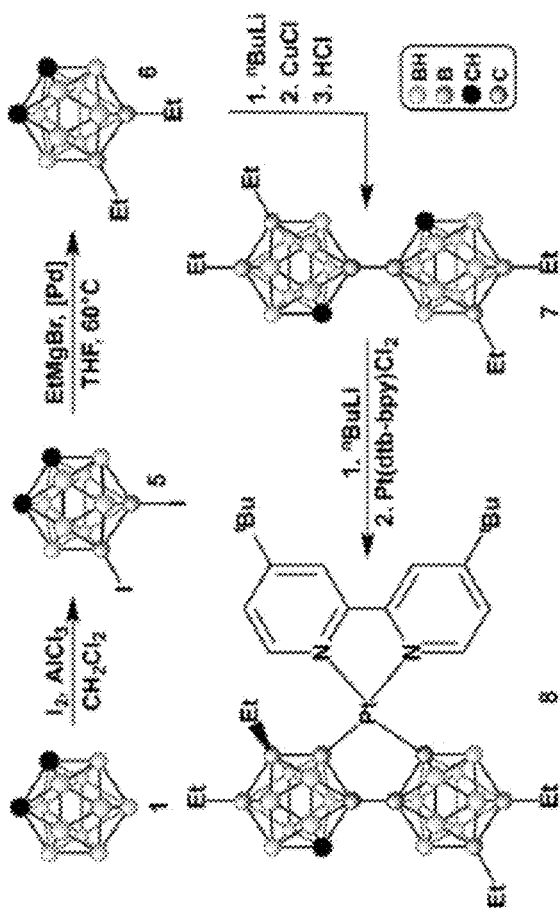
FIG. 30A
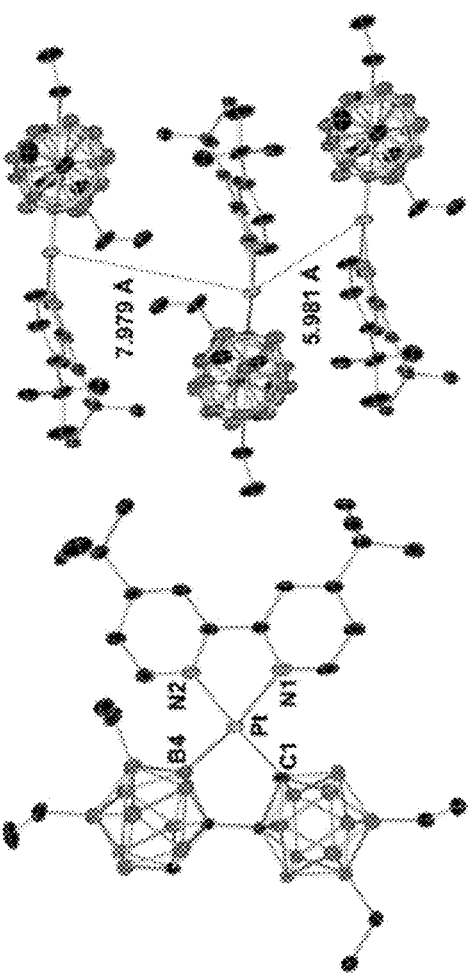
FIG. 30B
FIG. 30C

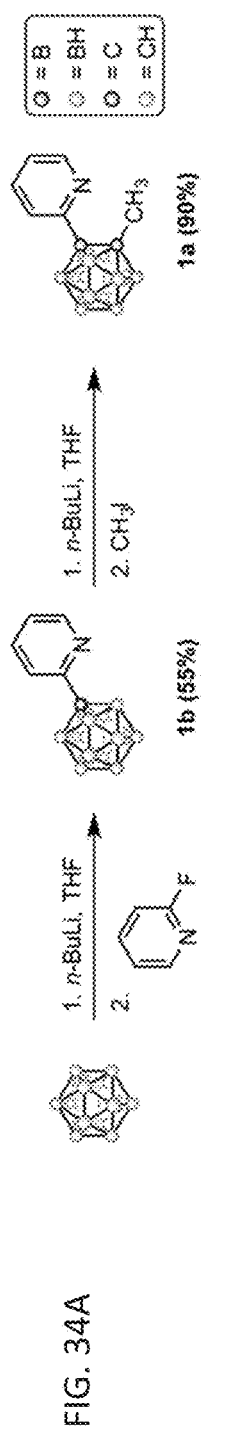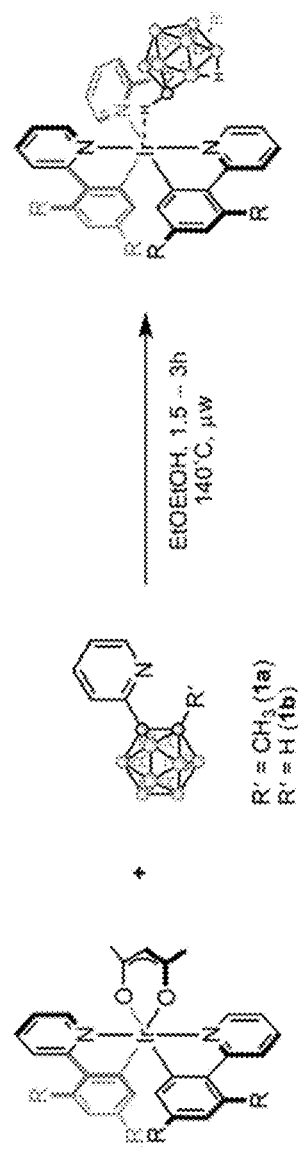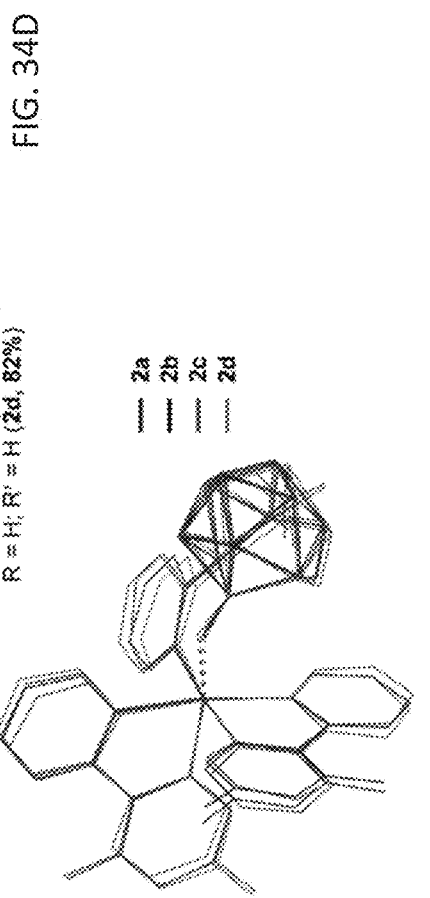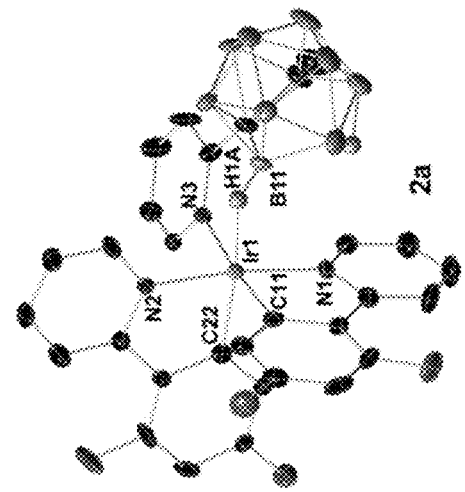
FIG. 34A  FIG. 34B  FIG. 34C  FIG. 34D

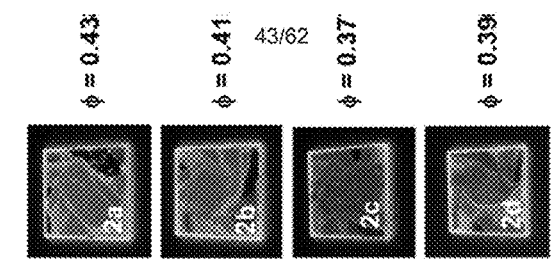
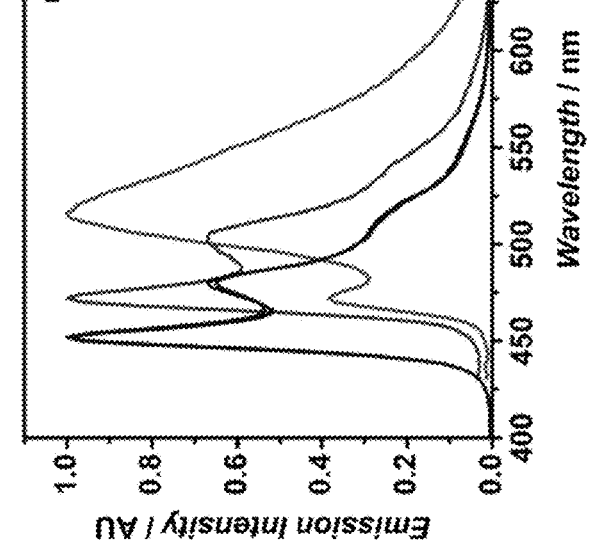
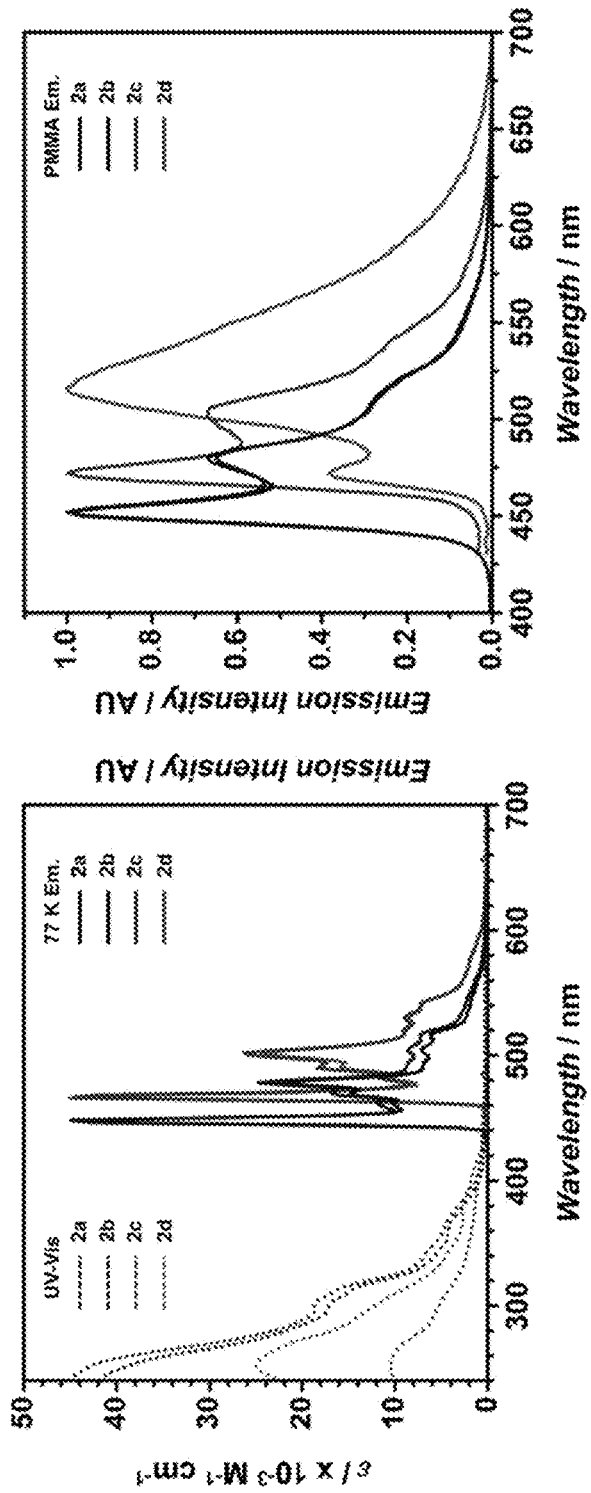
FIG. 35A
FIG. 35B
FIG. 35C

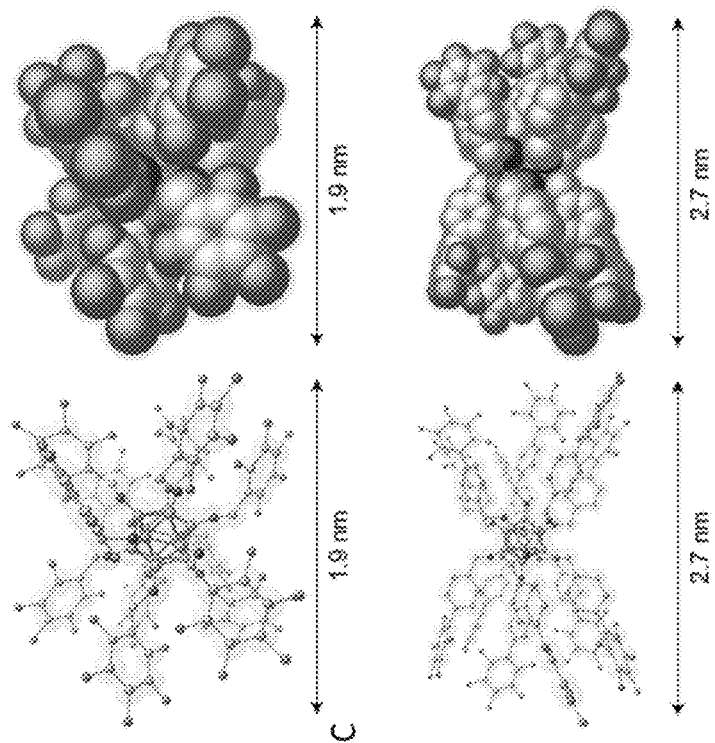
FIG. 40A
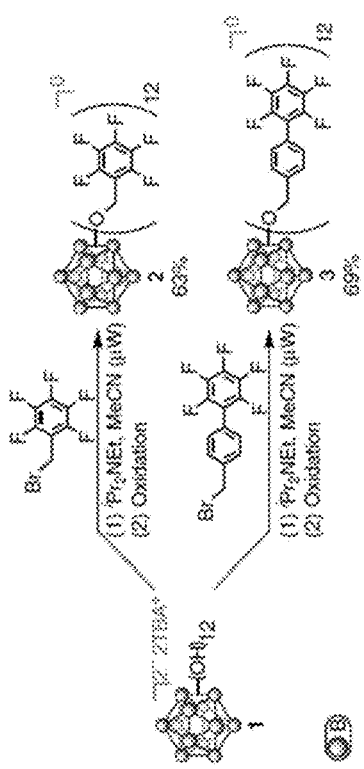
FIG. 40B
FIG. 40C
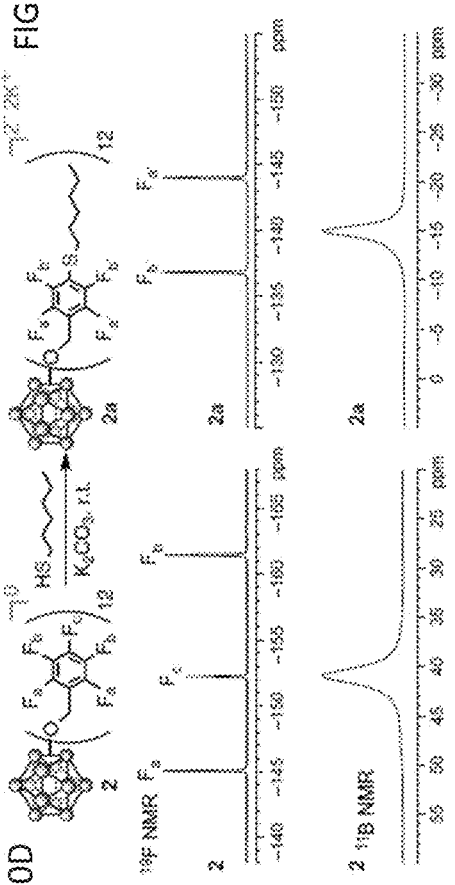
FIG. 40D

FIG. 41A

| Entry | Compound | L | R | Time (h) | In situ yield[a] (%) | Isolated yield[b] (%) |
|---|---|---|---|---|---|---|
| 1 | 2a | None | alkyl | 24 | 99 | 70 |
| 2 | 2b | None | Ph-CH₂ | 24 | 99 | 98 |
| 3 | 2c | None | Ph-CH₂CH₂ | 24 | 99 | 84 |
| 4 | 2d | None | -CH₂CH(OH)CH₂OH | 24 | 99 | 40 |
| 5 | 2e | None | -CH₂CH(OH)CH₂OH | 24 | 99 | 30 |
| 6 | 2f | None | -(CH₂)ₙNH₂ | 24 | 99 | 49 |
| 7 | 3a | phenyl linker | alkyl | 7 | 99 | 87 |

| Entry | Compound | L | R | Time (h) | *In situ* yield[a] (%) | Isolated yield[b] (%) |
|---|---|---|---|---|---|---|
| 1 | 2i | None | | 24 | 99 | 81 |
| 2 | 2j | None | | 24 | 99 | 19 |
| 3 | 2k | None | | 24 | 99 | 41 |
| 4 | 2l | None | | 24 | 99 | 17 |
| 5 | 3j | | | 5 | 99 | 78 |
| 6 | 3k | | | 4 | 99 | 21 |
| 7 | 3l | | | 20[c] | 99 | 54 |
| 8 | 3f | | | 5 | 99 | 32 |

[a]Yield determined by 19F NMR spectroscopy. [b]Isolated yield after purification. [c]3j and 3l underwent partial K+/Na+ counterion exchange during the deprotection reactions with NaOMe. Scale-up reactions shown; full conversion within 5 h.

THREE-DIMENSIONAL BORON-RICH CLUSTERS

FIELD OF THE INVENTION

The present invention generally relates to three-dimensional boron-rich clusters, the use of such clusters as substrates in a variety of photophysical processes and biomimetic functions, and methods of their manufacture, and of the manufacture of atomically precise nanoparticles therefrom.

BACKGROUND

Polyhedral carboranes are boron-rich molecular clusters that are often described as three-dimensional (3D) analogs to benzene. (See, e.g., Grimes, R. N. *Carboranes*, 2nd ed.; Elsevier: Oxford, 2011; and Spokoyny, A. M. *Pure Appl. Chem.* 2013, 85, 903, the disclosures of which are incorporated herein by reference.) Their unique delocalized 3D aromatic bonding, high stability, and potential for site-selective functionalization make them attractive building blocks for tunable pharmacophores, unique ligand scaffolds, and building blocks for materials applications. (See, e.g., Issa, F. et al., *Chem. Rev.* 2011, 111, 5701; McArthur, S. G. et al., *Inorg. Chem. Front.* 2015, 2, 1101; Bohling, L. et al., *Eur. J. Inorg. Chem.* 2016, 2016, 403; Jude, H., *J. Am. Chem. Soc.* 2005, 127, 12131; Farha, O. K. et al., *J. Am. Chem. Soc.* 2007, 129, 12680; Thomas, J. C. et al., *Chem. Mater.* 2015, 27, 5425; Yao, Z.-J. et al., *J. Organomet. Chem.* 2015, 798, 274; Douvris, C. & Ozerov, O. V., *Science* 2008, 321, 1188; Julius, R. L. et al., *Proc. Natl. Acad. Sci. U.S.A* 2007, 104, 4808; Endo, Y. et al., *Itai, A. Chem. Biol.* 2001, 8, 341; Lugo, C. A. et al., *Inorg. Chem.* 2015, 54, 2094; Shi, C. et al., *Angew. Chem.* 2013, 125, 13676; Lee, Y.-H. et al., *J. Am. Chem. Soc.* 2015, 137, 8018; and Joost, M. et al., *J. Am. Chem. Soc.* 2014, 136, 14654, the disclosures of which are incorporated herein by reference.)

SUMMARY OF THE INVENTION

Novel three-dimensional molecular clusters and methods of their synthesis are provided.

Various embodiments are directed to metal-free photooxidants comprising an icosahedral dodecaborate consisting of $B_{12}(OR)_{12}$ where R is an alkyl, unsubstituted, or substituted benzyl substituent.

In some such embodiments R is at least one of either an alkyl, substituted or unsubstituted benzyl substituent.

Other embodiments are directed to methods for photomediated (co)polymerization including:
  introducing a solution of a monomer and an icosahedral dodecaborate consisting of $B_{12}(OR)_{12}$ where R is an alkyl, unsubstituted, or substituted benzyl substituent; and
  illuminating the solution with an energetic emission.

In some such embodiments R is at least one of either an alkyl, substituted or unsubstituted benzyl substituent.

In other such embodiments the monomer(s) contains an alkene or epoxide.

In still other such embodiments the monomer(s) is selected from the group of substituted or unsubstituted styrenes, terpenes, cycloaliphatic epoxides, norbornenes, vinyl ethers, vinyl esters, methacrylates, acrylamides, hydrocarbons, maleic anhydrides, and various derivatives of molecules containing either activated or unactivated alkenes, or epoxides.

Still other embodiments are directed to a transition metal complex ligands including a 1, 1'-bis(o-carborane) consisting of $[(C_2H_{10}B_{10})^-]_2$.

Yet other embodiments are directed a transition metal complex ligands including a substituted 1, 1'-bis(o-carborane) consisting of $(C_2H_9B_{10}R_2)_2$, where R is selected from the group consisting of: alkane, alkene, alkyne, alcohol, aryl, ether, halide, aldehyde, carboxylic acid, ester, amide, amine, nitrile, isocyanate, thiol and arene.

In some such embodiments the ligand is coordinated with a transition metal (M) at the CH group, and wherein the transition metal is selected from the group consisting of: Sc, Ti, V, Cr, Mn, Fe, Co, Ni, Cu, Zn, Ru, Rh, Pd, Ag, Re, Os, Ir, Pt and Au.

In other such embodiments the transition metal complex ligand further includes a bidentate ligand containing two N-M bonds.

In still other such embodiments the transition metal complex ligand further includes a monoanionic ligand containing a C-M or B-M bond.

In yet other such embodiments the monoanionic ligand is an acetylacetone.

In still yet other such embodiments the transition metal complex ligands may be used a dopants in organic light emitting diode materials.

Still yet other embodiments are directed to transition metal complex carboranyl-aryl ligands consisting of $C_2H_8B_{10}R_2X$,
  where R is selected from the group consisting of: alkane, alkene, alkyne, alcohol, aryl, ether, halide, aldehyde, carboxylic acid, ester, amide, amine, nitrile, isocyanate, thiol and arene; and
  where X is a substituted or unsubstituted aryl.

In some such embodiments the aryl is a pyridine.

Still yet other embodiments are directed to molecular scaffolds for forming atomically precise nanomolecules comprising an icosahedral dodecaborate consisting of $B_{12}(OR)_{12}$,
  where R is a perfluoroaryl terminated linker.

In some such embodiments the dodecaborate is perfunctionalized with one or more alkyl or substituted aromatic perfunctionalization groups, and each of the perfluoraryl terminated linkers is attached to the dodecaborate through said perfunctionalization groups.

In other such embodiments one or more of the fluorine atoms of the perfluoroaryl terminated linkers is substituted with a thiol-containing molecule or macromolecule.

In still other such embodiments the thiol-containing macromolecule is a peptide such that the molecular scaffold is an organomimetic cluster nanomolecule.

In yet other such embodiments the molecular scaffold is PEGylated.

In still yet other such embodiments the thiol-containing molecules are recognition moieties.

In still yet other such embodiments the recognition moieties are glycoconjugates.

In still yet other such embodiments the glycoconjugates are linked with one or more molecules selected from the group consisting of proteins, peptides, lipid and saccharides.

In still yet other such embodiments the molecular scaffold forms an organomimetic cluster nanomolecule that functions as one of an antibody, protein, histone or viral mimic.

In still yet other such embodiments the molecular scaffold further comprises a viral scaffold and at least one fluorescent moiety, and wherein the molecular scaffold operates as a viral assay.

In still yet other such embodiments the viral scaffold is a gp41 viral scaffold.

In still yet other such embodiments the histone mimic comprises a periodic arrangement of cationic lysine residues separated by one or more helix-promoting hydrophobic amino acids.

Still yet other embodiments are directed to methods for forming atomically precise nanomolecules including:

providing an icosahedral dodecaborate scaffold consisting of $B_{12}(OR)_{12}$ appending one or more of the hydrogens on the dodecaborate scaffold with one or more perfluoroaryl terminated linkers;

conjugating one or more thiol containing molecules or macromolecules onto one or more of the perfluoraryl terminated linkers a nucleophilic aromatic substitution.

In some such embodiments the method further includes perfunctionalizing the dodecaborate scaffold with one or more alkyl or substituted aromatic perfunctionalization groups prior to appending the one or more perfluoraryl terminate linkers thereto.

Still yet other embodiments are directed to a covalent organic framework comprising two-dimensional carborane-containing polymer sheets.

In some such embodiments a plurality of receptor molecules are appended to the covalent organic framework.

In other such embodiments the receptor molecules are sugars or peptides.

Still yet other embodiments are directed to a method of forming a covalent organic framework including:

providing a plurality of carboranes;

forming a plurality of difunctionalized cyanocarbones therefrom via acid-mediated trimerization;

forming a two-dimensional carborane-containing polymer sheet via an ionothermal polymerization; and functionalizing one or more of the carbon-hydrogen vertices of the two dimensional carborane-containing polymer sheet.

In some such embodiments the functionalization comprises appending one or more receptor molecules onto the carbon-hydrogen vertices.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 2A and 2B illustrate: A) inherent dispersity associated with noble metal nanoparticles featuring thiolate ligands, and B) lability of the thiolate ligands.

FIGS. 5A and 5B illustrate: A) the reversible redox behavior of dodecafunctionalized $B_{12}$-based clusters. X can be alkyl, hydroxyl or substituted hydroxyl moieties; and B) 3D models of two representative $B_{12}$-based radicals and the calculated SOMO electron distribution in $B_{12}Me_{12}^1$, in accordance with embodiments of the invention.

FIGS. 12A to 12E illustrate: A) reversible redox activity of [13]; B) cyclic voltammogram (CV) demonstrating two independent, one-electron oxidation/reduction waves between 2−/1−, and 1−/0 states (1 mM [13] with 0.1 M $TBAPF_6$ in $CH_2Cl_2$; glassy carbon working electrode, Pt wire counter electrode, Ag/AgCl pseudoreference electrode behind a CoralPor tip; referenced to an internal ferrocene standard); C) infrared spectroelectrochemical (IR-SEC) analysis of 0/1−/2− states of [13]; D) $^{19}F$ NMR spectra of $[13]^{1-}$ and $[13]^{2-}$ with EPR of $[13]^{1-}$ (inset); E) UV-Vis spectra of $[13]^{1-}$ and $[13]^{2-}$ in accordance with embodiments of the invention.

FIGS. 13A and 13B illustrate solid state X-ray structures for $[13]^{1-}$ and $[11]^0$ shown with 50% thermal ellipsoid probabilities for the boron atoms in accordance with embodiments of the invention (hydrogen atoms omitted for clarity), where selected bond lengths and angles of the boron cores (substituents omitted for clarity) for $[11]^0$ and $[13]^{1-}$ are shown on the bottom, and overlay of the two cores ($[13]^{1-}$ and)$[11]^0$ is depicted in the middle.

FIGS. 14A and 14B illustrate: A) Boron XPS spectra for $TBA_2[1]^{2-}$, $TBA[12]^{1-}$, and $[11]^0$ showing an increase in B—B bond energy with increasing oxidation state; and B) boron XPS spectra for $TBA_2[13]^{2-}$ and $TBA[13]^{1-}$ indicating the higher B—B bond energies of the $[13]^{2-}$ and $[13]^{1-}$ anions compared to the other substituted clusters in accordance with embodiments of the invention.

FIGS. 22A to 22E illustrate: A) reversible oxidation/reduction of substituted boron-rich clusters (0/−1 shown); B) cyclic voltammogram of [1a] and [1b]; C) UV-Vis spectrum of photooxidants [1a] and [1b] in their fully oxidized states and mono-anionic states; and D-E) ball-and-stick and space-filling representations of the X-ray crystal structure of [1b] in accordance with embodiments of the invention.

FIG. 23 illustrates polymerization conditions of [2a] in accordance with embodiments of the invention, including number average molecular weight (M$_n$) and dispersity ($Đ$) determined by GPC.

FIGS. 29A to 29C illustrate: A) synthesis of the Pt(bc)(dtb-bpy) complex leads to a mixture containing two product isomers featuring a k2-C,C-bound bc [4a] and κ$^2$-B,C-bound bc [4b]; B) $^1$H NMR spectrum of the aryl region for the isolated mixture of [4a] (label A) and [4b] (label B); and C) single crystal X-ray structure of [4a] drawn with 50% thermal ellipsoid probability, in accordance with embodiments of the invention.

FIGS. 30A to 30C illustrate: A) synthetic route to 9,9', 12,12'-tetraethyl-1,1'-bis(o-carborane)[7], syntheses of [5] and [6]; B) X-ray crystal structure of [8] with thermal ellipsoids drawn at 50% probability, H atoms omitted for clarity; and C) stacking of [8] with Pt(II)/Pt(II) distances of 5.981°A and 7.979°, in accordance with embodiments of the invention.

FIGS. 34A to 34D illustrate: A) synthesis of carborane-based ligand precursors; B) Ir(III) compounds containing a nido-carboranylpyridine ligand; C) solid-state structure of [2a] (carboranyl label corresponds to IUPAC numbering scheme); and D) structure similarities of [2a-2d] are shown by superimposed stick models of the single crystal X-ray structures, in accordance with embodiments of the invention.

FIGS. 35A to 35C illustrate: A) UV-vis absorption (dotted line) and 77 K emission (solid line) spectra for [2a-2d](UV-vis measurements were recorded in CH$_2$Cl$_2$ at 1×10$^{-5}$M, and 77 K emission spectra were obtained from solutions of 2-MeTHF; B) emission spectra of 2 wt % PMMA films of [2a-2d] ($\lambda_{exc}$=400 nm); and C) pictures of 2 wt % PMMA films of [2a-2d] when irradiated with UV light ($\lambda_{exc}$=365 nm), in accordance with embodiments of the invention.

FIGS. 40A to 40D illustrate: the synthesis and characterization of the perfluoroaryl-perfunctionalized dodecaborate clusters and the subsequent modification with thiols in accordance with embodiments of the invention, where: A) perfunctionalization of [1] with rigid pentafluoroaryl-terminated linkers yields pure clusters [2] and [3], after isolation; B) & C) ball-and-stick and space-filling representations of the single-crystal X-ray structures of [2] and [3], (size measurements of the crystal structures reveal that [2] is 1.9 nm and [3] is 2.7 nm (lengthwise)); and D) 'click'-like modification of cluster [2] with the 1-hexanethiol reagent and the corresponding $^{19}$F and $^{11}$B NMR spectra associated with the transformation from the starting material [2] to the functionalized product [2a](perfunctionalization of [2] with 1-hexanethiol results in a shift of the meta-F resonance and the complete disappearance of the para-F resonance as well as a characteristic upfield shift of the boron singlet that results from the reduction of the cluster).

FIG. 41 provides results of the conjugation scope for [2] and [3] in accordance with embodiments of the invention.

FIG. 42 provides results of the PEGylation and glycosylation for [2] and [3] in accordance with embodiments of the invention.

DETAILED DESCRIPTION

Figure 1B:
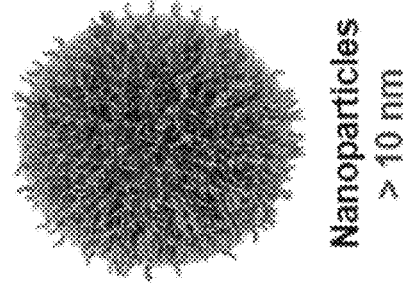
FIGS. 1A and 1B illustrate: A) size and atomic monodispersity conundrum within existing A) chemical space, and B) nanomolecules.

Turning now to the drawings, novel three-dimensional molecular clusters and methods of their synthesis are provided. In many embodiments the three-dimensional molecular clusters are perfunctionalized polyhedral boranes and carboranes. In some such embodiments the polyhedral boranes and carboranes are dodecaborates. In still other embodiments methods for synthesizing and perfunctionalizing such three-dimensional clusters are also provided.

In various embodiments, the three-dimensional clusters are configured to manipulate the photophysical properties of other materials, including, for example, for use as photooxidants or as components in organic light-emitting diode materials. In other such embodiments the three-dimensional clusters may be formed as two-dimensional sheets of such clusters.

Various other embodiments are directed to methods of forming atomically precise nanoparticles from such three-dimensional clusters, and to atomically precise molecular scaffolds formed from such three-dimensional clusters. In embodiments the atomically precise nanoparticles are formed by appending perfluoroaryls thereto followed by functionalizing the fluoroaryls with thiol-containing molecules and macromolecules. In various such embodiments the atomically precise nanomolecules may be utilized in a variety of organomimetic applications. In some such embodiments the biomimetic nanomolecules may be used with glycoconjugates that are linked with one or more molecules selected from the group consisting of proteins, peptides, lipid and saccharides. In other such embodiments the molecular scaffold forms an organomimetic cluster nanomolecule that functions as one of an antibody, protein, histone or viral mimic. In still yet other such embodiments the molecular scaffold operates as a viral assay.

These and other methods, materials and applications of said methods and materials will be described in greater detail in the disclosure.

Design and Synthesis of Three-Dimensional Molecular Clusters

Macromolecules in living systems usually act in tandem by constantly binding and interacting with each other. (See, e.g., Keskin, O. et al., Chem. Rev. 2008, 108, 1225-1244, the disclosure of which is incorporated herein by reference.) These protein-protein (PPIs) or protein-oligonucleotide interactions are known to mediate a large number of essential regulatory and assembly processes. Furthermore, viruses and bacteria capitalize on complex machinery consisting of several protein-protein interactions in order to penetrate and infect the host cell. Rationally designing and constructing abiotic systems that can interact precisely with large biomolecules remains a largely unsolved challenge given the molecular complexity of many PPIs and the large surface areas of these interactions. (See, e.g., Peczuh, M. W.; Hamilton, A. D. Chem. Rev. 2000, 100, 2479-2494; Wilson, A. J. Chem. Soc. Rev. 2009, 38, 3289-3300; Azzarito, V., et al., Nature. Chem. 2013, 161-173; Echols, H., Science 1986, 233, 1050-1056; Arkin, M. R.; Wells, J. A., Nat. Rev., Drug Disc. 2004, 3, 301-317; Jain, R. K.; Hamilton, A. D., Org. Lett. 2000, 2, 1721-1723; Park, H. S., et al., Proc. Natl. Acad. Sci. U.S.A 2002, 99, 5105-5109; Leung, D. K., et al., Proc. Natl. Acad. Sci. U.S.A 2000, 97, 5050-5053; and Rodriguez, J. M., et al., ChemBioChem 2009, 10, 829-833, the disclosures of each of which are incorporated herein by reference.) Because these interactions usually occupy such large surfaces (ranging from 500 to 4000 Å$^2$/molecule), any general solution to designing PPI inhibitors will require molecules with relatively large surface areas as well.

The current toolbox of available molecules consists primarily of only two distinct structural classes—small molecules (FIG. 1A) and protein-based species. Small molecules normally contain less than 100-200 atoms and feature relatively small surface areas. This ultimately prevents the majority of small molecules from efficient inhibition of protein-protein interaction by competitively binding the surface of one of the target proteins. On the other hand, protein-based inhibitors such as antibodies are dramatically larger in size (>1000 atoms) and their large surface footprint should in principle allow PPI disruption more efficiently. (See, e.g., Lo Conte, L.; Chothia, C.; Janin, J., J. Mol. Bio. 1999, 285, 2177-2198; and Jones, S.; Thornton, J. M., J. Mol. Bio. 1997, 272, 133-143, the disclosures of each of which are incorporated herein by reference.) However, antibodies and other biologics can only be made via recombinant techniques limiting their structural composition to natural and a few non-natural amino acid building blocks. Furthermore, these species are only stable within a narrow range of operational conditions (pH, reductants/oxidants, temperature) and in many cases are ineffective for applications that necessitate harsher environments. Finally, atomically precise site specific post-synthetic modifications on these species for interfacing them with abiotic materials and building blocks has been a long standing challenge and existing methods are very limited.

Figure 1A:
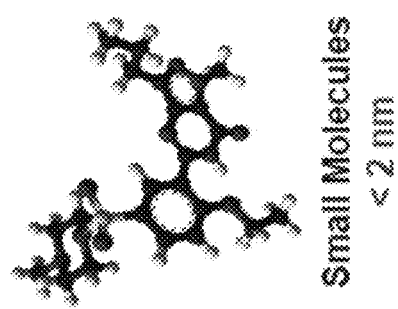

The advent of nanotechnology has recently provided researchers with ways to create a new class of hybrid nanoparticles, which can feature large surface footprints and essentially unlimited number of possible building block constituents (FIG. 1B). (See, e.g., Sailor, M. J.; Lee, E. J., Adv. Mater. 1997, 9, 783-793; Mucic, R. C., et al., J. Am. Chem. Soc. 1998, 120, 12674-12675; and Liu, H.; Owen, J. S.; Alivisatos, P. A., J Am. Chem. Soc. 2007, 129, 305-312, the disclosures of each of which are incorporated herein by reference.) A typical nanoparticle (FIG. 1B) assembly consists of a metallic-core and a corona of ligands attached to this core. Forces that hold such assemblies can be electrostatic (ionic), coordination-based (covalent) or both. The ultimate power of the existing hybrid nanoparticle platforms relies on the versatility and modularity of the sizes one can access by using various colloidal metal species and the orthogonality of the metal-ligand binding interaction. The latter allows introducing virtually any ligand molecules with excellent functional group and size tolerance.

Tremendous advances have been made by researchers in chemistry and engineering over the past decade exploring fundamental properties of these nanoparticle assemblies and the associated applications including those in delivery, sensing, diagnostics and "materials by design" technologies. However, all of these systems suffer from several fundamental limitations. Unlike proteins and small-molecules, hybrid nanoparticle assemblies are never atomically precise and therefore have non-uniform composition and size (FIG. 2A). (See, e.g., Gaumet, M.; Vargas, A.; Gurny, R.; Delie, F., *Eur. J. Pharm., Biopharm.* 2008, 69, 1-9, the disclosure of which is incorporated herein by reference.) This fundamentally limits researchers ability to precisely engineer recognition and binding properties of these assemblies. Consequently, inherent polydispersity features of hybrid nanoparticles lead to their diminished selectivity when they are designed to target and bind biomacromolecules (proteins, oligonucleotides, sugars) and other types of 3D complex chemical entities. Therefore, the status quo in the field largely centers on our inability to rationally address structure-function properties of nanoparticles on an atomic level and thus deduce their precise points of interaction with the target protein and other macromolecular structures. Furthermore, it has been well established that under relatively benign conditions weak metal-ligand interactions in the hybrid nanoparticles can lead to scrambling events (FIG. 2B). (See, e.g., Ramachandran, G. K.; Hopson, T.; Rawlett, A. M.; Nagahara, L. A.; Primak, A.; Lindsay, S. M., *Science* 2003, 300, 1413-1416, the disclosure of which is incorporated herein by reference.) This is especially true of a large class of hybrid noble metal nanoparticles such as gold (AuNPs). This additionally contributes to a statistical distribution of defects and positional uncertainty of ligands around the metal core limiting molecular precision in these species. In fact, when the composition of a bulk sample of inorganic clusters is inhomogeneous (polydisperse), researchers often refer to such matter as "nanoparticles". While surface-functionalized nanoparticles have been widely explored in the past decade, the area of atomically precise and functional hybrid "nanomolecules" remains largely unexplored.

Figure 3:
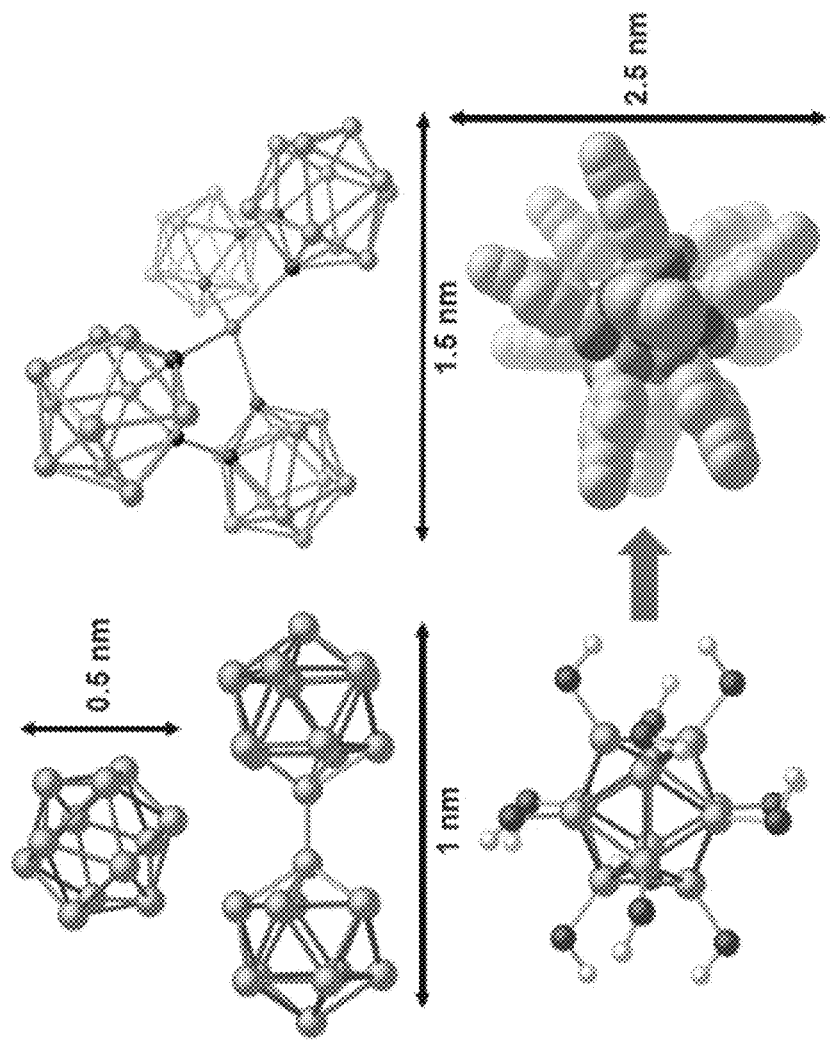
FIG. 3 illustrates representative diagrams showcasing the ability to manipulate boron-rich clusters creating nanomolecule cores of various sizes (hydrogen atoms are omitted for clarity), and functionalization of boron-rich clusters with chemical spaces leading to atomically-precise, rigid nanomolecules, in accordance with embodiments of the invention.

Embodiments are now provided that take advantage of inorganic chemistry to develop a wide-array of cluster-based scaffolds (as shown for example in FIG. 3). Such embodiments comprise organic clusters that contain stable polyatomic molecules composed of and featuring well-defined three-dimensional polyhedral structures (i.e., octahedron, icosahedron). (See, e.g., Zhu, M. et al., *J. Am. Chem. Soc.* 2008, 130, 1138; Peymann, T. et al., *J. Am. Chem. Soc.* 2001, 123, 2182-2185; Pope, T. M. and Müller, A., Polyoxometalate Chemistry: From Topology via Self-Assembly to Applications. Kluwer: 2001; Zhu, Y.; Qian, H.; Drake, B. A.; Jin, R., *Angew. Chem., Int. Ed* 2010, 49, 1295-1298; Muetterties, E. A. Boron Hydride Chemistry. Academic Press, 1975; Kaim, W. et al., *Angew. Chem., Int. Ed.* 2009, 48, 5082-5091; Ivanov, S. V., et al., *J. Am. Chem. Soc.* 2003, 125, 4694-4695; Li, T.; Jalisatgi, S. S. et al., *J. Am. Chem. Soc.* 2005, 127, 17832-17841; Maderna, A. et al., *Angew. Chem., Int. Ed.* 2001, 40, 1661-1664; and Goswami, L. N. et al., *Inorg. Chem.* 2013, 52, 1701-1709, the disclosures of each of which are incorporated herein by reference.) In many cases, embodiments are directed to boron-rich clusters, which are a class of molecules that contain characteristics of both metal-complexes and organic molecules. (See, e.g., Spokoyny, A. M. *Pure Appl. Chem.* 2013, 85, 903-919; and Mutterties, E. L.; Balthis, J. H.; Chia, Y. T.; Knoth, W. H.; Miller, H. C. *Inorg. Chem.* 1964, 3, 444-451, the disclosures of each of which are incorporated herein by reference.) Many polyhedral boron clusters are robust, kinetically stable, and can undergo facile functionalization chemistry. (See, e.g., Grimes, R. N. *J. Chem. Ed.* 2004, 81, 657-672; Hawthorne, M. F. *J. Chem. Ed.* 2009, 86, 1131; Kaim, W., et al., *Angew. Chem. Int. Ed.* 2009, 48, 5082-5091; Power, P. P. *Chem. Rev.* 2003, 103, 789-809; Aihara, J. J. *Am. Chem. Soc.* 1978, 100, 3339-3342; and King, R. B. *Chem. Rev.* 2001, 101, 1119-1152, the disclosures of each of which are incorporated herein by reference.) Species according to embodiments are ideal for a number of applications due to their topological rigidity, appropriate size domain, their potential for dense surface polyfunctionality and low toxicity. Embodiments provided herein provide a fundamental paradigm shift in chemical sciences and ultimately result in the development of new tools for a variety of processes and applications.

Many embodiments are directed to methods for synthesizing atomically precise cluster nanomolecules that can perform as three-dimensional scaffold. The ideal platform for nanoparticle synthesis should incorporate several key design elements including: a) functional group tolerance, b) modularity and c) robustness. Furthermore, given that nanoparticle scaffolds classically exhibit a large degree of rigidity the chemistry should allow for producing similarly rigid and semi-rigid scaffolds. Accordingly, embodiments are fundamentally different from the majority of existing classes of dendrimers, which are significantly more flexible and therefore less topologically structured. (See, Fréchet, J. M. J., *Proc. Natl. Acad. Sci.* 2002, 99, 4782-4787; Moore, J. S., *Acc. Chem. Res.* 1997, 30, 402-413; and Mammen, M., et al., *Angew. Chem., Int. Ed.* 1998, 37, 2754-2794, the disclosures of which are incorporated herein by reference.)

Rapid Synthesis of $B_{12}$ Clusters

There exist several relatively robust cluster species, which could be utilized as fundamental building blocks, unfortunately the majority of these species feature metal-containing vertices, which could potentially diminish the stability of the resultant hybrid constructs due to the necessity of forming metal-ligand bonds. (See, Zhu, M., et al., *J. Am. Chem. Soc.* 2008, 130, 1138; Peymann, T., et al., *J. Am. Chem. Soc.* 2001, 123, 2182-2185; Pope, T. M. and Müller, A. Polyoxometalate Chemistry: From Topology via Self-Assembly to Applications. Kluwer: 2001; and Zhu, Y., et al., *Angew. Chem., Int. Ed.* 2010, 49, 1295-1298, the disclosures of which are incorporated herein by reference.) A notable exception from these species are boron-rich clusters, which have been known to exhibit excellent stability both in the free form and with functional organic linkers appended to these species. (See, e.g., Muetterties, E. A. Boron Hydride Chemistry. Academic Press, 1975; Kaim, W., et al., *Angew. Chem., Int. Ed.* 2009, 48, 5082-5091; Ivanov, S. V., et al., *J. Am. Chem. Soc.* 2003, 125, 4694-4695; Li, T., et al., *J. Am. Chem. Soc.* 2005, 127, 17832-17841; Maderna, A., et al., *Angew. Chem., Int. Ed.* 2001, 40, 1661-1664; and Goswami, L. N., et al., *Inorg. Chem.* 2013, 52, 1701-1709, the disclosures of which are incorporated herein by reference.) Accordingly, many embodiments are directed to polyhedral boron-based scaffolds, such as $B_{12}$ scaffolds.

The existence of an icosahedral dodecaborate $[B_{12}H_{12}]$ cluster was first predicted by Lipscomb and co-workers in 1954. (See, e.g., B. C. Jr. W. H. Eberhardt and W. N. Lipscomb, *J. Chem. Phys.*, 1954, 22, 989-1001, the disclosure of which is incorporated herein by reference.) In a subsequent theoretical molecular orbital-based approach published in 1955, Longuet-Higgins and Roberts predicted that such a cluster would only be stable as dianionic $[B_{12}H_{12}]^{2-}$. (See, e.g., H. C. Longuet-Higgins and M. de V. Roberts, *Proc. R. Soc. London, Ser. A*, 1955, 230, 110-119, the disclosure of which is incorporated herein by reference.) A 1959 study by Shapiro and Williams suggested the possible formation of a $[B_{12}H_{12}]^{2-}$ icosahedron, and in 1960 this cluster was first successfully isolated and characterized as a triethylammonium salt by Pitochelli and Hawthorne, albeit in a relatively low yield. (See, e.g., I. Shapiro and R. E. Williams, *J. Am. Chem. Soc.*, 1959, 81, 4787-4790; and A. R. Pitochelli and F. M. Hawthorne, *J. Am. Chem. Soc.*, 1960, 82, 3228-3229, the disclosures of which are incorporated herein by reference.) Subsequent pioneering studies by Hawthorne, Knoth, Muetterties, and others initiated a new era in the field of boron cluster chemistry.

(See, e.g., E. B. Moore, L. L. Lohr and W. N. Lipscomb, *J. Chem. Phys.*, 1961, 35, 1329; R. Hoffmann and W. N. Lipscomb, *J. Chem. Phys.*, 1962, 36, 2179; R. Hoffmann and W. N. Lipscomb, *J. Chem. Phys.*, 1962, 37, 520; E. L. Muetterties, et al., *J. Am. Chem. Soc.*, 1962, 84, 2506-2508; R. Hoffmann and W. N. Lipscomb, *J. Chem. Phys.*, 1962, 37, 2872; H. C. Miller, et al, *J. Am. Chem. Soc.*, 1963, 85, 3885-3886; I. A. Ellis, et al., *J. Am. Chem. Soc.*, 1963, 85, 3885-3885; E. L. Muetterties, et al., *Inorg. Chem.*, 1964, 3, 444-451; W. R. Hertler, *Inorg. Chem.*, 1964, 3, 1195-1196; W. R. Hertler and M. S. Raasch, *J. Am. Chem. Soc.*, 1964, 86, 3661-3668; H. C. Miller, N. E. Miller and E. L. Muetterties, *Inorg. Chem.*, 1964, 3, 1456-1463; W. H. Knoth, et al., *Inorg. Chem.*, 1964, 3, 159-167; R. J. Wiersema and R. L. Middaugh, *Inorg. Chem.*, 1969, 8, 2074-2079; J. A. Wunderlich and W. N. Lipscomb, *J. Am. Chem. Soc.*, 1960, 82, 4427-4428; I. B. Sivaev, et al., *Collect. Czech. Chem. Commun.*, 2002, 67, 679-727; M. Davidson, *Royal Society of Chemistry*, 2000, vol. 253; N. S. Hosmane, *Boron Science: New Technologies and Applications*, Taylor & Francis, 2011; C. Knapp, in *Comprehensive Inorganic Chemistry II*, Elsevier, 2013, pp. 651-679; D. Olid, et al., *Chem. Soc. Rev.*, 2013, 42, 3318; V. Geis, et al., *Dalton Trans.*, 2009, 2687, the disclosures of which are incorporated herein by reference.) Specifically, these groups have shown that $[B_{12}H_{12}]^{2-}$ can be prepared on a large scale in a high yield (>90%) and undergo facile functionalization chemistry that parallels some properties of classical organic molecules (e.g. benzene). This was an exciting discovery, since previously many boron hydride clusters were perceived as highly unstable species prone to fast degradation by heat, acids, and bases. Conversely, $[B_{12}H_{12}]^{2-}$ salts were shown to be stable in acids and bases, and were thermally stable as high as 810° C. with no observable decomposition, see FIG. 4. A notable example that highlights the robustness of the $B_{12}$ framework can be clearly seen from the work by Strauss (cited above), who demonstrated that perfluorinated dodecaborate species $(B_{12}F_{12}^{2-})$ can withstand both harsh base (3M KOH exposure for 10 days) and acid (concentrated sulfuric and 70% nitric acid exposure for 24 hours) treatments without any noticeable decomposition. Furthermore, these species were shown to be thermally stable (up to 450° C.) and inert towards strong reducing agents (Li and Na metals). While the stability features of the $B_{12}F_{12}^{2-}$ cluster represent, perhaps, the most extreme characteristics among its other congeners, many known perfunctionalized $B_{12}$-based species generally exhibit similar properties. It has been recently demonstrated that other perhalogenated derivatives of $B_{12}H_{12}^{2-}$ feature high degree of chemical stability, which is a necessary prerequisite for applications in advanced materials. Work by Hawthorne (cited above) on perhydroxylated dodecaborate derivatives suggests that these species are also thermally stable, inert towards a range of harsh conditions.

Knoth and coworkers were the first to demonstrate the persubstitution of $[B_{12}H_{12}]^{2-}$, producing halogenated $[B_{12}F_{12}]^{2-}$, $[B_{12}Cl_{12}]^{2-}$, $[B_{12}Br_{12}]^{2-}$ and $[B_{12}I_{12}]^{2-}$ derivatives. (See, e.g., W. H. Knoth, et al., *J. Am. Chem. Soc.*, 1962, 84, 1056-1057, the disclosure of which is incorporated herein by reference.) In the past two decades, persubstitution of $[B_{12}H_{12}]^{2-}$ was improved with new synthetic methods and extended towards other functional groups including $[B_{12}Me_{12}]^{2-}$ and $[B_{12}(OH)_{12}]^{2-}$. (See, e.g., W. Gu and O. V. Ozerov, *Inorg. Chem.*, 2011, 50, 2726-2728; D. V. Peryshkov, et al., *J. Am. Chem. Soc.*, 2009, 131, 18393-18403; S. V. Ivanov, et al., *J. Am. Chem. Soc.*, 2003, 125, 4694-4695; M. F. Hawthorne, *Pure Appl. Chem.*, 2003, 75, 1157-1164; T. Peymann, et al., *Angew. Chem., Int. Ed.*, 1999, 38, 1061-1064, the disclosures of which are incorporated herein by reference.) Among the perfunctionalized derivatives synthesized, closo-$[B_{12}(OH)_{12}]^{2-}$ is particularly appealing, as it is capable of undergoing further functionalization by forming ether, ester, carbonate, and carbamate linkages. (See, e.g., O. K. Farha et al., *J Am. Chem. Soc.*, 2005, 127, 18243-18251, the disclosure of which is incorporated herein by reference.)

While controlled oxidation of the parent $[B_{12}H_{12}]^{2-}$ anion leads to an irreversible cluster degradation forming a B—B linked dimer, several perfunctionalized variants have been previously observed to undergo reversible redox behavior. (See, e.g., W. Kaim, et al., *Angew. Chem., Int. Ed.*, 2009, 48, 5082-5091, the disclosure of which is incorporated herein by reference.) For example, Rupich reported that $[B_{12}X_{12}]^{2-}$ could undergo a single electron oxidation to form a stable radical $[B_{12}X_{12}]^{1-}$, which was recently isolated and structurally confirmed as the oxidized radical $[B_{12}Cl_{12}]^{1-}$ species by Knapp and coworkers. (See, e.g., M. W. Rupich, *J. Electrochem. Soc.*, 1985, 132, 119; and R. T. Boeré, et al., *Angew. Chem., Mt. Ed.*, 2011, 50, 549-552, the disclosures of which are incorporated herein by reference.) Hawthorne and co-workers reported that the perfunctionalized $[B_{12}(OCH_2Ph)_{12}]$ cluster can exist in three distinct redox states accessible via two sequential and quasi-reversible one-electron oxidation reactions of the parent dianionic closo species. (See, e.g., T. Peymann, et al., *Angew. Chem., Int. Ed.*, 2001, 40, 1664-1667, the disclosure of which is incorporated herein by reference.) The same group later showed that other benzyl and alkyl functionalized $B_{12}(OR)_{12}$ clusters can be synthesized, and all of these species exhibit similarly reversible redox behavior. Schleid and co-workers subsequently showed that the parent $[B_{12}(OH)_{12}]^{2-}$ cluster can undergo a one-electron oxidation to form a stable radical $[B_{12}(OH)_{12}]^{1-}$ species. (See, e.g., N. Van, et al., *Chem. — Eur. J.*, 2010, 16, 11242-11245, the disclosure of which is incorporated herein by reference.) Interestingly, the redox potential of the ether-linked $B_{12}(OR)_{12}$ species can be rationally tuned as a function of the 0-bound substituent, reminiscent of many metal-based redox-active inorganic complexes. (See, e.g., M. W. Lee, et al., *Angew. Chem., Mt. Ed.*, 2007, 46, 3018-3022, the disclosure of which is incorporated herein by reference.) Unfortunately, all of the reported synthetic routes towards $B_{12}(OR)_{12}$ clusters currently require either extremely long reaction times (weeks) or highly specialized high pressure equipment. Furthermore, in all cases strict inert atmospheric conditions are also required for their synthesis.

Embodiments are directed to a rapid, scalable, and robust synthetic route to a wide range of perfunctionalized $B_{12}(OR)_{12}$ cluster derivatives. Various embodiments provide a microwave-based method that enables synthesis of perfunctionalized ether-linked boron clusters within minutes and does not require the use of inert atmosphere and rigorously dried solvents. In addition, embodiments of the methods may be used to prepare previously unknown $B_{12}(OR)_{12}$ derivatives featuring highly oxidizing redox potentials as well as vertex differentiated molecular architectures. Using embodiments of such methods allow for the full realization of the clusters' superior chemical and thermal inertness, relatively low cost compared to other polyhedral boron clusters, and isolation and characterization of a significant number of alkoxy-based derivatives, showing how one can rationally tune the relative redox and photophysical properties of the (−2) to (−1) to (0) species simply by varying the electronic properties of the substituent group (R) that is attached to the oxygen site of $B_{12}(OR)_{12}$, as shown schematically in FIGS. 5A and 5B.

Figure 6:
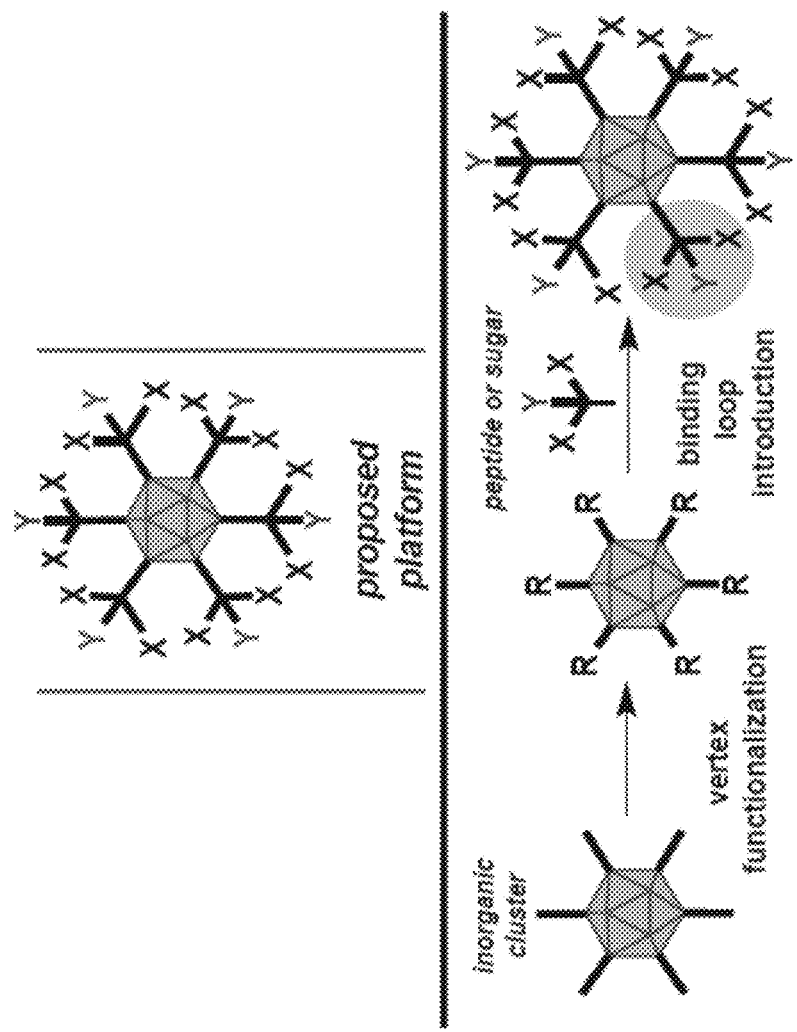
FIG. 6 illustrates a general synthetic strategy for the proposed bottom-up synthesis of atomically precise dodecaborate clusters in accordance with embodiments of the invention.

Various embodiments operate through the functionalization of the B—OH vertices with a diverse range of moieties, as shown schematically in FIG. 6. Such methods provide the means to create an entry point for the bottom-up nanoparticle synthesis. In accordance with many embodiments, metal-catalyzed and "click"-based routes that allow the direct derivatization of these species may also be used, since these methods hold a great promise for rapidly constructing complex nanomolecular core structures that can be further elaborated. Importantly, 3D aromaticity associated with all of these constructs makes them distinctively different from the previously developed classes of molecules with a large degree of three-dimensionality including organic dendrimers, organic-based oligomers and coordination-based assemblies. Specifically, cluster-based scaffolds, in accordance with embodiments, are all uniquely rigid and all of the corresponding vertices are electronically conjugated with each other, providing unique ability to create polyvalent vertex differentiated hybrid nanomolecules.

Figure 7:
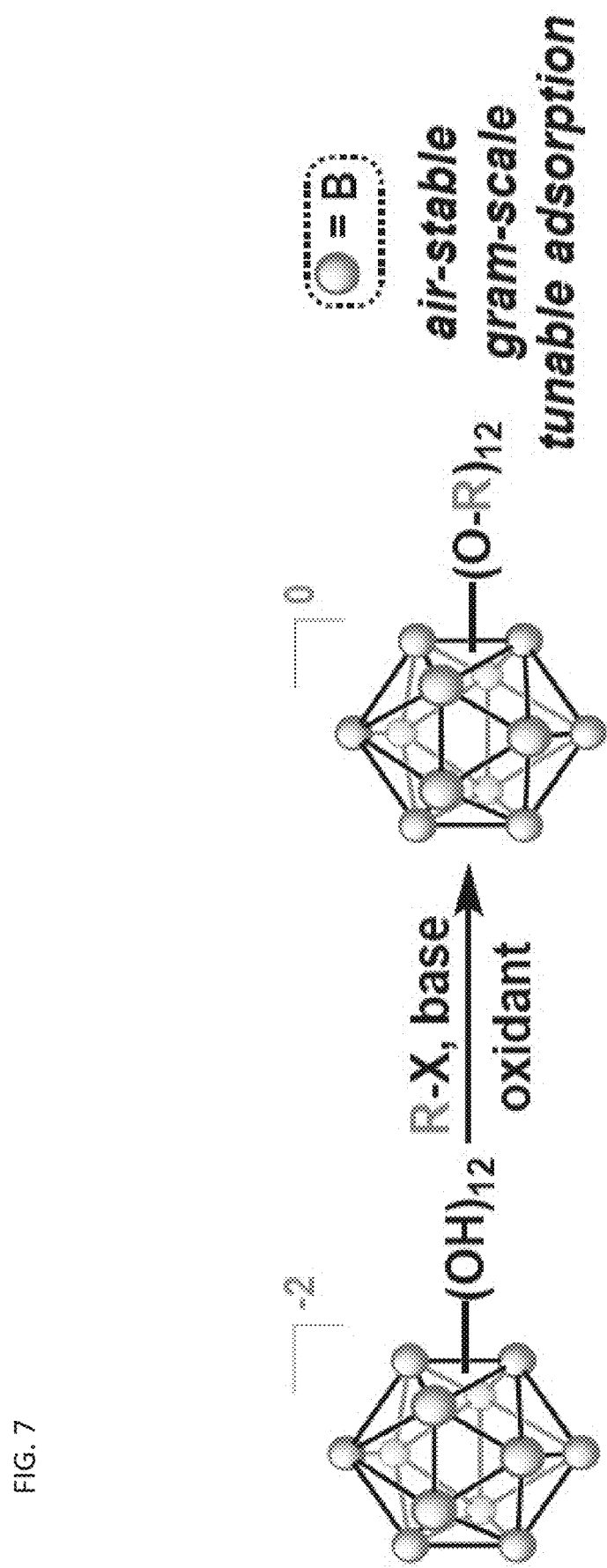
FIG. 7 illustrates the synthesis of the dodecaborate-based nanoparticle core, in accordance with embodiments of the invention.

In accordance with many embodiments, methods for the perfunctionalization of boron-rich clusters allowing one to efficiently graft molecules around these cores are provided. As shown in FIG. 7, various embodiments methods rely on the microwave technology and tolerates a large number of alkyl and aryl reagents. In contrast to previously reported state-of-the-art, the method, in accordance with embodiments, allows for the construction of complex 3D defined cluster cores in minutes (typical reaction times proceed between 15 to 45 minutes) with yields ranging from 50-60%. Notably, previously reported routes utilized specialized and operationally dangerous high-pressure equipment and required extremely long reaction times (multiple days to weeks). Results indicate that using methods according to embodiments allows for the synthesis of a large set of functional cores under open-air conditions with non-dry solvents.

Figure 8:
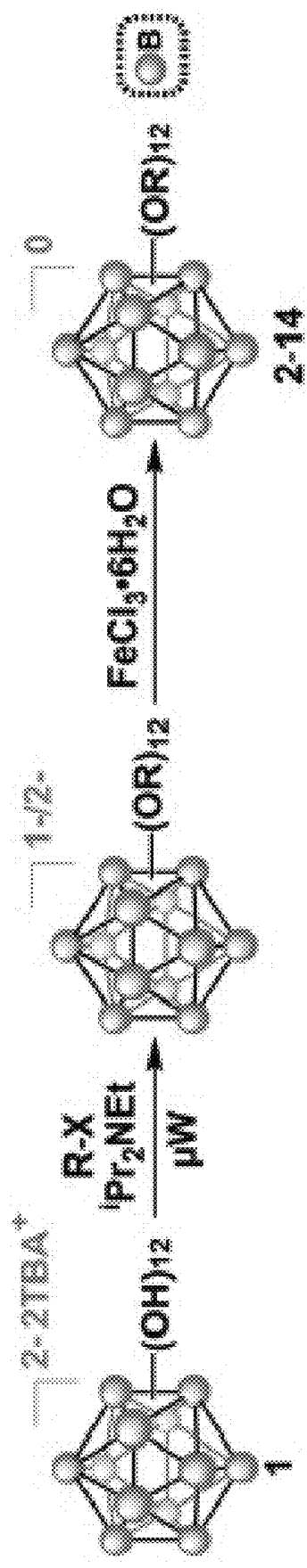
FIG. 8 illustrates the synthetic route to produce functionalized ether-linked derivatives of the hypercloso boron clusters [2-14] via microwave-assisted synthesis, in accordance with embodiments of the invention.
Figure 9:
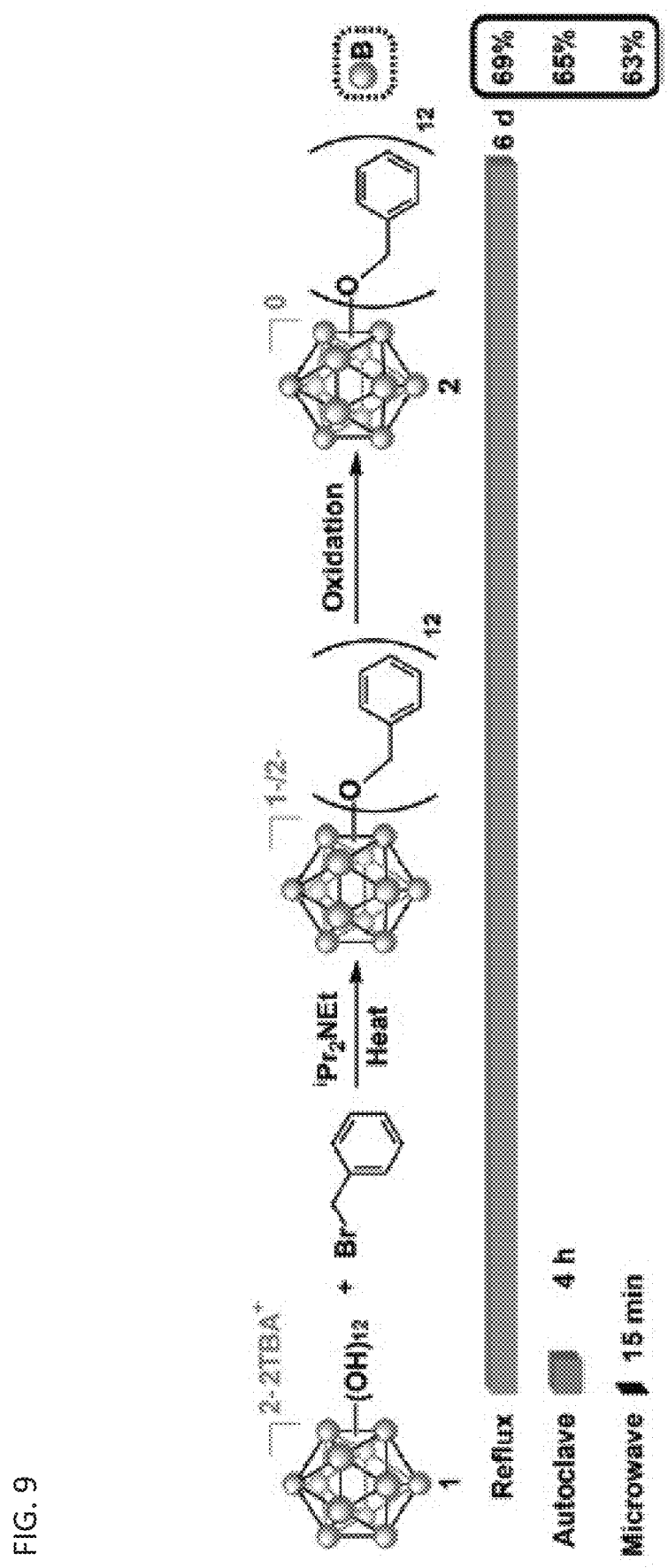
FIG. 9 illustrates the synthesis of [2] from $TBA_2$ [1] using microwave-based method in accordance with embodiments of the invention.

Various embodiments utilize the tetrabutylammonium (TBA) salt of closo[$B_{12}(OH)_{12}$]$^{2-}$ (TBA$_2$[1]) was chosen for use with our microwave synthesis due to its enhanced solubility in organic solvents compared to alkali metal salts of [1] (FIG. 8). (See, e.g., O.K Farha, et al., *J. Am. Chem. Soc.*, 2005, 127, 18243-18251, the disclosure of which is incorporated herein by reference.) The synthesis of TBA$_2$[1] was adapted from previously reported protocols by Hawthorne and co-workers. (Hawthorne, cited above). Oxygen-free, anhydrous conditions (oven-dried glassware, dried and distilled solvents, nitrogen atmosphere) were initially employed for microwave-assisted syntheses of alkyl and benzyl-functionalized closo-[$B_{12}(OH)_{12}$]$^{2-}$ [1] ether-linked derivatives, due to previously described high-pressure and reflux-based methods necessitating stringent air and moisture free conditions. However, it was discovered that microwave reactions utilizing benzyl bromide and TBA$_2$ [1] in the presence of N,N-diisopropylethylamine (DIEA, Hunig's base) in acetonitrile) are driven at a much higher rate, resulting in quantitative formation of a mixture of charged 1-/2- TBA salts of 2 within 15 minutes at 140° C., as indicated by in situ $^{11}$B NMR spectroscopy. Specifically, no parent $^{11}$B NMR resonance at δ−18 corresponding to the [$B_{12}(OH)_{12}$]$^{2-}$ starting material is observed, and a singlet at δ−16 can be seen instead. Concomitant presence of [2]$^{1-}$ radical species in the product mixture can be deduced from the diagnostic pink color of the solution and its measured signature EPR signal (G-factor=2.008121). Oxidation of the reaction mixture using FeCl$_3$.6H$_2$O in 90/10 ethanol/acetonitrile followed by column chromatography on silica gel produces the pure neutral cluster [2]$^0$ in 63% yield (FIG. 9). Oxidation can be conveniently monitored by $^{11}$B NMR, where the fully oxidized cluster [2]$^0$ exhibits a downfield resonance shift at δ 41.8. Overall, this represents a significant reduction in reaction duration from the originally reported 6 days and 4 hours required for reflux and high-pressure reactor methods, respectively, while retaining similar yield.

Figure 10:
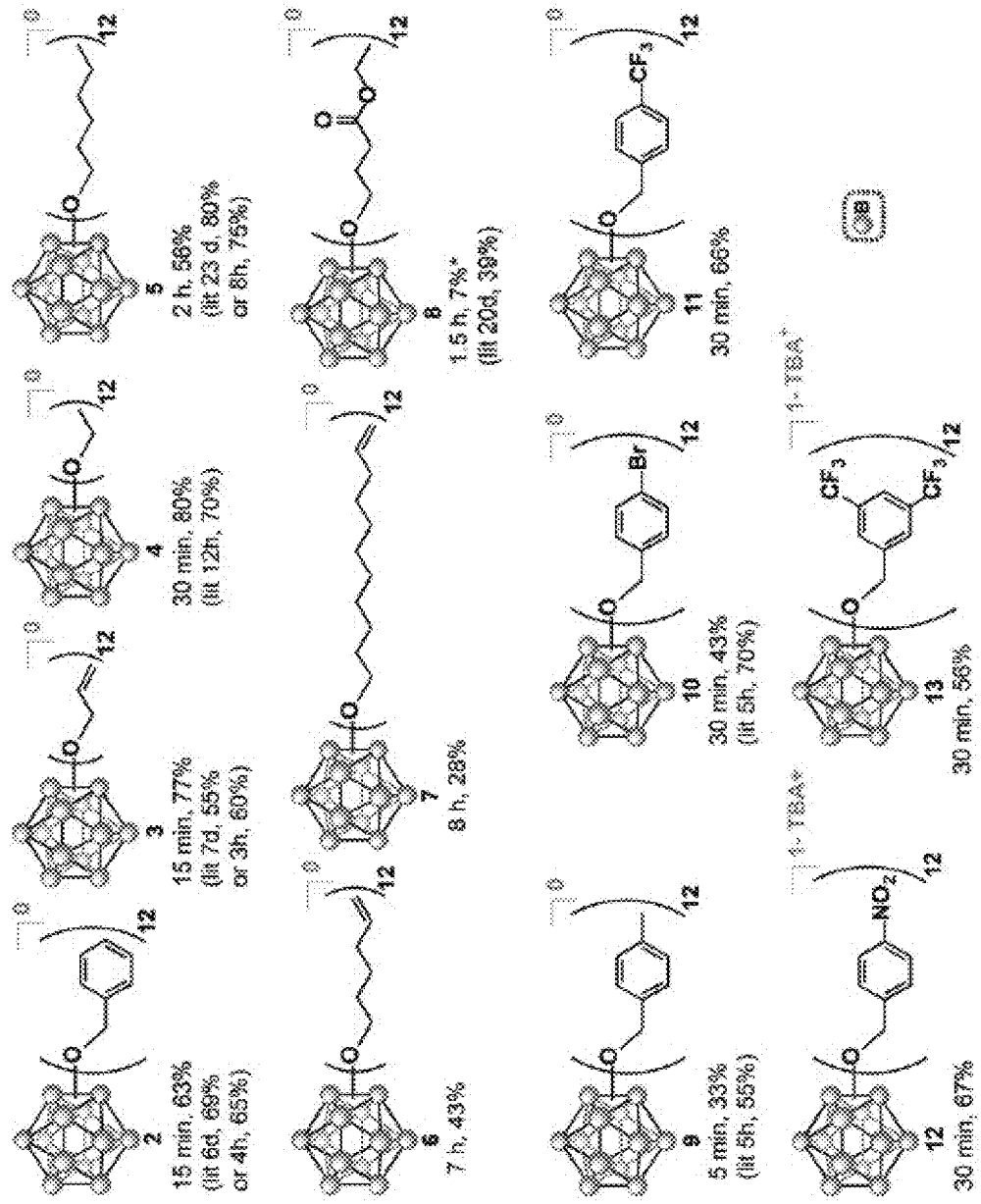
FIG. 10 illustrates synthesized $B_{12}(OR)_{12}$ clusters formed via microwave-based methods in accordance with embodiments of the invention (yields are reported for the species isolated in a designated oxidation state as an average of two independent trials, and for previously synthesized species, reported yield is given for comparison).

Other embodiments optimize the microwave reaction times with allyl bromide and bromoethane reagents independently, and in both cases demonstrate that complete substitution can be accomplished within 15-30 minutes at 140° C. These compounds were isolated in their fully oxidized neutral form in a similar fashion to [2]$^0$, (compounds [3]$^0$ and [4]$^0$, respectively; FIG. 10). Notably, previously reported high-pressure reactor synthesis of these species required 3 and 12 hours, respectively, for alkylation to occur at all twelve vertices, suggesting that the microwave-based method can be generally applied to several classes of ether-linked $B_{12}(OR)_{12}$ clusters and is superior to previously developed methods. (See, e.g., Farha, cited above.)

The relatively short perfunctionalization reaction times made possible by the microwave technique in accordance with embodiments allows for the rate of product formation to outcompete the rate of degradation stemming from the presence of adventitious air and moisture during the synthesis. Accordingly, in various embodiments, the synthesis of [2] was conducted using as-received non-dried acetonitrile with the reagents added to a reaction vessel open to air. The open-air synthesis of [2] proceeded with full conversion in 15 minutes as indicated by $^{11}$B NMR spectroscopy on the crude mixture. Following the normal work-up procedure, [2]$^0$ was isolated in a 63% yield, suggesting that rigorous exclusion of air and moisture is not necessary for this transformation using the methods according to embodiments. This open-air synthesis method was successfully used for all subsequent ether-based cluster syntheses reported.

Other embodiments explore the scope of this transformation by using longer-chain alkyl substituents. Hexyl chain substitution required increased reaction times compared to the shorter ethyl substituent, yet persubstitution was still achieved within two hours, as opposed to 8 hours when using a high-pressure reactor in accordance with the prior art (isolated as [5]⁰, FIG. 10). This increased reaction time likely stems from the increase in the length and size of the alkyl reagent affecting the kinetics of the reaction. (See, e.g., R. W. Taft, *J. Am. Chem. Soc.*, 1953, 75, 4231-4238; and C. Hansch, A. Leo and R. W. Taft, *Chem. Rev.*, 1991, 91, 165-195, the disclosures of which are incorporated herein by reference.) To further probe the limits of the microwave based method we tested hexene- and undecene-based electrophiles, and even with the requisite increase in reaction time to 7 and 8 hours respectively, persubstitution proceeded to full conversion. Neutral [6]⁰ and [7]⁰ were isolated in 43% and 28% yields, respectively, after oxidation and normal purification procedures (FIG. 10). These derivatives have not been synthesized prior to this report, and their preparation illustrates how one can dramatically increase the size of these ether based dodecaborate clusters via a direct linkage of large substituents featuring terminal olefins onto $[B_{12}(OH)_{12}]^{2-}$.

Based on the success of synthesizing long-chain olefin-containing moieties in accordance with embodiment, the compatibility of embodiments with less stable reagents was investigated using ethyl 4-bromobutyrate with $TBA_2$ [1]. Perfunctionalization with ethyl butyrate has been challenging using prior synthetic methods, requiring multiple step sequential additions of the alkyl halide and Hünig's base for 20 days while being handled under inert atmosphere conditions. (See, e.g., A. Pushechnikov, S. S. Jalisatgi and M. F. Hawthorne, *Chem. Commun.*, 2013, 49, 3579-358, the disclosure of which is incorporated herein by reference.) However, utilizing microwave-assisted synthesis according to embodiments, the same product (FIG. 10, [8]⁰) was obtained via a single 1.5 hour reaction, followed by oxidation with $FeCl_3.6H_2O$ overnight and purification with column chromatography on Sephadex™ and silica gel. Benzyl-substituted ether-based clusters can feature a high degree of electrochemical tunability as a function of the substituents attached to the aromatic ring. Embodiments of methods allow for the efficient synthesis of clusters containing both electron-rich [9] and electron-withdrawing [10] benzyl derivatives in yields matching previous methods but with significantly reduced reaction times (FIG. 10).

Figures 11A, 11B:
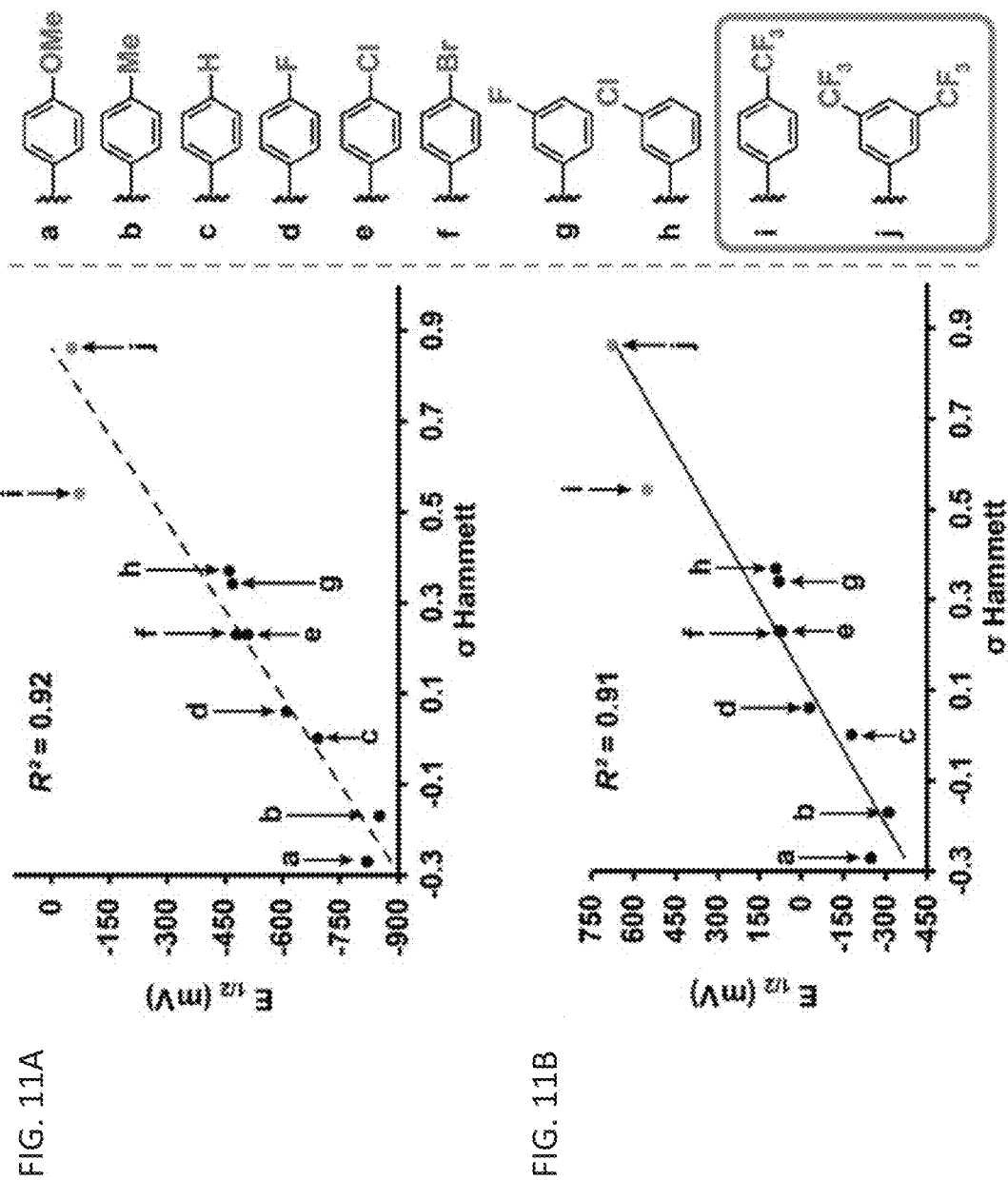
FIGS. 11A and 11B illustrate: A) redox potential of $[B_{12}(OR)_{12}]^{2-/1-}$; and B) $[B_{12}(OR)_{12}]^{1-/0}$ substituted with various benzyl substituents (vs. Fc/Fc+) plotted vs. Hammett constants (previously characterized (a-h) and new (i-j) $[B_{12}(OR)_{12}]^0$ clusters are shown in accordance with embodiments of the invention.
Figure 15A:
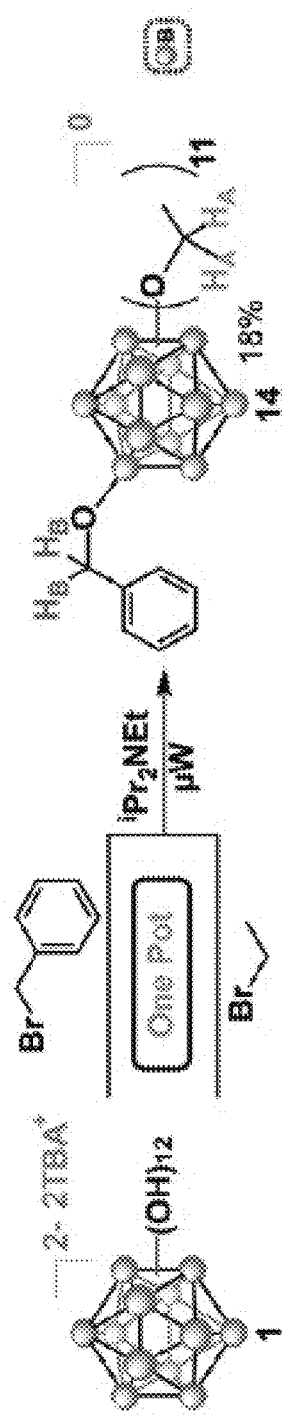
FIGS. 15A to 15D illustrate: A-B) one-pot synthesis of vertex-differentiated hypercloso cluster [14]$^0$ from an approximately 60:1:1 molar mixture of benzyl bromide: bromoethane:TBA$_2$[1], where the isolated yield of [14]$^0$ was 18% (compound [4]$^0$ was also formed as an additional product of the reaction); C) $^{11}$B NMR spectra indicates loss of the icosahedral symmetry due to vertex differentiation; and D) $^1$H NMR integrations show 24H (CH$_2$) and 36H (CH$_3$) for the 11 ethyl groups and 2H (CH$_2$) and 5H (Ph) for the single benzyl moiety in accordance with embodiments of the invention.
Figure 15C:
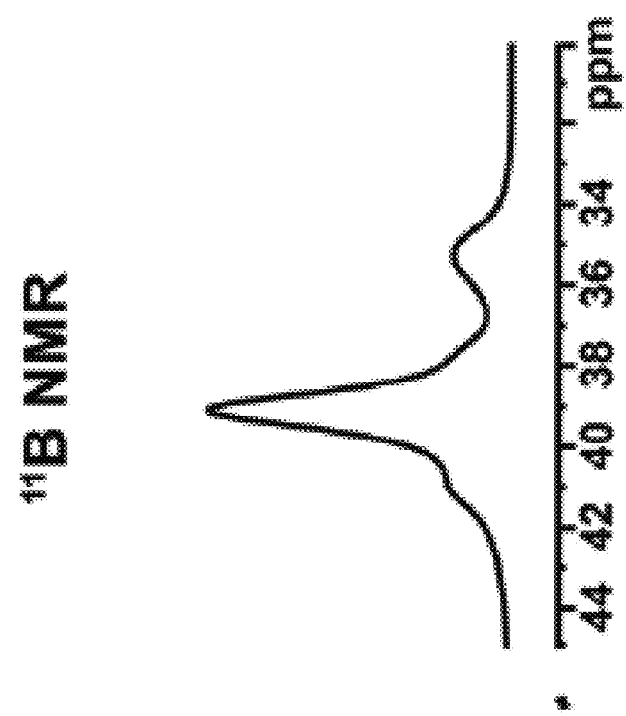
Figure 15B:
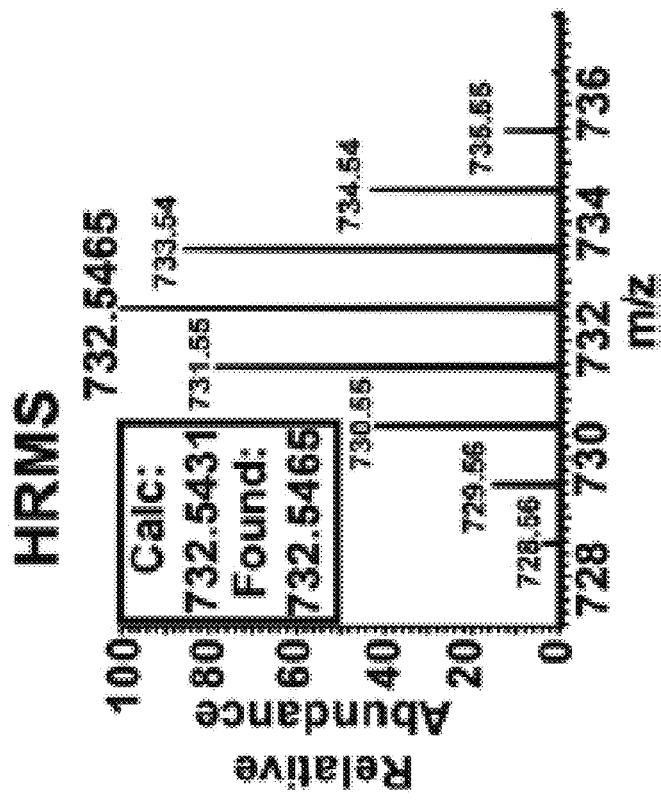
Figure 15D:
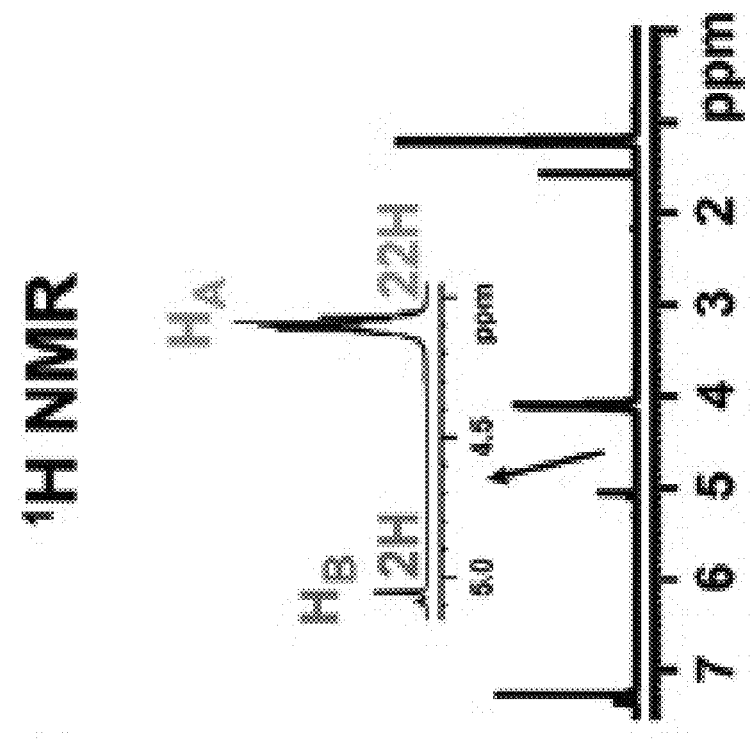

In various other embodiments the accessible electrochemical window for this class of compounds can be extended by utilizing benzyl halide precursors containing highly electron-withdrawing substituents. The perfunctionalized cluster featuring a trifluoromethyl ($CF_3$) group attached to the para position of the benzyl moiety was prepared using our method in 30 minutes, and following oxidation the isolated neutral compound [11]⁰ was obtained in 66% yield (FIG. 10). The oxidation potential of $[11]^{1-}/[11]^{0-}$ ($E_{1/2}$=0.56 V vs. Fc/Fc+) measured by cyclic voltammetry (CV) is particularly notable since it is higher than any reported $B_{12}(OR)_{12}$ cluster to date (previously 0.09 V vs. Fc/Fc+). 37 Plotting the Hammett constants of various benzyl substituents versus the redox potentials of $[B_{12}(OR)_{12}]$ clusters perfunctionalized with these groups (FIG. 11) indicates the oxidation potential of these clusters can be rationally extended beyond the previously reported electrochemical window.

Figure 4:
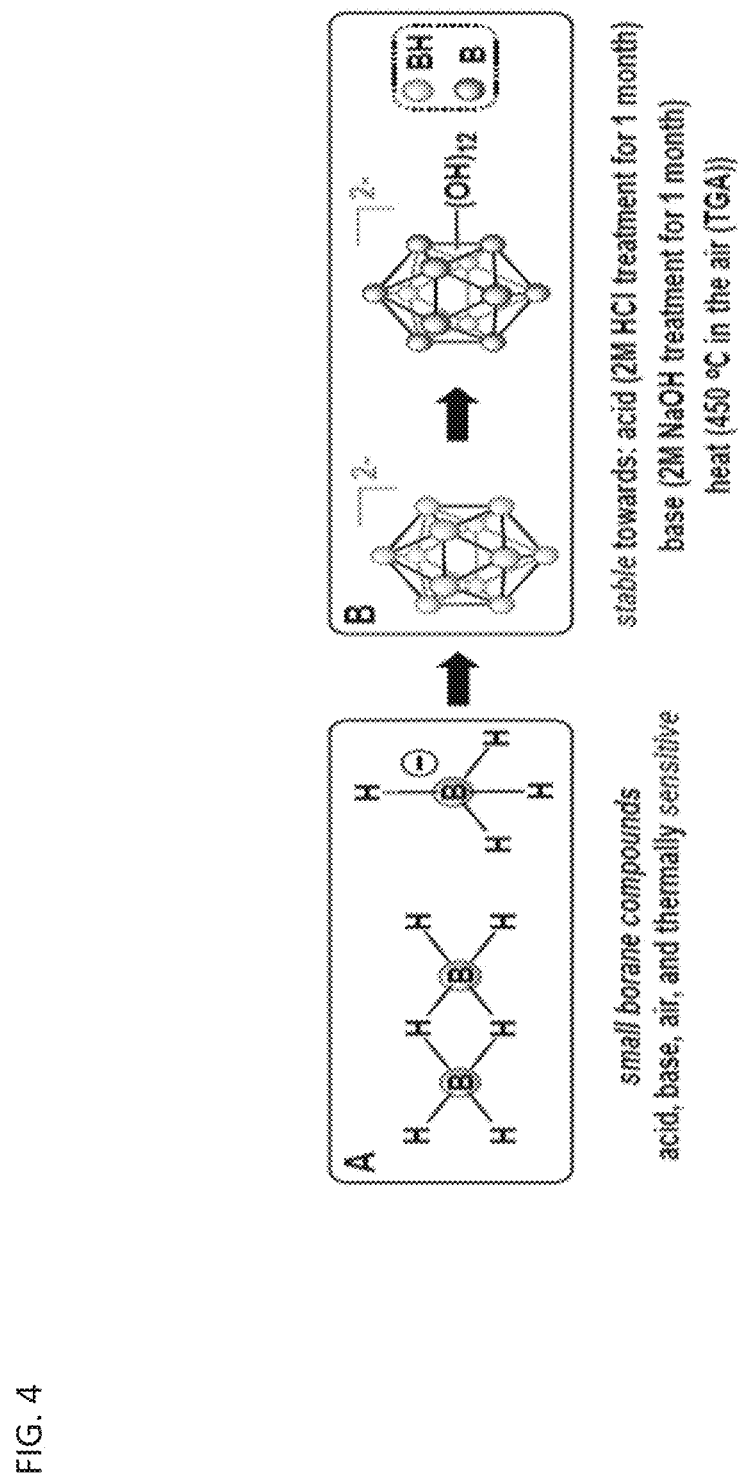
FIG. 4 illustrates a comparison of the stability features between small boranes and polyhedral 3D aromatic dodecaborate species in accordance with embodiments of the invention.

For example, according to the trend suggested by this Hammett plot, a para-nitrobenzyl-substituted cluster should exhibit a higher 1-/0 oxidation potential than [11] (FIGS. 3 and 4). The perfunctionalized cluster [12] featuring para-nitro ($NO_2$) substituent attached to the benzyl was successfully synthesized using embodiments of the method in 30 minutes, however, oxidation of the reaction mixture containing $[12]^{2-/1-}$ with $FeCl_3.6H_2O$ did not produce any hypercloso-neutral species [12]⁰. Instead, the radical cluster species $[12]^{1-}$ was isolated as the only product in 67% yield (FIG. 10). This is not surprising, given the predicted oxidation potential for the $[12]^{1-}/[12]^{0}$ redox couple is more positive than the oxidizing strength of $FeCl_3.6H_2O$. (See, e.g., N. G. Connelly and W. E. Geiger, *Chem. Rev.*, 1996, 96, 877-910, the disclosure of which is incorporated herein by reference.) Attempts to use stronger chemical oxidants (e.g. ceric ammonium nitrate) resulted in cluster degradation. Furthermore, insufficient solubility of [12]1− as a TBA salt precluded us from obtaining CV measurements for this derivative. Nevertheless, embodiments may be used to expand the electrochemical window for $B_{12}(OR)_{12}$ species featuring benzyl-based substituents, by using a potentially more soluble compound containing a 3,5-bis(trifluoromethyl)benzyl group instead.

Using embodiments of the microwave method described above, cluster [13] was synthesized in 30 minutes. Unlike all of the synthesized clusters reported thus far, the post-microwave reaction mixture was colorless, which is a characteristic feature of the pure dianionic state $[13]^{2-}$ for these clusters. The lack of color persisted even after column chromatography purification on silica gel in air. The identity of the pure isolated TBA salt of $[13]^{2-}$ (73% yield) was validated by full spectroscopic characterization and mass spectrometry. Oxidation of $[13]^{2-}$ with $FeCl_3.6H_2O$ did not produce the neutral cluster, rather the pure $[13]^{1-}$ radical species was isolated in 78% yield, resulting in 56% net yield for $[13]^{1-}$ species starting from $TBA_2[1]$. Use of stronger chemical oxidants such as ceric ammonium nitrate (CAN) degraded the boron cage, producing a diagnostic ¹¹B NMR resonance at δ 20 characteristic of borates. (See, e.g., C. G. Salentine, *Inorg. Chem.*, 1983, 22, 3920-3924, the disclosure of which is incorporated herein by reference.) Nevertheless, using embodiments of the method neutral cluster [13]⁰ was observed electrochemically via infrared spectroelectrochemistry (IR-SEC) and cyclic voltammetry (CV) in $CH_2Cl_2$ (FIGS. 12B and 12C). CVs of $[13]^{1-}$ as the TBA salt in $CH_2Cl_2$ showed two quasireversible redox features at −0.05 V and 0.68 V vs. Fc/Fc+, corresponding to the 2−/1− and 1−/0 transitions, respectively. IR-SEC experiments where the applied potential was increased to more positive potentials incrementally on the TBA salt of $[13]^{2-}$ showed subtle changes in the IR stretching modes for all three oxidation states of [13] around 1130-1140 cm⁻¹ and 1200-1220 cm⁻¹. The shift in these IR bands assigned to the B—O bond to higher wavenumbers from $[13]^{2-}/[13]^{1-}/[13]^{0}$ is consistent with those observed in the same region for the analogous para-$CF_3$ compound [11]⁰ which can be isolated in its neutral form via direct synthesis. (See, e.g., L. A. Leites, *Chem. Rev.*, 1992, 92, 279-323, the disclosure of which is incorporated herein by reference.) The high oxidation potential for the $[13]^{1-}/[13]^{0}$ redox couple observed from cyclic voltammetry ($E_{1/2}$=0.70 V vs. Fc/Fc+) is notable since it is the highest observed 1−/0 oxidation potential for the $B_{12}(OR)_{12}$ class of clusters reported to date and is ~130 mV higher that the para-$CF_3$ benzyl cluster [11]. 19F NMR spectroscopy provides another diagnostic handle on the oxidation state of this compound (FIG. 12D). ¹¹B NMR spectra for these clusters typically show a singlet around δ−14 to −16 for the 2− state, though the 1− state is silent due to the presence of the paramagnetic radical (confirmed by EPR, FIG. 12D (inset)). However, with ¹⁹F NMR spectroscopy, a shift from a singlet resonance in $[13]^{2-}$ at δ−63.36 to a broad singlet at δ−63.24 for $[13]^{1-}$ was observed. This broadening is consistent with the paramagnetic nature of $[13]^{1-}$, where F atoms are located far enough from the unpaired electron-carrying $B_{12}$-based cluster core to be resolved by $^{19}F$ NMR spectroscopy.

The structural parameters of the boron clusters featuring persubstituted vertices can exhibit significant distortions in the solid state as a function of the substituent and the redox state as determined by X-ray crystallographic studies. Specifically, $[2]^{2-}$ exhibits nearly identical B—B bond distances (1.781(4)-1.824(4) Å) and angles (B—B—B 107.798°<a<109.229°) as expected for a perfect icosahedron, yet as the cluster is oxidized to the electron-deficient $[2]^{1-}$ the structure expands and distorts slightly, with further distortion observed in the neutral state. Additionally, the B—O bond lengths decrease as the cluster is oxidized from $[2]^{2-}$, which contains the longest average B—O distances, to the neutral $[2]^{0}$ state with the shortest B—O distances. This observed trend of B—B bond lengthening, B—O bond contraction, and B—B—B angle distortion within the core as a function of cluster oxidation state is supported qualitatively by the crystal structures for neutral $[11]^{0}$ and radical $[13]^{1-}$ (FIGS. 13A and 13B), which show comparable changes to those observed between $[2]^{1-}$ and $[2]^{0}$. Selected bond lengths and angles for $[11]^{0}$ and $[13]^{1-}$ are shown in FIG. 13.

X-ray photoelectron spectroscopy (XPS) has been widely used to study oxidation states in inorganic compounds. (See, e.g., N. V. Alov, *J. Anal. Chem.*, 2005, 60, 431-435; W. Temesghen and P. Sherwood, *Anal. Bioanal. Chem.*, 2002, 373, 601-608; X. P. Zhu, et al., *Appl. Surf Sci.*, 2006, 252, 5776-5782; and M.-Y. Xing, et al., *J. Phys. Chem. C*, 2011, 115, 7858-7865, the disclosures of which are incorporated herein by reference.) This technique can therefore be utilized to further elucidate the oxidation state and effect of functionalization for the boron clusters according to embodiments. Boron XPS spectra for several representative clusters synthesized in (FIGS. 14A and 14B) indicate a clear trend observed in the shift of B—B bond peak energies depending on the redox state of the functionalized cluster. The previously discussed geometric distortion of these boron cluster icosahedra with oxidation from 2− to 1− and further to neutral species corresponds directly to increased B—B binding energy (FIG. 14A). The nature of the substituents also produces a clear trend in these measurements, as compound [13] also exhibits an increase in B—B binding energy as the cluster increases in oxidation state from $[13]^{2-}$ to $[13]^{1-}$ (FIG. 14B), yet both are higher in energy than that of neutral cluster $[11]^{0}$. However, despite the change in oxidation potential and binding energy from substituent effects, the nature of the electron radical delocalization throughout the boron-based core remains consistent. A single, broad symmetric EPR signal centered between 3450 and 3500 Gauss was observed for all cluster species isolated in the radical form with g values ranging between 2.0079 and 2.0081 depending on the substituent. Due to the 3D delocalization of the single electron across the 12 boron nuclei comprising the cluster, there exist a large number of possible hyperfine couplings. Overlap of these hyperfine couplings ultimately gives rise to the single broad line observed in the EPR spectra.

In addition to previously mentioned benefits such as shortened reaction durations and the lack of stringent requirements for inert reaction conditions, microwave-assisted synthesis according to embodiments allows for one-pot, single-step reactions that would otherwise require more elaborate protocols. Mono-substitution of a benzyl ligand followed by persubstitution of the remaining eleven vertices has previously required a lengthy process involving several steps, whereas methods according to embodiments demonstrate a one-pot approach enabled by the described microwave-based method. (See, e.g., L. N. Goswami, et al., *J. Org. Chem.*, 2012, 77, 11333-11338, the disclosure of which is incorporated herein by reference.)

For example, mixed-substituent $B_{12}(OEt)_{11}(OBn)$ cluster ([14], FIG. 15) can be formed in a single step simply by adding a stoichiometric amount of the desired reagents into a single reaction vessel. This reaction was completed in 30 minutes, producing three distinct species as a mixture which were oxidized with $FeCl_3 \cdot 6H_2O$ as previously described and subsequently isolated via column chromatography on silica: the perfunctionalized ethyl cluster $[4]^{0}$, a small amount (<5%) of di-substituted $[B_{12}(OEt)_{10}(OBn)_2]^{0}$ clusters, and the desired $[14]^{0}$ in 18% yield. This method represents a significantly faster route to produce $[B_{12}(OR)_{11}(OR')]$ mixed-substituent clusters. (See, e.g., O. Bondarev, et al., *J. Am. Chem. Soc.*, 2013, 135, 13204-13211; C. Jenne and C. Kirsch, *Dalton Trans.*, 2015, 44, 13119-13124; and Y. Zhang, J. Liu and S. Duttwyler, *Eur. J. Inorg. Chem.*, 2015, 31, 5158-5162, the disclosures of which are incorporated herein by reference.)

In summary, embodiments are directed to a rapid microwave-assisted synthetic route to perfunctionalized ether-linked $B_{12}(OR)_{12}$ clusters is disclosed and the robust nature of the technique demonstrated by the synthesis and characterization of multiple derivatives of [1]. For previously synthesized compounds, reaction duration was significantly reduced and prior requirements for oxygen-free and anhydrous reaction conditions were eliminated. Embodiments of the method also allow for a unique one-pot synthesis of mixed-substituent clusters with good selectivity under the same open-air conditions. The cluster species described here maintain the attractive properties of earlier derivatives, behaving as redox-active cores that show delocalization of electrons throughout the entire 3D boron cage, while the new functional groups provide a significant expansion to the available tuneable redox potential window for this class of clusters.

Palladium Cross-Coupling of B-Bromo-Carboranes

As described previously, carboranes are boron-rich molecules that can be functionalized through metal-catalyzed cross coupling. Many embodiments are directed to the use of bromo-carboranes in palladium-catalyzed cross-coupling for efficient B—N, B—O, and unprecedented B—CN bond formation. It is observed that in many cases bromo-carboranes outperform the traditionally utilized iodo-carborane species. This marked difference in reactivity can be leveraged in embodiments to circumvent multistep functionalization by directly coupling small nucleophiles (—OH, —NH$_2$, and —CN) and multiple functional groups onto the boron-rich clusters.

Icosahedral carboranes are boron-rich molecular clusters that are often described as three-dimensional (3D) analogs to benzene. As previously discussed, their unique delocalized 3D aromatic bonding, high stability, and potential for site-selective functionalization make them attractive building blocks for tunable pharmacophores, unique ligand scaffolds, and building blocks for materials applications. Further development of these and other applications with carboranes requires efficient methods for cluster synthesis and functionalization, where ultimately each individual vertex can be specifically addressed.

Over the past 50 years, palladium-catalyzed cross-coupling has emerged as a powerful synthetic method for creating new molecules. (See, e.g., de Meijere, A.; Diederich, F. *Metal-catalyzed Cross-coupling Reactions*, 2nd ed.; Wiley-VCH: Weinheim, 2008, the disclosure of which is incorporated herein by reference.) In particular, the emergence of designer ligands (beyond PPh3) for Pd-catalyzed cross-coupling dramatically expanded the scope of electrophile substrates beyond aryl iodides. (See, e.g., Jacobsen, E. N. *Adv. Synth. Catal.* 2015, 357, 2173, the disclosure of which is incorporated herein by reference.) These new catalyst systems demonstrated a clear ability to cross-couple aryl-bromides and aryl-chlorides, thereby facilitating transformations of synthetically challenging substrates. Among existing ligand platforms, biaryl phosphine ligands significantly increased the efficacy of Pd-catalyzed C—C, C—N, and C—O bond formation. (See, e.g., Surry, D. S.; Buchwald, S. L. *Angew. Chem., Int. Ed.* 2008, 47, 6338, the disclosure of which is incorporated herein by reference.)

Despite these advances in catalyst design for aromatic substrates, effective methodologies for metal-catalyzed B—N, B—O and B—C cross-coupling in carboranes are lacking. In fact, only B-iodo-carboranes have been used in Pd-catalyzed cross-coupling thus far. (See, e.g., Zakharkin, L. I. et al., *J. Organomet. Chem.* 1982, 226, 217; Li, J., et al., *Inorg. Chem.* 1991, 30, 4866; Zheng, Z., et al., *Inorg. Chem.* 1995, 34, 2095; Jiang, W., et al., *Inorg. Chem.* 1995, 34, 3491; Villas, C, et al., *Inorg. Chem.* 2001, 40, 6555; Mukhin, S. N., et al., Organometallics 2008, 27, 5937; Sevryugina, Y., et al., *Inorg. Chem.* 2010, 49, 10627; Olid, D., et al., *Chem. Soc. Rev.* 2013, 42, 3318; Qui, Z. *Tetrahedron Lett.* 2015, 56, 963; Kracke, G. N., et al., *ChemMedChem* 2015, 10, 62, the disclosures of which are incorporated herein by reference.) Embodiments are directed to B-functionalized electrophiles, beyond B-iodo-carboranes, which may be competent cross-coupling partners, and demonstrating for the first time that B-bromo-carboranes can be efficient electrophiles for B—N, B—O, and B—CN bond formation in Pd-catalyzed cross coupling. Furthermore, conditions are provided where these B-bromo-carboranes are superior to the iodinated congeners enabling the synthesis of previously inaccessible B-substituted carboranes. This chemistry is furthermore attractive given the greater synthetic accessibility of B-bromo-carboranes compared to their iodo-based congeners.

Figure 16A:
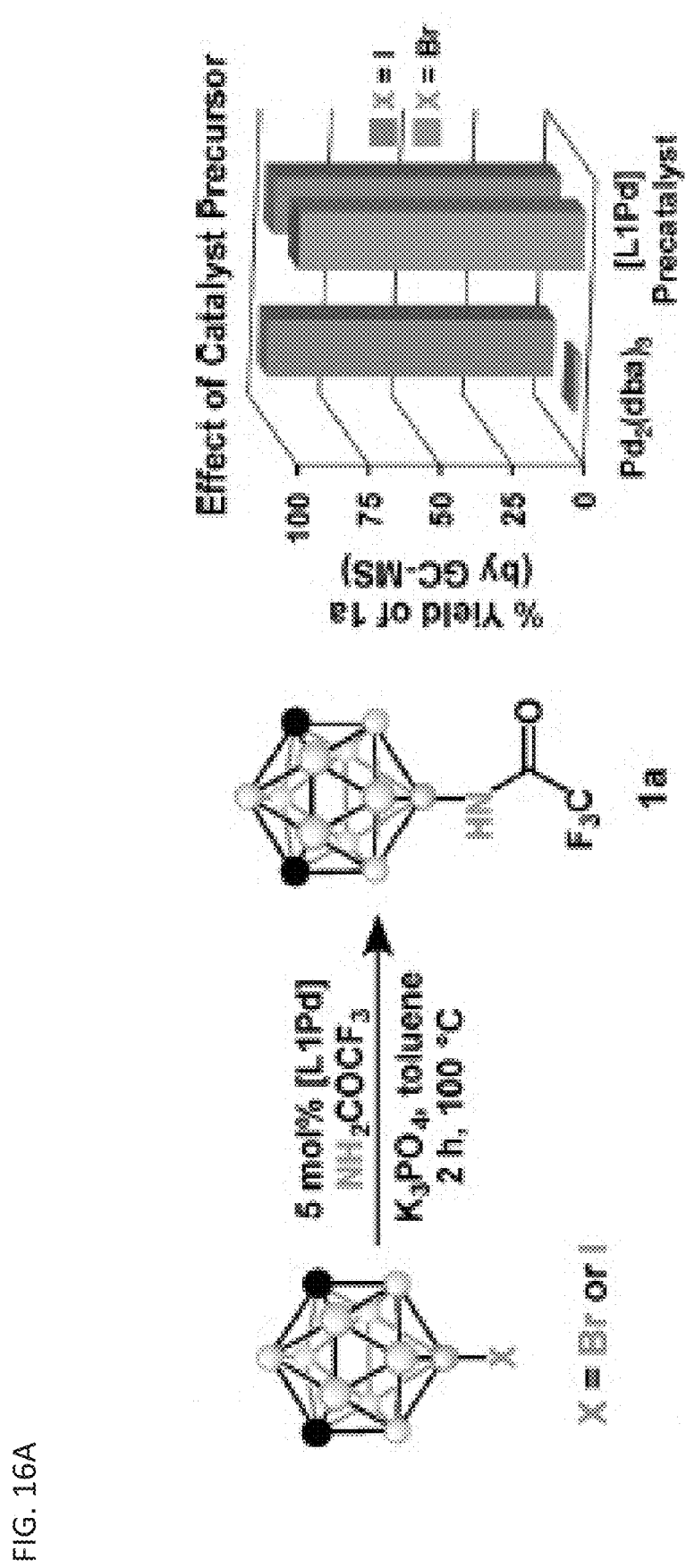
FIGS. 16A and 16B illustrate: A) general amidation conditions (inset, GC-MS yield of [1a] from Br-mCB and I-mCB using different palladium precursors; and B) proposed catalytic cycle employing biaryl phosphine ligands (step i, oxidative addition; step ii, transmetalation; step iii, reductive elimination) in accordance with embodiments of the invention.
Figure 16B:
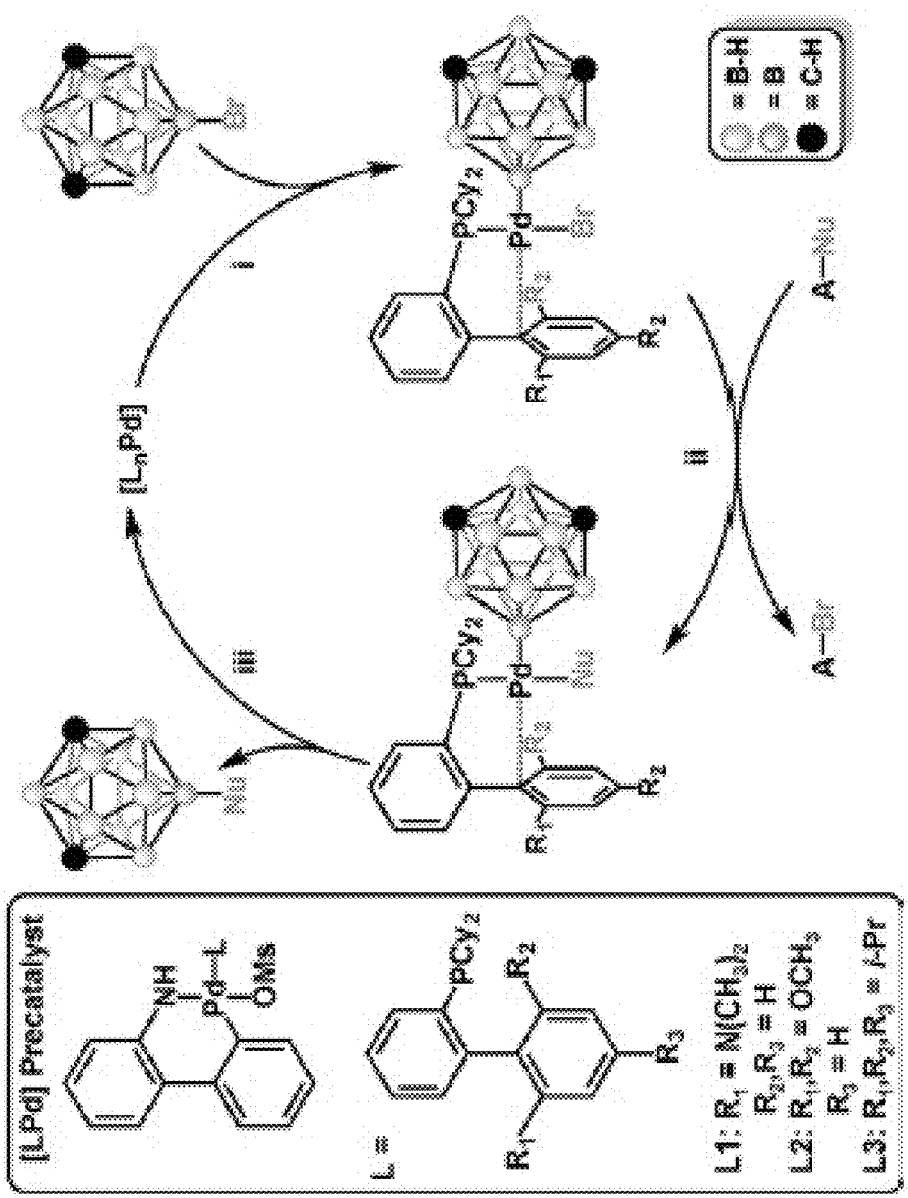

Hawthorne and co-workers recently reported Pd-catalyzed amidation of 9-I-m-carborane (I-mCB) utilizing the biaryl phosphine ligand DavePhos (L1, FIG. 16). (Hawthorne, cited above.) To test embodiments of the method, I-mCB is replaced with the bromo-carborane congener, 9-Br-m-carborane (Br-mCB), as a substrate under the reported cross-coupling conditions. However, initial attempts at cross-coupling trifluoroacetamide with Br-mCB proved unsuccessful. Rapid formation of Pd metal was observed without any consumption of Br-mCB. It is postulated that the Pd(0) precursor (Pd$_2$dba$_3$, dba=dibenzylideneacetone) was not efficiently forming the catalytically active species [L1 Pd$^0$]. To resolve this issue, a commercially available Pd(II) precatalyst may be used (FIG. 16B inset), which has been previously shown to dramatically improve catalytic activity across a large pool of aryl-based substrates and catalytic conditions. (See, e.g., Biscoe, M. R., et al., *S. L. J. Am. Chem. Soc.* 2008, 130, 6686; Bruno, N. C., et al., *Chem. Sci.* 2013, 4, 916; and Mart, M. A. et al., *J. Am. Chem. Soc.* 2013, 135, 12877, the disclosures of which are incorporated herein by reference.) Importantly, this change tremendously improves the catalytic conversion of Br-mCB producing [1a] in nearly quantitative conversion within 2 h (FIG. 16A). This discovery demonstrates for the first time that it is possible to efficiently activate a relatively inert B—Br bond in a carborane with electron-rich Pd-based species supported by a biaryl phosphine ligand (FIG. 16B).

This example demonstrates the potential competence of BrmCB toward cross-coupling (FIG. 16B), which does not have any literature precedent. This advance was also appealing given that Br-mCB can be synthesized in a fraction of the time (1 h) that is required for the synthesis of I-mCB (1 day). Embodiments then develop Pd-catalyzed cross-coupling of Br-mCB with other nucleophiles utilizing biaryl-ligand containing precatalysts.

Figure 17A:
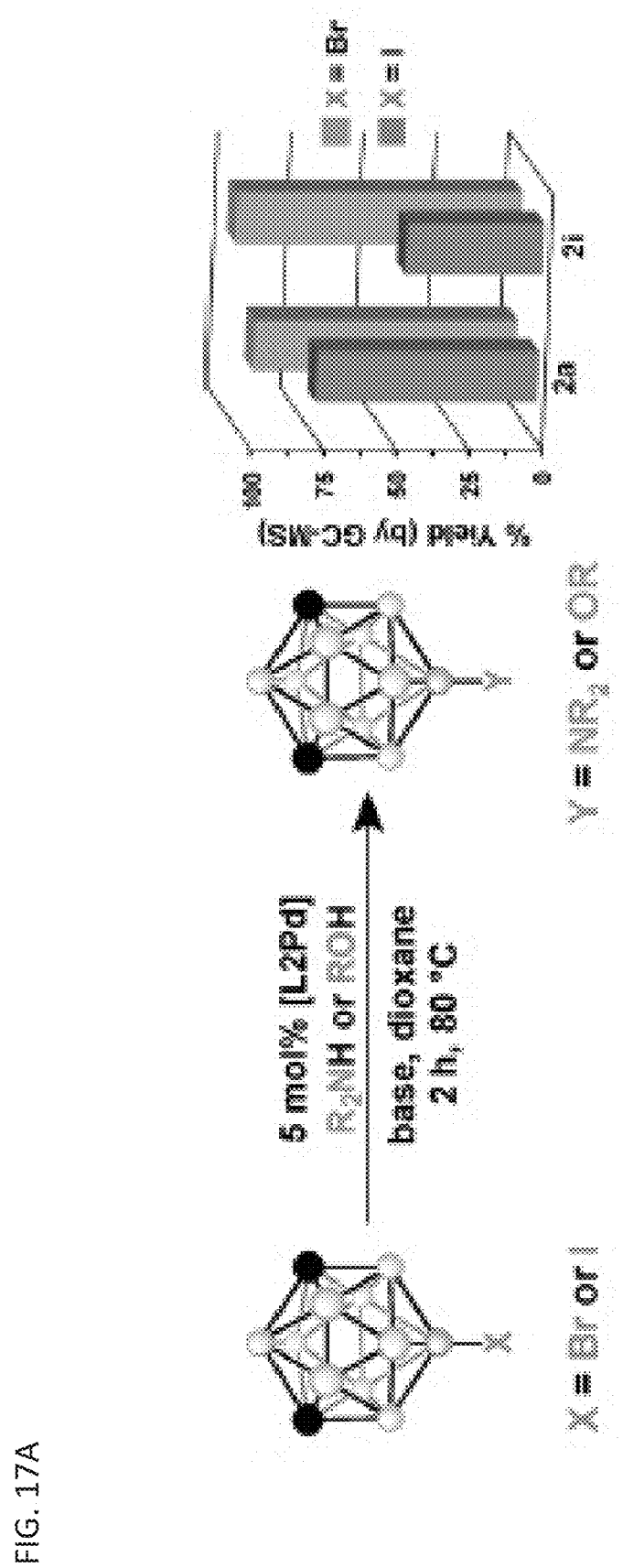
FIGS. 17A to 17C illustrate: A) general amination and alkoxylation conditions (inset, GC-MS yield of [2a] obtained from Br-mCB and I-mCB); B) amination scope using Br-mCB and X-ray crystal structure confirming B—N bond formation; and C) alkoxylation scope using Br-mCB and Xray crystal structure confirming B—O bond formation in accordance with embodiments of the invention (ellipsoids at 50% probability and H atoms omitted for clarity)(GC-MS yields, and isolated yields in parentheses)(*KtBuO used as a base except for: [2e], anhydrous K3PO4; [2f], 1 M aqueous K3PO4; [2g], NaOCH3).
Figure 17B:
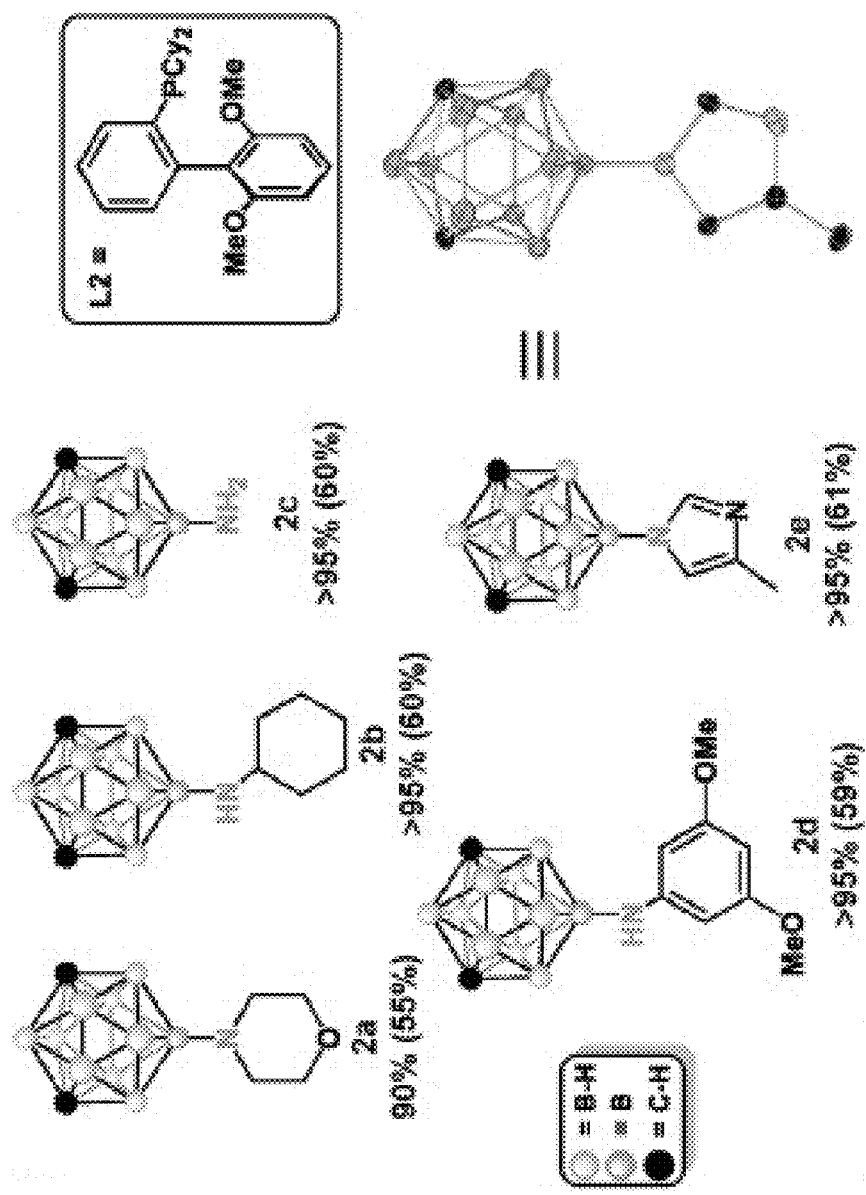
Figure 17C:
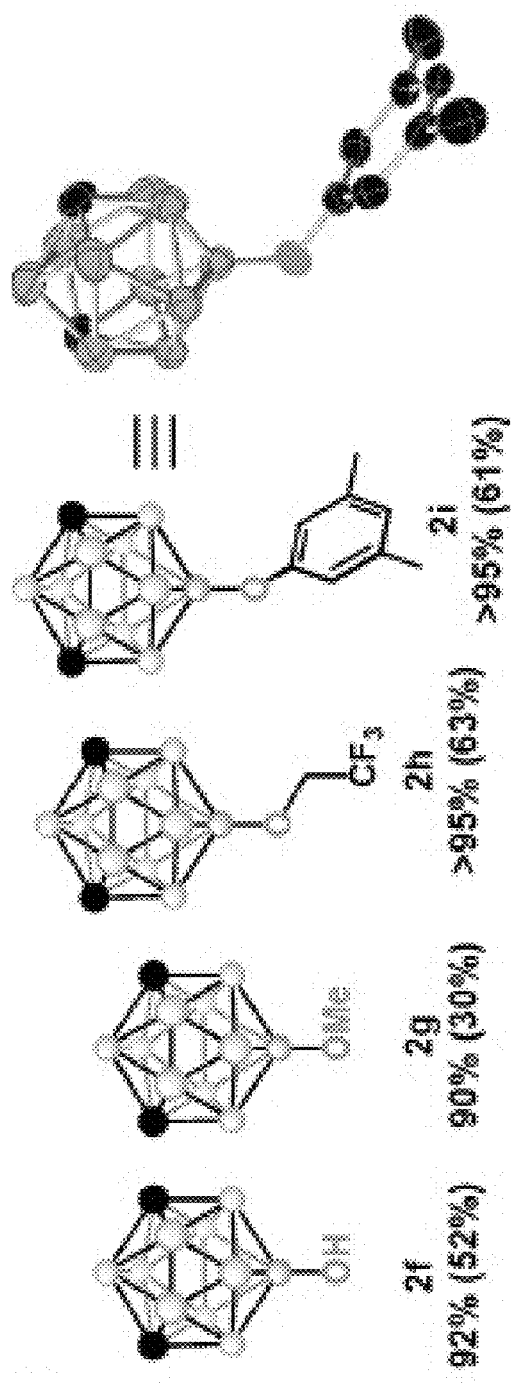

To further probe the scope of B—N bond formation using Br-mCB, we evaluated several conditions and substrates for Pd-catalyzed amination. Using morpholine as a substrate ([2a], FIG. 17), an evaluation was conducted of the cross-coupling efficiency of three precatalysts featuring L1, SPhos (L2), and XPhos (L3) ligands in accordance with embodiments. For this transformation, L2 afforded complete consumption of Br-mCB and a high amount of B—N coupling product [2a] as determined by GC-MS analysis. Evaluation of various bases indicated the superior performance of Kt BuO for forming [2a]. Importantly, Br-mCB showed superior cross-coupling efficiency compared to I-mCB for the formation of [2a] (FIG. 17A). Using these optimized conditions, cross-coupling of Br-mCB proceeds with primary, secondary, aromatic, and heterocyclic amines in nearly quantitative conversion affording the corresponding B—N compounds ([2b-2e], FIG. 17B).

In general, cross-coupling using unprotected nitrogen-rich heterocyclic substrates is known to be challenging. (See, e.g., Mem M. A., et al., *J. Am. Chem. Soc.* 2013, 135, 12877, the disclosure of which is incorporated herein by reference.) Amination of halocarboranes has only been shown on the 2-I-p-carborane, which is a significantly more reactive substrate than Br-mCB. (See, e.g., Beletskaya, et al., Organometallics 2007, 26, 2340, the disclosure of which is incorporated herein by reference.) Embodiments of the cross-coupling methodology addresses this issue for the first time in the context of m-carborane chemistry since [2e] represents the first product resulting from the direct cross-coupling of an unprotected five-membered heterocycle with a B-halo-m carborane.

The versatility of Br-mCB as a cross-coupling partner can be further seen from its efficient reaction with challenging nucleophiles. For example, Br-mCB cross-couples with ammonia producing [2c] (FIG. 17B), whereas previously [2c] could only be prepared by lengthy hydrolysis of [1a]. Importantly, embodiments of the methods represent the first example of a direct cross-coupling leading to [2c] and is enabled by the previously unrecognized reactivity of Br-mCB when using biaryl phosphine supported Pd-based catalysts.

It can be observed that B—OH coupling with Br-mCB ([2f]) when nonanhydrous bases were used. This is remarkable, given that the only example of a Pd-catalyzed carborane B—O bond formation was reported on 2-I-p-carborane. Importantly, the I-mCB congener was previously deemed too unreactive. (See, e.g., Kabytaev, K. Z., et al., *Organometallics* 2009, 28, 4758, the disclosure of which is incorporated herein by reference.) Embodiments of methods provide a cross-coupling protocol enabling the direct coupling of water, methanol, trifluoroethanol, and 3,5-dimethylphenol with BrmCB ([2f-2i], FIG. 17C).

This constitutes a novel Pd-catalyzed cross-coupling leading to a B—O bond formation with m-carborane substrates. Significantly, a control reaction where I-mCB was used as a substrate led to a significantly lower conversion to [2i] (FIG. 17A). This Pd-catalyzed route is also superior to the existing method for forming related B—O compounds utilizing carborane B-halonium salts. (See, e.g., Grushin, V. V. *Acc.*

Chem. Res. 1992, 25, 529, the disclosure of which is incorporated herein by reference.) Additionally, [2f] can be readily converted to [2g] by deprotonation with NaH and followed by treatment with MeI, demonstrating the added synthetic utility of [2f].

Figure 18A:
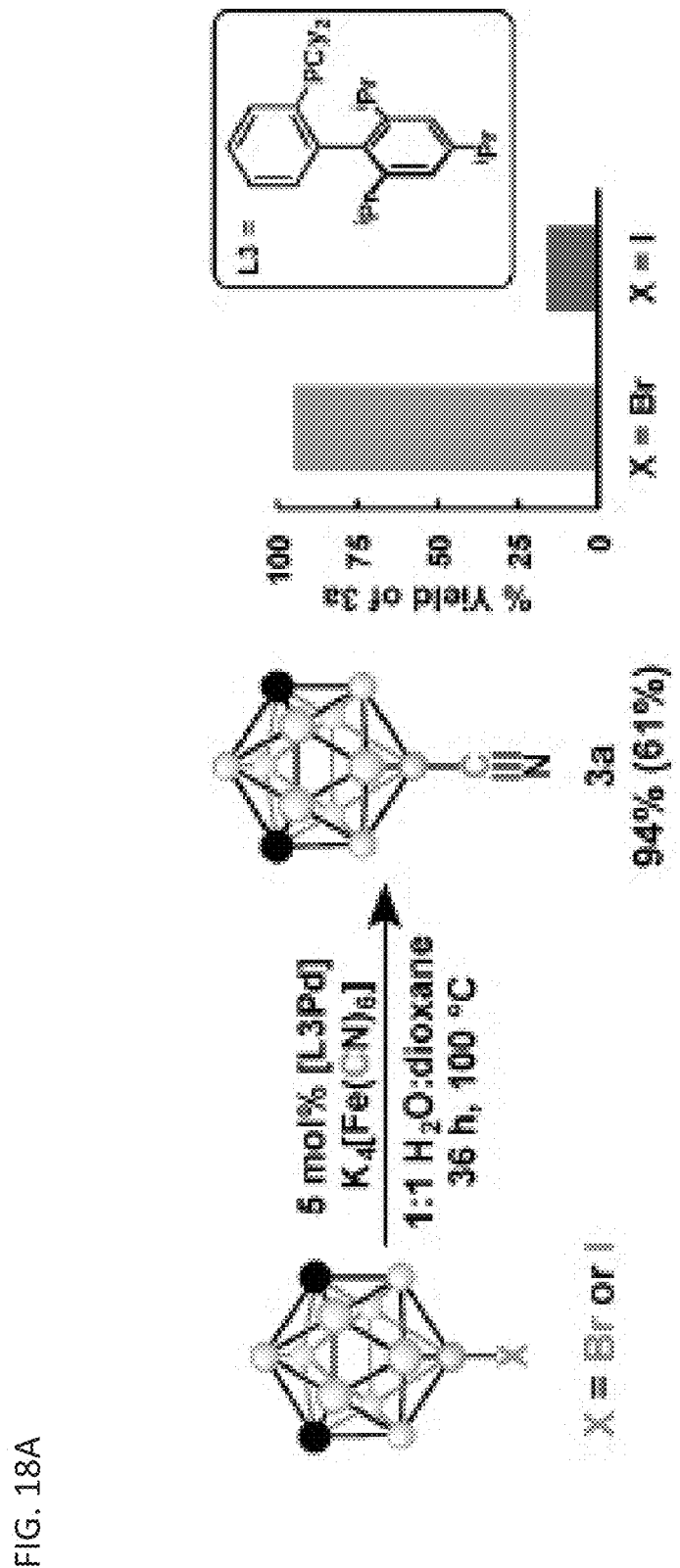
FIGS. 18A and 18B illustrate: A) cyanation protocol; GC-MS yield of [3a] obtained from Br-mCB and I-mCB (isolated yield in parentheses); and B) X-ray crystal structure, $^{11}$B and $^{13}$C NMR spectra of [3a] (ellipsoids at 50% probability and H atoms omitted for clarity) in accordance with embodiments of the invention.
Figure 18B:
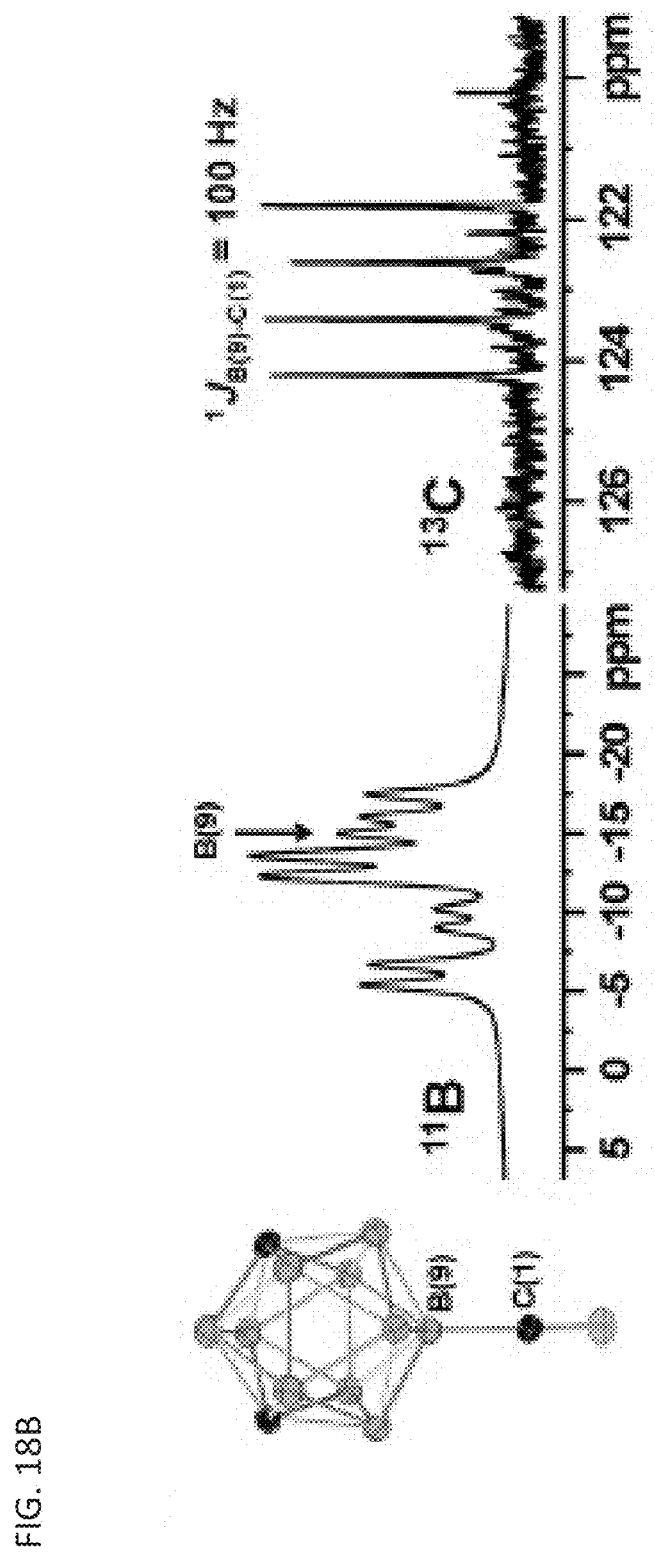

The versatility of embodiments of the Br-mCB cross-coupling with small nucleophiles also allows for the activation of B—CN bond formation. Cyanide is known to be a difficult cross-coupling partner in metal catalysis due to its propensity toward binding to catalytically active species, resulting in their deactivation. (See, e.g., Sundermeier, M., et al., *Chem.-Eur. J.* 2003, 9, 1828; Schareina, T., et al., *J. Organomet. Chem.* 2004, 689, 4576; Erhardt, S., et al., *J. Am. Chem. Soc.* 2008, 130, 4828; and Senecal, T. D., et al., *Angew. Chem., Int. Ed.* 2013, 52, 10035, the disclosures of which are incorporated herein by reference.) Recently several groups reported efficient protocols for cyanation of aromatic substrates using $K_4[Fe(CN)_6]$ as a mild cyanide source. (See above citations.) Pd-catalyzed cyanation of Br-mCB using $K_4[Fe(CN)_6]$ with an L3-based precatalyst led to the formation of 9-CN-m-carborane in a nearly quantitive conversion ([3a], FIG. 18A). Embodiments of this cross-coupling method represent the first direct cyanation of a halogenated derivative of dicarba-closo dodecaborane. Importantly, cross-coupling activity of the ImCB species under these conditions is dramatically diminished compared to Br-mCB (FIG. 18A).

Figure 19:
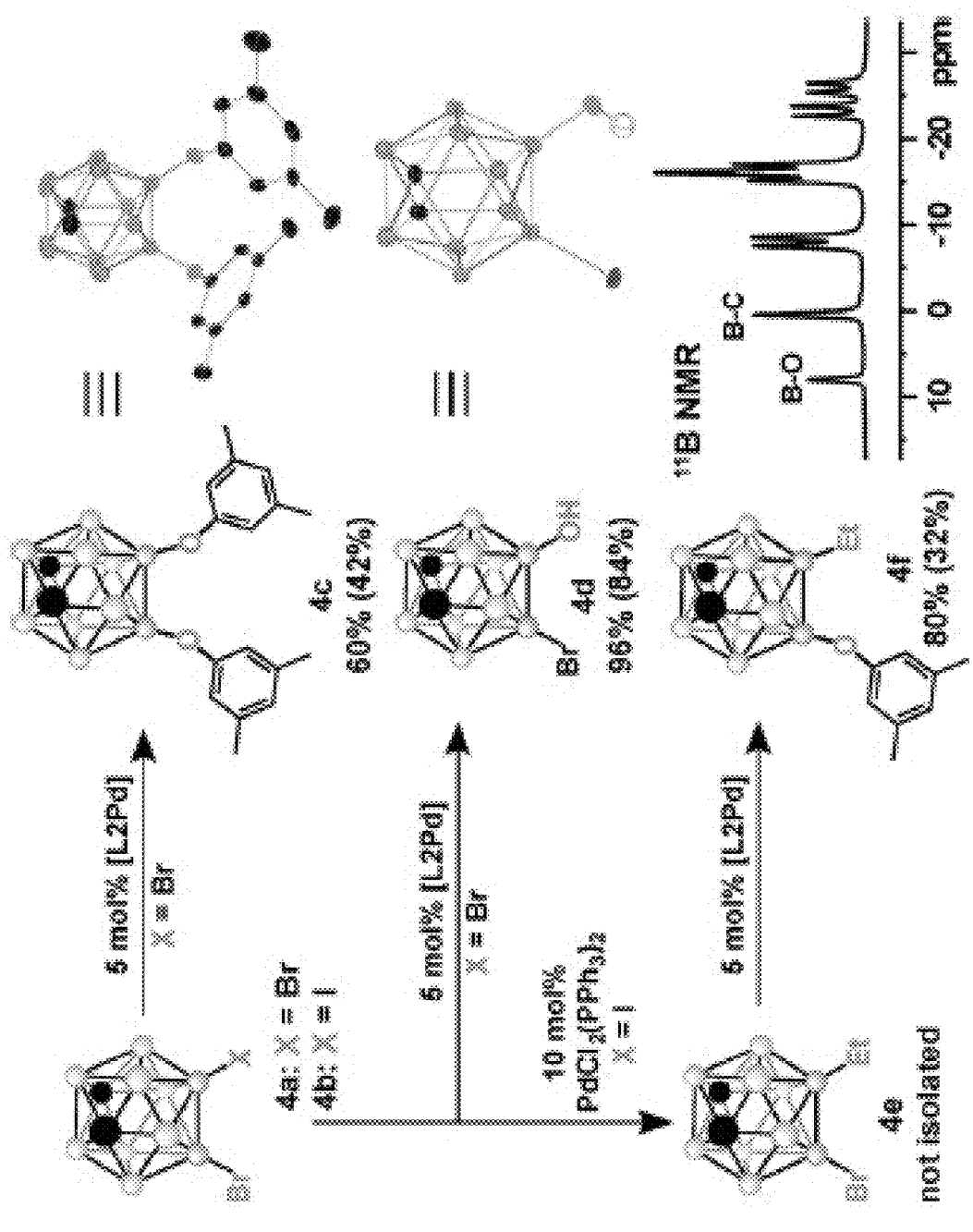
FIG. 19 illustrates the difunctionalization conditions and X-ray crystal structure confirming B—O bond formation in accordance with embodiments of the invention (X-ray crystal structure where ellipsoids at 50% probability and H atoms omitted for clarity)(GC-MS yields, and isolated yields in parentheses).

The ability to append multiple functional groups is crucial to developing carboranes for new and existing materials. (See, e.g., Puga, A. V., et al., *Chem. Commun.* 2011, 47, 2252; Kabytaev, K. Z., et al., *Eur. J. Inorg. Chem.* 2013, 2013, 2488; Konieczka, S. Z., et al., *Eur. J. Inorg. Chem.* 2013, 2013, 134; Wright, J. H., et al., *Inorg. Chem.* 2013, 52, 6223; and Zhao, D., et al., *Angew. Chem., Int. Ed.* 2014, 53, 8488, the disclosures of which are incorporated herein by reference.) While polyfunctionalization of arene-based electrophiles via cross-coupling is well-established, similar methods for carboranes are rare. Embodiments of the current methodology can be applied toward di substitution cross-coupling chemistry. Specifically, 9,10-$Br_2$-m-carborane [4a] can be functionalized with two bulky 3,5-dimethylphenolate substituents ([4c], FIG. 19). Under B—OH cross-coupling conditions (vide supra), [4a] undergoes exclusive monosubstitution to produce [4d].

In addition, given the pronounced orthogonal reactivity of B—Br versus B—I bonds in cross-coupling, embodiments of the methodology can be used to heterofunctionalize mixed halo-carborane substrates. The selectivity of $PdCl_2(PPh_3)_2$ can be leveraged for B—I bond functionalization to produce 9-Br-10-Et-m-carborane [4e] from 9-Br-10-I-m-carborane ([4b], FIG. 19).

Selective Pd-catalyzed cross-coupling of the B—Br moiety in [4e] with L2-containing precatalyst yields the heterofunctionalized 9-O-(3,5-$Me_2C_6H_3$)-10-Et-m-carborane [4f]. This transformation represents the first metal-catalyzed B-heterofunctionalization of di carba-closo-dodecaborane via cross-coupling demonstrating that B—Br-carboranes offer an additional pathway for multifunctionalization. These results also suggest that embodiments of the methodology are amenable to sterically encumbered carborane-based electrophiles.

Figure 20:
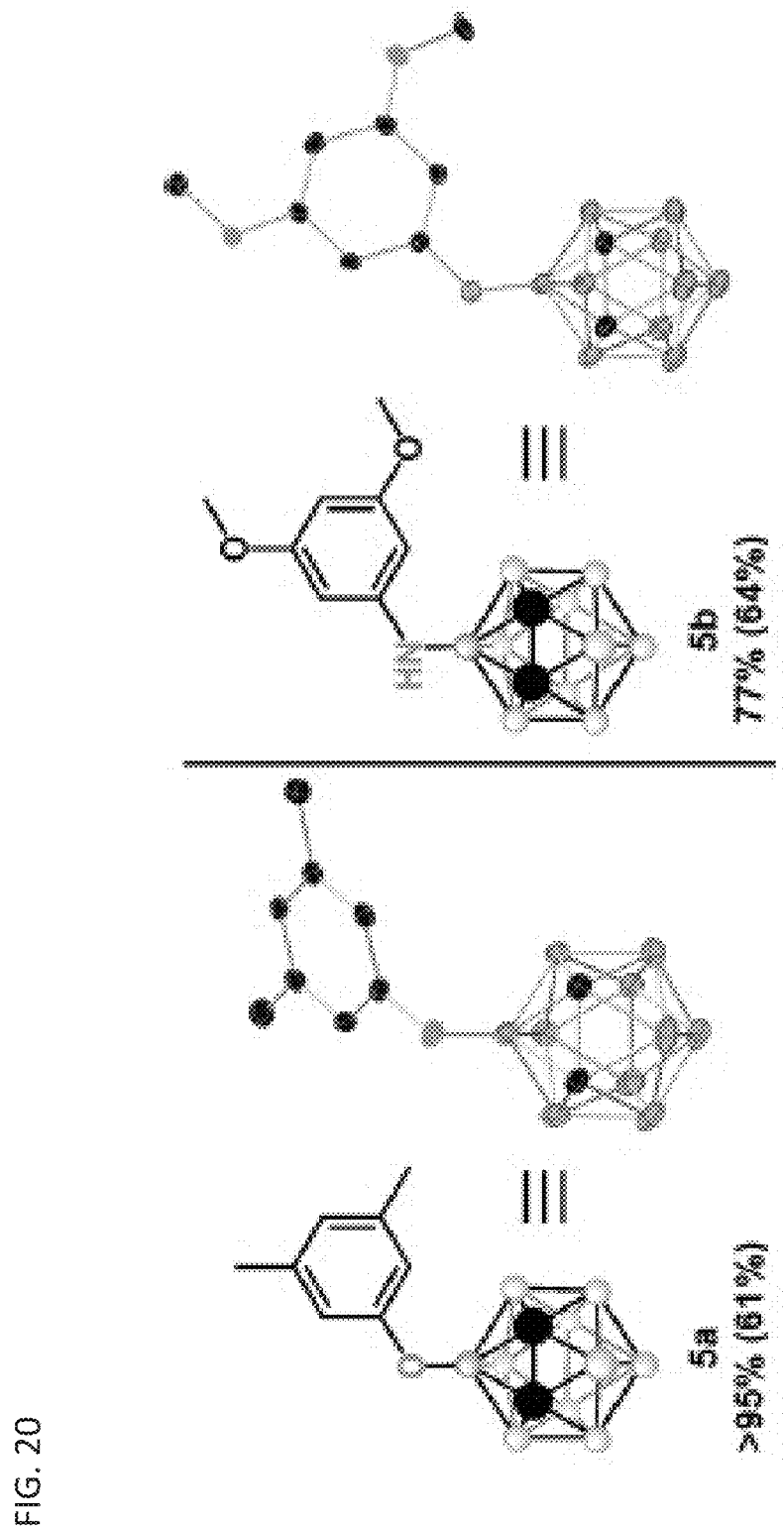
FIG. 20 illustrates the alkoxylation and amination of ortho-carboranes using BroCB in accordance with embodiments of the invention (ellipsoids at 50% probability and H atoms omitted for clarity)(GC-MS yields, and isolated yields in parentheses).

Ortho-carboranes are the most challenging substrates in cross-coupling methodologies, since these species undergo facile deboronation in the presence of nucleophiles. (See, e.g., Fox, M. A.; Wade, K., *J. Organomet. Chem.* 1999, 573, 279, the disclosure of which is incorporated herein by reference.) Conditions used in embodiments are sufficiently mild and enable the cross-coupling of 3-Br-o-carborane (Br-o-CB) with amine and alcohol substrates that are not strongly nucleophilic ([5a-5b], FIG. 20). Using 3-Br-o-carborane in this case is preferred, given its higher conversion efficiency and ease of preparation compared to the 3-I-o-carborane analogue.

In summary, in accordance with embodiments B-bromo-m-carboranes undergo efficient Pd-catalyzed B—N, B—O, and B—CN cross-coupling enabled by precatalysts featuring electron-rich biaryl phosphine ligands. Although not to be bound by theory, the higher reactivity of Br-mCB likely stems from faster transmetalation (FIG. 16B, step II) due to a weaker Pd—Br bond compared to Pd—I congener. This is consistent with previously observed trends in palladium-catalyzed transformations using aryl halide electrophiles and Pd-based catalysts supported by bulky electron-rich phosphine ligands. (See, e.g., Salvi, L., et al., *Org. Lett.* 2012, 14, 170; Friis, S. D., et al., *Org. Lett.* 2014, 16, 4296; Roy, A. H.; Hartwig, J. F. *Organometallics* 2004, 23, 1533; and Sheppard, T. D. *Org. Biomol. Chem.* 2009, 7, 1043, the disclosure of which are incorporated herein by reference.) The use of B-bromo-carboranes, in accordance with embodiments, allows direct access to previously unknown B-functionalizations of these clusters. In addition, judicious use of Pd-catalyst systems with either iodo- or bromo-functionalized carborane was used to access unprecedented heterofunctionalized species. This approach is also amenable to o-carborane, which is the most challenging carborane substrate. Notably, this cross-coupling chemistry is complementary to the recently efforts in directed B—H functionalization strategies, and may provide unprecedented densely functionalized carborane species.

3D Aromatic Boron-Rich Cluster Photooxidants

Many other embodiments are directed to perfunctional-ized icosahedral dodecaborate clusters of the type $B_{12}(OCH_2Ar)_{12}$ (Ar=Ph or $C_6F_5$) that can undergo photoexcitation with visible light, leading to a new class of metal-free photooxidants. In various embodiments, excitation in these species occurs as a result of the charge-transfer between low-lying orbitals located on the benzyl substituents and an unoccupied orbital delocalized throughout the boron cluster core. Some embodiments show how these species can participate in electron-transfer processes with a broad range of styrene derivatives, initiating their polymerization. Efficient initiation according to embodiments is observed in cases of both electron-rich and electron-deficient styrene monomers featuring para, meta and ortho-substituents at cluster loadings as low as 0.05 mol %. Furthermore, in some embodiments photo-excitation of $B_{12}(OCH_2C_6F_5)_{12}$ in the presence of a less activated olefin such as isobutylene results in the production of highly branched poly(isobutylene). Accordingly, various embodiments are directed to a new class of air-stable metal-free photoredox reagents capable of mediating chemical transformations.

Figure 21:
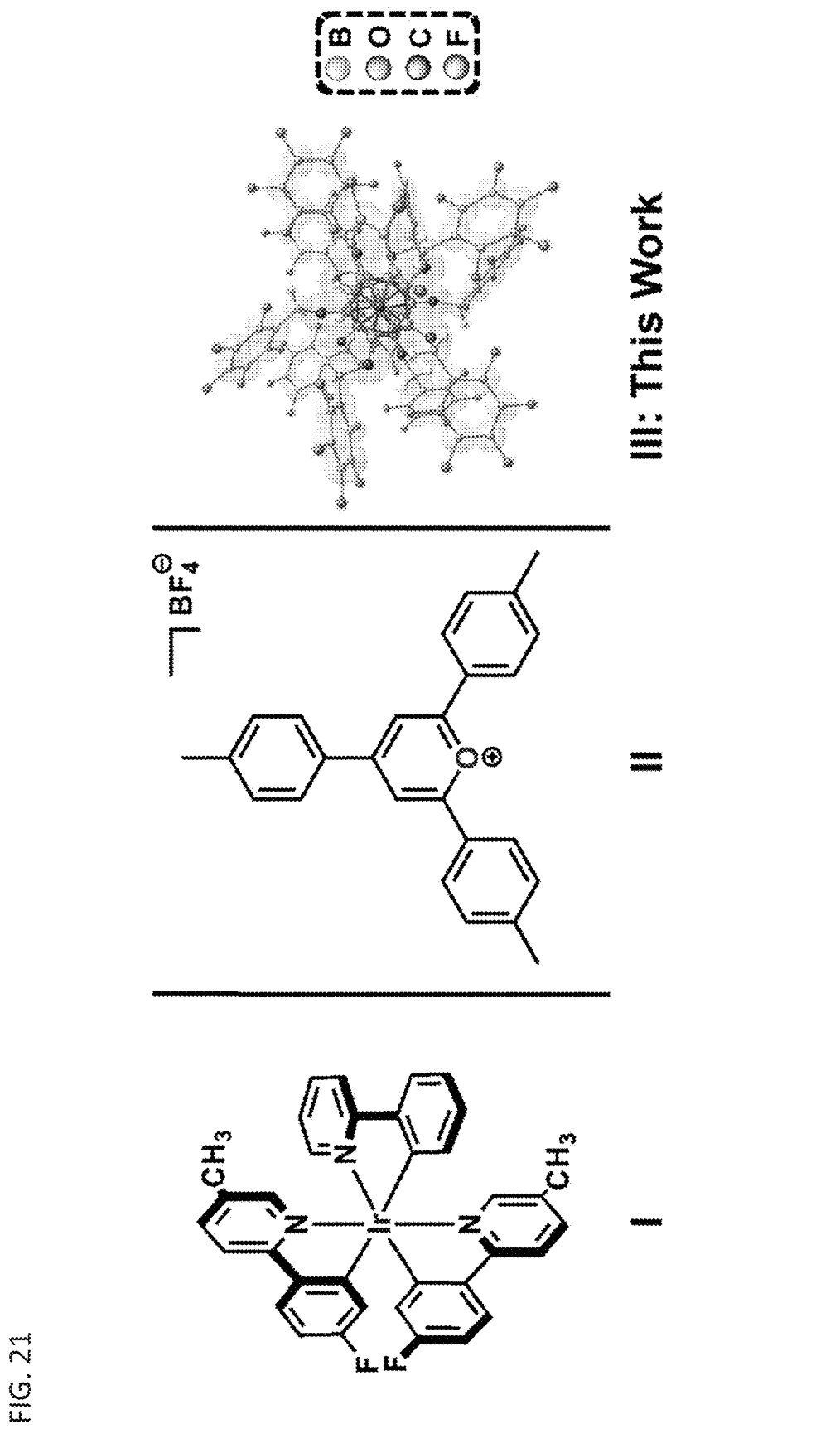
FIG. 21 illustrates exemplary molecular chromophores including transition-metal complexes [I], organic species (e.g., pyrylium$^6$ [II]), and dodecaborate-based (B$_{12}$(OR)$_{12}$) clusters (III) in accordance with embodiments of the invention.

Photoredox processes are ubiquitous in chemistry and require a chromophore to absorb a photon, triggering the formation of a metastable state with a dramatically different redox potential than the parent ground state. Well-defined molecular chromophores typically possess functional groups that are capable of absorbing light, upon which an electron is promoted into a higher energy molecular orbital; in many of these cases, these photo-excited species can behave as photooxidants or photo-reductants. There exist two broad classes of molecular-based chromophores capable of undergoing photo-redox processes: metal-based complexes and organic dyes. (See, e.g., Prier, C. K., et al., *Chem. Rev.* 2013, 113, 5322-5363; Fagnoni, M., et al., *Chem. Rev.* 2007, 107, 2725-2756; and Narayanam, J. M. R.; Stephenson, C. R. *J. Chem. Soc. Rev.* 2011, 40, 102-113, the disclosures of which are incorporated herein by reference.) Metal-based chromophores possess excited states with highly tunable lifetimes, as they are able to reach triplet states and are also able to delocalize electrons over a number of molecular orbitals. (See, e.g., Kalyanasundaram, K. *Coord. Chem. Rev.* 1982, 46, 159-244; Fox, L. S., et al., *Science*, 1990, 247, 1069-1071; Juris, A., et al., *Coord. Chem. Rev.* 1988, 84, 85-277; Lumpkin, R. S., et al., *J. Phys. Chem.* 1990, 94, 239-243; Li, J., et al., *Inorg. Chem.*, 2005, 44, 1713-1727, the disclosures of which are incorporated herein by reference.) On the other hand, the majority of organic chromophores possess relatively short-lived excited states featuring $\pi \rightarrow \pi^*$ electronic excitations with radicals centered primarily within s or p orbitals. (See, e.g., Marin, M. L., et al., *Chem. Rev.* 2012, 112, 1710-1750, the disclosure of which is incorporated herein by reference.)(FIG. 21). Both classes have been utilized to harness energy from visible light enabling the formation of new chemical bonds in the context of building complex and diverse molecular architectures. (See, e.g., Wilger, D. J., et al., *Nature Chem.* 2014, 6, 720-726; Yoon, T. P., et al, *J. Nature Chem.* 2010, 2, 527-532; Xu, J., et al., *J. Am. Chem. Soc.* 2014, 136, 5508-5519; Yağci, Y. Reetz, I. *Prog. Polym. Sci.* 1998, 23, 1485-1538; Chen, M., et al., *ACS Macro Lett.* 2015, 4, 566-569; and Dadashi-Silab, S., et al., Y. *Chem. Rev.* 2016, the disclosures of which are incorporated herein by reference.)

Figure 22A:
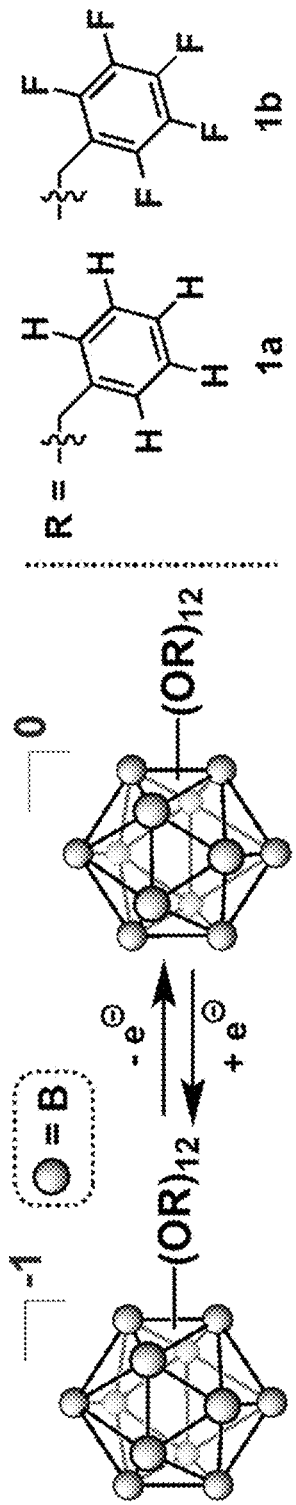
Figure 22C:
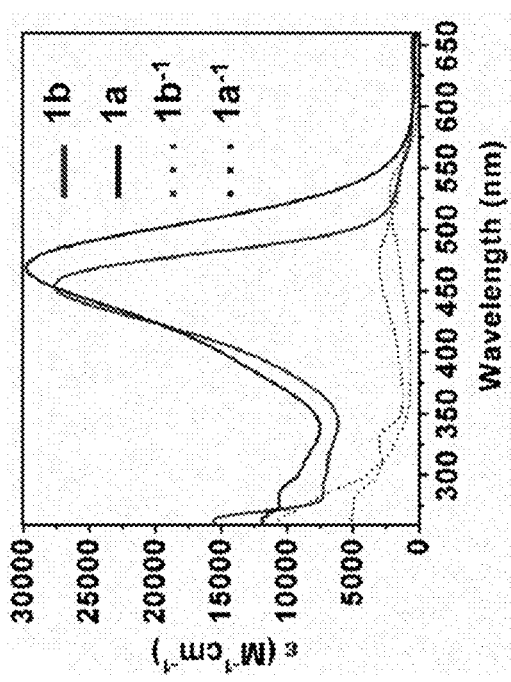
Figure 22B:
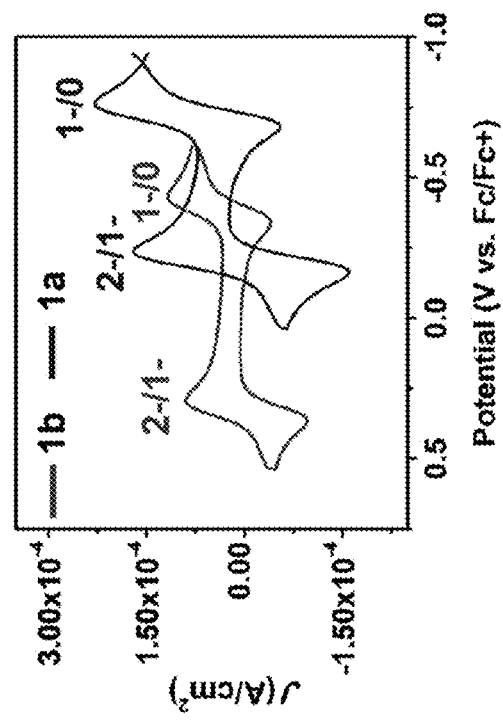

A class of molecules that contain characteristics of both metal-complexes and organic molecules are boron-rich clusters. (See, e.g., Spokoyny, A. M. *Pure Appl. Chem.* 2013, 85, 903-919; and Mutterties, E. L., et al., *Inorg. Chem.* 1964, 3, 444-451, the disclosure of which are incorporated herein by reference.) As previously described, many polyhedral boron clusters are robust, kinetically stable, and can undergo facile functionalization chemistry. (See, e.g., Grimes, R. N. *J. Chem. Ed* 2004, 81, 657-672; Hawthorne, M. F. *J. Chem. Ed.* 2009, 86, 1131; Kaim, W., et al., *Angew. Chem. Int. Ed* 2009, 48, 5082-5091; Power, P. P. *Chem. Rev.* 2003, 103, 789-809; Aihara, J. *J. Am. Chem. Soc.* 1978, 100, 3339-3342; and King, R. B. *Chem. Rev.* 2001, 101, 1119-1152, the disclosures of which are incorporated herein by reference.) In particular, dodecaborate clusters feature a unique, 3D aromatic bonding situation in which the skeletal electrons are delocalized in three dimensions. (See, e.g., Lorenzen, V., et al., *Inorg. Chem.* 1998, 37, 4011-4014, the disclosure of which is incorporated herein by reference.) Importantly, in the context of photo-oxidation, unfunctionalized boron-rich clusters containing B—H bonds do not absorb light in the visible region and also cannot undergo well-defined redox processes. (See, e.g., Sivaev, I. B., et al., *Collect. Czech. Chem. Commun.* 2002, 67, 679-727; and Pitochelli, A. R. and Hawthorne, M. F. *J. Am. Chem. Soc.* 1960, 82, 3228-3229, the disclosures of which are incorporated herein by reference.) However, researchers previously demonstrated that several classes of perfunctionalized polyhedral boron clusters are capable of undergoing reversible redox processes. (See, e.g., King, B. T., et al., *J. Am. Chem. Soc.* 1996, 118, 10902-10903; Lee, M. W., et al., *Angew. Chem. Int. Ed* 2007, 46, 3018-3022; Peymann, T., et al., *Angew. Chem. Int. Ed* 2001, 40, 1664-1667; Maderna, A., et al., *Angew. Chem. Int. Ed.* 2001, 40, 1661-1664; Peymann, T., et al., *Angew. Chem. Int. Ed.* 1999, 38, 1061-1064; and Wixtrom, A. I., et al., *Inorg. Chem. Frontiers* 2016, the disclosure of which are incorporated herein by reference.) For example, colorless ether-functionalized $[B_{12}(OR)_{12}]^{2-}$ clusters can undergo two sequential quasi-reversible one-electron redox processes leading to $[B_{12}(OR)_{12}]^{1-}$ and neutral $B_{12}(OR)_{12}$, respectively, both of which exhibit strong visible light absorption bands (FIG. 22A-C). Various embodiments are herein directed to reactive photo-excited species comprising boron-rich clusters. (See, e.g., Mukherjee, S. & Thilagar, P. *Chem. Commun.* 2016, 52, 1070-1093; and Cerdán, L., et al., *Nat. Commun.* 2015, 6, 1-7, the disclosures of which are incorporated herein by reference.) Specifically, many embodiments demonstrate the visible light photo-redox behavior of $B_{12}(OR)_{12}$ clusters, which interact with olefinic species and subsequently initiate their polymerization. Embodiments also show that this process occurs across a wide array of both electron-rich and electron-deficient styrene monomers as well as isobutylene. The latter process represents the first visible-light induced metal-free polymerization leading to highly branched poly(isobutylene).

Using embodiments of methods for perfunctionalizing $B_{12}(OR)_{12}$ clusters using microwave technology previously described it is possible to rationally tune the electrochemical properties of $B_{12}(OR)_{12}$ products using a variety of benzyl substituents (FIG. 22A). During the course of the synthetic investigations, it was discovered that upon leaving cluster species [1a] in the presence of 4-methoxystyrene [2a] in a dichloromethane ($CH_2Cl_2$) solution, a viscous mixture resulted, indicating polymerization of [2a]. Interestingly, the same reaction did not produce any polymer when left in the dark, suggesting that this process is likely photo-driven. This interesting behavior was investigated more closely via controlled irradiation of a 2M solution of [2a] in $CH_2Cl_2$ at room temperature under an $N_2$ atmosphere with 0.5 mol % [1a] ($\lambda_{max,abs}$=470 nm) illuminated under blue LED light (450 nm). After 4 hours of irradiation, the reaction produced polymer in less than 10% yield (FIG. 23). At the beginning of the course of investigations, Nicewicz and co-workers reported an elegant pyrilium-catalyzed (II, FIG. 21) photo-mediated polymerization protocol of [2a] and suggested that the mechanism of the polymerization likely occurs through a cationic route. (See, e.g., Perkowski, A. J., et al., *J. Am. Chem. Soc.* 2015, 137, 7580-7583, the disclosure of which is incorporated herein by reference.)

According to embodiments, a similar process operates with the $B_{12}(OBn)_{12}$ system and clusters functionalized with more electron-withdrawing substituents increase the oxidation potential of the photo-initiator, thereby providing greater photo-oxidizing power of these species. Therefore, $B_{12}(OCH_2C_6F_5)_{12}$ [1b] was synthesized in a manner analogous to that of [1a] and was isolated as a yellow solid in 63% yield (FIG. 22D). UV-Vis absorption shows that [1a] and [1b] exhibit similar $\lambda_{max}$ wavelengths (470 and 454 nm, respectively; FIG. 22C), and, notably, cyclic voltammetry (CV) experiments show a 500 mV increase in the 1−/0 redox couple of [1b] compared to [1a] (FIG. 22B).

In various embodiments, addition of 0.1 mol % [1b] to a 2M $CH_2Cl_2$ solution of [2a] under ambient lighting resulted in the instantaneous formation of a polymer gel featuring a high dispersity (FIG. 23). Surprisingly, reducing the loading of [1b] to 0.005 mol % still resulted in immediate gelation upon addition to [2a]. Under optimized reaction conditions, irradiation of 0.05 mol % [1b] in a 0.2 M $CH_2Cl_2$ solution of [2a] with 450 nm light for 6 hours produced 198 kDa polymer in 97% yield (FIG. 23).

Figure 24:
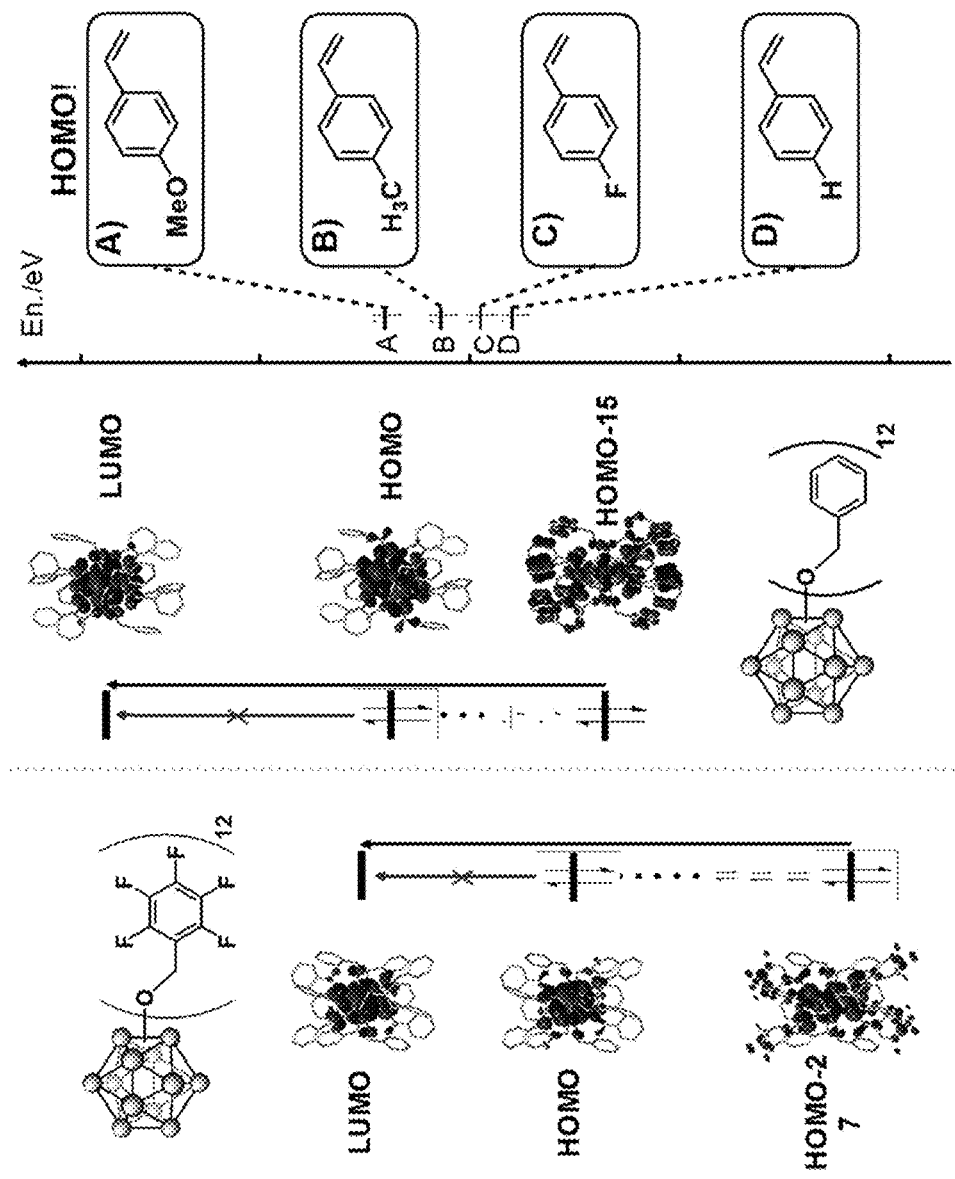
FIG. 24 illustrates TD-DFT studies indicating the existence of a LMCT-like (perfluoroaryl-to-boron cluster) excitation pathway of both [1a] and [1b] in accordance with embodiments of the invention (also shown are the relative energies of the HOMO levels of four monomers used).

In order to understand the nature of the observed photo-initiation TD-DFT studies were performed on [1a] and [1b]. This work reveals the existence of a favorable LMCT-like (aryl-to-boron cluster) excitation pathway leading to an excited species with a redox potential roughly matching the oxidation potential of styrene species (FIG. 24). This is consistent with the previous computational work of Schleid and co-workers on $B_{12}(OH)_{12}^{1-}$ monoradical species. (See, e.g., Van, N., et al., *Chem. Eur. J.* 2010, 16, 11242-11245, the disclosure of which is incorporated herein by reference.) The mechanism in accordance with embodiments involves the generation of a potent photo-oxidant by visible light promotion of an electron from a low-lying occupied orbital on an aryl ring to the cluster-based LUMO. The resulting excited species initiates polymerization via a single electron oxidation of styrene (or styrene derivative), producing a cluster-based radical anion, the stabilities of which are documented, and a monomer-based radical cation.

Photophysical measurements were then employed to probe the excited-state properties of [1b]. The excited-state lifetime of [1b], measured from the 600 nm emission maximum, was found to be on the order of ~380 ps. From this data, in addition to the ground-state oxidation potential tabulated above, an excited-state oxidation potential value of ~2.98 V was calculated for 1b. This value is consistent with the ability of [1b] to initiate the polymerization of [2a]. The photo-induced oxidative behavior of persubstituted clusters in accordance with embodiments is unprecedented and stands as a new contribution to the field of molecular photo-redox chemistry. Furthermore, the kinetic stability of both the neutral and monoanionic clusters due to the 3D delocalization of valence electrons within the cluster core provides a distinct strategic advantage for implementation in systems amenable to photochemistry involving a diversity of functional groups and reactive radical species. Notably, the polymerization of [2a] initiated by [1b] also proceeds under ambient conditions, affording a polymer of similar quality as that generated from a reaction set up under inert gas conditions. This is consistent with both a cationic mechanism of the observed process and the notion of the kinetic redox stability of these clusters (vide supra).

Given this successful polymerization, embodiments allow for the expansion of the substrate scope by employing styrene monomers [2b-2i], which possess a range of electronic and steric profiles. Polymerization of styrene [2b] with 0.1 mol % [1b] produced polystyrene in yields averaging 96% in 4 hours. Varying the catalyst loading did not have an effect on the molecular weight or dispersity of poly-2b.

Figure 25:
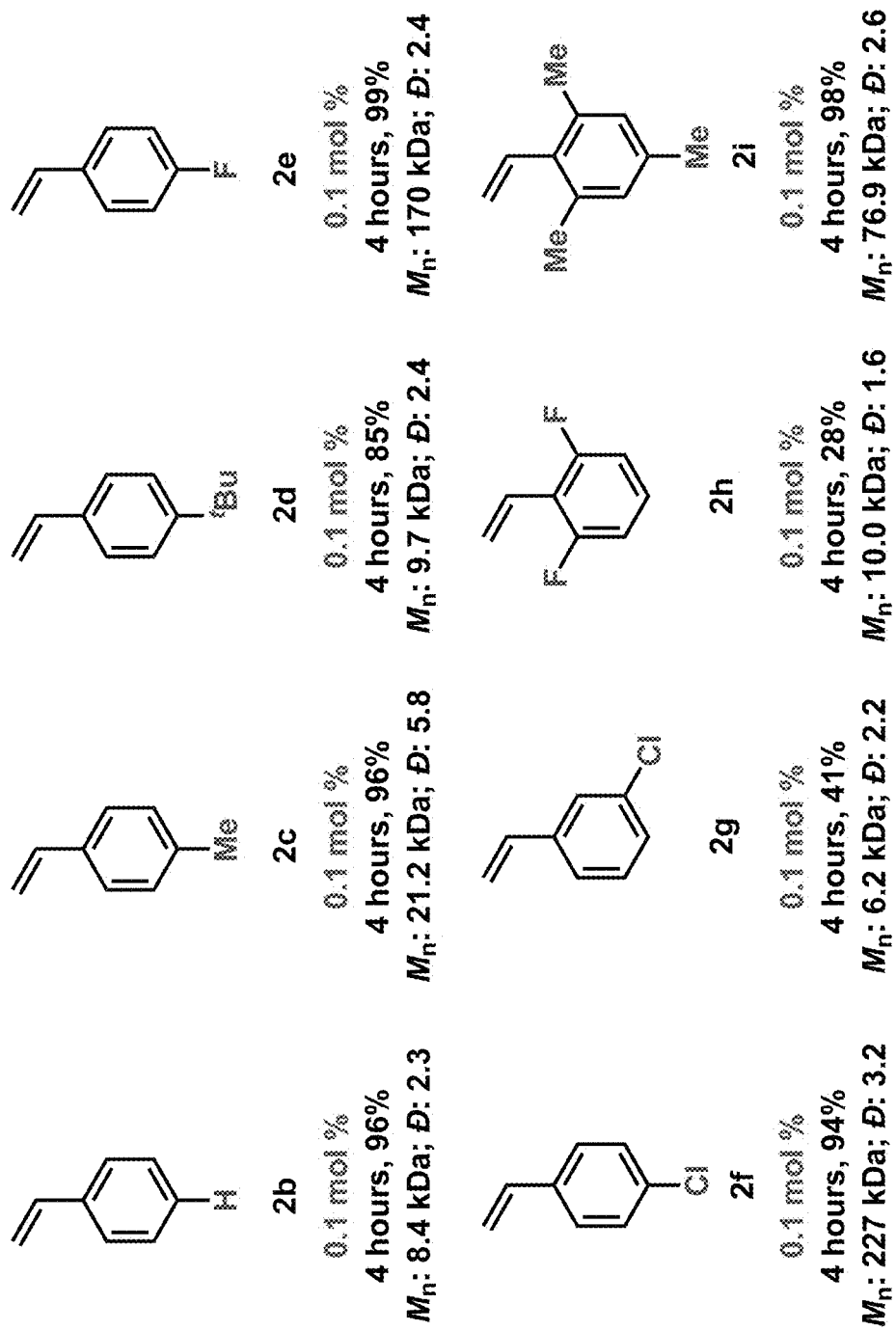
FIG. 25 illustrates substrate scope for styrene polymerization utilizing photooxidant [1b] in accordance with embodiments of the invention (general reaction conditions: Monomer (50 μL), 1b (0.05 mol %-1.0 mol %, 0.2-2M CH$_2$Cl$_2$ solution), 4-24 hours).

Notably, the pyrilium-based catalyst utilized by Nicewicz does not produce polystyrene. However, in accordance with embodiments polymers of other electron-rich styrenes are generated in the presence of [1b] within hours in good yield (FIG. 25: 2c, 2d, 2e, 2i); more electron-poor substrates can also be polymerized (FIG. 25: 2f, 2g, 2h) albeit with somewhat diminished efficiency, consistent with the mechanism in accordance with embodiments.

The perfluorinated nature of [1b] poses the question of whether the successful polymerization of such a wide range of styrene monomers in comparison to either [1a] or [II] (FIG. 21) might be due in part to specific interactions between the fluorinated rings of the initiator and the monomer. Such intermolecular π-π type interactions are well-recognized. (See, e.g., Calitree, B., et al., Organometallics 2007, 26, 6248; Carrera, E. I. & Seferos, D. S. *Dalton Trans.* 2015, 44, 2092; Lin, T.-P. & Gabbaï, F. P. *J. Am. Chem. Soc.* 2012, 134, 12230; Hirai, H., et al., *Angew. Chem., Int. Ed.* 2015, 54, 13581; Leitao, E. M. & Jurca, T., Manners, I. *Nat. Chem.* 2013, 5, 817; and Loudet, A.; and Burgess, K. *Chem. Rev.* 2007, 107, 4891, the disclosures of which are incorporated herein by reference.) In accordance with embodiments styrene [2b] was therefore subjected to the optimized polymerization conditions in the presence of [1b] employing benzene as solvent. Polymerization of [2b] produced polystyrene in 96% yield in 4 hours, though $M_n$ values observed for polystyrene produced in benzene are approximately ½ that of polymers produced in $CH_2Cl_2$. Given the likelihood of competitive association of solvent with the fluorinated aryl rings of [1b], one would expect a reduction in polymer yield using aromatic solvents if these π-π type interactions are essential to polymerization. Therefore, this results suggests that if π-type interactions between the initiator and the monomer exist, they are not essential for the polymerization in accordance with embodiments overall.

Accordingly, in accordance with embodiments and in light of the high excited-state oxidation potential (vide supra) of [1b], boron clusters are able to coax reactivity out of more challenging substrates. Typical cationic polymerization of isobutylene, a less activated than styrene, utilizes metal catalysts or harsh conditions. (See, e.g., Chen, M., et al., *Chem. Rev.* 2016, the disclosure of which is incorporated herein by reference.) A notable exception is the work of Michl and co-workers, who documented a $Li^+$-catalyzed polymerization of isobutylene supported by a weakly-coordinated monoanionic carborane.

Figure 26:
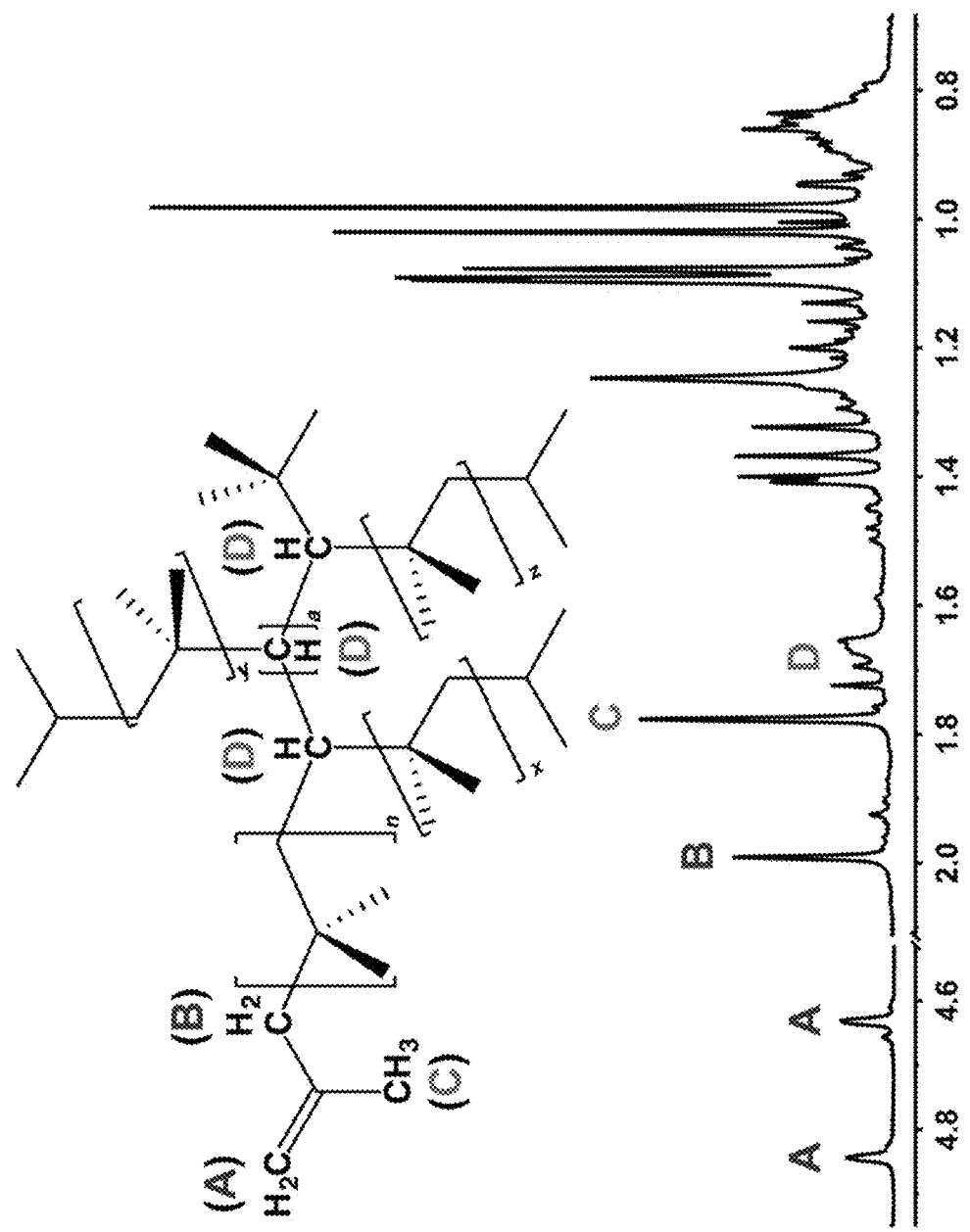
FIG. 26 illustrates $^1$H NMR spectrum of poly(isobutylene) produced from irradiation of [1b] with 450 nm light under 4 psi isobutylene in accordance with embodiments of the invention, where Label A indicates protons of the olefinic chain end; B and C, allylic protons of the chain end; D, methine protons, indicative of a high degree of branching in this polymer.

Irradiation (450 nm) of a 2M solution of [1b] in $CH_2Cl_2$ at pressures of isobutylene as low as 1 psi for 4 hours at room temperature in accordance with embodiments produced polymeric material. Neither irradiation of isobutylene in the absence of [1b] nor stirring [1b] in the presence of isobutylene in the dark, under otherwise identical reaction conditions as described above, afforded polymer. Interestingly, $^1H$ and $^{13}C$ NMR spectroscopy of the formed polymer material closely resembles the polymer obtained by Michl and is consistent with the formation of a highly branched poly(isobutylene) (FIG. 26).

In conclusion, embodiments demonstrate—for first time—that icosahedral dodecaborate clusters of the type $B_{12}(OR)_{12}$, where R is a benzyl derivative, can undergo photoexcitation with visible light and activate styrene derivatives towards polymerization. Increasing the electron-withdrawing power of the benzyl substituents results in increased activity which allows for development of the first example of a visible-light photooxidant capable of polymerizing isobutylene. DFT calculations suggest that photoexcitation in these species occurs through the promotion of an electron from a low-lying, aryl-based orbital on the cluster substituent to an unoccupied cage-based orbital by visible (~450 nm) light. Embodiments of $B_{12}$-based clusters can behave as powerful yet air-stable redox-active chromophores that serve as highly reactive, metal-free alternatives to current systems for photoredox transformations. Embodiments also expand on an exciting untapped potential of molecular main-group systems as unique photoactive components.

Accordingly, in various embodiments, molecular chromophores and methods of their synthesis are provided. In many embodiments, the molecular chromophores are perfunctionalized icosahedral dodecaborate clusters. In various embodiments the clusters are of the type $B_{12}(OCH_2Ar)_{12}$ (Ar=Ph or $C_6F_5$), which can undergo photo-excitation with visible light, leading to metal-free photooxidants. In embodiments, excitation in these species occurs as a result of the charge-transfer between low-lying orbitals located on the benzyl substituents and an unoccupied orbital delocalized throughout the boron cluster core. In various embodiments the air-stable metal-free photoredox reagents provided are capable of mediating chemical transformations. In many embodiments these species, when photo-excited (e.g., via an LED), participate in electron-transfer processes with a broad range of styrene derivatives, initiating polymerization. In many such embodiments, efficient initiation may be observed in cases of both electron-rich and electron-deficient styrene monomers featuring para, meta and ortho-substituents at cluster loadings as low as 0.05 mol %. In still other embodiments, photo-excitation of $B_{12}(OCH_2C_6F_5)_{12}$ in the presence of a less activated olefin such as isobutylene results in the production of highly branched poly(isobutylene). In other embodiments the invention is directed to metal-free photooxidants comprising an icosahedral dodecaborate consisting of $B_{12}(OR)_{12}$ where R is a substituted aromatic.

In still other embodiments R is at least one of either a substituted or unsubstituted phenyl or $C_6F_5$. In yet other embodiments the invention is directed to a method for photo-mediated polymerization including, introducing a solution of a monomer and an icosahedral dodecaborate consisting of $B_{12}(OR)_{12}$ where R is a substituted aromatic; and illuminating the solution.

In still yet other embodiments R is at least one of either a substituted or unsubstituted phenyl or $C_6F_5$. In still yet other embodiments the monomer is a substituted or unsubstituted styrene. In some such embodiments the styrene is substituted with a functional group selected from the group of Me, Bu, F, and Cl.

Novel Complexes for Organic Light Emitting Diode Materials

Strong-Field Chelating Boron Cluster Ligands

Turning now to the drawings, organic light-emitting diode (OLED) materials with tunable properties featuring photophysically innocent boron-rich cluster ligands and methods of their synthesis are described. In many embodiments the materials and methods describe d8 metal complexes featuring robust and photophysically innocent strong-field chelating 1,1'-bis(ocarborane) (bc) ligand frameworks and methods of their synthesis. In various embodiments the dianionic bc ligand does not contribute to any visible metal-to-ligand charge transfer (MLCT) transitions, yet it provides strong ligand field in these complexes. Other embodiments are directed to a bc-based Pt(II) complex containing a 4,4'-di-tert-butyl-2,2'-bipyridine ligand (dtbbpy) that displays blue phosphorescent emission dominated by MLCT from the Pt(II) center to the bpy ligand. In some such embodiments the bulky three-dimensional nature of the be ligand precludes intermolecular Pt(II)•••Pt(II) interactions in the solid state where the resulting compounds retain their emission properties. Accordingly, embodiments are directed to designing organic light-emitting diode (OLED) materials with tunable properties featuring photophysically innocent boron-rich cluster ligands.

Many square planar platinum complexes containing chelating biaryl ligands have been established as efficient phosphorescent emitters, making them desirable dopants in organic light-emitting diodes (OLEDs). (See, e.g., H. Yersin, Ed. *Highly Efficient OLEDs with Phosphorescent Materials*; Wiley-VCH: Weinheim, 2008; P.-T. Chou and Y. Chi, *Chem. Eur. J.* 2007, 13, 380-395; Y. Chi, P.-T. Chou, *Chem. Soc. Rev.* 2010, 39, 638-655; J. Brooks, et al., *Inorg. Chem.* 2002, 41, 3055-3066; J. Kavitha, et al., *Adv. Funct. Mater.* 2005, 15, 223-229; S.-Y. Chang, et al., *Inorg. Chem.* 2006, 45, 137-146; S.-Y. Chang, et al., *Dalton Trans,* 2008, 6901-6911; Z. M. Hudson, et al., *Adv. Funct. Mater.* 2010, 20, 3426-3439; and X.-C. Hang, et al., *Angew. Chem. Int. Ed.,* 2013, 52, 6753-6756, the disclosures of which are incorporated herein by reference.) The emissive properties of these Pt(II) complexes can be tuned by varying the electronic nature of the ligands surrounding the metal center; however, complete control over desired photophysical properties is still limited. For example, these square planar complexes are susceptible to aggregation as a consequence of the lack of steric bulk above and below the square plane, leading to intermolecular Pt(II)Pt(II) interactions that bring about luminescence quenching and red-shifting of the solid-state emission frequency. (See, e.g., D. Bandyopadhyay, et al., *Inorg. Chem.,* 1983, 22, 1315-1321; L. Chassot, et al., *Inorg. Chem.* 1984, 23, 4249-4253; M. Ghedini, et al., *Organometallics* 1999, 18, 2116-2124; and K. E. Dungey, et al., *Inorg. Chem.* 2000, 39, 5192-5196, the disclosures of which are incorporated herein by reference.) Furthermore, in prototypical mixed ligand complexes, (L)(L')Pt(II), the HOMO is generally both metal- and ligand-based (Pt(II) and L) while the LUMO is located on the remaining ligand (L'). (See, e.g., D. P. Rillema, et al., *Inorg. Chem.* 2013, 52, 596-607; and D. P. Rillema, et al., *Dalton Trans.* 2015, 44, 17075-17090, the disclosures of which are incorporated herein by reference.) This ultimately complicates the predictability of ligand effects on emission properties. A class of compounds that could kinetically stabilize the Pt(II) square planar framework without participating in electronic transitions would prove very useful for creating improved phosphorescent emitters for the next generation of OLED devices.

Icosahedral dicarba-closo-dodecaboranes ($C_2B_{10}H_{12}$, carborane) are robust, charge neutral boron clusters that are often considered as 3D aromatic analogues to arenes. Unfunctionalized carborane species have an extremely large HOMO-LUMO gap (~8 eV), making them potentially useful building blocks for probing their photophysical innocence in the context of metal-based phosphorescent emitters. (See, e.g., M. Scholz and E. Hey-Hawkins, E. *Chem. Rev.* 2011, 111, 7035-7062; and J. M. Oliva, et al., *Phys. Chem. Chem. Phys.* 2010, 12, 5101-5108, the disclosures of which are incorporated herein by reference.) Available functionalization routes through either carbon or boron vertices in these clusters also enable the synthesis of tailored ligand frameworks for transition metal complexes. (See, e.g., Y. Quan and Z. Xie, *Angew. Chem.* 2016, 128, 1317-1320; R. Cheng, et al., *Angew. Chem.* 2016, 128, 1783-1786; C. Tang and Z. Xie, *Angew. Chem. Int. Ed.* 2015, 54, 7662-7665; H. Lyu, et al., *Angew. Chem.* 2015, 127, 10769-10772. A. M. Spokoyny, *Pure Appl. Chem.* 2013, 85, 903-919; A. M. Spokoyny, et al., Organometallics 2012, 31, 8478-8481; C. A. Lugo, et al., *Inorg. Chem.* 2015, 54, 2094-2096; A. R. Popescu, et al., *Coord. Chem. Rev.* 2014, 269, 54-84; B. Xu, et al., *Dalton Trans.,* 2015, 44, 1530-1533; J. Kahlert, et al., *Dalton Trans.* 2015, 44, 9766-9781; J. Li, et al., *Inorg. Chem.* 1991, 30, 4866-4868; Z. Zheng, et al., *Inorg. Chem.* 1995, 34, 2095-2100, the disclosures of which are incorporated herein by reference.) For example, it has been demonstrated that κ2-C,N-bound 1-(2-pyridyl)-o-carboranyl and κ2-C,P-bound 1-(iPr2PCH2)-o-carboranyl can be strong ancillary ligands that contribute to the electronic stabilization of bis(heteroleptic) Ir(III) species, leading to an arylpyridine-dominant phosphorescent emission. (See, e.g., H. J. Bae, et al., *Dalton Trans.* 2013, 42, 8549-8552; T. Kim, et al., *Organometallics* 2015, 34, 3455-3458; A. M. Prokhorov, et al., *Chem. Commun.* 2011, 47, 7713-7715; A. M. Prokhorov, et al., *J. Am. Chem. Soc.* 2014, 136, 9637-9642, the disclosures of which are incorporated herein by reference.)

From DFT calculations and analysis of the emission spectra, it has also been determined that the C-bound o-carboranyl unit remains uninvolved in electronic transitions and that phosphorescent emission results from MLCT of the Ir(III)-based HOMO to the arylpyridine-based LUMO. Furthermore, biaryl ligands have been functionalized with connected carboranyl moieties (ortho, meta, and para) to tune luminescent properties. (See, e.g., C. Shi, et al., *Chem. Commun.* 2013, 49, 4746-4748; C. Shi, et al., *Angew. Chem. Int. Ed.* 2013, 52, 13434-13438; T. Kim, et al., *Inorg. Chem.* 2013, 52, 160-168; H. J. Bae, et al., *Inorg. Chem.* 2014, 53, 128-138, the disclosures of which are incorporated herein by reference.) Despite these promising properties, a tunable, exclusively carborane-based ligand scaffold for phosphorescent emitter molecules has not been found. (See, e.g., X. Li, et al., *Chem. Eur. J.* 2015, 22, 1888-1898; and S. Mukherjee and P. Thilagar, *Chem. Commun.* 2016, 52, 1070-1093, the disclosures of which are incorporated herein by reference.) Such a ligand framework would be an ideal system for a rational design of metal-based luminescent complexes (vide supra).

Figure 27:
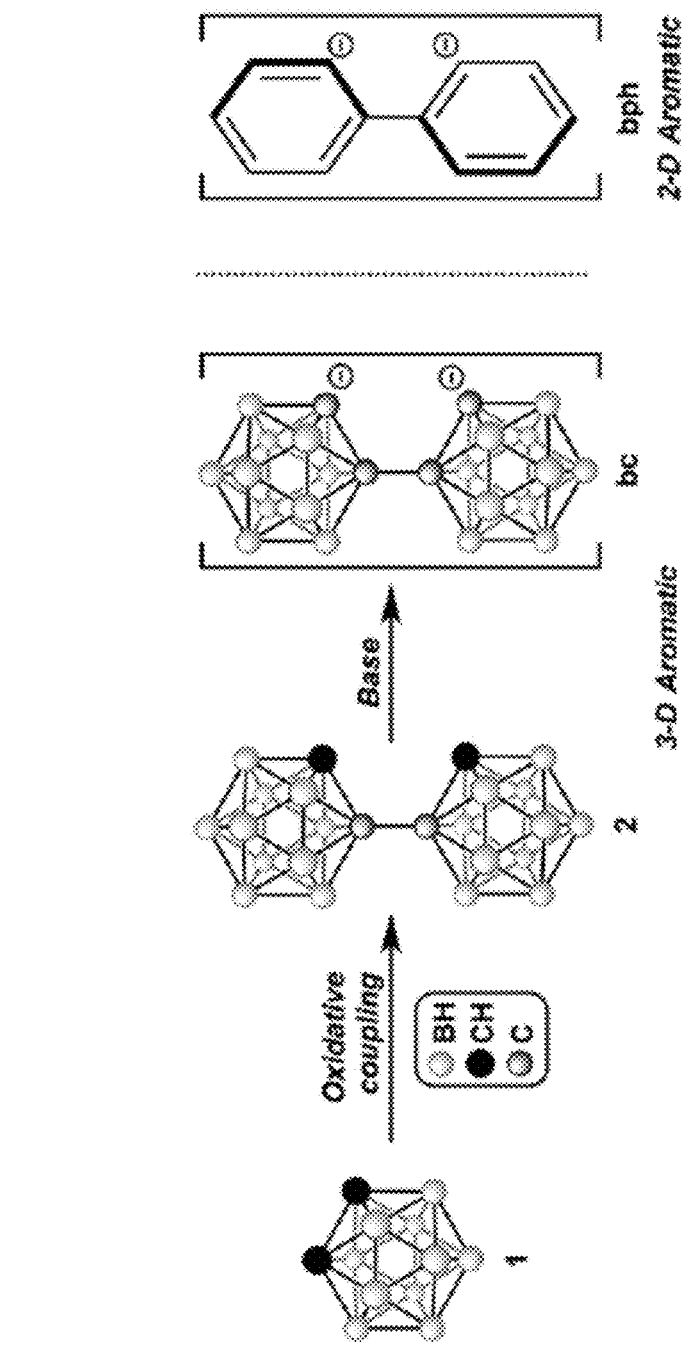
FIG. 27 illustrates the oxidative coupling of o-carborane [1] that yields 1,10-bis(o-carborane) [2], and the deprotonation of which yields the dianionic be ligand, which can be conceptually thought of as a 3D aromatic analogue of a dianionic biphenyl ligand (bph) in accordance with embodiments of the invention.

In 1970, Hawthorne elegantly showed that the oxidative coupling of two o-carboranes [1] through carbon vertices yields 1,1'-bis(o-carborane) [2], effectively a 3D analogue of biphenyl (FIG. 27). (See, e.g., R. A. Wiesboeck, M. F. Hawthorne, *J. Am. Chem. Soc.* 1964, 86, 1642-1643, the disclosure of which is incorporated herein by reference.) Later, Hawthorne demonstrated that the deprotonation of [2] results in a dianionic species bc, which was shown to bind several transition metals in bidentate or monodentate fashions. (See, e.g., D. A. Owen & M. F. Hawthorne, *J. Am. Chem. Soc.*, 1970, 92, 3194-3196; D. A. Owen & M. F. Hawthorne, *J. Am. Chem. Soc.* 1971, 93, 873-880; D. E. Harwell, et al., *J. Am. Chem. Soc.* 1996, 118, 2679-2685; D. E. Harwell, et al., *Inorg. Chem.*, 1997, 36, 5951-5955; and D. E. Harwell, et al., *J. Am. Chem. Soc.* 1996, 118, 2679-2685, the disclosures of which are incorporated herein by reference.) Ligand bc possesses similar electronic and physical properties as the parent o-carborane, and behaves as a robust transition metal ligand. More recently, several groups have improved the synthesis of [2] and further expanded the series of heteroleptic late-transition metal complexes containing bc. (See, e.g., S. Ren & Z. Xie, *Organometallics* 2008, 27, 5167-5168; M. J. Martin, et al., *J. Organomet. Chem.* 2015, 798, 36-40; Z.-J. Yao, et al., *J. Organomet. Chem.*, 2015, 798, 274-277; and L. E. Riley, et al., *Dalton Trans.* 2016, 45, 1127-1137, the disclosures of which are incorporated herein by reference.) However, fundamental electronic characterization and potential applications for these compounds as electronic materials have yet to be disclosed.

Two monoanionic bidentate ligands are commonly used in Pt(II) architectures employed for OLEDs, but there are few examples of Pt(II)-based emitters containing a dianionic bidentate ligand and a neutral bidentate ligand. (See, e.g., C. Cornioley-Deuschel & A. von Zelewsky, *Inorg. Chem.* 1987, 26, 3354-3358; M. Maestri, et al., *Helv. Chim. Acta* 1988, 71, 1053-1059; C. B. Blanton, et al., *Inorg. Chem.* 1992, 31, 3230-3235; J. A. Zuleta, et al., *J. Am. Chem. Soc.* 1989, 111, 8916-8917; J. M. Bevilacqua & R. Eisenbery, *Inorg. Chem.* 1994, 33, 2913-2923; S. D. Cummings & R. Eisenberg, *J. Am. Chem. Soc.* 1996, 118, 1949-1960; W. Paw, et al., *Coord. Chem. Rev.* 1998, 171, 125-150; and M. Hissler, et al., *Coord. Chem. Rev.* 2000, 208, 115-137, the disclosures of which are incorporated herein by reference.) One such example is Pt(bph)(bpy)[12a-c] (where bph=biphenyl, bpy=2,2'-bipyridine). Embodiments employ bc in place of bph to introduce sufficient steric bulk above and below the square plane to eliminate intermolecular Pt(II)•••Pt(II) interactions, which are often responsible for non-radiative decay pathways that lower luminescent efficiency. Additionally, the lack of an exposed π-aromatic system in embodiments comprising bc helps in reducing these undesirable intermolecular interactions and unwanted substitution and degradation pathways. Furthermore, the high-lying LUMO of embodiments incorporating bc should be inaccessible for orbital mixing and MLCT processes. Therefore, embodiments of the bc ligand provide kinetic stability while maintaining photophysical innocence in the context of designing OLEDs. Finally, emission originating from a single ligand according to embodiments yields greater color purity as mixing of emissions from multiple delocalized excited states will not be possible. Together, these properties allow for embodiments to rationally tune other ancillary ligands without electronic interference from bc.

Figure 28:
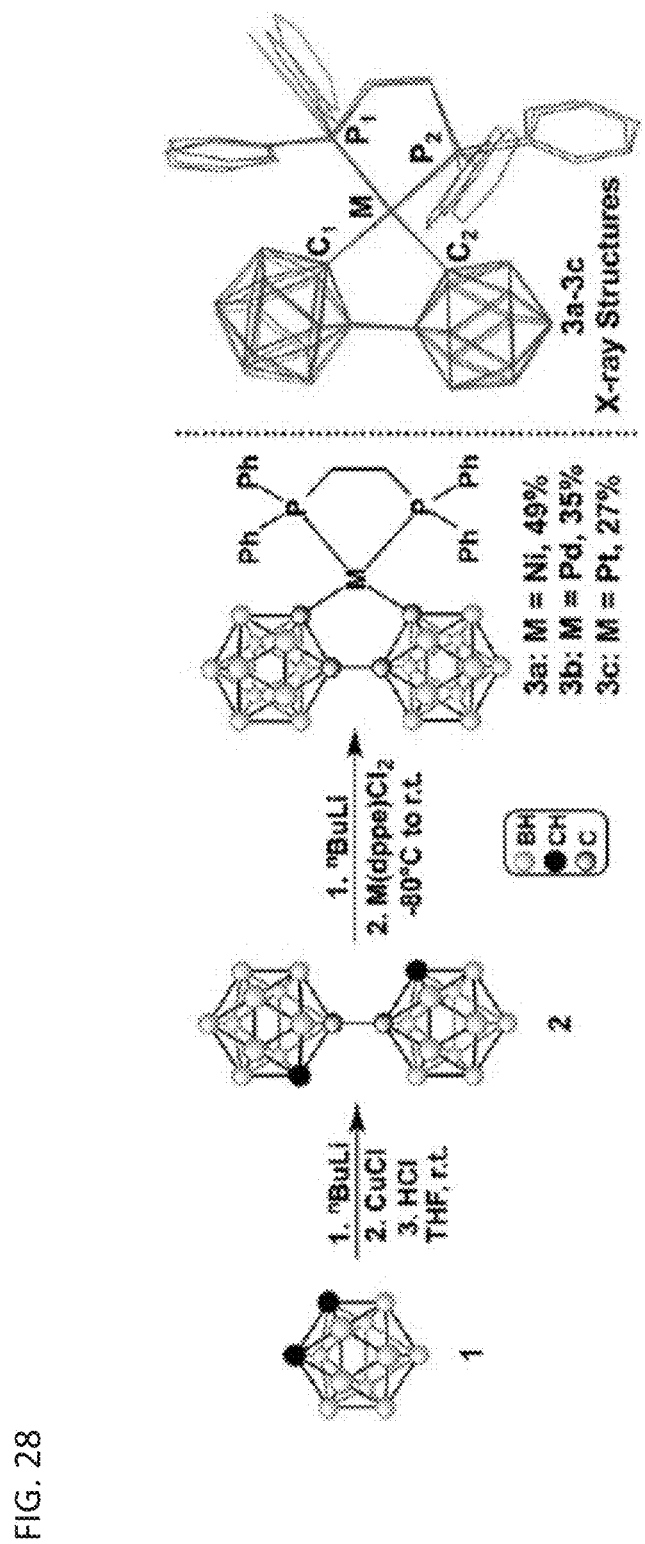
FIG. 28 illustrates: Left) synthesis of M(bc)(dppe), where M ¼ Ni [3a], Pd [3b], Pt [3c]; and Right) stacked X-ray crystal structures of compounds [3a-3c], illustrating structural similarity down the group, in accordance with embodiments of the invention.

The photophysical behavior of embodiments of bc as a ligand has been evaluated in a series of $d^8$ model transition metal complexes of the type M(bc)(dppe) (M=Ni(II), Pd(II), Pt(II); dppe=1,2-bis(diphenylphosphino)ethane; FIG. 28). The dilithio salt of bc ($Li_2$[bc]) was generated in THF and transferred into a slurry of M(dppe)$Cl_2$ in THF at −80° C. The reaction was allowed to slowly warm to room temperature overnight, yielding a dark brown solution. Pure compounds were isolated in the yields reported in FIG. 28 as crystalline yellow-orange solids after purification using column chromatography on silica or alumina. All reactions can be easily monitored via $^{31}P$ NMR spectroscopy. For example, [3a] and [3b] exhibit a significant (>10 ppm) upfield shift in their observed $^{31}P$ NMR singlet resonance compared to the starting metal-based precursors (FIG. 28). These results are also consistent with the recent work by Welch and co-workers who independently synthesized [3a]. (Cited above.) Observed $^1J_{Pt-P}$ coupling values for [3c] change significantly compared to the starting material, exhibiting a decrease of 1133 Hz ($^1J_{Pt-P}$ value changes from 3624 Hz to 2491 Hz). The substantial reduction in the magnitude of the $^1J_{Pt-P}$ coupling for [3c] can be attributed to the strong ligand field of bc versus that of the chloride ligands. (These results are consistent with the decrease in the $^1J_{Pt-P}$ value for other Pt(P^P)$Cl^2$ to Pt(P^P)$L^2$ complexes, where P^P=chelating diphosphine and L=strong-field ligand. (See, e.g., P. E. Garrou, *Chem. Rev.*, 1981, 81, 229-266; B. L. Edelbach, et al., *Organometallics*, 1998, 17, 4784-4794; and P. Sgarbossa, et al., *Organometallics*, 2007, 26, 2714-2719, the disclosures of which are incorporated herein by reference.))

To demonstrate that the bc framework according to embodiments is structurally similar to the biphenyl (bph) framework, bond distances, angles, and molecular geometries of [3a-3c] were compared to those of a series of cyclometallated M(bph)(L^L) in reported X-ray crystal structures, and determined that bc does not influence the intramolecular geometry much differently than the bph ligand. Furthermore, the M-P bond lengths in [3a-3c] are also consistent with the strong-field ligand nature of bc in these complexes.

UV-Vis spectroscopic measurements performed on [3a-3c] revealed strong transitions in the UV region below 360 nm corresponding to π-π* transitions on the ligand. UV-Vis spectra of [3a-3c] also feature weaker intensity transitions in the visible region ranging from 400-500 nm that result from M(II)-(dppe) MLCT. DFT calculations performed on the geometry optimized X-ray crystal structure inputs of [3a-3c] confirm the nature of the observed electronic transitions. Computational studies reveal an almost entirely metal-based HOMO and dppe ligand-based LUMO with negligible contribution from the bc ligand in all frontier orbitals. Accordingly, bc chelated to the d8 transition metals in embodiments of complexes remains uninvolved in all MLCT-based visible transitions, suggesting its photophysical innocence in the UV-Vis region.

Other embodiments are directed to methods of synthesizing a Pt(II)-bpy (bpy=2,2'-bipyridine) complex chelated by bc, as Pt(II) complexes containing this class of ligands are known to exhibit phosphorescent emission. (See, e.g., C. Cornioley-Deuschel and A. von Zelewsky, *Inorg. Chem.*, 1987, 26, 3354-3358; M. Maestri, et al., *Helv. Chim. Acta*, 1988, 71, 1053-1059; and C. B. Blanton, et al., *Inorg. Chem.*, 1992, 31, 3230-3235, the disclosures of which are incorporated herein by reference.) Starting with the addition of $Li_2[bc]$ to a slurry of $Pt(bpy)Cl_2$, a large amount of emissive, insoluble product was obtained. The extremely low solubility of this product in common organic solvents hampered its characterization. In order to potentially circumvent this issue, the 4,4'-di-tert-butyl-2,2'-bipyridine (dtb-bpy) ligand may be used as an alternative, anticipating more favorable solubility properties. Using the same synthetic route yielded, again, a largely insoluble, emissive solid (FIG. 29A). After dissolving the crude product in hot 1,2-difluorobenzene and passing the solution through a Celite plug, a non-emissive solid was left on the Celite; a yellow solid that emitted blue-green under UV excitation (364 nm) remained after all volatiles were removed in vacuo. Surprisingly, $^1H$ NMR spectroscopic data suggests that the isolated product consists of a mixture of two species [4a/4b] with a bc ligand chelated to the Pt(II) center in both $\kappa^2$-C,C-bound [4a] and $\kappa^2$-B,C-bound modes [4b] (FIG. 29). The $\kappa^2$-C,C-bound species [4a], derived from the symmetric binding of the bc ligand, is consistent with the presence of three resonances of equal integration in the aromatic region (dtb-bpy ligand) of the $^1H$ NMR spectrum (FIG. 29B, label A). The six remaining resonances in the aromatic region (FIG. 29B, label B) of the $^1H$ NMR spectrum are consistent with an asymmetric $\kappa^2$-B,C-bound bc species [4b] (vide infra). From the relative integration of these two sets of resonances, we estimate that the produced mixture contained a ratio of 1.4:1.0 of [4a] to [4b]. Repeated attempts to optimize this reaction produced the same mixture in varying ratios of [4a] and [4b]. Attempts to drive the formation of one isomer from the mixture of isomers while heating under forcing conditions produced no observable change in both $^1H$ and $^{11}B$ NMR spectra.

A mixture of [4a] and [4b] was dissolved in hot 2-MeTHF and allowed to cool to room temperature, yielding single crystals of 4a (FIG. 29C). The molecule adopts a minimally distorted square planar geometry with the C—Pt—$N_{trans}$ angles at 174.2(7)° and 173.0(8)°. The bulky bc ligand forces the molecule to pack "head-to-tail" with Pt(II) Pt(II) distances ranging between 5.87(0) Å and 5.52(0) Å, which far exceed the reported 3.15-3.76 Å expected for intermolecular Pt(II)•••Pt(II) interactions.

Given that the bc framework according to embodiments is amenable to substitution, functionalizing this scaffold with alkyl groups may be used to increase the solubility of the resulting Pt(II) complexes, ultimately allowing for the better characterization of these emissive species. We therefore installed ethyl groups at the B(9) and B(12) positions of the parent 9,12-B-diiodo-o-carborane [5] using Kumada cross-coupling conditions producing bis(alkylated) species [6] (FIG. 30A). Compound [6] was then subjected to Cu-mediated oxidative coupling conditions, ultimately producing the tetralkylated-bc [7] in 50% isolated yield (FIG. 30A). (See, e.g., D. E. Harwell, et al., *J. Am. Chem. Soc.*, 1996, 118, 2679-2685, the disclosure of which is incorporated herein by reference.) Compound [7] was dilithiated and added to $Pt(dtb-bpy)Cl_2$ in a similar manner as with 2 (FIG. 30A). Surprisingly, after the reaction mixture was stirred for a day at 60° C., predominantly a $\kappa^2$-B,C-bound isomer [8] was observed by and 2D $^{13}C$-$^1H$ HSQC NMR spectroscopy (>80%). Purification of the resulting mixture further afforded pure $\kappa^2$-B,C-bound species as a pale orange solid, which exhibits blue-green emission in the solid state and, as hypothesized, is extremely soluble in the majority of common organic solvents. (See, e.g., A. Herzog, et al., *Chem.-Eur. J.*, 1999, 5, 1212-1217, the disclosure of which is incorporated by reference.)

Crystals of [8] suitable for X-ray analysis were grown by slow evaporation of diethyl ether over the course of one week. The diffraction study confirmed the presence of the asymmetric isomer with one Pt—C(1) bond and one Pt—B (4) bond (FIG. 30A). At 2.07(3) Å, the B(4)-Pt bond is slightly longer than the 2.03(6) Å C—Pt bond. Furthermore, the greater trans influence of the carborane-based boryl moiety can be seen in the elongation of the Pt—N bond lengths: the Pt—N(1) bond is 2.17(5) Å, whereas the Pt—N (2) bond is only 2.05(3) Å. (For selected examples of molecules featuring carborane based B-M bonds, see: A. M. Spokoyny, et al., *J Am. Chem. Soc.*, 2009, 131, 9482-9483; Z.-J. Yao, et al., *J. Am. Chem. Soc.*, 2014, 136, 2825-2832; N. Fey, et al., *Organometallics*, 2012, 31, 2907-2913; M. E. El-Zaria, et al., *Inorg. Chem.*, 2011, 50, 4149-4161; and B. J. Eleazer, et al., *Organometallics*, 2016, 35, 106-112, the disclosures of which are incorporated herein by reference.) As a result of the asymmetric binding of the bc-based ligand in [8], one ethyl group is rotated about 30° out of the plane created by C—Pt—B(4), whereas the other 3 ethyl groups sit in the square plane (FIG. 30C). Although not to be bound by theory, this protruding ethyl group forces the dtb-bpy out of the square plane, causing the molecule to adopt a slightly distorted square planar structure; however, bond angles of 176.5(5°) for C—Pt—N(2) and 168.8(2°) for B(4)-Pt—N(1) are well within the range of corresponding angles in previously reported 4-coordinate Pt(bph)(N^N) compounds.

Importantly, the intermolecular Pt(II) Pt(II) distances were augmented even more in the solid-state than in [4a] through the introduction of ethyl groups, yielding Pt(II)•••Pt (II) distances of 5.891 Å (when ethyl groups face away from each other) and 7.979 Å (when ethyl groups point towards each other), effectively preventing any potential intermolecular Pt(II)•••Pt(II) interactions (FIG. 30C). Furthermore, the solid-state packing adopts a "head-to-tail" arrangement such that dtb-bpy lies above and below the bc-based ligand in the crystal lattice, eliminating the potential for any π-π it stacking interactions, which have also been reported to result in deleterious non-radiative emission quenching. (See, e.g., S.-Y. Chang, et al., *Inorg. Chem.*, 2006, 45, 137-146; and K. E. Dungey, et al., *Inorg. Chem.*, 2000, 39, 5192-5196, the disclosures of which are incorporated herein by reference.)

Figure 31B:
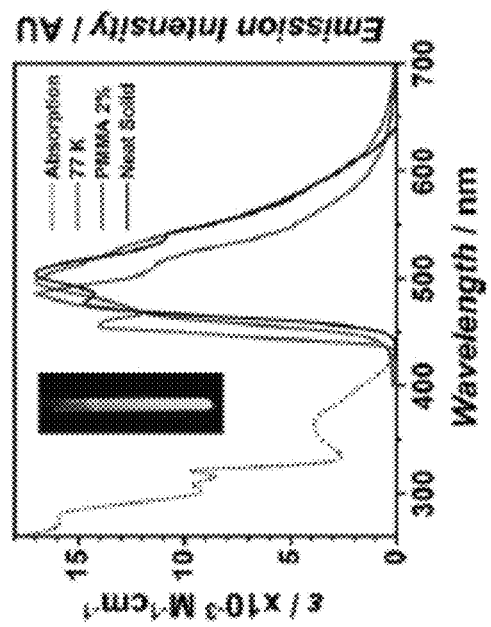
FIGS. 31A & 31B illustrate: A) cyclic voltammogram of [8] versus Fc/Fc+ in MeCN with a glassy carbon working electrode, scan rate ¼ 0.1 V s$^{-1}$; and B) UV-Vis absorption spectrum in CH$_2$Cl$^2$ (dotted line) and emission spectra of [8] in 2-MeTHF at 77 K, 2 wt % PMMA film, and neat solid, lexc ¼ 380 nm; and inset: picture of [8] in 2-MeTHF at 77 K (lexc ¼ 365 nm), in accordance with embodiments of the invention.
Figure 31A:
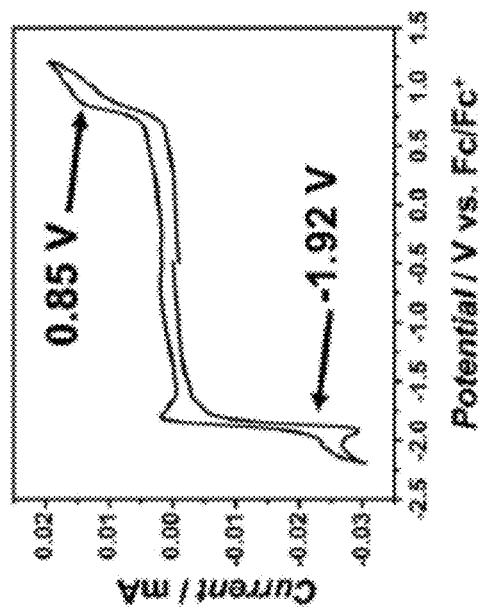

Cyclic voltammetry (CV) of [8] reveals a reversible, one-electron reduction ($E_{1/2}^{Red}$=−1.92 V) and an irreversible one-electron oxidation ($E_{1/2}^{Ox}$=0.85 V), as shown in Table 1 (below) and FIG. 31A. This electrochemical behavior is consistent with other square planar Pt(II) species undergoing a reversible ligand-centered reduction and irreversible metal-centered oxidation. Further, DFT calculations support these data (vide infra).

TABLE 1

Electrochemical Data for [8] and Related Compounds

| Compound | $E_{1/2}^{Red}$ | $E_{1/2}^{Ox}$ | Solvent | Reference |
|---|---|---|---|---|
| [8] | $-1.92^c$ | $0.85^d$ | MeCN | Current disclosure |
| Pt(bph)(bpy)[b] | $-1.87^c$ | $-0.33^d$ | MeCN | C. Cornioley-Deuschel and A. von Zelewsky, *Inorg. Chem.*, 1987, 26, 3354-3358, incorporated herein by reference. |
| Pt(bph)(en)[b] | $-2.13^c$ | $0.25^d$ | $CH_2Cl_2$ | C. B. Blanton, et al., *Inorg. Chem.*, 1992, 31, 3230-3235, incorporated herein by reference. |

Though electrochemical characterization for heteroleptic Pt(II) complexes bound by a dianionic bidentate ligand and neutral bidentate ligands are scarce, Table 1 presents redox potentials for two such examples, Pt(bph)(bpy) and Pt(bph)(en) (where en=1,2-ethylenediamine). (See, e.g., N. G. Connelly & W. E. Geiger, *Chem. Rev.*, 1996, 96, 877-910, the disclosure of which is incorporated by reference.) The reduction potential for [8] is similar to the other two compounds (Table 1, Column 2); however, the oxidation potential of [8] is significantly greater (Table 1, Column 3). This is consistent with the strong field ligand character of the bc-based framework according to embodiments, which should make it more difficult to remove an electron from the Pt(II) HOMO level in [8].

Similar to [4a/4b], it is observed that [8] emits an intense blue-green color upon irradiation with a table-top UV lamp at 364 nm at room temperature. Given the improved solubility properties of [8] according to embodiments, it is possible to carry out a detailed series of photophysical measurements in order to ascertain the efficiency and nature of this luminescent behavior (FIG. 31 and Table 2). The UV-Vis and phosphorescent emission spectra for [8] are presented in FIG. 32 with corresponding data in Table 2. The absorption spectrum reveals strong transitions in the UV region (≤330 nm) that arise from π-π* transitions on the dtb-bpy ligands in accordance with embodiments. The broad, lower intensity band from 340-420 nm can be assigned to both singlet and triplet metal-to-ligand charge transfers ($^1$MLCT and $^3$MLCT). Compound [8] is non-emissive in solution at room temperature, suggesting emission might be thermally quenched through interaction with solvent molecules. However, at 77 K in 2-MeTHF, bright blue phosphorescence is observed (λmax=485 nm, τ=11.4 µs). The well-defined vibrational features suggest ligand-centered emission resulting from an MLCT.

TABLE 2

Photophysical Data of [8] from Solution-based and Solid-state Measurements

| Medium | Em. λmax (nm) | $\phi^c$ | $\tau^d$ (µs) | $kr^f$ ($10^4$ s$^{-1}$) | $knr^f$ ($10^4$ s$^{-1}$) |
|---|---|---|---|---|---|
| 77 K | 456, 486, 514 | — | 11.4 | — | — |
| PMMA film | 497 | 0.07 | $4.24^e$ | 1.67 | 22.1 |
| Neat solid | 476, 505, 540 | 0.03 | $0.94^e$ | 3.20 | 103.1 |

Similarly, the neat solid [8] also exhibits an emission profile with a resolved vibronic fine structure, further suggesting the ligand-centered emission. Compared to the emission profile from the neat solid, emission from the solution at 77 K is hypsochromically shifted by roughly 20 nm. This shift is expected as vibrational relaxations to a lower energy excited state will not be favorable at lower temperatures, resulting in a higher energy, blue-shifted emission observed for [8] at 77 K in 2-MeTHF. When [8] is doped in a PMMA matrix (2 wt. %), the emission profile is broadened and the peak is blue-shifted by about 8 nm versus the emission of the neat solid. The excited-state lifetime (t) for [8] increases as the environment becomes more rigid. This increase is significant, going from 0.94 µs as a neat solid, to 4.24 µs doped in PMMA, further to 11.4 µs at 77 K. This evidence suggests that decreasing vibrational motion through a more rigid and ordered surrounding environment in accordance with embodiments can preserve the excited state, possibly by minimizing the energy loss via non-radiative relaxation pathways.

From the measured excited state lifetimes and quantum yields for [8] doped in the PMMA matrix and neat solid in accordance with embodiments, the radiative rate constant (kr) and non-radiative rate constant (knr) could be calculated (Table 2). Though $k_r$ for the doped PMMA film is half that of the neat solid, $k_{nr}$ for the doped PMMA film decreased by about a factor of 5, which supports the trend seen for measured τ values (vide supra). Additionally, the doped PMMA film according to embodiments exhibits a quantum yield (φ) more than twice that of the neat solid, as well as a lifetime that is about 4.5 times greater. Based on these data, it is likely that the PMMA film decreases access to a non-radiative decay pathway through its behavior as a rigid matrix.

Figure 32:
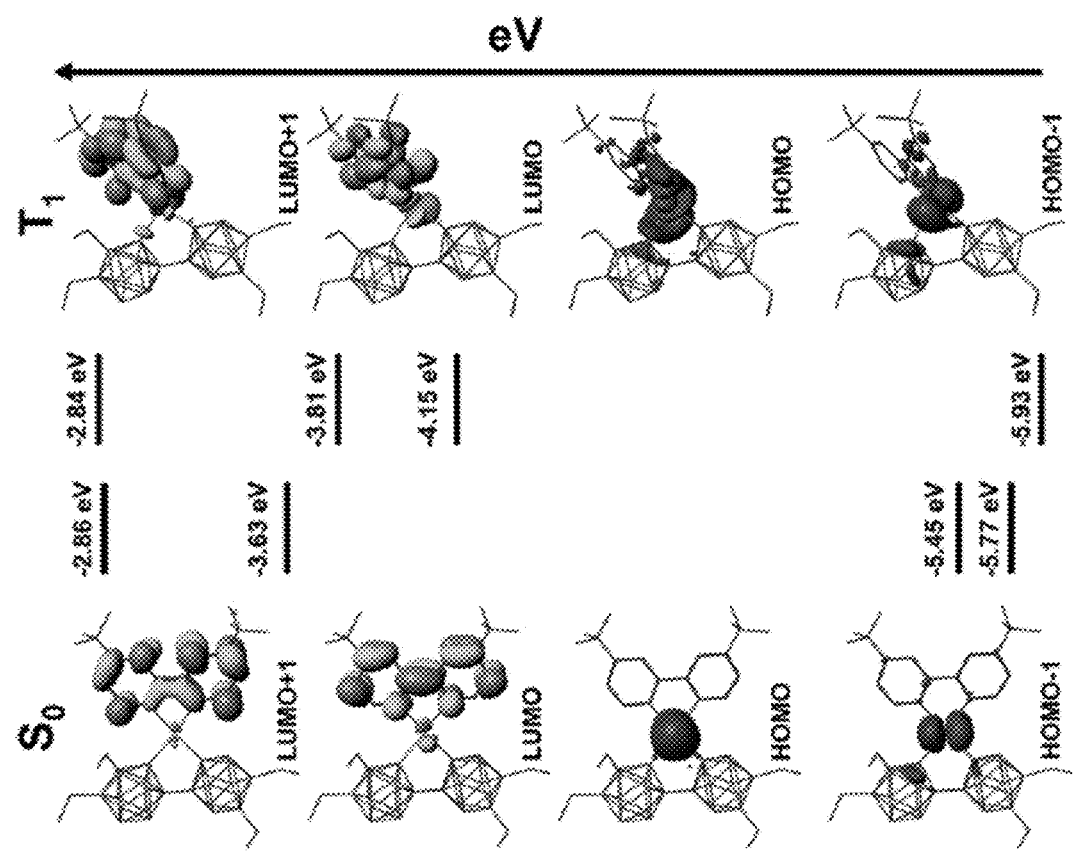
FIG. 32 illustrates frontier orbitals of [8] based on optimized geometries of S$_0$ and T$_1$ states (BP86-D3, TZP), in accordance with embodiments of the invention.

The photophysical properties of [8] in accordance with embodiments, a DFT computational study was performed at the BP86-D3 level using the TZP basis set (FIG. 32). The optimized geometry of the singlet state displays a slightly distorted square planar structure, which is in agreement with the obtained single crystal X-ray structure. The frontier orbital diagram indicates a HOMO and HOMO-1 almost completely localized on the Pt(II) with negligible contribution from the bc fragment. Both the LUMO and LUMO+1 are isolated on dtb-bpy, which corroborates the observed ligand-centered phosphorescence of [8] without observed contribution from the bc fragment. The optimized geometry of the triplet state, however, reveals an almost tetrahedral structure that is extremely distorted from the favorable square planar geometry seen in the ground state (FIG. 32). In the excited state, the complex twists via a non-radiative decay pathway, resulting in a large value for $k_{nr}$. This observation supports the decrease in $k_{nr}$ from the pure solid to the PMMA matrix: as the rigidity of the environment increases, the geometry of the molecule will be more difficult to distort. Accordingly, embodiments of future molecular clusters may incorporate a large degree of steric bulk to minimize this excited state distortion and thereby improve phosphorescence efficiency in these compounds.

In general, phosphorescent blue OLEDs suffer from short lifetimes (~600 hours) relative to their red and green counterparts (106 hours). Several groups have previously investigated the degradation of blue OLEDs and found that the decomposition of the phosphorescent dopant molecules occurs during regular use, greatly inhibiting the overall lifetime and efficiency of the device. (See, e.g., Y. Zhang, S. Lee and S. R. Forrest, *Nat. Commun.*, 2014, 5, 1-7; S. Scholz, et al., *Proc. SPIE*, 2008, 69991B; V. Sivasubramaniam, et al., *J. Fluorine Chem.*, 2009, 130, 640-649; I. R. de Moraes, et al., *Org. Electron.*, 2011, 12, 341-347; and R. Seifert et al., *Org. Electron.*, 2013, 14, 115-123, the disclosures of which are incorporated herein by reference.) Thermogravimetric analysis of [8] suggests the bc ligand framework remains intact upon heating to 500° C. Accordingly, chelating boron cluster scaffolds according to embodiments may be used to ameliorate previously described stability issues in OLED devices.

In conclusion, compounds and methods for producing 1,1'-bis(-o-carborane) as a dianionic ligand (bc) in group 10 metal complexes are provided. From the synthesis and characterization of model complexes, it has been discovered that unlike the structurally reminiscent biphenyl ligand, (bc) displays a unique photophysical innocence and remains uninvolved in relevant photophysical transitions when bound to the group 10 transition metals. Furthermore, since bc introduces sufficient steric bulk above and below the square plane of the metal center, it effectively shuts down undesired intermolecular interactions in the solid-state. For Pt(II) complexes featuring phosphorescent emission properties, this unique ligand design aspect allows for the removal of any possible Pt(II)•••Pt(II) interactions, which commonly lead to luminescence quenching. Organomimetic properties of carboranes in general, and bc in particular, enable embodiments to rationally tune the processability of a blue phosphorescent emitting Pt(II) species. In other embodiments, the substitution of carborane-based ligands with bulkier functional groups can be used to minimize the excited state distortion. Some embodiments are directed to transition metal complex ligands comprising a 1,1'-bis(o-carborane) consisting of $[(C_2H_{10}B_{10})^-]_2$.

Other embodiments are directed to transition metal complex ligands comprising a substituted 1, 1'-bis(o-carborane) consisting of $(C_2H_9B_{10}R_2)_2$, where R is selected from the group consisting of: alkane, alene, alkyne, alcohol, aryl, ether, halide, aldehyde, carboxylic acid, ester, amide, amine, nitrile, isocyanate, thiol and arene.

In still other embodiments the ligand is coordinated with a transition metal (M) at the CH group, and wherein the transition metal is selected from the group consisting of: Sc, Ti, V, Cr, Mn, Fe, Co, Ni, Cu, Zn, Ru, Rh, Pd, Ag, Re, Os, Ir, Pt and Au. In yet other embodiments the ligand is a bidentate ligand containing two N-M bonds. In some such embodiments the ligand is a monoanionic ligand containing one or either a C-M or B-M bond. In other such embodiments the monoanionic ligand is an acetylacetone. Still yet other embodiments are directed to transition metal complex carboranyl-aryl ligands consisting of $C_2H_8B_{10}R_2X$, where R is selected from the group consisting of: alkane, alene, alkyne, alcohol, aryl, ether, halide, aldehyde, carboxylic acid, ester, amide, amine, nitrile, isocyanate, thiol and arene; and where X is a substituted or unsubstituted aryl. In some such embodiments the aryl is a pyridine. These embodiments allow for a new avenue in designing luminescent materials with improved properties incorporating robust and photophysically innocent multidentate ligand platforms.

Zwitterionic Iridium (III) Complexes Featuring Nido-Carborane-Based Ligands

Various embodiments are directed to a new class of phosphorescent zwitterionic bis(heteroleptic) Ir(III) compounds containing pyridyl ligands with weakly coordinating nido-carboranyl substituents. Treatment of phenylpyridine-based Ir(III) precursors with C-substituted ortho-carboranylpyridines in 2-ethoxyethanol in accordance with embodiments results in a facile carborane deboronation and the formation of robust and highly luminescent metal complexes. The resulting nidocarboranyl fragments in accordance with embodiments associate with the cationic Ir(III) center through primarily electrostatic interactions. These compounds phosphoresce at blue wavelengths (450-470 nm) both in a poly(methylmethacrylate) (PMMA) matrix and in solution at 77 K. These complexes display structural stability at temperatures beyond 300° C. and quantum yields greater than 40%. Importantly, the observed quantum yields correspond to a dramatic 10-fold enhancement over the previously reported Ir(III) congeners featuring carboranyl-containing ligands in which the boron cluster is covalently attached to the metal. Embodiments are further directed to the use of a ligand framework containing a weakly coordinating anionic component to provide a new avenue for designing efficient Ir(III)-based phosphorescent emitters.

The past two decades have seen a surge in the development of fluorescent and phosphorescent emitters with ever-increasing efficiency and color purity. (For selected examples of blue OLEDs incorporating fluorescent emitters, see: Uoyama, H., et al., Adachi, C. *Nature* 2012, 492, 234; Méhes, G., et al., *Angew. Chem., Int. Ed.* 2012, 51, 11311; Lee, S. Y., et al., *Angew. Chem., Int. Ed.* 2014, 53, 6402; Kawasumi, K., et al., *J. Am. Chem. Soc.* 2015, 137, 11908; Zhang, Q., et al., *Nat. Photonics* 2014, 8, 326; Feuillastre, S., et al., *J. Am Chem. Soc.* 2016, 138, 3990; Li, K., et al., *Chem. Commun.* 2011, 47, 9075; and for selected examples of phosphorescent emitters for OLED applications, see: Yersin, H., Ed. *Highly Efficient OLEDs with Phosphorescent Materials*, Wiley-VCH: Weinheim, 2008; Chou, P.-T., et al., *Chem. Soc. Rev.* 2010, 39, 638; Lamansky, S., et al., *J. Am. Chem. Soc.* 2001, 123, 4304; Lamansky, S., et al., *Inorg. Chem.* 2001, 40, 1704; Tamayo, A. B., et al., *J Am. Chem. Soc.* 2003, 125, 7377; Sajoto, T., et al., *Inorg. Chem.* 2005, 44, 7992; Chang, C.-F., et al., *Angew. Chem., Int. Ed.* 2008, 47, 4542; Tsuboyama, A., et al., *J. Am. Chem. Soc.* 2003, 125, 12971; Maity, A., et al., *Inorg. Chem.* 2016, 55, 2299; Fleetham, T., et al., *J. Org. Electron.* 2012, 13, 1430; Turner, E., et al., *J. Inorg. Chem.* 2013, 52, 7344; Saris, P. J. G. & Thompson, M. E. *Org. Lett.* 2016, 18, 3960; Kui, S. C. F., et al., *Chem. Commun.* 2013, 49, 1497; Hudson, Z. M., et al., *Adv. Funct. Mater.* 2010, 20, 3426; and Ko, S.-B., et al., *Dalton Trans.* 2015, 44, 8433, the disclosures of each of which are incorporated herein by reference.) In particular, the continued development of efficient Ir(III)-based phosphorescent compounds, currently targeted for their potential use in organic light-emitting diodes (OLEDs) represents a vital component of this research. (See, e.g., Tremblay, J.-F. *Chemical & Engineering News*, Jul. 11, 2016; pp 30-34, the disclosure of which is incorporated herein by reference.) Previous work has shown that ligand choice is crucial for optimizing luminescence efficiencies, emission wavelengths, and emitter stability in these devices. Still, despite the significant progress that has been made so far, efficient and long-lasting blue phosphorescent emitters have remained largely elusive. (See, e.g., Zhang, Y., et al., *Nat. Commun.* 2014, 5, 5008; Fleetham, T., et al., *J. Adv. Mater.* 2014, 26, 7116; Lee, J., et al., *Nat. Mater.* 2015, 15, 92; Fleetham, T. B., et al., *J. Chem. Mater.* 2016, 28, 3276; Giebink, N. C., et al., *J. Appl. Phys.* 2008, 103, 044509; Seifert, R., et al., *Org. Electron.* 2013, 14, 115; and Holmes, R. J., et al., *Appl. Phys. Lett.* 2003, 82, 2422, the disclosures of which are incorporated herein by reference.)

Figure 33B:
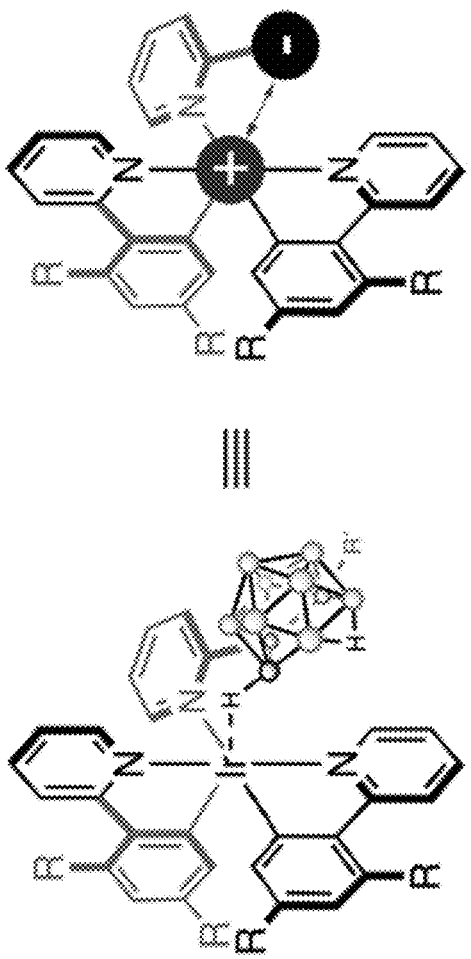
FIGS. 33A & 33B illustrate a design approach for luminescent metal complexes in which a weakly coordinating ligand is employed, in accordance with embodiments of the invention.
Figure 33A:
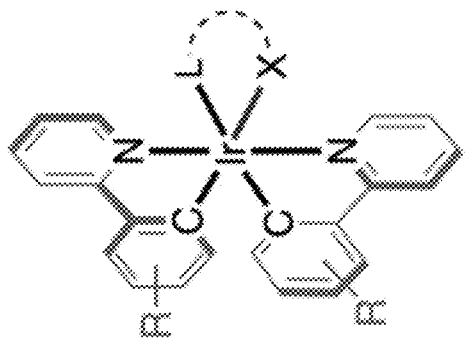

The prevailing design principle for Ir(III)-based phosphorescent systems leverages covalently bound strong- and weak-field (chelating) donor ligands to deliver the desired properties of the luminescent species (FIG. 33A). This strategy would seem intuitive, given the well-recognized nonradiative decay pathways of excited-state Ir(III) species via ligand labilization/loss or excited-state distortions. Researchers have attempted to address this issue by using cyclometalated N-heterocyclic carbenes (NHCs) as L-type ligands to increase the energy barrier for nonradiative thermal deactivation. 2f-h In contrast to this convention, here embodiments introduce a fundamentally new approach whereby strongly blue emitting and highly stable phosphorescent Ir(III) compounds are generated by employing weakly coordinating/noncovalently bound ligands derived from robust carborane clusters.

Carboranes, a class of icosahedral boron-based clusters recognized for their high stability and unique electronic properties, are used in embodiments as ligand components of emissive Pt(II)- and Ir(III)-based molecules toward implementation as dopants in OLEDs and as fluorophores in cell imaging. (Spokoyny, A. M.; et al., *Nat. Chem.* 2011, 3, 590; Grimes, R. N. *Dalton Trans.* 2015, 44, 5939; Tsang, M. Y., et al., *Inorg. Chem.* 2014, 53, 9284; Gabel, D. *Pure Appl. Chem.* 2015, 87, 173; Teixidor, F., et al., *A. Chem.-Eur. J.* 2015, 21, 12778; Kennedy, R. D., et al., *Chem. Mater.* 2013, 25, 3539; and Jiang, W., et al., *Inorg. Chem.* 2010, 49, 3252, the disclosures of which are incorporated herein by reference.) The distinctive electronic influence of carboranes, which behave as electron-withdrawing groups if bound through carbon and electron-releasing groups if bound through boron, provide a unique opportunity for isosteric electronic variation. Since complete control over vertex functionalization of carboranes is still a largely unsolved problem, researchers in the field of OLED development have employed more easily accessible C-functionalized carborane scaffolds to perturb the electronic manifold of metal-based phosphors. However, despite the electronic extremes accessible through carborane as a ligand, very few phosphorescent metal-based molecules have been developed that contain carborane directly bound to a metal center or that contain deboronated (e.g., nido) analogues; rather, carboranyl substituents are most commonly installed on the periphery of the ligand scaffolds where direct interaction of the metal and the carborane is not possible. (See, e.g., Bae, H. J., et al., *Dalton Trans.* 2013, 42, 8549; Kim, T., et al., *Organometallics* 2015, 34, 3455; Prokhorov, A. M., et al., *Chem. Commun.* 2011, 47, 7713; Prokhorov, A. M., et al., *J. Am. Chem. Soc.* 2014, 136, 9637; Shi, C., et al., *Chem.-Eur. J.* 2014, 20, 16550; Visbal, R., et al., *J. Am. Chem. Soc.* 2013, 135, 4712; Visbal, R., et al., *Dalton Trans.* 2014, 43, 328; Czerwieniec, R., et al., *Inorg. Chem.* 2010, 49, 3764; Crespo, O., et al., *Inorg. Chem.* 2003, 42, 2061; Crespo, O., et al., *Chem.-Eur. J.* 2014, 20, 3120; Shi, C., et al., *Chem. Commun.* 2013, 49, 4746; Kim, T., et al., *Inorg. Chem.* 2013, 52, 160; Shi, C., et al., *Angew. Chem., Int. Ed.* 2013, 52, 13434; Lee, Y. H., et al., *J. Am. Chem. Soc.* 2015, 137, 8018; Zhu, L., et al., *Chem.-Eur. J.* 2015, 21, 4721; Lee, Y. H., et al., *Chem.-Eur. J.* 2015, 21, 2052; Park, J., et al. *Dalton Trans.* 2016, 45, 5667; and Kim, Y. et al., *Inorg. Chem.* 2016, 55, 909, the disclosures of which are incorporated herein by reference.) As part of our ongoing studies of the organometallic chemistry of carboranes, we considered that deboronated carboranes, which are formally anionic, might be successfully employed as weakly coordinating/noncovalent ligands in building zwitterionic Ir(III)-based phosphorescent molecules.

We began our studies in pursuit of generating bis(heteroleptic) Ir(III) phosphors with a nido-carboranylpyridine ligand. A common tactic employed in designing metal-based phosphorescent molecules involves the installation of strong field ligands such as carbanions or N-heterocyclic carbenes to stabilize metal-based orbitals; it is also known, however, that the filled d-orbitals may also be stabilized if electron density is removed from the metal center, either as a consequence of electron-withdrawing ligands or if the metal center bears a formal positive charge. (See, e.g., Li, J., et al., *Polyhedron* 2004, 23, 419, the disclosure of which is incorporated herein by reference.) In both cases, the HOMO-LUMO gaps are widened, opening the possibility for blue-shifted, radiative excited-state decay. In accordance with embodiments, the dominant steric profile of the nido-carboranyl scaffold amidst an otherwise rigid octahedral metal environment minimizes metal-cage interactions such that the metal holds a greater proportion of the formal positive charge. In addition, the diffuse nature of the negatively charged nido-carboranyl substituent gives poor directionality for interaction with the metal, thereby maintaining the desired ionic/noncovalent interaction by restricting electron sharing with the Ir(III) center.

Embodiments of ligand [1a] were synthesized. The intermediate carboranylpyridine (FIG. 34A, Compound 1b) has been synthesized previously: one reported method requires Sonagashira coupling of 2-bromopyridine with dimethylethynyl carbinol, followed by condensation of 2-ethynylpyridine with decaborane, affording the desired product in ~28% yield (22% yield over two steps). (See, e.g., Ames, D. E., et al., *Synthesis* 1981, 1981, 364; and Coult, F., et al., *J. Organomet. Chem.* 1993, 462, 19, the disclosures of which are incorporated herein by reference.) More recently, Valliant and co-workers reported an alternative synthesis of [1b] from decaborane which requires the use of 10 mol % of a Ag(I)-based catalyst. (See, e.g., El-Zaria, M. E., et al., *Angew. Chem., Int. Ed.* 2014, 53, 5156, the disclosure of which is incorporated herein by reference.) Since C-metalated carboranyls (e.g., 1-Li-o-$C_2B_{10}H_{11}$) can easily be generated, such species are employed in embodiments using SNAr-type reactivity with Z-fluoropyridine, a substrate documented to undergo substitution with a range of O-, N-, S-, and C-based nucleophiles. (See, e.g., Fort, Y. & Forgione, P. *2-Fluoropyridine. E-Eros Encyclopedia of Reagents for Organic Synthesis;* 2007; and Cherng, Y.-J. *Tetrahedron* 2002, 58, 4931, the disclosures of which are incorporated herein by reference.) Though few examples of electron-deficient arenes undergoing nucleophilic substitution by metal carboranyl compounds exist, none of which include heterocyclic arenes, it was found that treatment of commercially available o-carborane with n-BuLi followed by addition of 2-fluoropyridine in accordance with embodiments affords the desired ligand in a single step in 55% yield. Importantly, this protocol in accordance with embodiments circumvents the use of the toxic decaborane precursor and metal-based catalysis. Subsequent deprotonation of [1b] followed by treatment with methyl iodide affords [1a] in good yield.

Treatment of Ir($^{F2}$ppy)$_2$(acac) with [1a] under either microwave conditions or in an oil bath in 2-ethoxyethanol (EtOEtOH) for 3 h (FIG. 34B) in accordance with embodiments results in the formation of a golden yellow solution which emits blue under ultraviolet (UV) excitation (365 nm) at 77 K. Notably, this reaction is significantly faster and higher yielding than those generally observed for the synthesis of Ir(III) bis(heteroleptic) cyclometallates. $^{11}$B NMR spectroscopy revealed that the resulting product contained a deboronated carborane, which was identified from the diagnostic resonances in the −30 to −40 ppm range.

The solvent in this reaction was then removed in vacuo, and the resulting solid was subjected to additional spectroscopic characterization. The $^1$H NMR spectrum of the sample dissolved in CDCl$_3$ showed diagnostic, upfield (~−3.5 to −4.5 ppm) chemical shifts, characteristic of a hydride on the open face of a deboronated o-carborane. Precipitation of the Ir(III) species from hexanes afforded [2a] in 73% yield after purification. X-ray diffraction analysis of single crystals of the product [2a], grown from a concentrated EtOH solution at −15° C., confirmed the presence of the nido-carboranyl group (FIG. 34C). The deboronation of o-carborane is known to proceed through treatment with metal alkoxide or hydroxide bases in alcohol solvent; embodiments therefore suggest that the nature of the reaction solvent, in addition to the precoordination of [1a] to the Ir(III) center through pyridine, aids the observed deboronation. (See, e.g., Wiesboeck, R. A. & Hawthorne, M. F. *J. Am. Chem. Soc.* 1964, 86, 1642; Hawthorne, M. F., et al., *J. Am. Chem. Soc.* 1968, 90, 862; Plešek, J., et al., *Inorg. Synth* 1984, 22, 231; Sit, M.-M., et al., *Organometallics* 2011, 30, 3449; Teixidor, F., et al., *Organomet. Chem.* 2000, 614-615, 48, the disclosures of which are incorporated herein by reference.) Indeed, heating [1a] in EtOEtOH under the reaction conditions but in the absence of Ir($^{F2}$ppy)$_2$(acac) does not result in deboronation (or any other observable decomposition products). Additionally, heating Ir($^{F2}$ppy)$_2$(acac) and [1a] in a nonprotic solvent (1,2-dimethoxyethane or acetonitrile) under otherwise identical reaction conditions results in <10% conversion to [2a].

In order to probe the effect of the nido-carboranyl ligand on the luminescent properties of Ir(III)-based compounds, several derivatives were synthesized featuring modified phenylpyridine (ppy) and carborane-based ligands. The deboronation of [1a] en route to formation of [2a] raises whether in embodiments it is necessary to protect the remaining carboranyl C—H vertex of [1b], particularly considering that C-functionalized o-carboranes containing electron-releasing substituents are generally more stable toward deboronation than the parent o-carborane were synthesized in an analogous manner to [2a] (FIG. 34B). It was found that no C—H activation is observed under the reaction conditions by using nonmethylated ligand [1b] as a precursor. (See, e.g., Zakharkin, L. I. & Kirillova, V. S. Bull. *Acad. Sci. USSR, Div. Chem. Sci.* 1975, 24, 2484; and Schaeck, J. J. & Kahl, S. B. *Inorg. Chem.* 1999, 38, 204, the disclosures of which are incorporated herein by reference.) X-ray crystallographic analysis of single crystals of [2b-2d] confirmed the presence of the nido-carboranyl ligand fragments as in [2a]. As expected, the structures of [2a-2d] are closely related, as seen from the superimposed wireframe plots shown in FIG. 34D. Embodiments of compound [2b], which contains a proton at the 2-position of the carborane cage, emits blue both in the solid state and in solution at 77 K under hand-held UV light. Embodiments of compounds [2c] and [2d], which contain unfunctionalized ppy ligands, emit blue-green in solution at 77 K under UV excitation (vide infra). Embodiments of [2d] also exhibits bright green emission in the solid state.

Embodiments of ligands, e.g., [2a-2d] are the first examples of luminescent iridium(III) compounds that employ a cyclometalated ligand which associates with the metal through weakly coordinating/noncovalent interactions, despite a large number of cationic, luminescent iridium complexes having been reported. Many of these cationic Ir(III) species exist as formal salts, while comparatively few zwitterionic species, which also contain formally cationic Ir(III) centers, have been documented. (See, e.g., Ladouceur, S. & Zysman-Colman, E. *Eur. J. Inorg. Chem.* 2013, 2013, 2985; Darmawan, N., et al., *J. Mater. Chem. C* 2014, 2, 2569; Byun, Y., et al., *J. Appl. Phys. Lett.* 2007, 91, 211106; Jiang, W., et al., *Inorg. Chem.* 2010, 49, 3252; and Li, J., et al., *Polyhedron* 2004, 23, 419, the disclosures of which are incorporated herein by reference.) In contrast to [2a-2d], the negatively charged component of these previously reported "inner-salt complexes" is distal to the metal center and the coordination environment around the Ir(III) center falls in line with the more traditional construct containing covalent metal-ligand bonds (FIG. 33A).

A suite of photophysical studies were carried out on embodiments [2a-2d] to evaluate the influence of the nido-carboranylpyridine ligand framework on the luminescent properties, excited state lifetime, and thermal stability of the title compounds. The absorption and emission spectra of embodiments [2a-2d] are presented in FIG. 35 with corresponding data presented in FIG. 36A. All compounds exhibit strong absorption bands from 250-330 nm attributed to the spin-allowed 1π-π* transitions ($^1$LC) on the ppy ligands. The broad, lower intensity bands that extend from 340-420 nm arise from spin-allowed $^1$MLCT and spin-forbidden $^3$MLCT transitions that are consistent with previously reported Ir(III) complexes. (See, e.g., Bae, H. J., et al., *Inorg. Chem.* 2014, 53, 128, the disclosure of which is incorporated herein by reference)

Figures 36A, 36B:
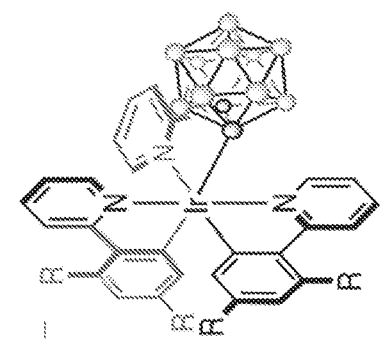
FIGS. 36A and 36B illustrate: A) a table providing: (a) UV-vis absorption spectra measured in $CH_2Cl_2$ (1×10$^{-5}$M), (b) emission maxima, quantum yields, and excited state lifetimes were measured in 2 wt % PMMA films with spectra recorded in 2-MeTHF at 77 K are marked with parentheses, (c) highest energy peaks are reported, (d) quantum yields were measured using an integrating sphere under $N_2$, (e) excited-state lifetime values in PMMA films are obtained from the weighted average of a biexponential decay, and (f) calculated for PMMA films according to the equations $k_r=\phi/\tau$ and $k_{nr}=(1-\phi)/\tau$, where $k_r$ is the radiative rate constant, $k_{nr}$ is the nonradiative rate constant, $\phi$ is the quantum yield, and $\tau$ is the excited-state lifetime, in accordance with embodiments of the invention; and B) structures of Ir(III) complexes featuring the covalently bound carboranyl ligand previously.

All embodiments of complexes are weakly emissive in fluid solutions of deaerated 2-MeTHF with quantum yields (Φ) less than 0.01 at room temperature, but become strongly luminescent at 77 K and when doped in PMMA films (FIG. 36A). This behavior has been observed with other previously reported mer-Ir(ĈN)$_3$ (ĈN=cyclometalating ligand) complexes (previously cited). Only embodiments [2b] and [2d], which do not contain CH$_3$ groups bound to the 2-position of the nido-carboranyl fragment, exhibit observable emission as neat solids. This observation could also be ascribed to aggregation in the solid state due to a lesser degree of steric bulk on the carborane to prevent such interactions. A similar observation has been made by Lee and co-workers in Ir(III)-based emitters containing C-substituted carboranes. (Lee, previously cited.)

At 298 K, the excited state lifetimes (τ) of embodiments [2a-2d] in fluid solution display multiexponential decays with nano- and microsecond components. The dynamic behavior suggests a possible equilibration between other triplet states before deactivation and is currently under further investigation. Upon cooling 2-MeTHF solutions of embodiments [2a-2d] to 77 K, becomes first-order and ranges from 5.11 μs [2c] to 6.38 μs [2d]. Low temperature emission spectra for embodiments [2a-2d] all display well-defined vibronic features consistent with emission from a ligand-centered triplet state. Introduction of the CH$_3$ group to the nido-carboranyl-pyridyl ligand has a negligible effect on the luminescence, as the E$_{0-0}$ energies and vibronic structure for embodiments [2a/2b] and [2c/2d] are nearly indistinguishable (FIG. 35A). In PMMA films at room temperature the vibronic manifold in the emission spectra for embodiments [2a-c] red-shift and broaden relative to the corresponding spectra at 77 K (FIG. 35B). In contrast, the low solubility for embodiment [2d] is evidenced in a spectrum that displays a broad, red-shifted band at 525 nm. This new feature indicates that embodiments of [2d] aggregates prior to solvent evaporation despite filtering solutions before casting the PMMA film. Indeed, Lee and co-workers have noted that substituted carboranyl components of Ir(III)-based emitters can help prevent solid-state quenching at higher concentrations. (See, e.g., Lee, Y. H., et al., *Chem.-Eur. J.* 2015, 21, 2052; Park, J., et al., *Dalton Trans.* 2016, 45, 5667; and Kim, Y., et al., *Inorg. Chem.* 2016, 55, 909, the disclosures of which are incorporated herein by reference.) The quantum yields for all four complexes drastically increase upon doping in PMMA films, ranging from 0.37 to 0.43 (FIG. 36A).

Methylation of the nido-carboranyl fragment has little effect on photophysical properties when these complexes are doped in PMMA films since φ, τ, and the emission frequencies for embodiments [2a/2b] and [2c/2d] are roughly identical. Conveniently, the carboranyl moiety can be functionalized to address solubility issues, such as in the case of embodiments [2d to 2c], without significant effect on the emission properties. This is a significant advantage of the carborane-based framework in the context of embodiments of the system.

From the excited-state lifetimes and quantum yields of embodiments [2a-2d] doped in the PMMA matrices, the radiative ($k_r$) and nonradiative ($k_{nr}$) rate constants can be deduced (FIG. 36A). The $k_r$ values observed for embodiments are between $1.1 \times 10^5$ s$^{-1}$ and $1.3 \times 10^5$ s$^{-1}$, with $k_{nr}$ values ranging from $1.6 \times 10^5$ s$^{-1}$ to $2.1 \times 10^5$ s$^{-1}$. To elucidate the effect of the nido-carboranylpyridine ligand according to embodiments, these values were compared to those of related complexes doped in PMMA films reported by Lee and co-workers, [3a] and [3b] (FIG. 36B). Though φ<0.10 for [3a] and [3b] in the PMMA films, the shorter τ values for these compounds yield $k_r$ values roughly similar to those of embodiments [2a-2d]. In contrast, the $k_{nr}$ values for embodiments [2a-2d] are more than an order of magnitude lower than those of [3a] and [3b]. The ratio of $k_r/k_{nr}$ for embodiment [2d] is ~16 times greater than that for the related compound [3b] (0.64 and 0.04, respectively). Therefore, despite the weakly coordinating nature of the carboranyl fragment to the Ir(III), embodiments [2a-2d] exhibit significantly lower values for $k_{nr}$ and hence up to a 10-fold increase in quantum yields compared to values reported for related molecules with covalent Ir(III)-carborane interactions. This newly developed electrostatic framework thus potentially offers a counterintuitive yet useful concept in engineering efficient Ir(III) emitters for OLED devices.

Figure 37B:
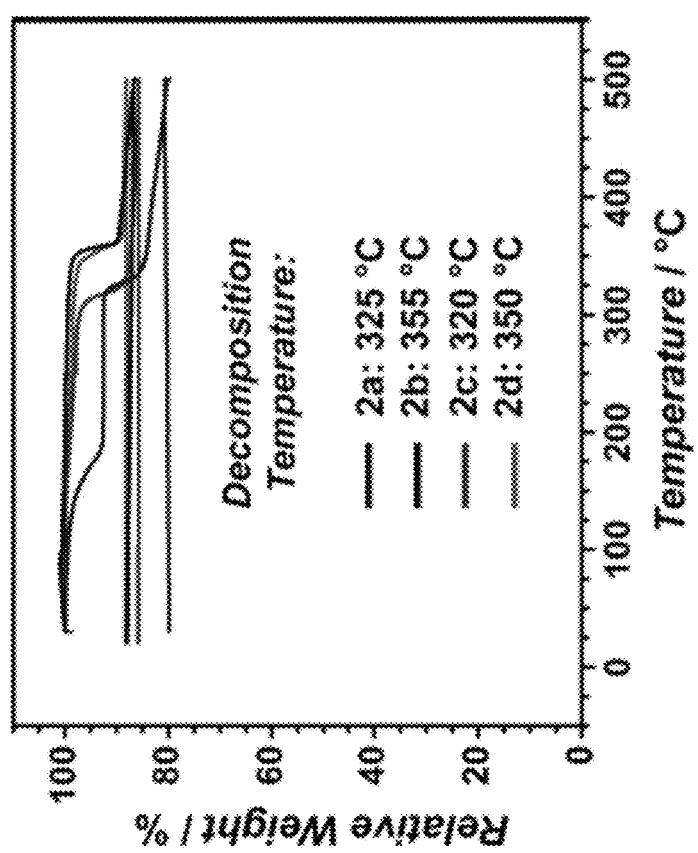
FIGS. 37A and 37B illustrate: A) stacked cyclic voltammograms of [2a-2c] with scale bar of 0.1 mA (referenced to Fc$^+$/Fc in MeCN with a glassy carbon working electrode, scan rate=0.1 V/s; B) thermogravimetric analysis (TGA) plots of [2a-2d] with corresponding temperatures of decomposition, in accordance with embodiments of the invention.
Figure 37A:
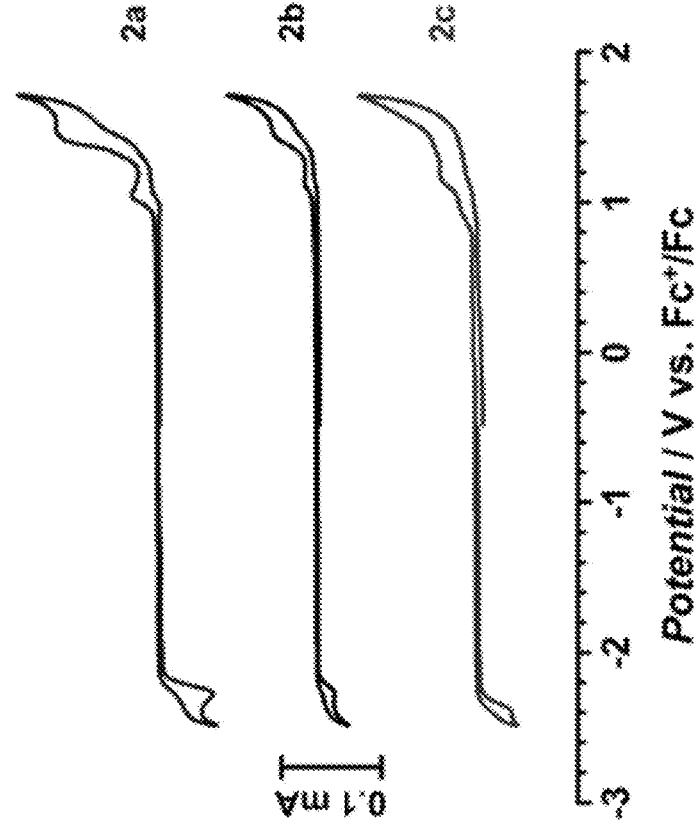

Cyclic voltammetry (CV) plots of [2a-2c] are presented in FIG. 37A with the associated data summarized in Table 3. Compared to [3a] and [3b], embodiments [2a-2c] have analogous reductive behavior as all complexes display a single, irreversible reduction wave from −2.26 V to −2.39 V versus the ferrocenium/ferrocene redox couple. Introduction of the methyl group on the nido-carboranyl ligand has negligible influence on the reduction potential, as $V^{1/2}_{Red}$ for [2a] and [2b] are 2.27 and 2.26 V, respectively. In contrast, the Ir(III) complexes bearing the nido-carboranyl ligands are up to 0.32 V more difficult to oxidize than their covalent analogues [3a and 3b] and feature two irreversible oxidation waves. The first oxidation potential ($V^{1/2}_{Ox,1}$) decreases from 1.14 V [2b] to 1.05 V [2a], likely due to the electron-releasing inductive effect of the methyl group. Furthermore, the second oxidation potential ($V^{1/2}_{Ox,2}$) is roughly the same at 1.48 V for 2a and 1.50 V for [2b]. On the basis of density functional theory (DFT) calculations (vide infra), reduction likely occurs on the ppy ligand, whereas the two unique oxidations involve removal of an electron from both the nido-carboranyl fragment and the Ir(III) center. (See, e.g., Dedeian, K., et al., *Inorg. Chem.* 2005, 44, 4445, the disclosure of which is incorporated herein by reference.)

TABLE 3

Electrochemical Properties for [2a-2c] and Related Compounds

| Compound | $V^{1/2}_{Red}$ (V) | $V^{1/2}_{Ox,1}$ (V) | $V^{1/2}_{Ox,2}$ (V) | ΔE (V) |
|---|---|---|---|---|
| 2a | −2.27 | 1.05 | 1.48 | 3.32 |
| 2b | −2.26 | 1.14 | 1.50 | 3.40 |
| 2c | −2.39 | 0.94 | 1.20 | 3.33 |

TABLE 3-continued

Electrochemical Properties for [2a-2c] and Related Compounds

| Compound | $V^{1/2}_{Red}$ (V) | $V^{1/2}_{Ox,1}$ (V) | $V^{1/2}_{Ox,2}$ (V) | ΔE (V) |
|---|---|---|---|---|
| 3a | −2.30 | 0.94 | — | 3.24 |
| 3b | −2.39 | 0.62 | — | 3.01 |

Values for 3a and 3b reported in: Bae, H. J., et al., *Dalton Trans.* 2013, 42, 8549, the disclosure of which is incorporated herein by reference.

A series of zwitterionic Ir(III)-based phosphors have been previously probed electrochemically and were shown to display shifts to more positive potentials (1.09 V-1.58 V vs Fc+/Fc) compared to typical Ir(III)-based phosphors containing a formally neutral Ir(III) center (~0.9 V vs Fc+/Fc). Cyclic voltammetry measurements of an independently synthesized deboronated analogue [4a] of embodiment [1b] were performed, which show the first oxidation wave centered at 0.57 V vs Fc$^+$/Fc. It is therefore suggested that the first oxidation is centered on the nido-carboranyl fragment (whose oxidation is pushed to more positive potentials upon association to the metal center), and the second oxidation corresponds to a metal-centered Ir(III)/(IV) couple. Despite the apparent electrostatic interaction between the carboranyl ligand and the Ir(III) center, embodiments [2a-2d] have proven to be very thermally stable. Thermogravimetric analysis (TGA) shows the onset of mass loss occurring from 320-355° C. for these compounds (FIG. 37B). Importantly, the introduction of methyl substitution on the carborane embodiments [2a] and [2c] does not significantly affect decomposition temperatures.

Figure 38A:
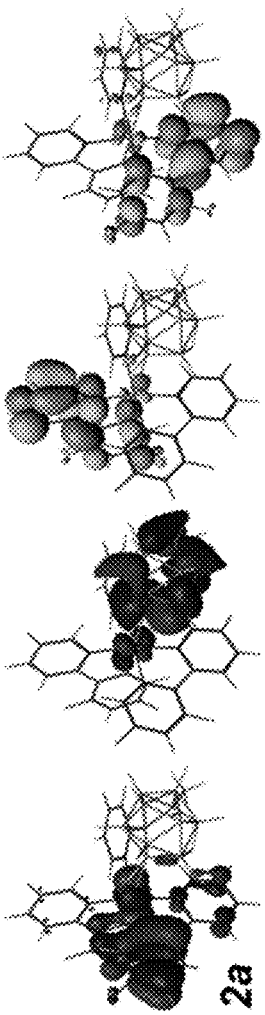
FIGS. 38A to 38C illustrate frontier orbital diagrams of: A) [2a]; B) [2c](HOMO-1, HOMO, LUMO, and LUMO+1 diagrams were calculated from the geometry-optimized singlet state; and C) AIM analysis of [2a](electron density and Laplacian density values at the bond critical point suggest primarily electrostatic interactions between the nido-carboranyl fragment and the Ir(III) center, in accordance with embodiments of the invention.
Figure 38B:
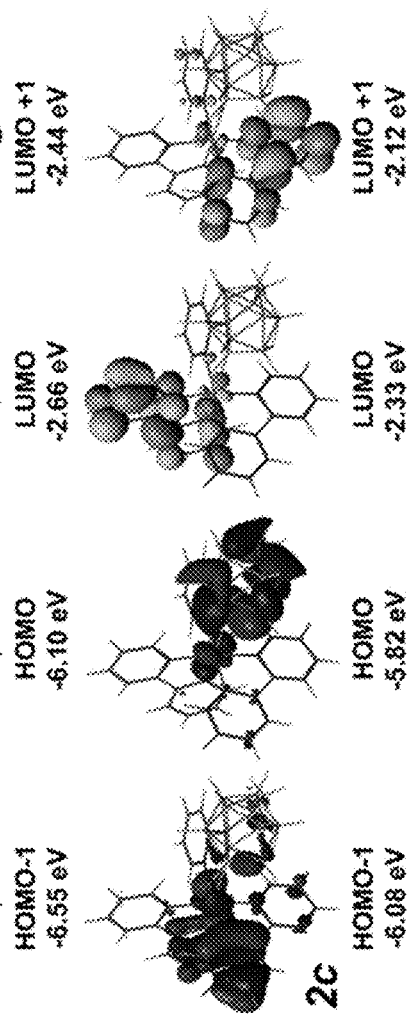

The electronic structures of embodiments [2a-2d] calculated using density functional theory (DFT) provide further insights into the observed photophysical phenomena. Ground-state geometries of embodiments [2a-2d] were optimized from the coordinates obtained from their crystallographically derived X-ray data, and subsequent single-point calculations were carried out with the B3LYP functional and TZP basis set (FIGS. 38A and 38B). The bond angles and distances of the optimized structures in accordance with embodiments compare favorably with the experimentally determined metrics based on X-ray crystallography. The calculated energies corresponding to the first triplet excited state (Ti) to singlet ground state ($S_0$) are consistent with those measured in solution at 77 K. As expected, the HOMO levels for embodiments [2a] and [2b], which contain fluorinated ppy ligands, are located slightly lower in energy than those for embodiments [2c] and [2d]; similarly, the LUMO levels for embodiments [2a] and [2b] are slightly higher in energy than those for embodiments [2c] and [2d]. Finally, the experimentally observed emission data are consistent with the energy levels calculated for embodiments [2a-2d]. Analysis of the solid-state structure of embodiment [2a], which will be treated in the following discussion as a representative embodiment given the structural similarity of embodiments [2a-2d] (see FIG. 34D), displays a meridional (mer) arrangement of the pyridine ligands. A long Ir•••B(11) distance of 2.528(6) Å is found, which is longer than the sum of the covalent radii of the two atoms (2.07 Å) based on literature values, suggesting no appreciable covalent metal-ligand bonding interaction. (See, e.g., Pyykkö, P. & Atsumi, M. *Chem.-Eur. J.* 2009, 15, 186, the disclosure of which is incorporated herein by reference.) These distances are also systematically longer by ~0.3 Å than those in Ir(III)-based complexes in which B—H agostic interactions are normally invoked. (Stevens, C. J., et al., *Chem.-Eur. J.* 2011, 17, 3011; Tang, C. Y., et al., *J. Am. Chem. Soc.* 2010, 132, 10578;

El-Hellani, A., et al., *Organometallics* 2013, 32, 6887; Rifat, A., et al., *Organometallics* 2002, 21, 2856; Crowther, D. J., et al., *Organometallics* 1993, 12, 2897; Nunez, R., et al., *Appl. Organomet. Chem.* 2003, 17, 509; and Mhinzi, G. S., et al., *J. Chem. Soc., Dalton Trans.* 1991, 2769, the disclosures of which are incorporated herein by reference.) In addition, the Ir—H(1A) bond distance (1.935(9) Å) also well exceeds the sum of the covalent radii (1.54 Å) of Ir(III) and H atoms. The B(11)-H(1A) bond distance of 1.007(2) Å is nearly identical to those of the other terminal B—H bonds on the boron cluster scaffold in [2a], suggesting that this bond (in addition to the analogous bonds in [2b-2d]) is not strongly activated by the Ir(III) center.

Infrared (IR) spectroscopy suggests only weak coordination of the bridging hydride to the metal center: solid-state IR spectra reveal broad resonances in the expected B—H region ~2500 cm$^{-1}$, which correspond to the cage B—H stretches, with some fine structure observed. An additional but very weak resonance is observed for embodiments [2a-2d], ~2100 cm$^{-1}$, which is suggestive of a weak Ir-μ-H—B stretching band. Such M-μ-H—B interactions have been noted previously with carboranes. In particular, Reed and Teixidor observed similar stretching frequencies in [CB$_{11}$H$_{12}$]— (2380 cm$^{-1}$) and nido-carborane-based (2119-2077 cm$^{-1}$) systems, respectively, and have also ascribed these bands to weak interactions of carboranyl B—H bonds with cationic metal centers. (See, e.g., Shelly, K., et al., *J. Am. Chem. Soc.* 1985, 107, 5955; Shelly, K. & Reed, C. A. *J. Am. Chem. Soc.* 1986, 108, 3117; and Teixidor, F., et al., *J. Am. Chem. Soc.* 2000, 122, 1963, the disclosures of which are incorporated herein by reference. Hawthorne observed slightly lower B—H stretching frequencies (1965 cm$^{-1}$) for a nido-carborane anion associated with Ir(III) through two B-μ-H—Ir interactions. (See, e.g., Doi, J. A., et al., *J. Chem. Soc., Chem. Commun.* 1980, 80, the disclosure of which is incorporated herein by reference.)

Given the rigid steric profile of the ppy ligands around the octahedral iridium center and the bulk of the carboranyl ligand, it is suggested that the bridging hydride interacts with the metal to complete its preferred octahedral geometry but that the primary mode of association results from ion pairing between the formally anionic nido-carborane and the formally cationic Ir(III) center (FIG. 33B). $^{11}$B NMR resonances for embodiments [2a-2c] ([2d] is too insoluble to observe defined $^{11}$B signatures) contain several broad features at room temperature, where B—H coupling is not well-resolved. A variable temperature (VT) $^{11}$B NMR study of embodiment [2a] revealed that these resonances further broaden upon cooling to −60° C., and sharpen upon heating to 60° C., implicating fluxional behavior of the nido-carboranyl-metal interaction. At higher temperatures, it is revealed that one doublet in the $^{11}$B NMR contains a slightly smaller coupling constant (~80 Hz) relative to the rest (~130-140 Hz); the $^{1}$H NMR also shows a partially resolved quartet (~−3.5 ppm) with a $^{1}J_{BH}$ value of ~80 Hz. Given that the spectrum broadens upon cooling, the observation of this B—H coupling is a snapshot of a fluxional process that is fast on the NMR time scale and indicates that the M-μ-H—B is appreciable at some point during this dynamic process. Overall, these data support an electrostatic description interaction between the Ir(III) center and the nido-carboranyl ligand according to embodiments in the solid state and in solution as opposed to a covalent Ir-nido-carboranyl bond model.

Figure 38C:
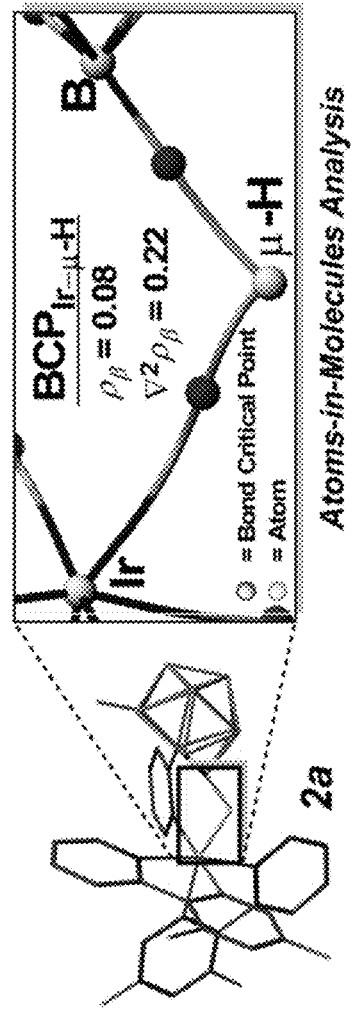

Using DFT, it was possible to further probe the interaction between Ir(III) and the nido-carboranyl fragment in embodiments [2a-2d] using the Quantum Theory of Atoms in Molecules (QTAIM) analysis, which has been used to evaluate different types of bonding (e.g., covalent, electrostatic) interactions between atoms. (See, e.g., Bader, R. F. W. *Chem. Rev.* 1991, 91, 893; and For QTAIM analysis of boron-containing clusters, carboranes, and electron deficient cluster species, see: Bader, R. F. W. & Legare, D. A. *Can. J. Chem.* 1992, 70, 657; and Bader, R. F. W. *Atoms in Molecules: A Quantum Theory*; Oxford University Press: New York, 1990, the disclosures of which are incorporated herein by reference.) The results suggest that minimal covalency exists between Ir(III) and either H(1A) or B(11) in embodiment [2a] (FIG. 38C) or embodiments [2b-2d]. First, no bond critical point (BCP) is observed between Ir and B(11) in any of the four exemplary compounds. This is consistent with the long Ir—B(11) distances found crystallographically (which extend beyond the sum of the covalent radii of the two atoms) and further supports an electrostatic description of the interaction between the carboranyl ligand and the metal center as evidenced by the VT $^{11}$B NMR study of embodiment [2a] (vide supra).

Second, while a BCP is found in embodiments [2a-2d] between Ir and H(1A), the value of the electron density (ρβ) at this point is ~0.08 for all compounds. In general, ρβ values of 0.2 or greater are indicative of covalent interactions, whereas values of less than 0.1 signify noncovalent interactions such as van der Waals, hydrogen bonding, or electrostatic interactions. The Laplacian of the electron density at the BCP ($\nabla 2\rho\beta$) signifies the relative concentration or depletion of electron density along and perpendicular to the bond path at the BCP. Positive values generally indicate the depletion of electron density at the BCP, which is indicative of closed-shell bonding interactions, such as ionic and hydrogen bonding. Values of ~0.22 are obtained for all structures, strongly suggesting closed shell/electrostatic interactions between the carboranyl ligand fragment and Ir(III).

Accordingly, embodiments are directed to electrostatically bound ligands for Ir(III)-based phosphors. Various embodiments use bulky, weakly coordinating, noncovalent ligand frameworks for stable and emissive phosphorescent molecules based on Ir(III). Importantly, embodiments allow for the structural modification of the weakly coordinating ligand to be carried out without detrimentally affecting the photophysical properties of the resulting complex: the inclusion of a methyl group at the Cvertex of the nido-carboranyl ligand in embodiments [2a] and [2c] does not strongly influence the emission wavelength relative to the nonmethylated counterparts (embodiments [2b] and [2d], respectively); importantly, however, methylation does improve the solubility of embodiments [2a and 2c] relative to [2b and 2d]. Embodiments utilize this orthogonality as a potentially useful handle for optimizing the physical/materials properties of this class of Ir(III)-based phosphors without significantly modulating the excited-state characteristics when employed as a component of an OLED construct, particularly given the nontriviality of engineering dopant-host layer compatibility. (See, e.g., Swensen, J. S., et al., *Adv. Funct. Mater.* 2011, 21, 3250; Tsang, D. P.-K., et al., *Org. Electron.* 2011, 12, 1114; and Veinot, J. G. C. & Marks, T. *J. Acc. Chem. Res.* 2005, 38, 632, the disclosure of which is incorporated herein by reference.)

Embodiments may also be coupled with methods described elsewhere herein to functionalize boron vertices of carboranes with vertex precision to provide powerful strategies for modulating structural and photophysical properties of Ir(III) species with B-substituted carborane-based ligands. The utility of such boron cluster-based weakly coordinating ligands in phosphorescent molecules demonstrated in accordance with embodiments also enabled the use of other tunable boron cluster congeners that similarly present appreciable steric bulk and overall negative charge. (See, e.g., Lavallo, V., et al., *Angew. Chem., Int. Ed.* 2013, 52, 3172; Kultyshev, R. G., et al., *J. Am. Chem. Soc.* 2002, 124, 2614; Beletskaya, I. P., et al., *J. Organomet. Chem.* 2004, 689, 2920; Kultyshev, R. G., et al., *Inorg. Chem.* 2003, 42, 3199; Himmelspach, A., et al., *Inorg. Chem.* 2012, 51, 2679; Douvris, C. & Michl, *J. Chem. Rev.* 2013, 113, PR179; Preetz, W. & Peters, G. *Eur. J. Inorg. Chem.* 1999, 1999, 1831; Semioshkin, A., et al., *Polyhedron* 2004, 23, 2135; Olid, D., et al., *Chem. Soc. Rev.* 2013, 42, 3318; Peymann, T., et al., *Inorg. Chem.* 2000, 39, 1163; Grüner, B., et al., *J. Am. Chem. Soc.* 1999, 121, 3122; Zhang, Y., et al., *S. Eur. J. Inorg. Chem.* 2015, 2015, 5158; Konieczka, S. Z., et al., *Eur. J. Inorg. Chem.* 2013, 2013, 134; Bolli, C., et al., *Chem.-Eur. J.* 2014, 20, 13783; Wong, Y. O., et al., *Chem.-Eur. J.* 2016, 22, 6764; Ivanov, S. V., et al., *J. Fluorine Chem.* 1998, 89, 65; Ivanov, S. V., et al., *Inorg. Chem.* 2003, 42, 4489; Boron Hydride Chemistry Muetterties, E. L., Ed., Academic Press, Inc: New York, N.Y., 1975; Ramirez-Contreras, R., et al., *Angew. Chem., Mt. Ed.* 2013, 52, 10313; Press, L. P., et al., *Chem. Commun.* 2015, 51, 14034; and Ramirez-Contreras, R. & Ozerov, O. V. *Dalton Trans.* 2012, 41, 7842, the disclosures of which are incorporated herein by reference.) In various embodiments, functionalized closo-boron clusters, such as the anionic carba-closo-dodecaboranes and charge-compensated closo-dodecaborates, may be incorporated into embodiments, as these bulky, closo-clusters are generally more stable than nido- or arachno-derivatives and are themselves widely used as noncoordinating anions. In short, embodiments provide methods for strategically designing, weakly coordinating carborane-based ligands based on the materials and photophysical properties of metal-based luminescent molecules to produce efficient emitters for application in light-emitting devices.

Formation of Atomically Precise Cluster Nanomolecules

Embodiments are also directed to methods for forming atomically precise and highly tunable hybrid nanomolecules with well-defined three-dimensionality. In various embodiments perfunctionalization of atomically precise clusters with pentafluoroaryl-terminated linkers produces size-tunable rigid cluster nanomolecules amenable to facile modification with a variety of thiol-containing molecules and macromolecules. In some embodiments, assembly proceeds at room temperature within hours under mild conditions, and the resulting nanomolecules exhibit high stabilities because of their full covalency. Various embodiments also demonstrate how these nanomolecules may be grafted with saccharides to exhibit dramatically improved binding affinity towards a protein. Ultimately, the embodiments allow for the rapid generation of precise molecular assemblies to investigate multivalent interactions.

Natural systems feature very complex three-dimensional (3D) molecular architectures that can interact with a high degree of specificity and fidelity. Among the well-established interaction modes, multivalency has been known to enable myriad biological events by strengthening individually weak interactions between biomolecules that are either native or foreign to the organism. (See, e.g., Mammen, M., Choi, S.-K. & Whitesides, *Angew. Chem. Int. Ed.* 37, 2754-2794 (1998), the disclosure of which is incorporated herein by reference.) Multivalent interactions can be found in such diverse processes as infection (viral/bacterial proteins-cell receptors), immune recognition (antibodies-cell receptors/antigens, cytokines-cell receptors) and gene-expression regulation (transcription factors-DNA) because of the higher avidity and better recognition compared with the corresponding monovalent bindings. (See, e.g., Kiessling, L. L., Gestwicki, J. E. & Strong, L. E. *Angew. Chem. Int. Ed.* 45, 2348-2368 (2006), the disclosure of which is incorporated herein by reference.)

Inspired by nature's design, chemists have taken an interest in developing synthetic multivalent ligands with the ability to bind specific target receptors with a high affinity to (1) elucidate the mechanistic details of multivalent interactions and (2) promote or inhibit biological interactions of interest. (See, e.g., Jones, L. H., *Nat. Chem.* 7, 952-960 (2015), the disclosure of which is incorporated herein by reference.) Many examples of synthetic scaffolds have emerged over the past several decades, which include, but are not limited to, polymeric nanoparticles, dendrimers, and hybrid nanoparticles. (See, e.g., Elsabahy, M. & Wooley, K. L., *Chem. Soc. Rev.* 41, 2545-2561 (2012); Rao, J. P. & Geckeler, K. E., *Prog. Polym. Sci.* 36, 887-913 (2011); Tomalia, D. A. et al., *Polym. J.* 17, 117-132 (1985); Hawker, C. J. & Frechet, J. M., *J. Am. Chem. Soc.* 112, 7638-7647 (1990); Farokhzad, O. C. & Langer, R. *ACS Nano* 3, 16-20 (2009); Peer, D. et al., *Nat. Nanotech.* 2, 751-760 (2007); Daniel, M.-C. & Astruc, D., *Chem. Rev.* 104, 293-346 (2004); Dreaden, E. C., et al., *Chem. Soc. Rev.* 41, 2740-2779 (2012); Brust, M., et al., *J. Chem. Soc., Chem. Commun.* 801-802 (1994); Giljohann, D. A. et al., *Nano Lett.* 7, 3818-3821 (2007); Jones, M. R., et al., *Science* 347, 1260901 (2015); Suzuki, K., Sato, S. & Fujita, *Nat. Chem.* 2, 25-29 (2010); Heindl, C., et al., *Am. Chem. Soc.* 137, 10938-10941 (2015); Ambrogio, M. W., et al., *Acc. Chem. Res.* 44, 903-913 (2011), the disclosures of which are incorporated herein by reference.) Specifically, the advent of nanotechnology and the development of surface-functionalized metal nanoparticles has provided an extremely powerful class of multivalent scaffolds. For example, gold nanoparticles (AuNPs) capped with thiolated ligands can feature biocompatibility and stability, which enables them for applications that require binding and recognition capabilities. Hybrid AuNP systems are especially attractive because of the synthetic ease of producing systems that are well-defined and tunable in size. Nevertheless, it is well known that thiolated ligands often can desorb or undergo exchange processes with other surfactants in solution over short periods of time, and furthermore, various electrochemical conditions or elevated temperatures (>60° C.) dramatically accelerate these processes. (See, e.g., Love, J. C., et al., *Chem. Rev.* 105, 1103-1170 (2005); Hostetler, M. J., et al., *J. Am. Chem. Soc.* 118, 4212-4213 (1996); Hostetler, M. J., Templeton, A. C. & Murray, R. W., *Langmuir* 15, 3782-3789 (1999); and MacLeod, M. J. & Johnson, J. A., *J. Am. Chem. Soc.* 137, 7974-7977 (2015), the disclosures of which are incorporated herein by reference.) These events can be explained primarily by the relatively weak nature of the gold-thiolate bond (40-50 kcal mol$^{-1}$). Processes of thiol-ligand exchange also readily occur on smaller Au-based cluster molecules (≤5 nm), which potentially limits the ability of researchers to create atomically precise hybrid nanomolecules that remain compositionally well-defined under biologically relevant conditions (for example, in serum). (See, e.g., Hakkinen, H., *Nat. Chem.* 4, 443-455 (2012), the disclosure of which is incorporated herein by reference.)

Embodiments provide a strategy to build robust atomically precise hybrid nanomolecules using air-stable inorganic clusters densely decorated with perfluoroaromatic functional groups. (See, e.g, Yvon, C. et al., *Angew. Chem.*

Figure 39B:
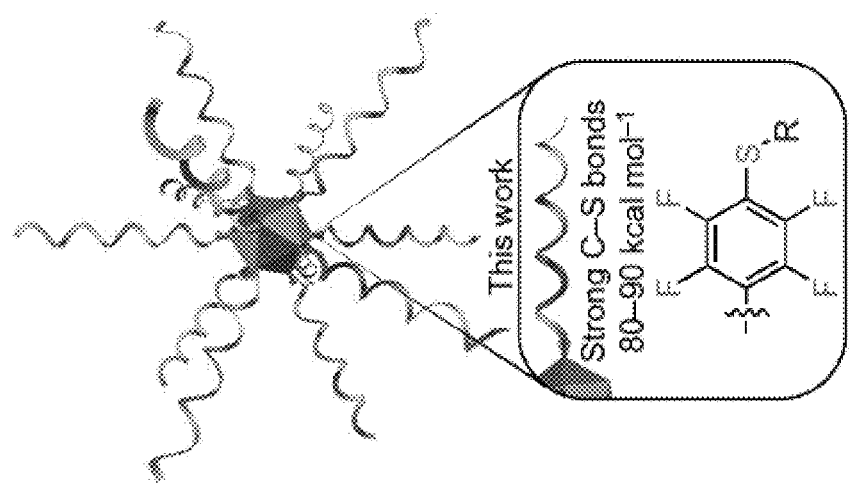
FIGS. 39A and 39B illustrate a comparison of features between the thiol-capped AuNPs and the OCNs in accordance with embodiments of the invention, where: A) is a thiol-capped AuNPs between 5 and 100 nm that can be easily prepared via self-assembly to give rise to polydisperse hybrid particles that comprise weak, non-covalent gold-thiolate bonds (40-50 kcal mol$^{-1}$); B) uniform and robust OCNs can be assembled efficiently with atomic precision and full covalency in the size range 2-10 nm via perfluoroaryl-thiol SNAr chemistry under mild conditions in accordance with embodiments of the invention (where the formed carbon-sulfur bond (80-90 kcal mol$^{-1}$) is significantly stronger compared with the gold-sulfur interaction, and results in nanomolecules that feature high structural stabilities).
Figure 39A:
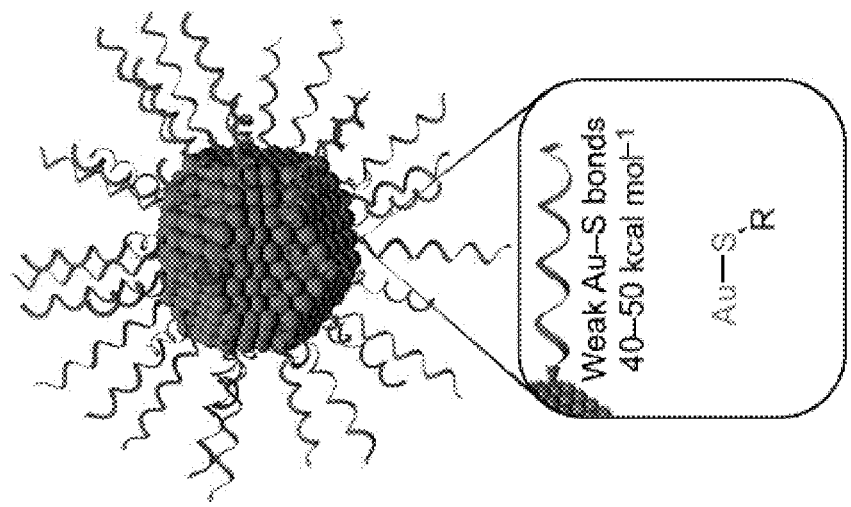

*Int. Ed.* 53, 3336-3341 (2014); Gouzerh, P. & Proust, A., *Chem. Rev.* 98, 77-112 (1998); Müller, A. & Gouzerh, P., *Chem. Soc. Rev.* 41, 7431-7463 (2012); Li, G., et al., *J Inorg. Organomet. Polym.* 11, 123-154 (2001); Spokoyny, A. M., *Pure Appl. Chem.* 85, 903-919 (2013); and Lee, I. S., et al., *J. Am. Chem. Soc.* 127, 13802-13803 (2005), the disclosures of which are incorporated herein by reference.) Using this organomimetic strategy according to embodiments, it is possible to mimic the rigid surface of a Au-based nanoparticle core and simultaneously produce assemblies that are fully covalent and thus stable under relatively harsh conditions (FIGS. 39A & 39B). Specifically, embodiments demonstrate how dodecaborate clusters that feature a dense layer of rigid pentafluoroaryl functional groups can serve as excellent scaffolds for constructing atomically precise multivalent organomimetic cluster nanomolecules (OCNs). (See, e.g., Pitochelli, A. R. & Hawthorne, M. F., *J. Am. Chem. Soc.* 82, 3228-3229 (1960); Farha, O. K. et al., *J. Am. Chem. Soc.* 127, 18243-18251 (2005); Jalisatgi, S. S. et al., *J. Am. Chem. Soc.* 133, 12382-12385 (2011), the disclosures of which are incorporated herein by reference.) The perfluoroaryls in accordance with embodiments are able to undergo facile 'click'-like nucleophilic aromatic substitution (SNAr) with a wide range of thiols at room temperature within hours, which creates robust carbon-sulfur bonds (80-90 kcal mol$^{-1}$) and thereby produces nanomolecules decorated with well-defined functional surfaces. This approach according to embodiments affords the functional advantages of using dendrimers and at the same time mimicking the synthetic ease with which thiol-capped AuNPs are normally constructed. Unlike the majority of dendritic scaffolds, the resulting assemblies are highly rigid and can be synthesized and purified within hours. (See, e.g., Lundquist, J. J. & Toone, E. J., *Chem. Rev.* 102, 555-578 (2002); and Moore, J. S. & Xu, Z., *Macromolecules* 24, 5893-5894 (1991), the disclosure of which is incorporated herein by reference.) Furthermore, embodiments of these OCNs are purely covalent and therefore feature improved stability in serum and various pH environments. Finally, embodiments demonstrate the first example of using a hybrid inorganic cluster scaffold as a highly competent multivalent recognition platform for binding a protein system.

Given the high reactivity of the perfluoroarenes with thiol-based nucleophiles, embodiments utilize perfluoroaryl-thiol SNAr chemistry to conjugate various thiolated groups onto perfluoroaryl-containing clusters efficiently under mild conditions at room temperature. (See, e.g., Birchall, J. M., et al., *Chem. Commun. Lond.* 338-339 (1967); Becer, C. R., et al., *Angew. Chem. Int. Ed.* 48, 4900-4908 (2009); Becer, C. R. et al., *Macromolecules* 42, 2387-2394 (2009); and Spokoyny, A. M. et al., *J. Am. Chem. Soc.* 135, 5946-5949 (2013), the disclosures of which are incorporated herein by reference.) Embodiments may also be combined with the rapid perfunctionalization embodiments of the [B$_{12}$(OH)$_{12}$]$^{2-}$ cluster previously described. As described, such methods and embodiments feature a wide scope of substituents and allow for the synthesis of perfunctionalized clusters grafted with rigid linkers that contained peripheral pentafluoroaryl moieties (FIG. 40A). Specifically, the perfunctionalized cluster scaffolds [2] and [3] can be synthesized in good yields in less than 30 minutes and isolated after purification by silica-gel column chromatography in their neutral form as air stable solids soluble in the majority of common polar organic solvents. The single-crystal X-ray structures of [2] and [3] reveal the highly rigid nature of these scaffolds (FIGS. 40B & 40C, respectively). Importantly, by using a size-tunable linker precursor in the synthesis of [2] and [3] in accordance with embodiments, the resulting rigid cluster species can be rationally controlled in size ([2] is approximately 1.9 and [3] is about 2.7 nm lengthwise, as measured from the single-crystal structures). Embodiments of these clusters represent a new class of atomically precise scaffolds that offer unique rigidity and structural covalency, which makes them topologically reminiscent of both dendrimers and small metal nanoparticles.

Conjugation studies were conducted between [2] and 1-hexanethiol [A] to show that [2] and [3] can be fully functionalized by thiols via an SNAr reaction, in accordance with embodiments. Cluster [2] was mixed with 12 equiv. of thiol [A] in dimethylformamide (DMF) in the presence of base and left stirring under a N$_2$ atmosphere to mitigate the undesired oxidation of the thiol reagent. Notably, the initially dark-red solution quickly turned colorless. $^{11}$B NMR spectroscopy of this colorless solution revealed a singlet resonance at $\delta=15$, characteristic of a reduced cluster in a [2]$^{2-}$ oxidation state, which is consistent with the reducing capacity of the thiolate species when exposed to [2]$^0$ (FIG. 40D). Therefore, for all subsequent optimization embodiments may utilize an extra equivalent of the thiol reagent to account for this reduction.

Figure 41B:
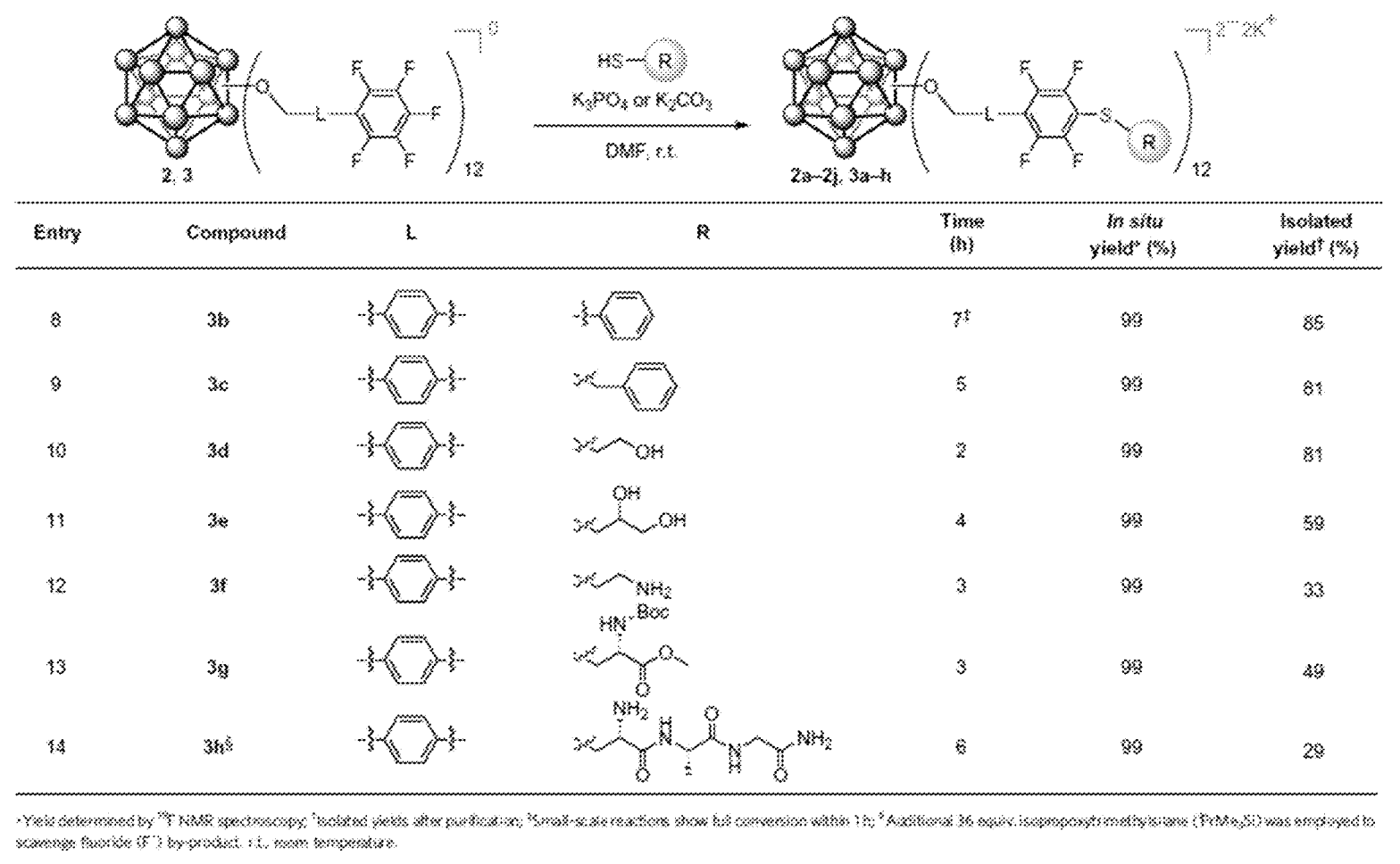

$^{19}$F NMR spectroscopy was utilized to monitor the conversion of [2] into [2a], given the diagnostic change associated with this transformation (FIG. 40D shows the disappearance of the para-F resonance and significant downfield shift of the meta-F resonances in [2a] compared with the that of starting material [2]. A base screen identified potassium carbonate (K$_2$CO$_3$) as the optimal reagent that leads to the substantial conversion that resulted in the formation of the perfunctionalized cluster [2a]. After additional optimization using K$_2$CO$_3$, it was found that using 13.3 equiv. of 1-hexanethiol and 30 equiv. of K$_2$CO$_3$ resulted in a nearly quantitative (>99%) substitution of [2], to produce the 12-fold substituted OCN [2a] (FIG. 40D and FIG. 41, entry 1). The crude product was dried and then purified via silica gel column chromatography and isolated as an oily substance in 70% yield. Electrospray ionization-high resolution mass spectrometry (ESI-FIRMS) and $^1$H, $^{11}$B and $^{19}$F NMR spectroscopies of purified [2a] are consistent with its proposed structure and composition. Further, it was found that in accordance with embodiments [2] could be conjugated fully with aromatic [B] and benzylic [C] thiols. Both reactions proceeded nearly quantitatively within 24 hours at room temperature using potassium phosphate (K$_3$PO$_4$), and led to pure OCNs [2b] and [2c] (FIG. 41). The results with embodiments [2a-2c] indicate that the methodology can operate with a wide range of thiol-based species that span a significant window of nucleophilicities (the pKa of aliphatic thiols is approximately 17, and that of aromatic thiols is approximately 10).

Overall, these results suggest that, with embodiments of the method, it is possible to assemble OCNs rapidly via SNAr chemistry under very mild and operationally simple conditions that mimic the simplicity of the assembly of thiol-capped AuNPs. Furthermore, unlike the previously developed Huisgen 'click' cycloaddition and carbamate functionalization strategies of inherently non-rigid B$_{12}$-based clusters, which require elevated temperatures, long reaction times (days) and a large excess of reagents (4-5-fold per vertex), the perfluoroaryl-thiol SNAr chemistry described here in accordance with embodiment proceeds using significantly milder conditions. (See, e.g., Jalisatgi, S. S. et al., *J. Am. Chem. Soc.* 133, 12382-12385 (2011), the disclosure of which is incorporated by reference.)

Thiol-capped AuNP constructs are also extremely attractive given the chemical orthogonality of the gold-thiol interaction compared with that of other ligands, which provides an opportunity to use a wide variety of unprotected thiol reagents for facile and programmable self-assembly. Therefore, embodiments also utilize an SNAr chemistry on perfluorinated clusters to mimic this attractive feature. To evaluate the thiol selectivity of embodiments of the approach, conjugation reactions between [2] and thiols are performed that featured additional nucleophilic groups, such as alcohols and amines. Consistent with the previous work by Pentelute and co-workers with unprotected peptides, it is found that the model thiol species [D-F] all reacted with [2] through the thiol site selectively to form the desired perfunctionalized OCNs [2d-2f] (FIG. 41, entries 4-6) within 24 hours, as confirmed by 19F NMR spectroscopy, in accordance with embodiments. This finding is important as it suggests that embodiments of the chemistry can be used to selectively conjugate thiol reagents that contain multiple nucleophilic functional groups and fundamentally takes advantage of the mild conditions developed here, which allow one to guide the kinetic selectivity between the thiol and pentafluoroaryl fragment. (See, e.g. Becer, C. R. et al., Macromolecules 42, 2387-2394 (2009); Spokoyny, A. M. et al., J. Am. Chem. Soc. 135, 5946-5949 (2013); and Zhang, C. et al., Nat. Chem. 8, 120-128 (2016), the disclosures of which are incorporated herein by reference.) Most importantly, the chemoselectivity of embodiments is reminiscent of that observed in the assembly of thiol-capped AuNPs.

With the successful perfunctionalization of [2] (vide supra), embodiments may be extended into larger-sized clusters [3] that could be perfunctionalized with the same thiols to create a new generation of OCNs that are modularly extended in size, but could also accommodate 12-fold conjugation with bulkier substrates. Indeed, under the same conditions as described above for the functionalization of [2], cluster [3], in accordance with embodiments, undergoes clean and facile perfunctionalization chemistry with thiols [A-F] to yield embodiments [3a-3f] (FIG. 41, entries 7-12). Importantly, when using [3] instead of [2], a significantly faster conversion rate that that which led to perfunctionalized clusters (less than six hours versus 24 hours) is observed, consistent with the surface of [3] being less sterically encumbered than that of [2]. Therefore, using [3] in accordance with embodiments allows for full substitution with a bulky cysteine derivative [G] as well as a small, unprotected peptide sequence C-A-G [H] to yield [3g] and [3h], respectively (FIG. 41, entries 13 and 14).

To demonstrate that embodiments could introduce more-complex molecular architectures onto the clusters, poly(ethylene glycol) (PEG) may be used. (See, e.g., Hoffman, A. S., J. Control. Release 132, 153-163 (2008); and Alconcel, S. N. S., Baas, A. S. & Maynard, H. D., Polym. Chem. 2, 1442-1448 (2011), the disclosures of which are incorporated herein by reference.) Complete 12-fold conjugation between [2] and commercially available mPEG-thiol (Mw=356 Da) occurred within 24 hours at room temperature to yield OCN [2i] (FIG. 42, entry 1). Subsequently, larger mPEG-thiols (Mw=766 Da and 2,000 Da) were tested and similarly afforded [2j] and [2k], respectively, in quantitative conversions based on $^{19}F$ NMR spectroscopy (FIG. 42, entries 2 and 3). As expected, PEGylation conferred considerable hydrophilicity to these clusters: [2i-2k] are readily soluble in water. Owing to the full covalency of PEGylated OCNs, it is hypothesized that these species should be structurally stable under biological conditions. Using [2i] as a model, stability studies in biologically relevant media were conducted. A purified sample of [2i] was exposed to cell-culture media that contained fetal bovine serum for five days at room temperature, and no changes or degradation products were observed by monitoring this sample by $^{19}F$ and $^{11}B$ NMR spectroscopy. Similarly, no degradation occurred when this sample was incubated for an additional five days at 37° C. Importantly, samples of [2i] were dissolved in buffers of various pH (5, 7 and 9) for five days, and these were found to remain structurally intact as well. These results suggest that OCNs in accordance with embodiments retain their structural integrity under the wide range of biologically relevant conditions.

The stability of the conjugation linkage between the cluster core and the thiol was then examined. Given the full covalency of [2i], it might be expected that it should not undergo ligand-exchange, a process that commonly occurs with many ligand-capped AuNPs. Significantly, no thiol-exchange occurred when [2i] (0.8 mM) was exposed to 2-mercaptoethanol (20 mM) over a period of 11 days. Similar results were obtained with 2 mM glutathione. Overall, these results clearly demonstrate that the OCNs constructed via the SNAr approach in accordance with embodiments feature superior robustness compared with many AuNP-based assemblies.

PEGylated OCNs in accordance with embodiments were characterized by a number of techniques to ensure their proposed nearly monodisperse composition (whereas the OCN cores are monodisperse, the PEG chains used feature some compositional variability because of the inherent limitations of PEG oligomer synthesis). (See, e.g., Veronese, F. M. & Pasut, G., Drug Discov. Today 10, 1451-1458 (2005), the disclosure of which is incorporated herein by reference.) First, 2D diffusion ordered spectroscopy (2D DOSY)$^1$H NMR were conducted with purified samples of [2i-2k] and the more-extended OCNs [3i-3k] (FIG. 42, entries 5-7) in D20. Based on the diffusion constants obtained from these 2D DOSY experiments, the respective hydrodynamic diameters were estimated (FIG. 43A). As expected, the results reveal a gradual increase in the sizes of the PEGylated clusters, both as a function of the cluster core size (from [2] to [3]) and the length of the PEG chain used. The size of [3i] measured by 2D DOSY was larger than expected, most probably because of aggregation under the conditions the measurement was performed, which suggests the small number of PEG units in [3i] could not fully stabilize the hydrophobic core against self-aggregation.

Figure 43B:
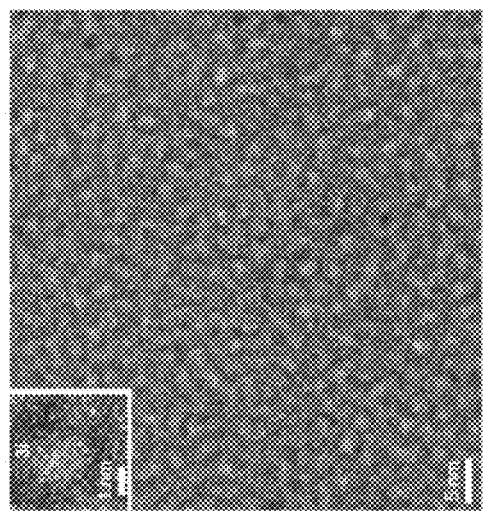
FIGS. 43A to 43D illustrate the characterization of the PEGylated OCNs [2i-2k] and [3i-3k] in accordance with embodiments of the invention, where: A) provides a plot of the particle sizes of the PEGylated OCNs [2i-2k] and [2i-2k] obtained via 2D DOSY $^1$H NMR experiments (the plot reveals a trend of a gradual increase in the sizes of the OCNs, both as a function of the cluster precursor dimension and of the chain length of the PEG reagent); B) TEM images of a negatively stained sample of [3i] reveal the presence of nearly monodisperse particles with an average size of 1.9 nm, consistent with the expected size of [3i]; C) GPC traces of [2k] and [3k] measured in water further confirm the monodispersity of the samples ($Đ$=1.003±0.02 and 1.081±0.007, respectively); and D) MD-calculated structures of the PEGylated nanomolecules in pure water after 21 ns of simulation indicate a trend in the sizes of the OCNs consistent with that observed through the 2D DOSY experiments.
Figure 43D:
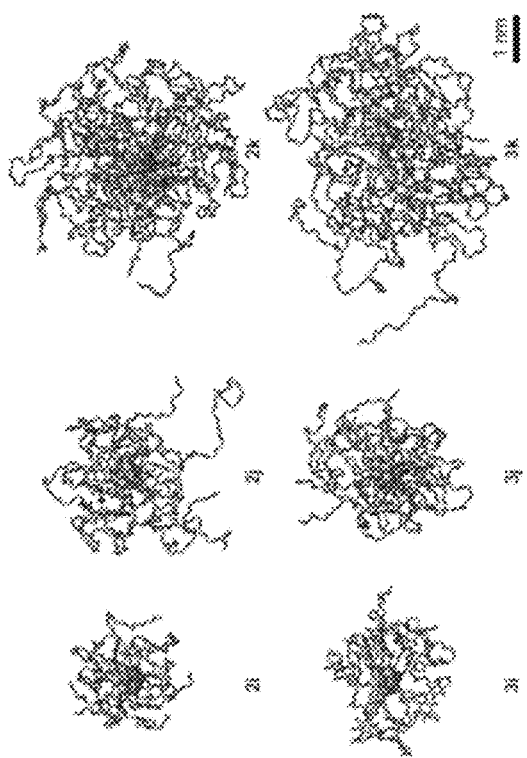
Figure 43A:
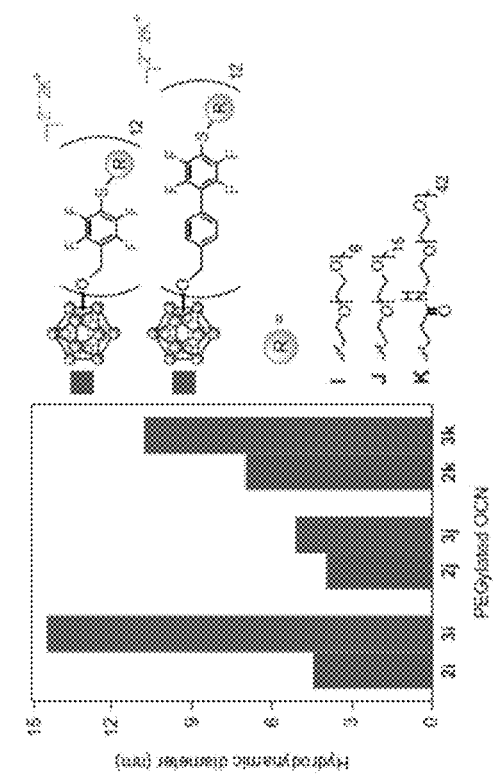
Figure 43C:
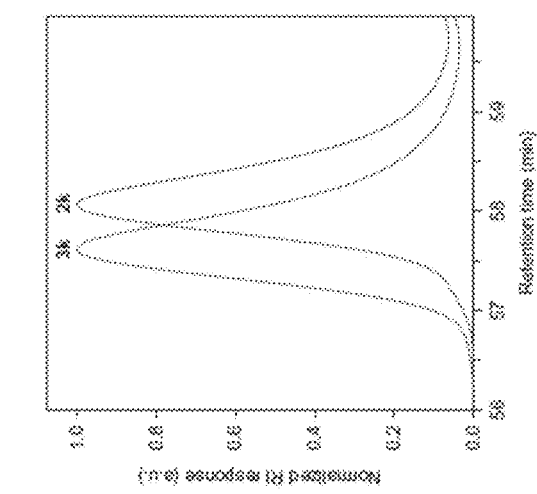

To determine the size of a single non-aggregated OCN [3i], additional transmission electron microscopy (TEM) experiments were performed on [3i] (FIG. 43B. The TEM images reveal the presence of nearly monodisperse particles with an average size of 1.9 nm, which is in agreement with the expected value for a non-aggregated single particle. Consistent with these results, gel-permeation chromatography (GPC) traces of [2k] and [3k] in water (FIG. 3C) also reveal nearly monodisperse samples ($Đ$=1.003±0.02 and 1.081±0.007, respectively). Furthermore, molecular dynamics (MD) simulations of species [2i-2k] and [3i-3k] were performed in water and calculated their hydrodynamic radii and radii of gyration (snapshots after 21 ns are shown in FIG. 43D. The results are in good agreement with the non-aggregated OCN sizes measured by TEM, and moreover exhibit a trend similar to that observed by 2D DOSY. A small discrepancy arises between the sizes estimated based on computational studies/TEM and 2D DOSY and is probably due to some aggregation of the particles under the conditions employed in the 2D DOSY experiments. Overall, the results clearly show that using the developed SNAr assembly strategy in accordance with embodiments, one can rationally prepare robust and nearly monodisperse samples of size-tunable PEGylated OCNs.

Figure 44A:
FIGS. 44A to 44F illustrate multivalent binding of the glycosylated OCN [2l] to the lectin ConA in accordance with embodiments of the invention, where: A) provides ESI-HRMS of [2l] supports its proposed structure and composition (see inset for the MD simulated structure of [2l] in an aqueous environment); B) SPR sensorgram indicates that the measured binding response is dependent on the concentration of [2l] it also suggests multivalent binding interactions between [2l] and ConA as well as minimal binding of the PEGylated cluster [2i] and D-glucose controls to ConA; C) a snapshot at 20 ns of a MD simulation showcases the interactions between four particles [I, II, and IV] and ConA; and D-F) MD-simulation close-up snapshots of three of the 21 particles ([I] D), [II] E) and [III] F)) binding to ConA at the known monosaccharide-binding residues (colored and labelled).

After demonstrating the scope of embodiments with various classes of thiols, the scaffold clusters may be coated with recognition moieties to develop OCNs capable of multivalent binding interactions. In nature, multivalent glycoconjugates, such as glycoproteins and glycolipids, can bind lectins with a relatively high avidity, and thereby bypass the fundamental limitation of weak monosaccharide binding (dissociation constants (KD) range between millimolar and micromolar). (See, e.g., Dam, T. K., et al., *J. Biol. Chem.* 275, 14223-14230 (2000) & Bernardi, A. et al., *Chem. Soc. Rev.* 42, 4709-4727 (2013), the disclosures of which are incorporated herein by reference.) In such embodiments, clusters [2] and [3] can serve as rigid, tunable scaffolds for the 3D precise display of saccharides. In some such embodiments, using commercially available glucose precursor 1-thio-3-D-glucose tetraacetate, it is possible to synthesize the functionalized OCNs [2l] and [3l] featuring [12] appended glucose molecules (FIG. 44A & FIG. 42, entries 4 and 8).

Figure 44B:
Figure 44C:
Figure 44D:
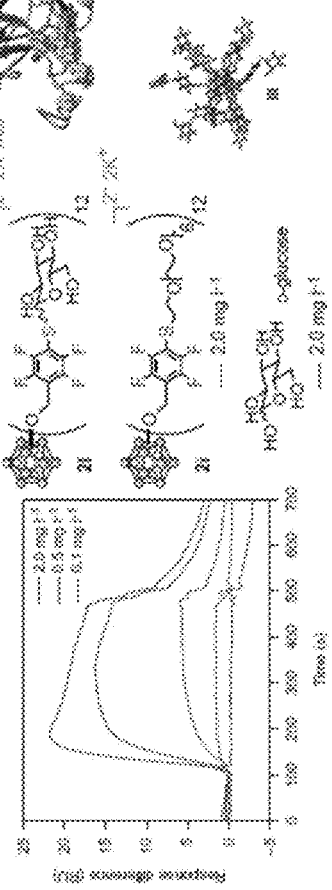
Figure 44E:
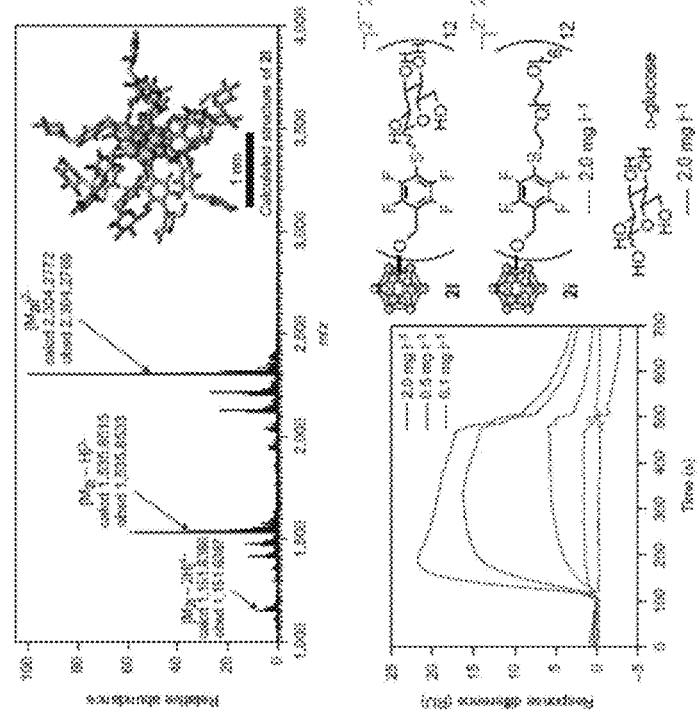
Figure 44F:
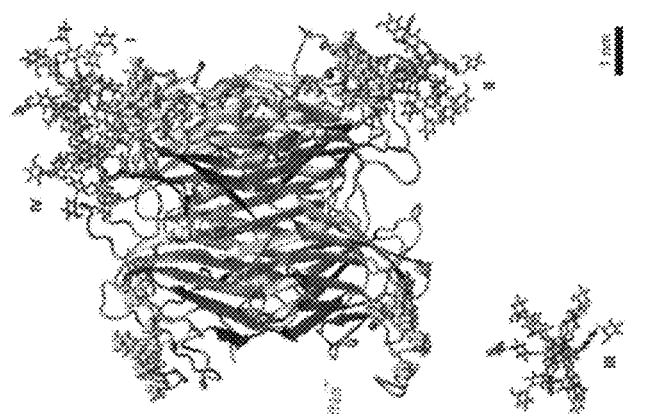

Surface plasmon resonance (SPR) experiments were then conducted with a Biacore T100 instrument to monitor and quantify binding interactions between the glycosylated OCN [2l] and a model lectin concanavalin A (ConA) at pH 7.4. ConA was covalently attached to the Au-coated sensor chip's dextran layer via conventional amide coupling, and binding between ConA and the injected analyte was measured as a change in the refractive index (RI) and expressed in response units (RU). From the binding sensorgrams (FIG. 44B), it is clear that the measured binding response was dependent on the concentration of [2l] in the injected sample. Furthermore, when two controls ([2i] and D-glucose) were injected at the highest mass concentration of [2l] shown (2.0 mg 1-1), minimal to no binding was observed. When the binding curves of [2l] were fitted to the Langmuir 1:1 binding model, the KD value was estimated to be 54 nM, which corresponds to a 6,500-fold increase in affinity when compared with the KD between ConA and methyl D-glucopyranoside. (See, e.g., Munoz, E. M., et al., *J. Am. Chem. Soc.* 135, 5966-5969 (2013), the disclosure of which is incorporated herein by reference.) These results are consistent with the KD value previously reported by Munoz et al. between ConA and a third-generation D-glucose-functionalized glycodendrimer (15.8 nM, 27 saccharides). This result is significant as it demonstrates that a similar multivalent effect can be achieved by using a rigid OCN scaffold in accordance with embodiments that features significantly fewer (12 versus 27) saccharides. Furthermore, compared with the glycodendrimer used in the work of Munoz and co-workers, which requires eight synthetic steps, glycosylated OCNs can be constructed rapidly (in less than 24 hours) in three steps with an SNAr conjugation (Huisgen click cycloaddition conjugations on large dendritic assemblies normally take several days for completion). (See, e.g., Fernandez-Megia, E., et al., *Macromolecules* 39, 2113-2120 (2006), the disclosure of which is incorporated herein by reference.) Lastly, the OCNs generated in accordance with embodiments are fully covalent and therefore feature enhanced stability properties compared with the species synthesized via a coordination-based self-assembly. (See, e.g., Kamiya, N., et al., *J. Am. Chem. Soc.* 129, 3816-3817 (2007), the disclosure of which is incorporated herein by reference.)

Although not to be bound by theory, the glycosylated OCN's dramatically enhanced affinity over D-glucose towards ConA can be explained by the cluster glycoside effect. To better understand the mechanistic details of the binding between [2l] and ConA, MD simulations of the interactions between [2l] and ConA were performed (see the snapshots of the simulation in FIG. 44C-F. For comparison, interactions between D-glucose and ConA in water were simulated. The results are consistent with the experimental observations—that [2l] exhibits a much higher affinity than the monovalent D-glucose molecule towards ConA's saccharide-binding sites. Furthermore, the higher affinity can be attributed to the multivalent statistical/rebinding effect provided by the densely functionalized surface filled with monosaccharide ligands positioned around the OCN cluster.

Accordingly, embodiments have been developed that allow a rapid assembly of fully covalent nanoparticles with atomic precision. Specifically, embodiments demonstrate that the rigid clusters densely decorated with perfluoroaryl-containing functional groups undergo efficient conjugation with a variety of thiols via SNAr chemistry under very mild conditions at room temperature. Embodiments of this chemistry are reminiscent of the chemoselective assembly conditions associated with thiol-capped AuNPs, and similarly to thiol-capped AuNPs, these OCNs can be easily tuned in size and surface chemistry by choosing a specific thiol reagent. OCNs according to embodiments exhibit dramatically improved structural stability under a wide range of biologically relevant conditions because of the full covalency of all the bonding interactions that comprise these nanomolecules. Using embodiments of this assembly strategy it is possible to design and synthesize nanomolecules that feature a 3D densely packed layer of saccharides that can participate in multivalent binding with a natural lectin and lead to a dramatic increase in binding affinity. Embodiments open a methods to create highly tailored synthetic mimics of ligand-capped AuNPs that feature rigid and fully covalent atomically precise assemblies.

Engendering Abiotic Protein-Like Functions in Cluster-Based Atomically Precise Scaffolds.

In embodiments, these constructs may be used as antibody mimics to bind proteins. Embodiments develop multivalent species capable of binding and sensing complex biomolecules. In contrast to existing hybrid nanoparticles, the system features improved stability towards harsh environmental conditions including pH, oxidants/reductants and serum.

Figure 45:
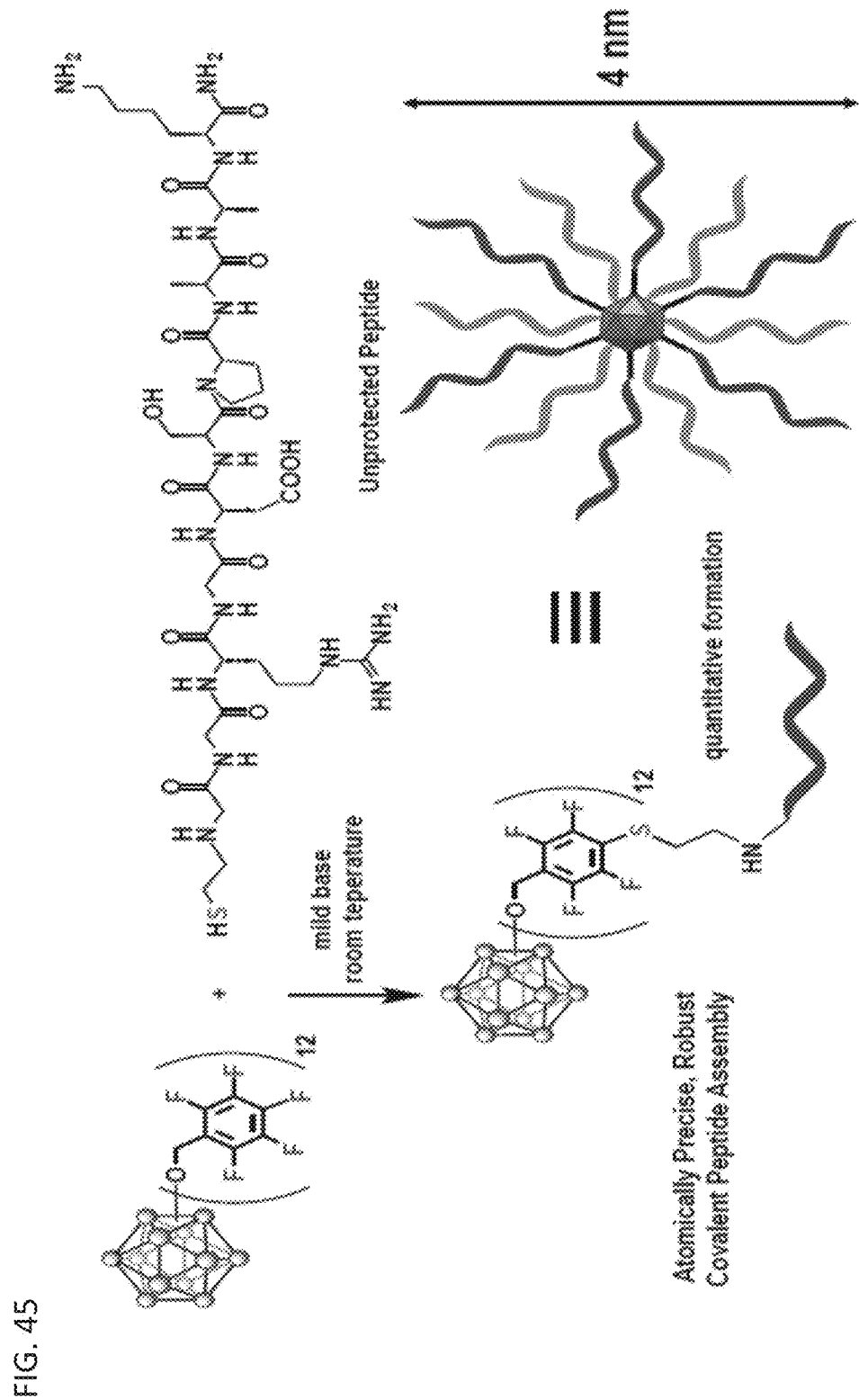
FIG. 45 illustrates results showcasing the ability to append unprotected peptides around the cluster-based core leading to the atomically precise hybrid nanomolecules, in accordance with embodiments of the invention.

In order to ascertain whether the formed structures possess improved stability stemming from their complete covalency and proximal packing of the functional groups, a series of systematic stability studies may be performed on the system. Results indicate that embodiments of the thiol-functionalization chemistry are amenable towards complex unprotected peptides (FIG. 45). Such a high level of chemical orthogonality has never been previously observed with cluster-based species. Importantly, these peptides can be conveniently synthesized on the solid support and do not necessitate recombinant technologies normally used for protein expression. This significantly widens the pool of synthetic components that can be incorporated within embodiments of scaffolds including non-natural amino acids, sophisticated linkers and spacers and other synthetic functional groups not available in natural systems.

To assess in vitro protease resistance of the antibody mimics, it is possible to use various proteases such as trypsin, chymotrypsin, and proteinase K based on the sequence composition of the biomolecule. Time-dependent cleavage of amide bonds will be monitored by LCMS to determine rates of degradation, and will be compared to that of the AuNPs and free peptide.

To determine proteolytic stability in serum: constructs may be incubated with fresh serum at 37° C. for various time points. The serum samples may then be flash frozen, lyophilized, extracted with acetonitrile/water solution containing TFA, and subjected to targeted LCMS/MS for quantification of intact peptides. If the previous approach fails, biotin may be installed on each variant and use for sample cleanup and enrichment with streptavidin beads after incubation with serum. Then LCMS can be used to obtain the proteolytic profile and degradation rates to determine if the scaffold significantly stabilizes the variants in ex vivo serum. The effect of spacer linkers on the structure and the function of these biomolecules may be determined using CD spectroscopy, X-ray crystallography, NMR spectroscopy, and molecular dynamics simulations (for peptides). Specifically, CD spectroscopy may be used to monitor the effects of linker length and architecture on secondary structure of grafted peptides, e.g. the extent of a-helical conformation by examining the dual minima at 208 and 222 nm in CD spectra. Embodiments show the formation of a-helical motif on model peptide is enhanced, although not to be bound by theory, likely as a function of packing. High resolution NMR spectroscopic may be used to gain more insight into the 3D structures of these assemblies according to embodiments. For example, TOCSY NMR measurements may be used to ascertain and correlate the ordering observed via the structures via CD spectroscopy. NOESY and ROESY NMR experiments under various pH conditions may be used to obtain a precise 3D structure of these assemblies. Finally, X-ray crystallography may be used to further elucidate precise three-dimensional structures and understand the role of the size and dynamics in embodiments of the system.

Utilizing Atomically-Precise Multivalency for Biomolecular Recognition and Sensing.

Many embodiments are directed to protein mimics, where one inorganic scaffold can now tether multiple receptor molecules with a three-dimensional precision. These species can be conceptually thought of as abiotic antibody mimics in the way they can selectively associate with complex targets. Specifically, many embodiments are directed analogous peptide-based abiotic assemblies that can interact with DNA thereby mimicking certain functions of histones.

Virus Capsid Recognition and Sensing.

In many embodiments assemblies are configured to recognize and sense two structurally and functionally distinct systems. In one embodiment a gp41 viral scaffold (FIG. 46), may be used. A number of viruses (Ebola, HIV-1, Influenza) utilize a similarly structured scaffold. (See, e.g., Guarise, C., et al., Tetrahedron 2012, 68, 4346-4352; Kogot, J. M., et al., J. Am. Chem. Soc. 2008, 130, 16156-16157; Matthews, T., et al., Nat. Rev. Drug. Disc. 2004, 3, 215-225; Malashkevich, V. N., et al., Proc. Natl. Acad. Sci (USA) 1999, 96, 2662-2667; Weissenhorn, W., et al., FEBS Lett. 2007, 581, 2150-2155; and Kielian, M. and Rey, F. A. Nature Rev. Microbio. 2006, 4, 67-76, the disclosures of which are incorporated herein by reference.)

Figure 46A:
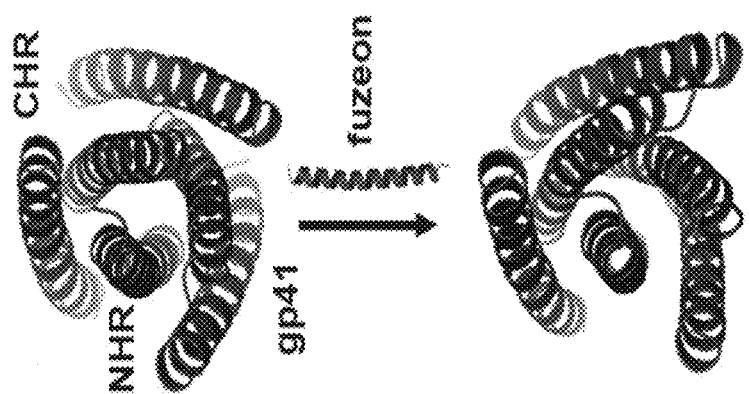
FIGS. 46A & B illustrate: A) crystallographically-derived representation for HIV-1 entry inhibition by fuzeon-like peptide binding gp41 (PDB: 1 AIK); and B) schematic representation of the hybrid multivalent cluster-based inhibitor containing multiple peptide ligand copies binding gp41, in accordance with embodiments of the invention.
Figure 46B:
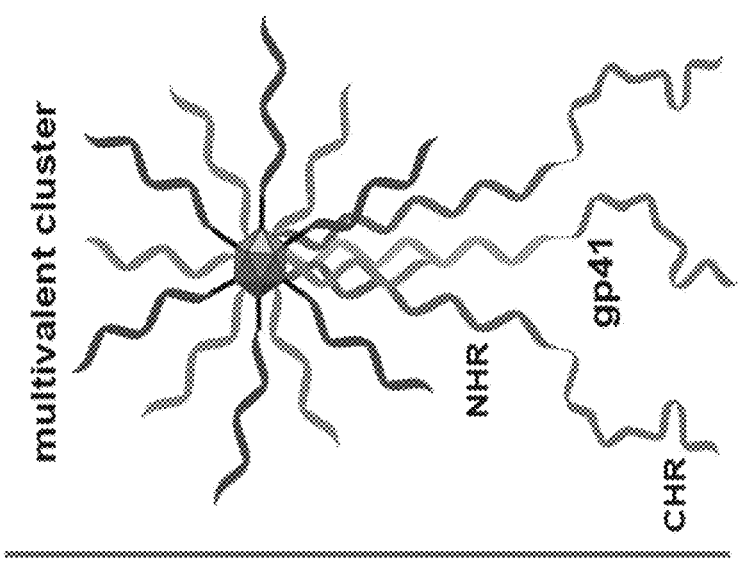

Previously, researchers developed several classes of peptide molecules capable of binding gp41, however these binding affinities remain relatively small. Importantly, as opposed to polydisperse nanoparticles and polymers, atomically precise scaffolds in accordance with embodiments will be fully amenable to structural studies via classical protein characterization methods such as X-ray crystallography and Nuclear Magnetic Resonance spectroscopy allowing to precisely pinpoint interactions between these species and a protein target. Peptide sequences may be used that are designed to bind a single helix of gp41 (FIG. 46). Specifically, the length of the fuzeon peptide sequence and spacer units appended on the boron cluster may be varied. Target nanomolecules may then be used for binding measurements with gp41. These measurements may be performed using SPR technology (Biacore), where gp41 will be covalently attached on a gold chip and nanomolecules will be eluted over the surface. The binding kinetics may be used to calculate and compare the binding constant $K_d$ between the hybrid nanomolecules and single peptide strand controls. Scaffolds exhibiting bindings better than the control fuzeon peptide may then be further optimized and evaluated for sensing. The latter may be accomplished by incorporating a fluorescent moiety onto one of the vertices of the cluster thereby allowing to conveniently measuring the binding via fluorescence polarization change (FP). Upon successful demonstration of the sensing scheme in vitro, a sensitive assay for gp41 in biological medium may then be developed. This approach will be highly dependent on the stability of these scaffolds, which are expected to be improved compared to existing antibodies and nanoparticles (vide infra).

Atomically Precise Cationic Nanomolecules as Histone Mimics.

Figure 47A:
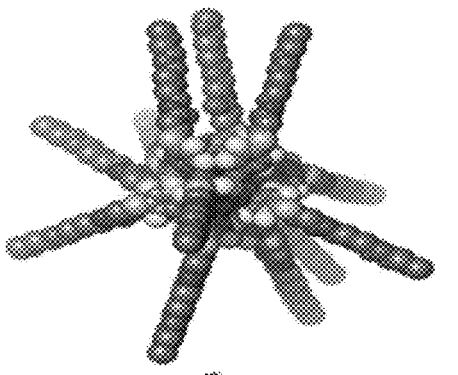
FIGS. 47A-D illustrate: A-B) cartoon structure and an X-ray representation of a histone encircled with a DNA; and C-D) the proposed histone mimic based on the atomically precise cluster-based nanomolecules grafted with cationic peptides, in accordance with embodiments of the invention.
Figure 47B:
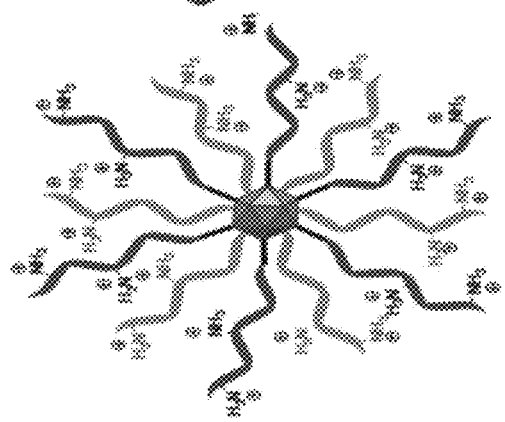
Figure 47C:
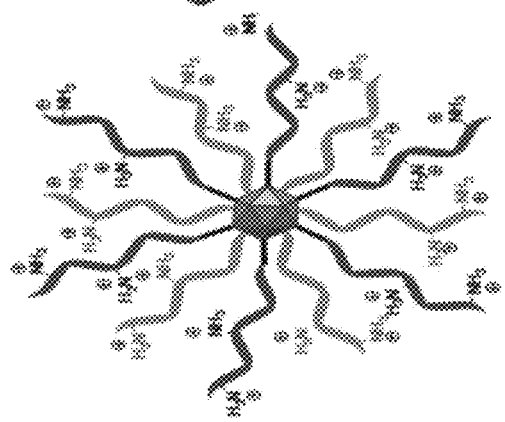
Figure 47D:
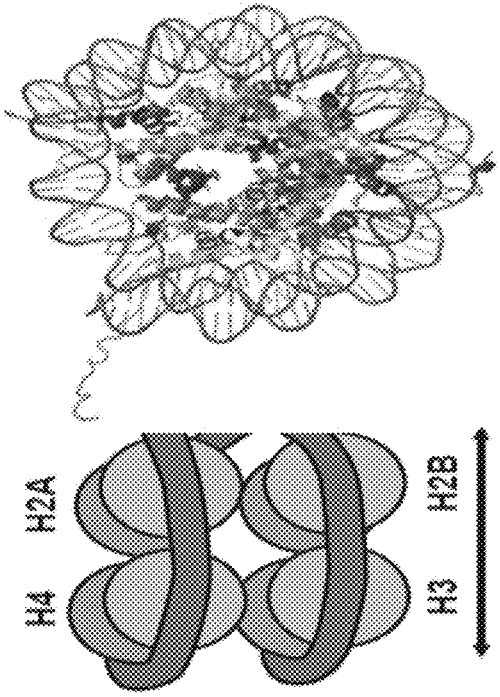

Ability of polycationic agents to interact with the negatively charged phosphate backbone of the oligonucleotides has been recognized for a long time. (See, e.g., Su, C.-J., et al., Macromolecules 2012, 45, 5208-5217; and Yu, S. and Larson, R. G., Soft Matter 2014, 10, 5325-5336, the disclosures of which are incorporated herein by reference.) This observation has led to the development of many intracellular delivery platforms and detection assays. In fact, nature has been utilizing such a class of interactions DNA packaging via condensation. This process is centered around histone protein assemblies which consist of several subunits with a precisely regulated positive charge density located in a three-dimensional space occupying approximately 11 nm diameter (FIGS. 47A-B). Unfortunately, existing polycationic structures are not capable of mimicking accurately the rigidity, three-dimensionality and topology of histones and previous attempts mimicking this important class of molecules have been met with limited success. (See, e.g., Kohonen, P. J., et al., Cancer Res. 2013, 73, 5657; and Kikuchi, T., et al., Chem. Sci. 2014, 5, 3257-3260, the disclosures of which are incorporated herein by reference.) Embodiments are directed to precisely control the architecture of 3D cluster-based assemblies featuring designer peptides thereby producing robust and highly tailored histone mimics. Specifically, embodiments utilize peptides containing a periodic arrangement of cationic lysine residues separated by helix-promoting hydrophobic amino acids (FIG. 47C). Resulting scaffolds will be tested in vitro to address their ability to selectively interact with DNA. Specifically, atomic force microscopy (AFM) may be used to observe structural effects embodiments of histone mimics can produce upon binding to DNA plasmid.

2D and 3D Materials Featuring Atomically Precise Clusters Nanomolecules.

Figures 48A, 48B:
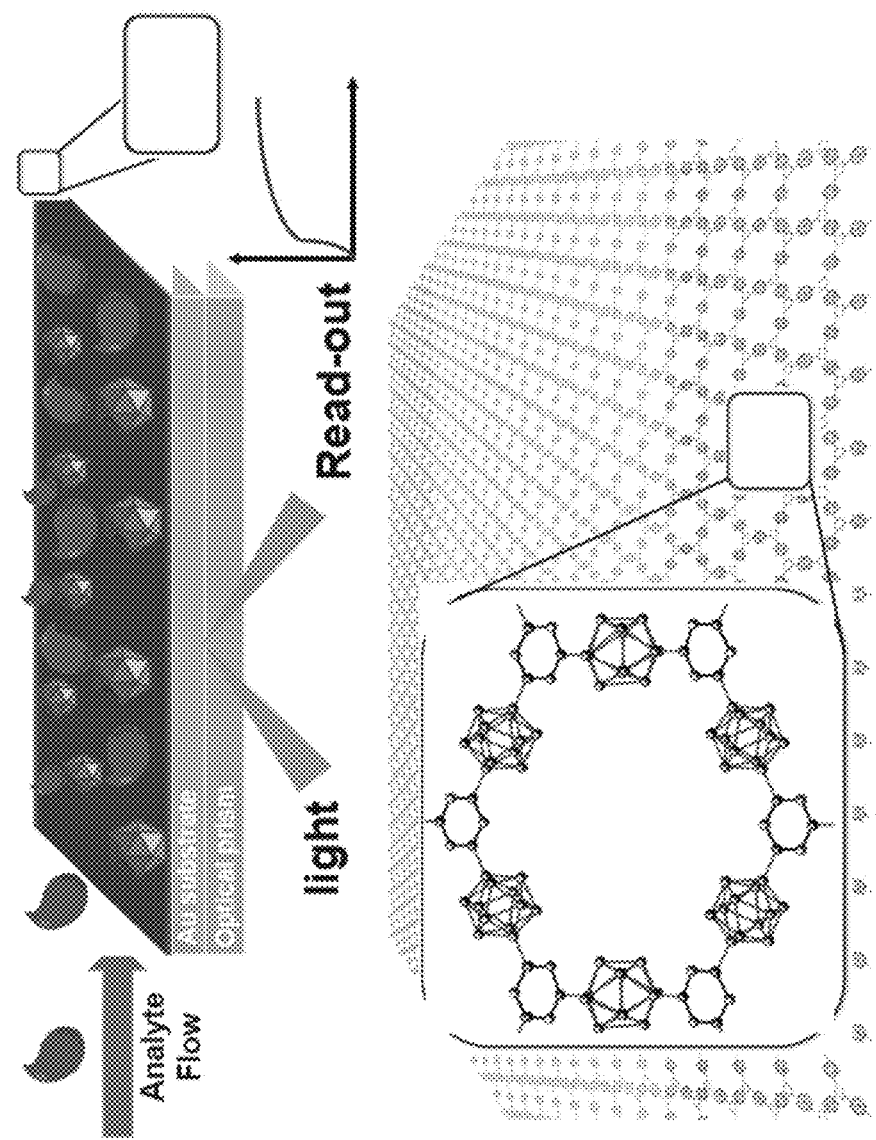
FIGS. 48A-B illustrate: A) microfluidic SPR-based scheme for analyte binding detection on a cluster-system embedded within a 2D conductive material; and B) representative diagram for the proposed 2D layered material featuring inorganic clusters (functionalization on B-vertices is omitted for clarity), in accordance with embodiments of the invention.

Embodiments are also directed to a reliable technique where 3D-based multivalency can be precisely measured and quantified in a more high-throughput fashion would carry a tremendous advantage. In some embodiments a new class of conductive 2D materials, which can be integrated into the existing surface-plasmon resonance technology (SPR) thereby allowing to precisely measure molecular binding events (FIG. 48) are provided. Although 2D organic conjugated molecules have been extensively studied and used to create 2D materials, there has been no effort addressing the possibility for utilizing three-dimensional (3D) aromatic molecules to create 2D monolayer-structured materials. Importantly, by incorporating 3D aromatic building blocks into this class of materials, in accordance with embodiments, it is possible to bypass the fundamental limitation of graphene and similar materials, where any covalent modification of its surface inherently leads to disruption in conjugation and conductivity.

Recent interest in two-dimensional (2D) materials, such as graphene, has spurred a significant research effort in creating design rules allowing deliberate synthesis of new classes of such materials. 2D materials show potential promise in electronics, sensors, and catalysts. (See, e.g., Geim, A. K., Novoselov, K. S., *Nature Materials* 2007, Volume 6, 183-191; and Allen, M. J., et al., *Chem. Rev.* 2010, 11, 132-145, the disclosures of which are incorporated herein by reference.) For example, graphene, a 2D honeycomb-like network of carbon, is an excellent candidate material for electronics due to its extremely high conductivity. Graphene's high conductivity stems from a continuous 2D π-orbital conjugation, which allows electrons to freely flow along the graphene surface. However, π-orbitals of one layer can overlap with it-orbitals of another layer resulting in π-π stacking interactions that hold two or more sheets of this material together. In some cases, the unique property of the 2D material diminishes, as additional layers are stacked together. This prompted researchers to look for general methods to exfoliate individual sheets of graphene and similar 2D materials. Although 2D conjugated molecules have been extensively studied and used to create 2D materials, there are no reports addressing the possibility for utilizing three-dimensional (3D) aromatic molecules to create 2D monolayer-structured materials. In order to synthesize an "ideal" 2D material consisting of aromatic boron clusters one needs to address the following two challenges: 1) identify whether the incorporation of boron clusters in 2D sheets can suppress π-π interactions leading to self-exfoliated materials 2) develop the design rules allowing one to maximize electronic conductivity in the polymers consisting of 3D aromatic boron clusters and 3) develop post-synthetic modification tools on the corresponding materials allowing to selectively graft ligand moieties around the cluster species.

Accordingly, embodiments are directed to a class of carborane-containing covalent organic frameworks. Covalent organic frameworks (COFs) are crystalline organic supramolecular arrays composed of molecular building blocks. (See, e.g., El-Kaderi, H. M., et al., *Science* 2007, Volume 316, 268-272; Farha, O. K., et al., *Chemistry of Materials* 2009, Volume 21, 3033-3035; Kuhn, P., et al., *Angew. Chem., Int. Ed.* 2008, Volume 47, 3450-3453; DeBlase, C. R., et al., *Chem. Mater.* 2015, 9, 3178-3183; Smith, B. J., et al., *J. Am. Chem. Soc.* 2014, 136, 8783-8789; and Duhovic, S. and Dincă, M., *Chem. Mater.* 2015, 27, 5487-5490, the disclosures of which are incorporated herein by reference.) COFs were previously constructed from it-conjugated molecules and shown to exhibit a high degree of π-conjugation. Consequently, COF sheets exhibit pronounced π-π stacking interactions. Functionalizing the molecular building blocks with carborane derivatives presents an opportunity to develop COF systems with suppressed π-π interactions, since boron clusters lack cofacially exposed it aromatic orbitals (FIGS. 46A & B). (See, e.g., Spokoyny, A. M., Pure and *Appl. Chem.* 2013, 85, 903-919; and R. N. Grimes, "Carboranes" 2nd Ed. Elsevier, the disclosures of which are incorporated herein by reference.)

Furthermore, the strength of π-π interactions may be controlled by tuning the amount of carborane moieties present in the molecular building blocks.

Figure 49:
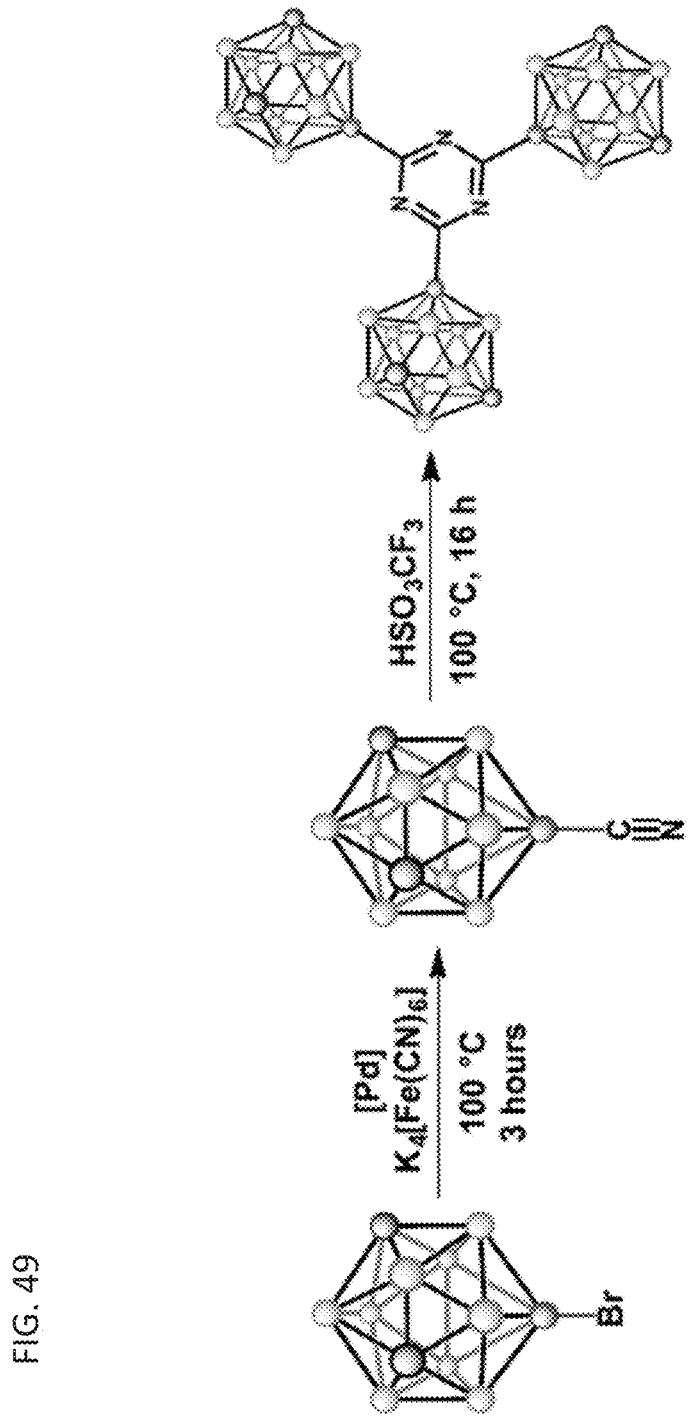
FIG. 49 illustrate: results highlighting the synthesis of B-functionalized carboranes featuring cyanide moiety, in accordance with embodiments of the invention.

In order to achieve highly functionalized boron clusters it is important to identify regio- and chemospecific transformations on the boron clusters that can serve as building blocks to construct 2D materials. Previously, it has been shown that by virtue of incorporating multiple cyanide groups within organic molecules, one could assemble conducting COF materials. In order to achieve this goal, a new cross-coupling chemistry that allows one to precisely graft cyanide functional groups on the boron vertices of carborane cluster has been developed. For example, 9-bromo-metacarborane species can be converted into the corresponding cyano derivative in 90% yield (FIG. 49). A cyclomerization reaction was performed with a strong acid. The acid-mediated trimerization has proceeded quantitatively as evidenced by $^{11}$B NMR spectroscopy producing trimer species and suggesting the synthetic feasibility of our strategy. In embodiments, the developed chemistry may be utilized to construct several bifunctional carborane-based building blocks amenable for polymerization. Specifically, embodiments are directed to the synthesis of difunctionalized cyanocarboranes, which can be tested as monomers under the ionothermal polymerization conditions in molten $ZnCl_2$ at 400° C. Carborane-containing 2D polymer sheets should be amenable to a facile functionalization. For example, CH vertices in these clusters can undergo base-promoted reactions with electrophiles allowing one to install functional handles within these 2D layers. Furthermore, BH activation with organometallic reagents may be utilized in order to create species containing densely functionalized clusters. While COF structures can be elucidated by powder X-ray diffraction studies providing important information regarding the inter-layer spacing parameters, solid-state NMR spectroscopy may significantly complement and enhance our structural understanding of these materials. Specifically, solid-state $^{11}$B NMR spectroscopy may be used to address the stability and degree of functionalization of these materials. Synthesized 2D materials, in accordance with embodiments, may be used for attachment of small receptor molecules (sugars, peptides), and ultimately aid the discovery process for the previous goal.

Alternative Cluster Constructs

Some embodiments are directed to the synthesis of fully alkylated closo-hexaborate dianions. In various embodiments, the reaction of $[NBu_4][B_6H_6H^{fac}]$, benzyl bromide, and triethylamine under microwave heating conditions affords persubstituted $[NBu_4][B_6(CH_2AR)_6H^{fac}]$ ($Ar=C_6H_5$, 4-Br—$C_6H_4$), which have been isolated and characterized by NMR spectroscopy, mass spectrometry, single crystal X-ray diffraction, and other spectroscopic techniques. Electrochemical studies of embodiments of these clusters reveal an irreversible one-electron oxidation likely indicating degradative cage rupture. The observed metal-free alkylation in accordance with embodiments proceeds as a consequence of the pronounced nucleophilic character of the hexaborate anion. Embodiments represent the first example of a perfunctionalized hexaborate cluster featuring B—C bonds.

Many polyhedral boron clusters have been shown to exhibit enhanced stability relative to more commonly encountered tricoordinate boranes. This stability has been ascribed to the unique bonding arrangement and three-dimensional aromatic character of these polyhedral clusters. (See, e.g., King, R. B.; Rouvray, D. H. *J. Am. Chem. Soc.* 1977, 99, 7834; Aihara, J.-I. *J. Am. Chem. Soc.* 1978, 100, 3339; Bridgeman, A. J. & Empson, C. *J. Chem. Sci.* 2008, 32, 1359; Housecroft, C. E., et al., *Polyhedron* 1985, 4, 1875; Zhao, M. & Gimarc, B. M., *Inorg. Chem.* 1993, 32, 4700; and King, R. B. *Chem. Rev.* 2001, 101, 1119, the disclosures of which are incorporated herein by reference.) For example, the $B_{12}H_{12}^{2-}$ dianion is one of the most kinetically stable compounds known, capable of withstanding strongly acidic, oxidizing, and basic conditions, as well as heating in air beyond 600° C. (See, e.g., Pitochelli, A. R. & Hawthorne, M. F. *J. Am. Chem. Soc.* 1960, 82, 3228-3229; and Muetterties, E. L., et al., *Inorg. Chem.* 1964, 3, 444-451, the disclosures of which are incorporated herein by reference.) Partial and exhaustive functionalization of this cluster can furnish unique molecular scaffolds, which are potentially useful for a wide range of applications including, but not limited to, photoactive materials, polymers, electrolytes, catalysts, therapeutics, and diagnostic agents in biomedicine.
(See, e.g., Grimes, R. N. *J. Chem. Ed.* 2004, 81, 657; Kaim, W. et al., *Angew. Chem. Int. Ed.* 2009, 48, 5082; Nunez, R, et al., *F. Chem. Rev.* 2016, 116, 14307; Peymann, T., et al., *Inorg. Chem.* 2001, 40, 1291; Peymann, T., et al., *J. Am. Chem. Soc.* 1999, 121, 5601; Peymann, T. et al., *Chem. Commun.* 1999, 2039; Ivanov, S. V. et al., *J. Am. Chem. Soc.* 2003, 125, 4694; Peryshkov, D. V. et al., *J. Am. Chem. Soc.* 2010, 132, 13902; Nieuwenhuyzen, M et al., *Inorg. Chem.* 2009, 48, 889; Boeré, R. T. et al., *Chem. Eur. J.* 2014, 20, 4447; Maderna, A. et al., *Angew. Chem. Int. Ed.* 2001, 40, 1661; Zhang, Y. et al., *Eur. J. Inorg. Chem.* 2015, 5158; Gu, W. et al., *Inorg. Chem.* 2011, 50, 2726; Van, N. et al., *Chem. Eur. J.* 2010, 16, 11242; Messina, M. S. et al., *J. Am. Chem. Soc.* 2016, 138, 6952; Ma, L. et al., *Inorg. Chem.* 2006, 45, 278; Lee, Jr., M. W. *Angew. Chem. Int. Ed.* 2017, 56, 138; Hawthorne, M. F. *Angew. Chem. Int. Ed.* 1993, 32 950; Kultyshev, R. G. et al., *J. Am. Chem. Soc.* 2002, 124, 2614; Satapathy, R. et al., *J. Organomet. Chem.* 2015, 798, 13; Sivaev, I. B., et al. *Russ. Chem. Bull. Int. Ed.* 2002, 51, 1362; Nakamura, H. et al., *Org. Biomol. Chem.* 2012, 10, 1374, the disclosures of which are incorporated herein by reference.) The ability to design and tune these molecules remains crucial for producing desirable properties and reactivity.

Figure 50:
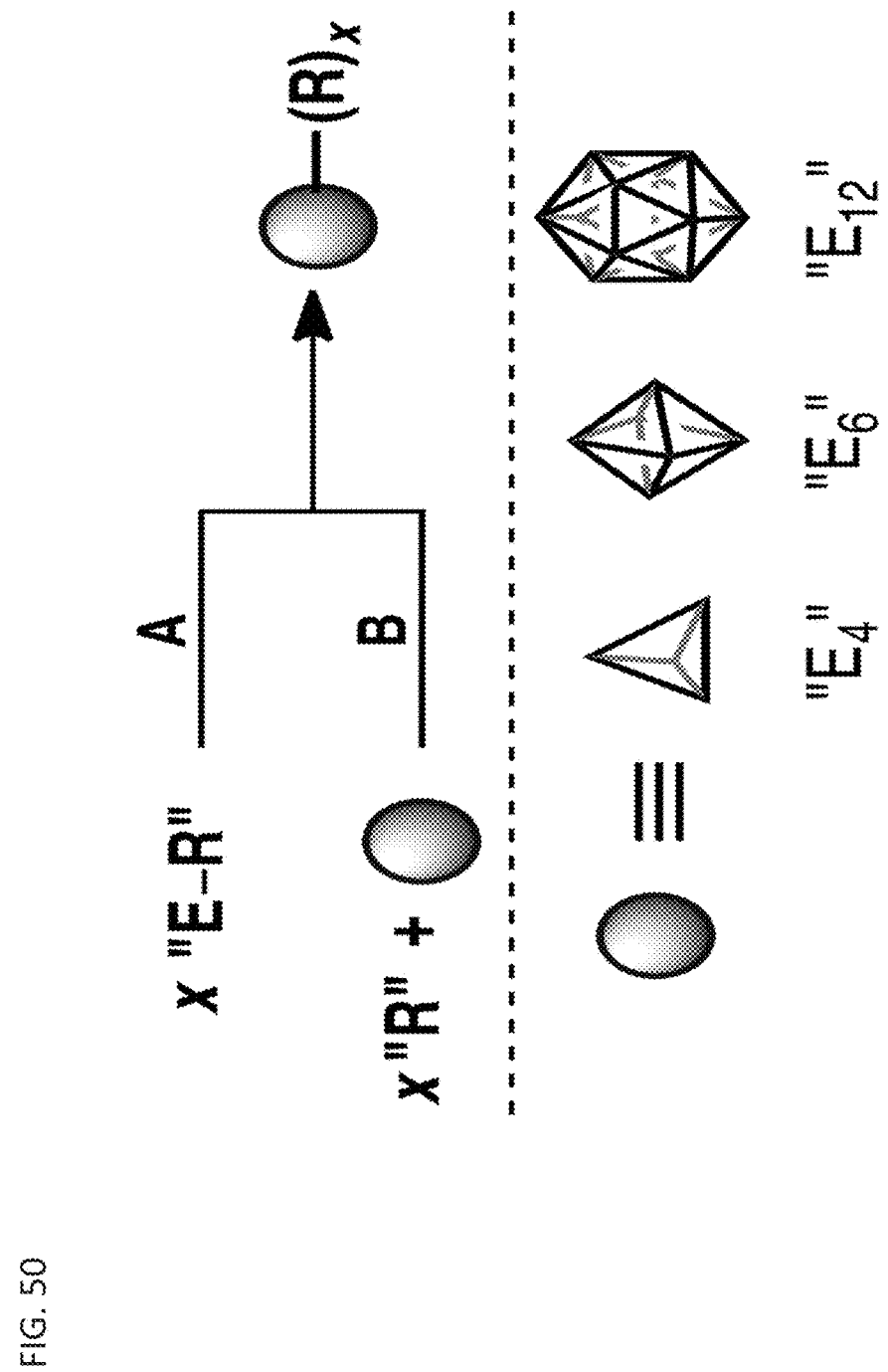
FIG. 50 illustrates: two general approaches for synthesizing substituted Group 13 clusters: A) involves the combination of substituted fragments "E-R" of one or several types to form the desired molecule; and B) employs a preformed cluster and an external functionality "R" to form the same desired framework, in accordance with embodiments of the invention.

In general, two main approaches to persubstituted Group 13 polyhedral clusters in accordance with embodiments exist. The first involves the assembly of prefunctionalized fragments to form the desired cluster-based motif (FIG. 50, Route A). This approach has frequently been utilized in the context of Group 13 clusters—most notably in the seminal work by Schnöckel—and to a lesser degree with small boron-based clusters. (See, e.g., Linti, G. et al., *N Clusters of the Heavier Group* 13 *Elements. In Molecular Clusters of the Main Group Elements*, Wiley-VCH: Weinheim, 2004, pp. 126-168; and Dohmeier, C. et al., *Angew. Chem. Int. Ed.* 1991, 30, 564, the disclosures of which are incorporated herein by reference.) The second approach involves first the synthesis of an unsubstituted cluster core precursor, which is then elaborated with functional groups (FIG. 50, Route B). This latter approach has been applied almost exclusively in boron cluster chemistry, particularly with the icosahedral boron clusters. This is not surprising, given that unfunctionalized icosahedral boranes are significantly more stable than their heavier group 13 congeners and thus can serve as molecular precursors for the latter method of synthesis. (See, e.g., Schnöckel, H. *Chem. Rev.* 2010, 110, 4125, the disclosure of which is incorporated herein by reference.)

Beyond icosahedra, other polyhedral boron clusters are known, and in contrast to the well-established chemistry of the $B_{12}H_{12}^{2-}$ dianion and its derivatives, the chemistry of the closo-hexaborate dianion, $B_6H_6^{2-}$— the smallest of the known deltahedral 3D aromatic boron clusters—has received much less attention. Predicted in 1954 and isolated in 1964, the $B_6H_6^{2-}$ dianion, which is stable under ambient conditions both in the solid and solution state, was quickly shown to be rather different than its icosahedral relative. (See, e.g., Eberhardt, W. H. et al., *J. Chem. Phys.* 1954, 22, 989; Longuet-Higgins, H. C. & de V. Roberts, M. *Proc. Royal Soc. London, A* 1954, A224, 336; Longuet-Higgins, H. C. & de V. Roberts, *M. Proceedings of the Royal Society of London A*, 1955, A230, 110; and Boone, J. L. *J. Am. Chem. Soc.* 1964, 86, 5036, the disclosures of which are incorporated herein by reference.) The pioneering work of Preetz revealed the apparent nucleophilic character of the hexaborate clusters to be significantly more pronounced than the $B_{12}H_{12}^{2-}$ species. (See, e.g., Preetz, W.; Peters, G. *Eur. J. Inorg. Chem.* 1999, 1831, the disclosure of which is incorporated herein by reference.) This observation led to some early examples demonstrating that $B_6H_6^{2-}$ can undergo partial substitution with carbon-based electrophiles to form B—C bonds; similar reactions with the dodecaborate scaffold have not been disclosed. To date, persubstitution of the hexaborate cluster has never been accomplished. Here embodiments provide the synthesis and properties of the first peralkylated hexaborate clusters, $B_6(CH_2Ar)_6^{2-}$ (Ar=$C_6H_5$, 4-Br—$C_6H_5$), generated as a consequence of the nucleophilic character of the hexaborate dianion.

Preetz and co-workers previously disclosed several examples of alkylated hexaborate clusters of the type $B_6R_nH_{6-n}^{2-}$ (n=1-3, R=alkyl) and it was ultimately suggested that alkylation would not proceed beyond three substitutions. B—C bond formation is thought to occur with concomitant migration of the terminal H from the B vertex to an adjacent face of the hexaborate cluster. This facial proton ($H^{fac}$) mitigates the nucleophilicity of the cluster and must be removed with base for further substitutions to occur. In the examples reported by Preetz, it was concluded that that removal of $H^{fac}$ was not possible beyond three B—C bond formations. (See, Preetz, cited above.) Using embodiments of microwave-assisted functionalization analogous with those described above with respect to $B_{12}H_{12}^{2-}$ with alkyl electrophiles, it is found possible to produce fully functionalized $B_6H_6^{2-}$ frameworks, bypassing previously encountered limitations.

Figures 51A, 51B:
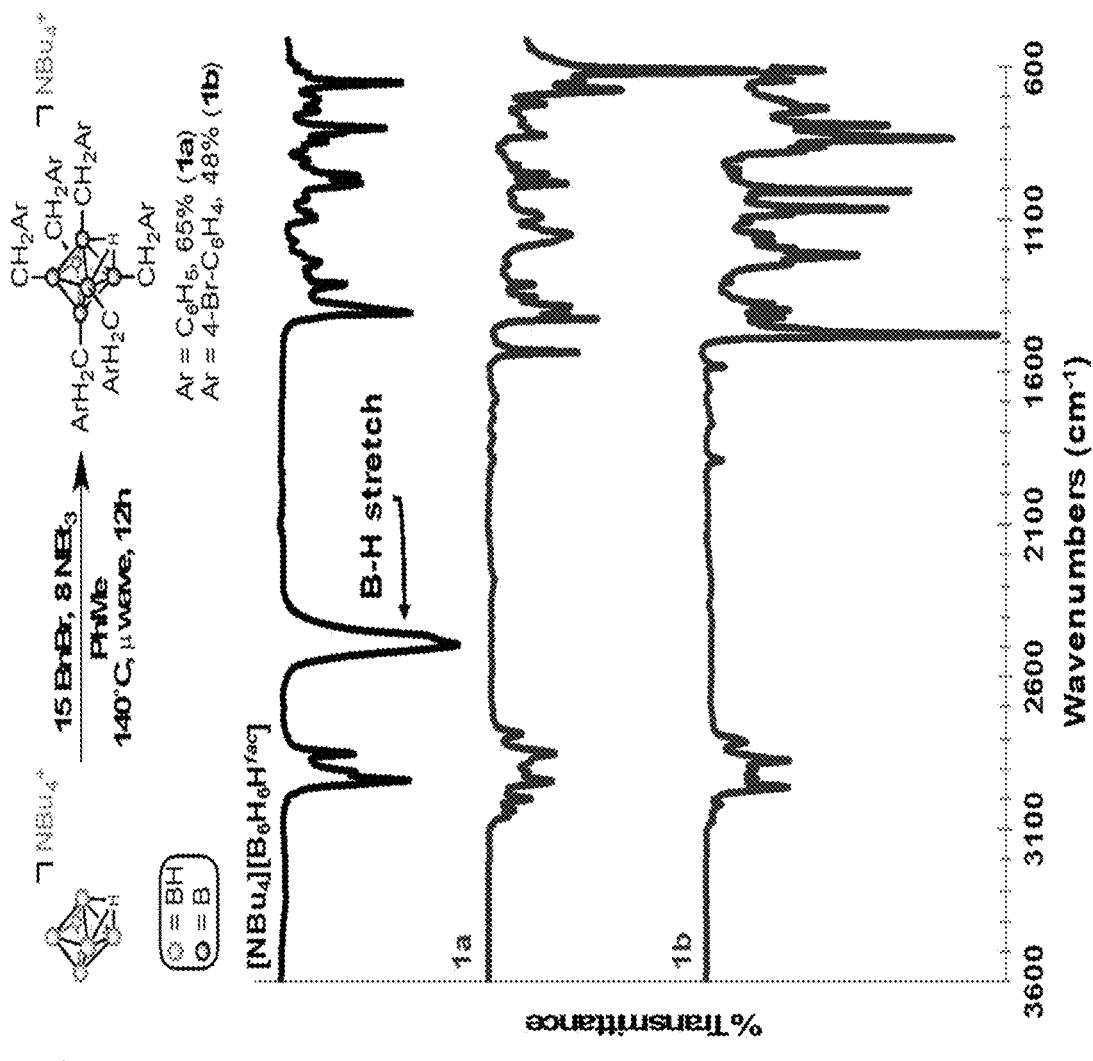
FIGS. 51A & 51B illustrates: A) synthetic scheme for [1a] and [1b] from $B_6H_6^{2-}$; and B) IR spectra of [NBu$^4$][B$_6$H$_6$H$^{fac}$], [1a], and [1b](the absence of stretching vibrations from ~2100-2600 cm$^{-1}$ for [1a] and [1b] suggests a lack of terminal B—H bonds and complete cluster substitution, in accordance with embodiments of the invention.
Figure 52:
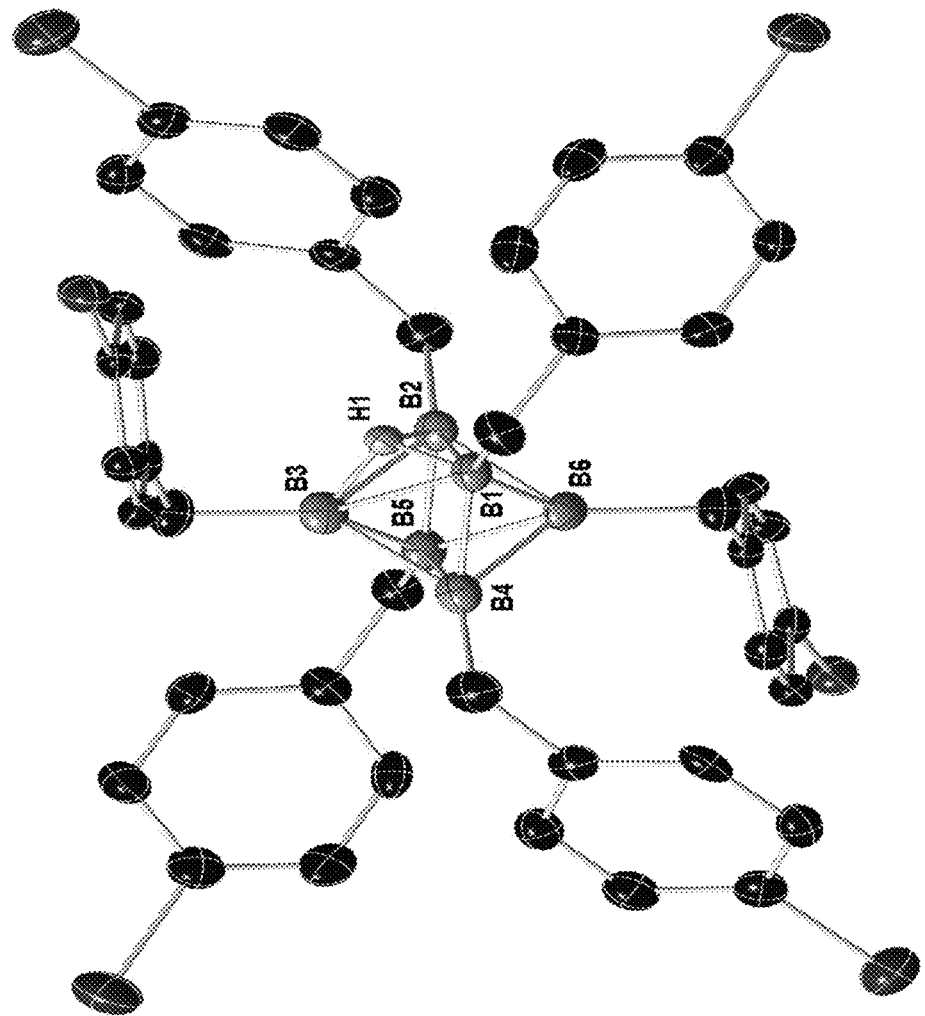
FIG. 52 illustrates the single crystal X-ray structure of [1b] in accordance with embodiments of the invention, with thermal ellipsoids at 50% probability (benzyl protons and the NBu$_4$ counterion are omitted for clarity; H1 (H$^{fac}$) was placed at the B1-B2-B3 face and refined; selected distances (Å): B1-B2, 1.817(8); B1-B3, 1.818(8); B1-B4, 1.725(9), B1-B6, 1.729(8); B2-B3, 1.788(8); B2-B5, 1.713(9), B2-B6, 1.739(8); B3-B4, 1.779(9); B3-B5, 1.769(8); B4-B5, 1.822 (8); B4-B6, 1.746(8); B5-B6, 1.764(8); and thermal ellipsoids (except for H1) are plotted at 50% probability).

In accordance with embodiments, treatment of [NBu$_4$][$B_6H_6H^{fac}$] with 30 equivalents of benzyl bromide and Hünig's base in CH$_3$CN under microwave heating conditions led to the formation of a new species displaying a single, broad resonance at δ−7.6 in the $^{11}$B NMR spectrum. Further optimization of the reaction conditions permitted the isolation of [NBu$_4$][$B_6H_6H^{fac}$][1a] after work-up in 65% yield (FIG. 51A). The facial proton in [1a] can be identified by its characteristic upfield shift at δ−3.8 in the $^1$H NMR spectrum. This assignment is consistent with previous spectroscopic and structural studies on analogous unfunctionalized and partially functionalized B6-based clusters as well as computational studies in which electron density maxima are found at each face of the B6 cluster. (See, e.g., Solntsev, K. A. et al., *J. Inorg. Chem.* 1986, 31, 633; Kuznetsov, I. Y. et al., *Dolk. Akad. Nauk. SSR* 1985, 283, 873; Forster, D. et al., *Eur. J. Inorg. Chem.* 2007, 3169; Hofmann, K. et al., *Chem. Comm.* 2007, 3097; Jacobsen, H. *Dalton Trans.* 2009, 4252; Brint, P. et al., *J. Chem. Soc., Dalton Trans.* 1981, 2515; Cavanaugh, M. A. et al., *Polyhedron* 1985, 4, 687; and Burkhardt, A. et al., *Anorg. Allg. Chem.* 1993, 619, 437, the disclosures of which are incorporated herein by reference.) Complete substitution is also strongly suggested by the disappearance of characteristic terminal B—H stretching vibrations at ~2400 cm$^{-1}$ in the infrared (IR) spectrum of purified [1a] (FIG. 51B).

X-ray diffraction of crystals of [1a] revealed significant disorder due to "wagging" of the benzyl substituents, which was also observed for [B$_6$H$_5$(CH$_2$Ph)]$^{2-}$. A functionalized benzyl electrophile was therefore employed in an attempt to impart greater order and crystallinity in the desired persubstituted product. Treatment of [NBu$_4$][B$_6$H$_6$H$^{fac}$] with 4-bromobenzyl bromide under otherwise identical conditions used to synthesize [1a] similarly affords a compound that displays a single broad peak in the $^{11}$B NMR spectrum at δ−7.6 and an IR spectrum consistent with [1a] (FIG. 51). Upon workup, perfunctionalized [1b] is afforded in 48% yield as a white, air-stable solid.

An X-ray diffraction study was carried out on single crystals of [1b] grown from a cooling solution of [1b] in boiling ethanol. [1b] crystallizes in the P21 space group with two independent ion pairs in the asymmetric unit. One NBu$^{4+}$ counterion is detected per cluster, supporting the proposed facially protonated species and consistent with the $^1$H NMR data.

While definitive location of the facial proton (H$^{fac}$) proved difficult, its position can be tentatively assigned based on the bond metrics of the B6-based core. The B1-B2-B3 face contains the three of the four longest B—B distances in the cluster (1.818, 1.818, and 1.789 Å), which are large in comparison to the average of all other B—B distances, 1.725 Å (range 1.713-1.824 Å). Although not to be bound by theory, it is therefore suggested that H$^{fac}$ is bound to this face of the cage in the solid state. This assignment is consistent with previous reports. (See, e.g., Baurmeister, J. et al., Naturforsch. 1995, 50b, 623, the disclosure of which is incorporated herein by reference.) All B—C bonds range from 1.592 Å-1.601 Å, which are consistent with the B—C bond distances in previously reported monobenzylated clusters.

While the homo- and heteroleptic perhalogenation (Cl, Br, I) of B$_6$H$_6$$^{2-}$ has been reported, embodiments of [1a-b] are the first molecules of their type in which carbon-based substituents are bound to each vertex of the hexaborate cage. (See, e.g., Preetz, W. & Fritze, J. Z. Naturforsch. 1984, 39b, 1472; Fritze, J. et al., Z. Naturforsch. 1987, 42b, 287; Fritze, J. & Preetz, W. Z. Naturforsch. 1987, 42b, 293; Preetz, W. & Stallbaum, M. Z. Naturforsch. 1990, 45b, 1113; Thesing, J.; Stallbaum, M.; Preetz, W. Z. Naturforsch. 1991, 46b, 602, the disclosures of which are incorporated herein by reference.) Indeed, the only other reports of perfunctionalized hexaborate clusters are the charge-neutral B$_6$(NR$_2$)$_6$ species (R=Me, Et). In contrast to embodiments [1a-b], the B$_6$(NR$_2$)$_6$ clusters irreversibly open into cyclic constitutional isomers when heated. Although not to be bound by theory, the formation of embodiments [1a-b] appears to proceed via a simple S$_N$2 mechanism.

Figures 53A, 53B, 53C:
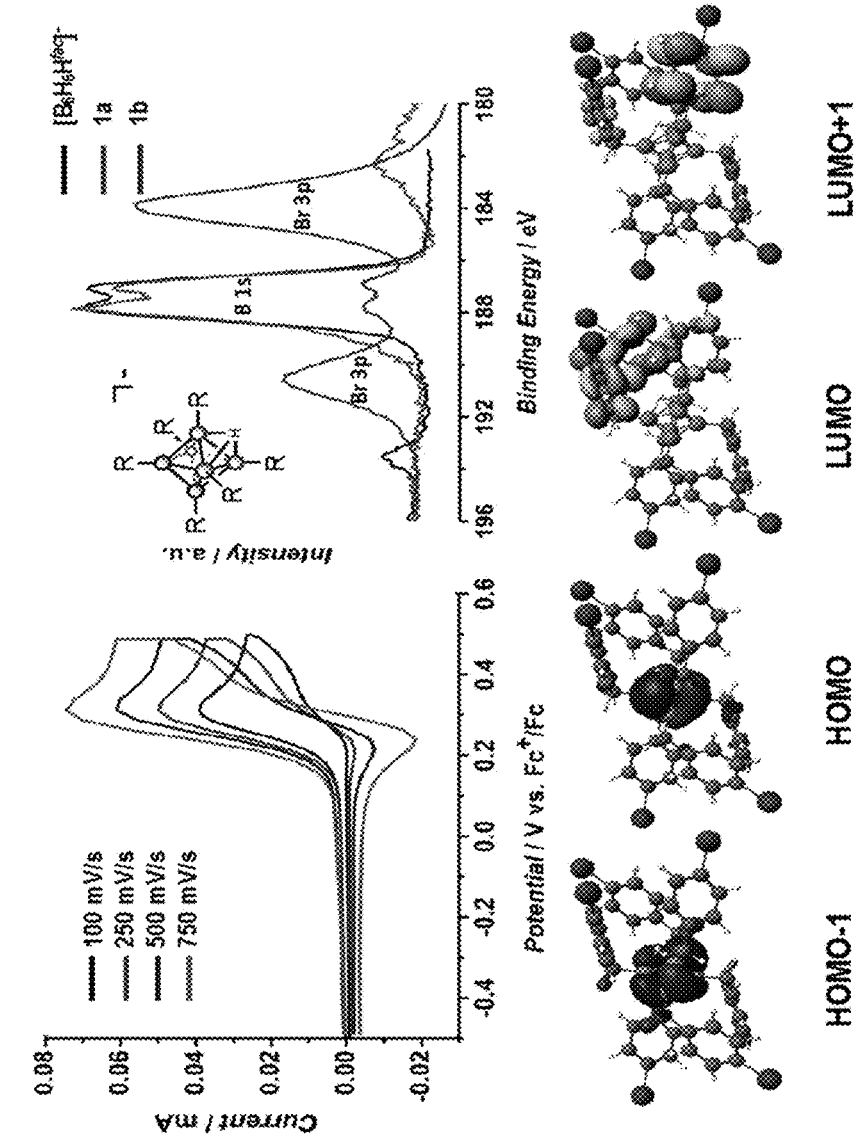
FIGS. 53A to 53C illustrate: A) cyclic voltammogram of [1a] in CH$_3$CN (faster scan rates reveal the pseudoreversibility of the 1−/0 redox couple); B) normalized X-ray photoelectron spectrum of [NBu$^4$][B6H$_6$H$^{fac}$], [1a] and [1b]; and C) Kohn-Sham representations derived from the DFT analysis of the frontier molecular orbitals of [1b], in accordance with embodiments of the invention.

Perhalogenated clusters B$_6$X$_6$$^{2-}$ (X=Cl, Br, I), mixed halogen clusters B$_6$X$_n$X'$_{6-n}$$^{2-}$ (X=F, Cl, Br, I; F=1 only), and B$_6$X$_5$R$^{2-}$ (R=alkyl) were previously shown to exhibit redox behavior. (See, e.g., Lorenzen, V., et al., Inorg. Chem. 1998, 37, 4011; Speiser, B.; Wizemann, T.; Wiirde, M. Inorg. Chem. 2003, 42, 4018; and Wanner, M. et al., Z. Naturforsch. 1999, 54b, 1103, the disclosures of which are incorporated herein by reference.) Based on this history, the electrochemical behavior of embodiments, [1a-b] was studied with cyclic voltammetry (CV). Solutions of [1a] and [1b] in anhydrous CH$_3$CN display apparent irreversible one-electron oxidation waves at 0.32 V and 0.46 V vs. Fc/Fc$^+$, respectively (FIG. 53A). The observed redox irreversibility is consistent with previous reports of hexaborate cluster decomposition under oxidizing conditions (vide infra). (See, e.g., Preetz, W.; Hake, M. G. Z. Naturforsch. 1992, 42b, 1119; and Preetz, W.; Steuer, B. Z. Naturforsch. 1996, 51b, 551, the disclosures of which are incorporated herein by reference.) Although not to be bound by theory, the anodic shift in the oxidative peak potential between [1a] and [1b] is likely due to the slightly more electron-withdrawing nature of the benzyl substituents in [1b]; similar substituent effects have been observed in hexaborate and dodecaborate systems.

As the scan rate is incrementally raised from 100 mV/s to 750 mV/s for [1a], a reverse reductive wave becomes more pronounced (FIG. 53A). These data suggest that the benzyl substituents of [1a] stabilize the transient neutral B$_6$Bn$_6$H$^{fac}$ toward decomposition relative to [NBu$_4$][B$_6$H$_6$H$^{fac}$]. One possible explanation lies in the peripheral benzyl substituents: the steric bulk of these groups likely prevents oxidative dimerization, which is known to occur with B$_6$H$_6$$^{2-}$. (See, e.g. Bublitz, D.; Franken, A.; Preetz, W.; Thomsen, H. Z. Naturforsch. 1996, 51b, 609, the disclosure of which is incorporated herein by reference.) Similar stabilizing effects by boron cluster substitution have been suggested by Michl in the context of icosahedral carba-closo-dodecaborates. (See, e.g., King, B. T. et al., J. Am. Chem. Soc. 2007, 129, 12960, the disclosure of which is incorporated herein by reference.) Therefore, the irreversibility of this redox couple must originate from some other mode of decomposition, likely cage degradation (vide infra). Although not to be bound by theory, the absence of redox reversibility at higher scan rates in the case of [1b] may be attributed to electronic differences in the benzyl substituents compared to [1a], which may destabilize the cluster to a greater degree upon oxidation.

The electronic structure of [1b] was probed using Density Functional Theory (DFT) at the BP86-D3/TZP level of theory and the frontier molecular orbital diagrams obtained from this study are presented in FIG. 53B. In agreement with previous computational studies of [B$_6$H$_6$]$^{2-}$ the highest occupied molecular orbital (HOMO) and the HOMO-1 are found to be delocalized across the eight faces of the octahedron. In contrast, the lowest unoccupied molecular orbital (LUMO) and the LUMO+1 are primarily located on the benzyl moieties. The observed decomposition of [1a] and [1b] under anodic electrochemical potentials (vide supra) is consistent with removal of an electron from the cluster-based HOMO, resulting in kinetic destabilization due to an overall reduction in bonding character and 3D aromaticity. (See, e.g., McKee, M. L. Inorg. Chem. 2002, 41, 1299; McKee, M. L. et al., J. Am. Chem. Soc. 2000, 122, 4781, the disclosures of which are incorporated herein by reference.)

To investigate the unique bonding structure of [1a] and [1b], X-ray photoelectron spectroscopy (XPS) measurements were performed to further probe the electronic landscape of the B6-based core (FIG. 53C). The B1s binding energy for [1a-b] and unfunctionalized cluster [NBu$_4$][B$_6$H$_6$H$^{fac}$] is observed to be ~187 eV, which is consistent with B1s binding energies previously measured for substituted icosahedral dodecaborate clusters. The degree and type of substitution (H vs. alkyl; benzyl vs. 4-bromobenzyl) do not seem to strongly affect the binding energy. Interestingly, two maxima in the 187 eV region were found for all compounds at 187.1 eV and 187.9 eV (FIG. 53C). This can be attributed to the existence of two distinct boron environments in [NBu$_4$][B$_6$H$_6$H$^{fac}$], [1a] and [1b]: one triangular face contains three boron atoms which share bonding interactions to H$^{fac}$; the other three atoms of the octahedron do not contain a B•••H$^{fac}$ interaction. Since higher binding energies roughly correlate with degree of oxidation, it is suggested that, given the reduction in electron density from one face of the octahedron by H+ in the form of a covalent bonding interaction relative to B—H units which do not contain this interaction, the peak of higher binding energy corresponds to the set of boron atoms binding B•••H$^{fac}$.

In summary, embodiments are also directed to the perfunctionalization of the hexaborate dianion, which is achievable via treatment with benzyl halides, resulting in the formation of six B—C bonds per cluster. Embodiments also provide for hexaborate clusters that may be (per)functionalized with other electrophiles to form B—R bonds of varying types. Embodiments of the compounds, which are stable solids under ambient conditions, exhibit irreversible electrochemical oxidations, likely the result of cage degradation, ultimately suggesting a differing reactivity from embodiments the peralkylated dodecaborate ($B_{12}R_{12}^{2-/1-}$) species.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A metal-free photooxidant comprising an icosahedral dodecaborate consisting of $B_{12}(OR)_{12}$,
where R is a substituent selected from the group consisting of $CH_2C_6F_5$, $CH_2(4\text{-}CF_3C_6H_4)$, and $CH_2(3,5\text{-}(CF_3)_2C_6H_3)$.

2. A molecular scaffold for forming atomically precise nanomolecules comprising an icosahedral dodecaborate of $B_{12}(OR)_{12}$,
where R is a perfluoroaryl terminated linker.

3. The molecular scaffold of claim 2, wherein the dodecaborate is perfunctionalized with one or more substituted aromatic perfunctionalization groups, and each of the perfluoroaryl terminated linkers is attached to the dodecaborate through said perfunctionalization groups.

4. The molecular scaffold of claim 2, wherein one or more of the fluorine atoms of the perfluoroaryl terminated linkers is substituted with a thiol-containing molecule or macromolecule.

5. The molecular scaffold of claim 4, wherein the thiol-containing macromolecule is a peptide such that the molecular scaffold is an organomimetic cluster nanomolecule.

6. The molecular scaffold of claim 2, wherein the molecular scaffold is PEGylated.

7. The molecular scaffold of claim 4, wherein the thiol-containing molecule is a recognition moiety.

8. The molecular scaffold of claim 7, wherein the recognition moieties are glycoconjugates.

9. The molecular scaffold of claim 8, wherein the glycoconjugates are linked with one or more molecules selected from the group consisting of proteins, peptides, lipid and saccharides.

10. The molecular scaffold of claim 7, wherein the molecular scaffold forms an organomimetic cluster nanomolecule that functions as one of an antibody, protein, histone or viral mimic.

11. The molecular scaffold of claim 10, wherein the molecular scaffold further comprises a viral scaffold and at least one fluorescent moiety, and wherein the molecular scaffold operates as a viral assay.

12. The molecular scaffold of claim 11, wherein the viral scaffold is a gp41 viral scaffold.

13. The molecular scaffold of claim 10, wherein the histone mimic comprises a periodic arrangement of cationic lysine residues separated by one or more helix-promoting hydrophobic amino acids.

* * * * *